US005596689A

United States Patent [19]

[11] Patent Number: 5,596,689

[45] Date of Patent: Jan. 21, 1997

Tamura et al.

[54] FIGURE PROCESSING WITH MAGNIFICATION OF DESIGNATED PORTION OF DISPLAY

[75] Inventors: Masaaki Tamura, Fuchu; Ayako Fujii; Yoshiko Kobari, both of Kawasaki; Mamoru Nagano, Yokohama; Kiyoshi Watanabe, Kawasaki; Hidehiko Morinaga, Tokyo; Shigeki Koyama, Yokohama; Yoshikazu Sawada, Inagi, all of Japan

[73] Assignee: Canon Kabushiki Kaisha, Tokyo, Japan

[21] Appl. No.: 739,500

[22] Filed: Aug. 2, 1991

[30] Foreign Application Priority Data

Aug. 3, 1990 [JP] Japan .................................... 2-206541

[51] Int. Cl.[6] ........................................ G06T 3/00

[52] U.S. Cl. .......................... 395/133; 395/139; 395/147; 395/155

[58] Field of Search .................................... 395/133, 139, 395/144–148, 155–161; 358/451

[56] References Cited

U.S. PATENT DOCUMENTS

| | | | |
|---|---|---|---|
| 4,622,641 | 11/1986 | Stephens | 395/155 X |
| 4,899,292 | 2/1990 | Montagna et al. | 395/147 |
| 4,907,095 | 3/1990 | Komura | 358/451 |
| 5,199,102 | 3/1993 | Sakuragi | 395/139 |

FOREIGN PATENT DOCUMENTS

| | | | |
|---|---|---|---|
| 64-71767 | 3/1989 | Japan | G09G 1/00 |

OTHER PUBLICATIONS

Newman et al., Principles of Interactive Computer Graphics, 2nd. ed., pp. 74–76 and 160–171 1983.

Shneiderman, "Designing Menu Selection Systems", Journal of Amer. Soc. for Information Science, Mar. 1986, pp. 57–70.

Foley et al., Fundametnals of Interactive Computer Graphics, 1982, pp. 40–43 and 78–87.

Ellis, "Postscript®, Bézier Curves, and Chinese Characters", ACM Computer Science Conf. (1989) 21–23 Feb., New York, pp. 162–165.

*Primary Examiner*—Almis R. Jankus
*Attorney, Agent, or Firm*—Fitzpatrick, Cella, Harper & Scinto

[57] ABSTRACT

A change in magnification of a figure pattern within a predetermined area is performed by designating a desired rectangular frame or one point on a screen, A plurality of menus associated with figure processes are performed by interruption,

10 Claims, 126 Drawing Sheets

| finefinefine | | FILE FORMING | DIGITIZING | CHR MODIFYING | UTILITY | DISPLAY CHECKING | PRINTER OUTPUTTING | END | | FILE |
|---|---|---|---|---|---|---|---|---|---|---|
| olmin_s | | NEW / CHANGE | USER'S NAME kohari | CODE | | | | | | PREVIOUS / NEXT |
| olmminmu800800 | | | | | | | | | | |
| ologotype | | | | | | | | | | |
| ologotype_s | | | | | | | | | | |
| oomdchbi720xxx | | | | | | | | | | |
| oomdchbu720xxx | | | | | | | | | | |
| ooodchbi720xxx | | | | | | | | | | |
| ooodchbu720xxx | | | | | | | | | | |

Labels: a-1, a-2, a-3, a-4, a-5, a-6, a-7, a-8, a-9, a-10, a-11, a-12, a-13, a-14, a-15, a-16, a-17

P DATA

|  | | |
|---|---|---|
| [0] | $P_0(x)$ | $P_0(y)$ |
|  | 0 | |
|  | | ↑ |
| [1] | $P_1(x)$ | $P_1(y)$ |
|  | 4 | |
|  | addr 2 | ↑ |
| [2] | $P_2(x)$ | $P_2(y)$ |
|  | 1 | |
|  | | ↑ |
| [n−1] | $P_{n-1}(x)$ | $P_{n-1}(y)$ |
|  | 0 | |
|  | | ↑ |

←addr 1   addr 2→

| n coef |
|---|
| $a_0$ |
| $b_0$ |
| $c_0$ |
| $d_0$ |
| $a_1$ |
| $b_1$ |
| $c_1$ |
| $d_1$ |
| $a_{ncoef-1}$ |
| $b_{ncoef-1}$ |
| $c_{ncoef-1}$ |
| $d_{ncoef-1}$ |

| ooAAxx720xxx | code | | | | |
|---|---|---|---|---|---|
| SCAN | 1 | 2 | 3 | 4 | 5 |
| CODE | 1 | 2 | 3 | 4 | 5 |
| CENTER | 1 | 2 | 3 | 4 | 5 |
| NOISE | 1 | 2 | 3 | 4 | 5 |
| OUTLINE | 1 | 2 | 3 | 4 | 5 |
| SYSTEM ERROR MESSAGE | | | | | |

CANCEL PAGE b-19

| 1 | 2 | 3 | 4 | 5 |

YES    NO

| No | SCAN | CHR | CODE |
|----|------|-----|------|
| 1  |      |     |      |
| 2  |      |     |      |
| 3  |      |     |      |
| 4  |      |     |      |
| 5  | A    |     |      |
| 6  | B    |     |      |
| 7  | C    |     |      |
| 8  | D    |     |      |
| 9  | E    |     |      |
| 10 | F    |     |      |
| 11 | G    |     |      |
| 12 | H    |     |      |
| 13 | I    |     |      |
| 14 | J    |     |      |
| 15 | K    |     |      |

SEQUENTIAL b-12

END OF CODE SETTING b-13

| SCAN    | 1 | 1 | 1 | 1 | 1 |
|---------|---|---|---|---|---|
| CODE    | 2 | 2 | 2 | 2 | 2 |
| CENTER  | 3 | 3 | 3 | 3 | 3 |
| NOISE   | 4 | 4 | 4 | 4 | 4 |
| OUTLINE | 5 | 5 | 5 | 5 | 5 |

AAAAAAAaaaaaa
先頭コードは未確定です。

| No | SCAN | CHR | CODE |
|----|------|-----|------|
| 1  | ■    |     |      |
| 2  | ■    |     |      |
| 3  | ■    |     |      |
| 4  | ■    |     |      |
| 5  | A    | A   | 2341 |
| 6  | B    | B   | 2342 |
| 7  | C    | C   | 2343 |
| 8  | D    | D   | 2344 |
| 9  | E    | E   | 2345 |
| 10 | F    | F   | 2346 |
| 11 | G    | G   | 2347 |
| 12 | H    | H   | 2348 |
| 13 | I    | I   | 2349 |
| 14 | J    | J   | 234a |
| 15 | K    | K   | 234b |

EXTERIOR DELETION | PAINT | END OF NOISE REMOVAL

| SCAN    |   |   | 1 | 1 | 1 | 1 | 1 |
|---------|---|---|---|---|---|---|---|
| CODE    |   | 2 | 2 | 2 | 2 | 2 |   |
| CENTER  |   |   | 3 | 3 | 3 | 3 | 3 |
| NOISE   |   |   | 4 | 4 | 4 | 4 | 4 |
| OUTLINE |   |   | 5 | 5 | 5 | 5 | 5 |

AoAAAAAAaaaaaa

| No | SCAN | CHR | CODE |
|---|---|---|---|
| 1 | ■ | | |
| 2 | ■ | | |
| 3 | ■ | | |
| 4 | ■ | | |
| 5 | A | A | 2341 |
| 6 | B | B | 2342 |
| 7 | C | C | 2343 |
| 8 | D | D | 2344 |
| 9 | E | E | 2345 |
| 10 | F | F | 2346 |
| 11 | G | G | 2347 |
| 12 | H | H | 2348 |
| 13 | I | I | 2349 |
| 14 | J | J | 234a |
| 15 | K | K | 234b |

| EXTERIOR DELETION | PAINT | END OF NOISE REMOVAL |
|---|---|---|
| b-15 | b-16 | b-17 |

| SCAN | 1 | 1 | 1 | 1 | 1 | 2 | 2 | 2 | 2 | 2 | 3 | 3 | 3 | 3 | 3 | 4 | 4 | 4 | 4 | 4 | 5 | 5 | 5 | 5 | 5 |
|---|---|---|---|---|---|---|---|---|---|---|---|---|---|---|---|---|---|---|---|---|---|---|---|---|---|
| CODE | | | | | | | | | | | | | | | | | | | | | | | | | |
| CENTER | | | | | | | | | | | | | | | | | | | | | | | | | |
| NOISE | | | | | | | | | | | | | | | | | | | | | | | | | |
| OUTLINE | | | | | | | | | | | | | | | | | | | | | | | | | |

AoAAAAAAAaaaaaaa

| No | SCAN | CHR | CODE |
|---|---|---|---|
| 1 | ■ | | |
| 2 | ■ | | |
| 3 | ■ | | |
| 4 | ■ | | |
| 5 | A | A | 2341 |
| 6 | B | B | 2342 |
| 7 | C | C | 2343 |
| 8 | D | D | 2344 |
| 9 | E | E | 2345 |
| 10 | F | F | 2346 |
| 11 | G | G | 2347 |
| 12 | H | H | 2348 |
| 13 | I | I | 2349 |
| 14 | J | J | 234a |
| 15 | K | | 234b |

AoAAAAAAaaaaaa

| SCAN | ■ | 2 | 3 | 4 | 5 |
| CODE | 1 | 2 | 3 | 4 | 5 |
| CENTER | 1 | 2 | 3 | 4 | 5 |
| NOISE | 1 | 2 | 3 | 4 | 5 |
| OUTLINE | 1 | 2 | 3 | 4 | 5 |

FIG. 30B

| |
|---|
| RE-DISPLAY |

| | | |
|---|---|---|
| SCROLL | ZOOM | STAND. SIZE |
| ORIGINAL on off | OUTLINE PAINT | LINE on off |
| SAMPLE on off | CURVE LINE | CURSOR on off |

FIG. 30C

| | | | | |
|---|---|---|---|---|
| | | POINT INSERT | POINT DELETE | |
| | | POINT REVERSE | RECTANGLE | |
| | | POINT ALIGNMENT | LINE WIDTH | POINT ALIGN. WITHIN AREA |
| | | VER/HOR | POINT MOVEMENT | |
| | | IMAGINARY | CURVE DESIGN | |
| | | VER/HOR | OUTLINE MOVEMENT | OUTLINE DELETION |
| CENTER | Undo | ELEMENT SYN. | SYN THE SIZE | CUT |
| | | MODIFY | FIGURE | CIRCLE |

FIG. 30D

| | | |
|---|---|---|
| POINT COORDINATE | LIST | |

FIG. 30E

| | | |
|---|---|---|
| CHR INPUT | LINE SETTING | BUSHU |

FIG. 30F

| | | |
|---|---|---|
| RETURN | TEMP STORAGE | REGIS./ END |

FIG. 30G

| | | |
|---|---|---|
| SCROLL | ZOOM | STAND. SIZE |

FIG. 30H

| | | |
|---|---|---|
| CODE 2426 | HEN | TSUKURI |

| nloop |
|---|

| n point | addr 1 ↑ |
|---|---|

D DATA

| $P_0(x)$ | $P_0(y)$ |
|---|---|
| L ||
| | ↑ |
| $P_1(x)$ | $P_1(y)$ |
| C ||
| addr 2 ↑ ||
| ⋮ ||
| $P_{n-1}(x)$ | $P_{n-1}(y)$ |
| L ||
| | ↑ |

addr 2 →

| npt ||
|---|---|
| $PT_0(x)$ | $PT_0(y)$ |
| $PT_1(x)$ | $PT_1(y)$ |
| ⋮ ||
| $PT_{npt-1}(x)$ | $PT_{npt-1}(y)$ |

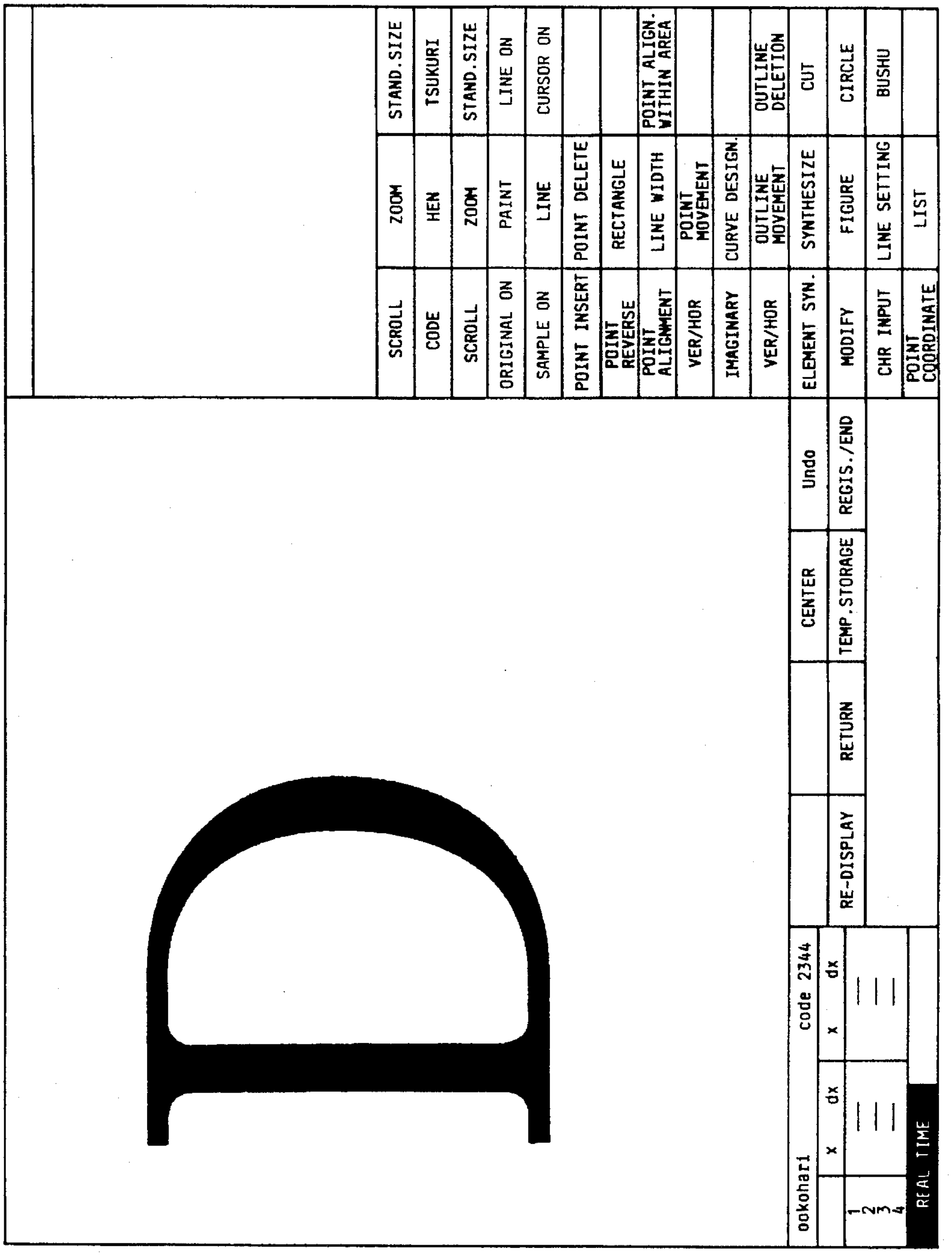

FIG. 44

| | | | | | STAND.SIZE | |
|---|---|---|---|---|---|---|
| | SCROLL | ZOOM | | | TSUKURI | |
| | CODE | HEN | | | STAND.SIZE | |
| | SCROLL | ZOOM | | | LINE ON | |
| | ORIGINAL ON | PAINT | | | CURSOR ON | |
| | SAMPLE ON | LINE | | | | |
| | POINT INSERT | POINT DELETE | | | | |
| | POINT REVERSE | RECTANGLE | | | POINT ALIGN. WITHIN AREA | |
| | POINT ALIGNMENT | LINE WIDTH | | | | |
| | VER/HOR | POINT MOVEMENT | | | | |
| | IMAGINARY | CURVE DESIGN. | | | | |
| | VER/HOR | OUTLINE MOVEMENT | | | OUTLINE DELETION | |
| | ELEMENT SYN. | SYNTHESIZE | | | CUT | |
| | MODIFY | FIGURE | | | CIRCLE | |
| | CHR INPUT | LINE SETTING | | | BUSHU | |
| | POINT COORDINATE | LIST | | | | |

| | | RE-DISPLAY | RETURN | CENTER | Undo | |
|---|---|---|---|---|---|---|
| | | | | TEMP.STORAGE | REGIS./END | |

ookohari    code 2344

| x | dx | x | dx |
|---|---|---|---|
| 1 | — | — | |
| 2 | — | — | |
| 3 | | | |
| 4 | | | |

REAL TIME

| |
|---|
| FIG. 64-2A |
| FIG. 64-2B |

| 86-1 | 86-2 | | 86-3 | 86-4 | | 86-5 |
|---|---|---|---|---|---|---|
| | x | | dx | y | | dy |
| 1 | 600 | | | 777 | | |
| 2 | 500 | — | 100 | 666 | — | 111 |
| 3 | 300 | — | 200 | 333 | — | 333 |
| 4 | 201 | — | 99 | 555 | — | 222 |
| | REAL TIME | | | 317 | | 371 |

86-6

86-7

| FIG. 89A | FIG. 89B |
|---|---|

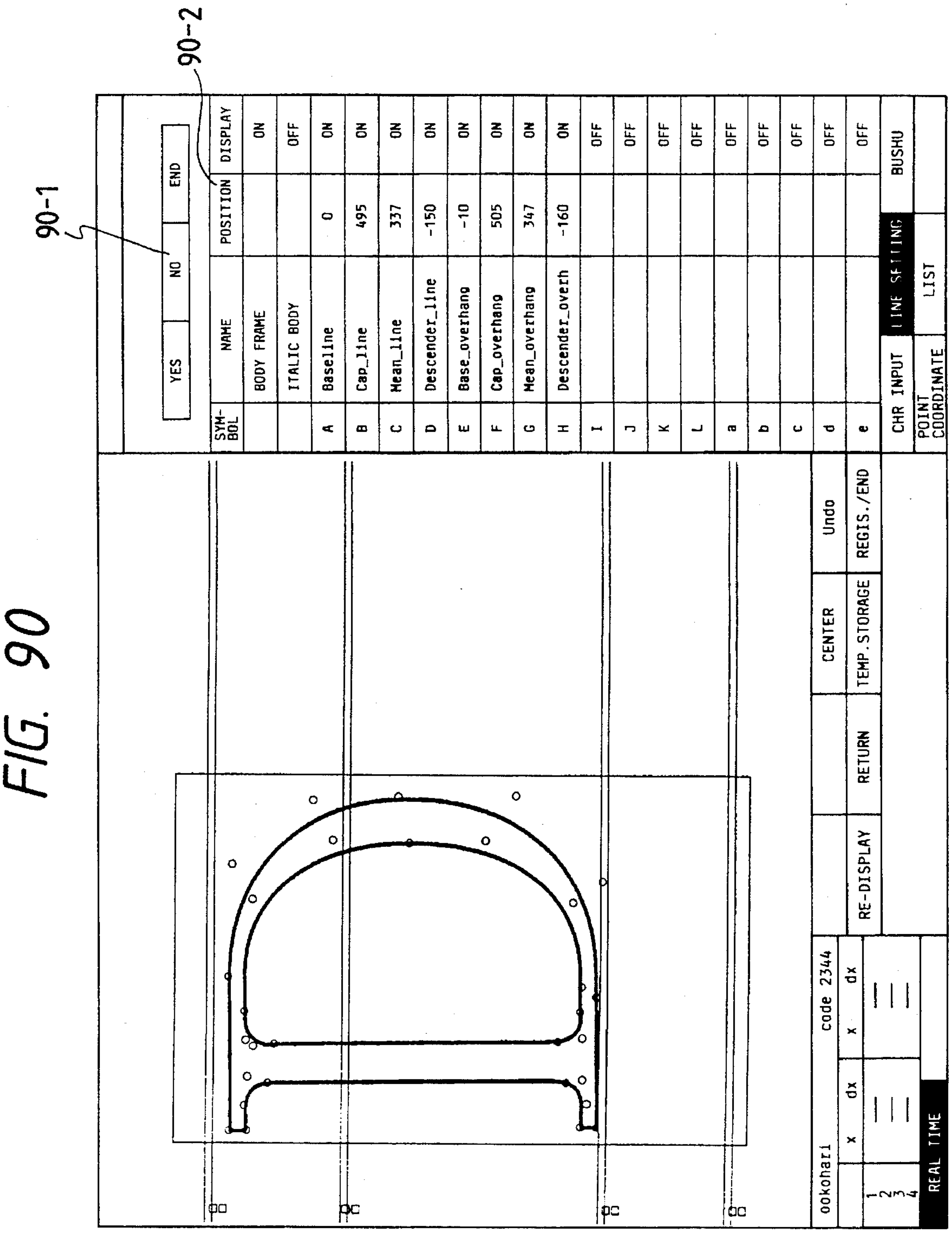

FIG. 90

| YES | NO | END |
|-----|----|----|

| SYM-BOL | NAME | POSITION | DISPLAY |
|---------|------|----------|---------|
|   | BODY FRAME |  | ON |
|   | ITALIC BODY |  | OFF |
| A | Baseline | 0 | ON |
| B | Cap_line | 495 | ON |
| C | Mean_line | 337 | ON |
| D | Descender_line | -150 | ON |
| E | Base_overhang | -10 | ON |
| F | Cap_overhang | 505 | ON |
| G | Mean_overhang | 347 | ON |
| H | Descender_overh | -160 | ON |
| I |  |  | OFF |
| J |  |  | OFF |
| K |  |  | OFF |
| L |  |  | OFF |
| a |  |  | OFF |
| b |  |  | OFF |
| c |  |  | OFF |
| d |  |  | OFF |
| e |  |  | OFF |

| CHR INPUT | LINE SETTING | BUSHU |
|-----------|--------------|-------|
| POINT COORDINATE | LIST |  |

| RE-DISPLAY | RETURN | CENTER | Undo |
|------------|--------|--------|------|
|  | TEMP.STORAGE | REGIS./END |  |

ookohari    code 2344

| x | dx | x | dx |
|---|----|----|----|
| 1 |  |  |  |
| 2 |  |  |  |
| 3 |  |  |  |
| 4 |  |  |  |

REAL TIME

| FIG. 92A |
|---|
| FIG. 92B |

DISPLAY CHECK

| 95-2 | ooAAAAmu720xxx |
| 95-3 | CODE 2341 ~ 237A |
| 95-4 | RESOLUTION 300 dpi |
| 95-5 | POINT 12 pt. / NO. OF DOTS 50 dot |
| 95-6 | QUALITY CHECK / CENTER CHECK |
| 95-7 | END OF CHECK |
| 95-8 | SYSTEM ERROR MESSAGE |
| 95-9 | FILE / PREVIOUS / NEXT |

95-1:
- ooAAAAmu720xxx
- ooBBBBmu720xxx
- ooCCCCmu720xxx
- ooDDDDmu720xxx
- ooEEEEmu720xxx
- ooFFFFmu720xxx
- ooGGGGmu720xxx

PRINTER OUTPUT

| 97-2 | ooAAAAmu720xxx |
| 97-3 | CODE 2341 ~ 237A |
| 97-4 | 300 dpi |
| 97-5 | Outline — A, B, C, D |
| 97-6 | Scalable ~ pt. QUALITY CHECK / CENTER CHECK |
| 97-7 | LIST |
| 97-8 | END OF OUTPUT |
| 97-9 | SYSTEM ERROR MESSAGE |
| 97-10 | FILE / PREVIOUS / NEXT |

97-1:
- ooAAAAmu720xxx
- ooBBBBmu720xxx
- ooCCCCmu720xxx
- ooDDDDmu720xxx
- ooEEEEmu720xxx
- ooFFFFmu720xxx
- ooGGGGmu720xxx

FIG. 99

Swiss Bold 216F - 237A

12 Point

¥$¢£%#&*ABCDEFGHIJKLMNOPQRSTUVWXYZabcdefghijklmnopqrstuvwxyz

H¥H$H¢H£H%H#H&H*HAHBHCHDHEHFHGHHHIHJHKHLHMHNHOHPHQHRHSHTHUHVH
HWHXHYHZHaHbHcHdHeHfHgHhHiHjHkHlHmHnHoHpHqHrHsHtHuHvHwHxHyHzH

O¥O$O¢O£O%O#O&O*OAOBOCODOEOFOGOHOIOJOKOLOMONOOOPOQOROSOTOUO
OVOWOXOYOZOaObOcOdOeOfOgOhOiOjOkOlOmOnOoOpOqOrOsOtOuOvOwOxOyOzO

□¥□$□¢□£□%□#□&□*□A□B□C□D□E□F□G□H□I□J□K□L□M□N□
□O□P□Q□R□S□T□U□V□W□X□Y□Z□a□b□c□d□e□f□g□h□i□j□
□k□l□m□n□o□p□q□r□s□t□u□v□w□x□y□z□

Swiss Bold QUALITY CHECK 216F - 237A

¥$¢£%#&*ABCDEFGHIJKLMNOPQRSTUVWXYZabcdefghijklmnopqrstuvwxyz 10 Point

¥$¢£%#&*ABCDEFGHIJKLMNOPQRSTUVWXYZabcdefghijklmnopqrstuvwxyz 11 Point

¥$¢£%#&*ABCDEFGHIJKLMNOPQRSTUVWXYZabcdefghijklmnopqrstuvwxyz

12 Point

¥$¢£%#&*ABCDEFGHIJKLMNOPQRSTUVWXYZabcdefghijklmnopqrstuvwxyz

13 Point

FIG. 100

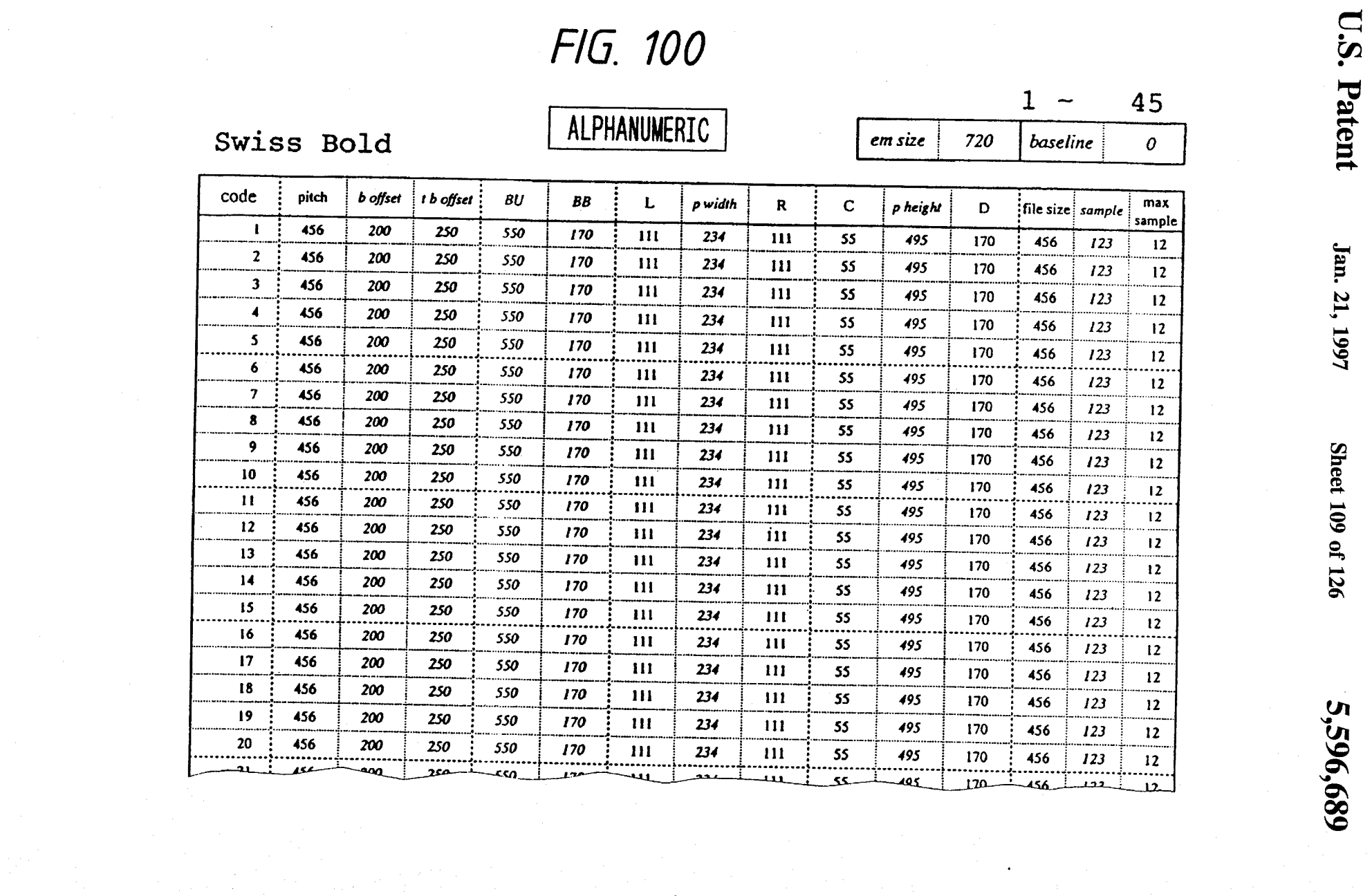

Swiss Bold

ALPHANUMERIC

1 ~ 45

| em size | 720 | baseline | 0 |
|---|---|---|---|

| code | pitch | b offset | t b offset | BU | BB | L | p width | R | C | p height | D | file size | sample | max sample |
|---|---|---|---|---|---|---|---|---|---|---|---|---|---|---|
| 1 | 456 | 200 | 250 | 550 | 170 | 111 | 234 | 111 | 55 | 495 | 170 | 456 | 123 | 12 |
| 2 | 456 | 200 | 250 | 550 | 170 | 111 | 234 | 111 | 55 | 495 | 170 | 456 | 123 | 12 |
| 3 | 456 | 200 | 250 | 550 | 170 | 111 | 234 | 111 | 55 | 495 | 170 | 456 | 123 | 12 |
| 4 | 456 | 200 | 250 | 550 | 170 | 111 | 234 | 111 | 55 | 495 | 170 | 456 | 123 | 12 |
| 5 | 456 | 200 | 250 | 550 | 170 | 111 | 234 | 111 | 55 | 495 | 170 | 456 | 123 | 12 |
| 6 | 456 | 200 | 250 | 550 | 170 | 111 | 234 | 111 | 55 | 495 | 170 | 456 | 123 | 12 |
| 7 | 456 | 200 | 250 | 550 | 170 | 111 | 234 | 111 | 55 | 495 | 170 | 456 | 123 | 12 |
| 8 | 456 | 200 | 250 | 550 | 170 | 111 | 234 | 111 | 55 | 495 | 170 | 456 | 123 | 12 |
| 9 | 456 | 200 | 250 | 550 | 170 | 111 | 234 | 111 | 55 | 495 | 170 | 456 | 123 | 12 |
| 10 | 456 | 200 | 250 | 550 | 170 | 111 | 234 | 111 | 55 | 495 | 170 | 456 | 123 | 12 |
| 11 | 456 | 200 | 250 | 550 | 170 | 111 | 234 | 111 | 55 | 495 | 170 | 456 | 123 | 12 |
| 12 | 456 | 200 | 250 | 550 | 170 | 111 | 234 | 111 | 55 | 495 | 170 | 456 | 123 | 12 |
| 13 | 456 | 200 | 250 | 550 | 170 | 111 | 234 | 111 | 55 | 495 | 170 | 456 | 123 | 12 |
| 14 | 456 | 200 | 250 | 550 | 170 | 111 | 234 | 111 | 55 | 495 | 170 | 456 | 123 | 12 |
| 15 | 456 | 200 | 250 | 550 | 170 | 111 | 234 | 111 | 55 | 495 | 170 | 456 | 123 | 12 |
| 16 | 456 | 200 | 250 | 550 | 170 | 111 | 234 | 111 | 55 | 495 | 170 | 456 | 123 | 12 |
| 17 | 456 | 200 | 250 | 550 | 170 | 111 | 234 | 111 | 55 | 495 | 170 | 456 | 123 | 12 |
| 18 | 456 | 200 | 250 | 550 | 170 | 111 | 234 | 111 | 55 | 495 | 170 | 456 | 123 | 12 |
| 19 | 456 | 200 | 250 | 550 | 170 | 111 | 234 | 111 | 55 | 495 | 170 | 456 | 123 | 12 |
| 20 | 456 | 200 | 250 | 550 | 170 | 111 | 234 | 111 | 55 | 495 | 170 | 456 | 123 | 12 |

FIGURE PROCESSING WITH MAGNIFICATION OF DESIGNATED PORTION OF DISPLAY

BACKGROUND OF THE INVENTION

1. Field of the Invention

The present invention relates to a figure processing method for graphic editing.

2. Related Background Art

A character set (font) of each style is required to process characters in an electronic device represented by a word-processor, workstation, or printer. For this purpose, a large number of character data must be prepared. In particular, each Japanese style requires at least about 6,500 characters defined in JIS X0208 "Information Exchange Kanji Code System". In addition, a system for expressing characters in the form of outline data requires design precision more strict than original analog characters in outline character data serving as basic character data so as to enhance aesthetic effects because this system has an advantage in that only one basic character set can output character data of all sizes. Font formation based on this assumption requires a manual character forming time of several tens of minutes to several hours per character, thus resulting in inefficient jobs.

The following basic functions are assumed in editing of characters, figures, and the like in addition of the font formation. These functions are a digitizing function, i.e., a function of optically scanning an analog character pattern to obtain binary data and generating character outline data, and a character forming function, i.e., a function of editing the editing outline data generated and formed by the digitizing function to obtain final outline data having the desired quality.

The above figure process, however, poses the following problem.

When various figure processes are to be performed, e.g., when menu display is to be performed, however, one menu process is ended when another menu process is selected. The second menu must be started after the first menu operation is interrupted, resulting in degradation of workability.

The above figure process has the following problem. When a figure is to be enlarged, the entire figure is fitted in a given frame, or an enlargement factor is input numerically. However, conventional system cannot freely enlarge a figure using simple operations. That is, a process for interrupting display of a figure pattern to designate enlargement and switching the current screen to a screen for setting the enlargement factor is required.

The above figure process also has the following problem. When a figure pattern is to be visually output and edited by editing the sample points on the basis of the sample point information for expressing the figure pattern, the editing figure pattern cannot be edited while displaying a nonedited figure pattern. As a result, the relationship between the pattern before editing and a pattern after editing cannot be easily grasped.

SUMMARY OF THE INVENTION

It is an object of the present invention, in consideration of the conventional problems described above, to provide a figure processing method capable of easily enlarging a figure pattern by plural types of operations.

It is an aspect of the present invention, in consideration of the conventional problems described above, to provide a figure processing method of displaying a figure pattern within a predetermined area, designating a desired rectangular frame in the predetermined area, determining an enlargement factor of the figure pattern or one point on the screen on the basis of the predetermined area and the rectangular frame, and determining the enlargement factor of the figure pattern.

It is still another aspect of the present invention, in consideration of the conventional problems described above, to provide a figure processing method capable of performing an interruption process with high efficiency when another menu is selected during execution of one menu display control menu.

It is still another aspect of the present invention, in consideration of the conventional problems described above, to provide a figure processing method capable of switching between a mode for displaying a nonedited figure pattern and a mode for not displaying the nonedited figure pattern when the figure pattern is edited.

BRIEF DESCRIPTION OF THE DRAWINGS

FIGS. 30A to 30H are views showing display screen states during character forming of this embodiment;

FIG. 44 is a view for explaining an outline-paining process of this embodiment;

FIGS. 64-1 to 64-3B (including FIGS. 64-1A, 64-1B, 64-2, 64-2A, 64-2B, 64-3A and 64-3B) are views for explaining the point alignment process of this embodiment;

FIG. 90 is a view for explaining a line setting process of this embodiment;

FIG. 99 is a view for explaining the printer output process of this embodiment;

FIG. 100 is a view for explaining the printer output process of this embodiment;

DETAILED DESCRIPTION OF THE PREFERRED EMBODIMENT

[Block Diagram of Figure Editing Apparatus]

A figure editing apparatus according to the present invention will be described with reference to the accompanying drawings.

Figure 1:
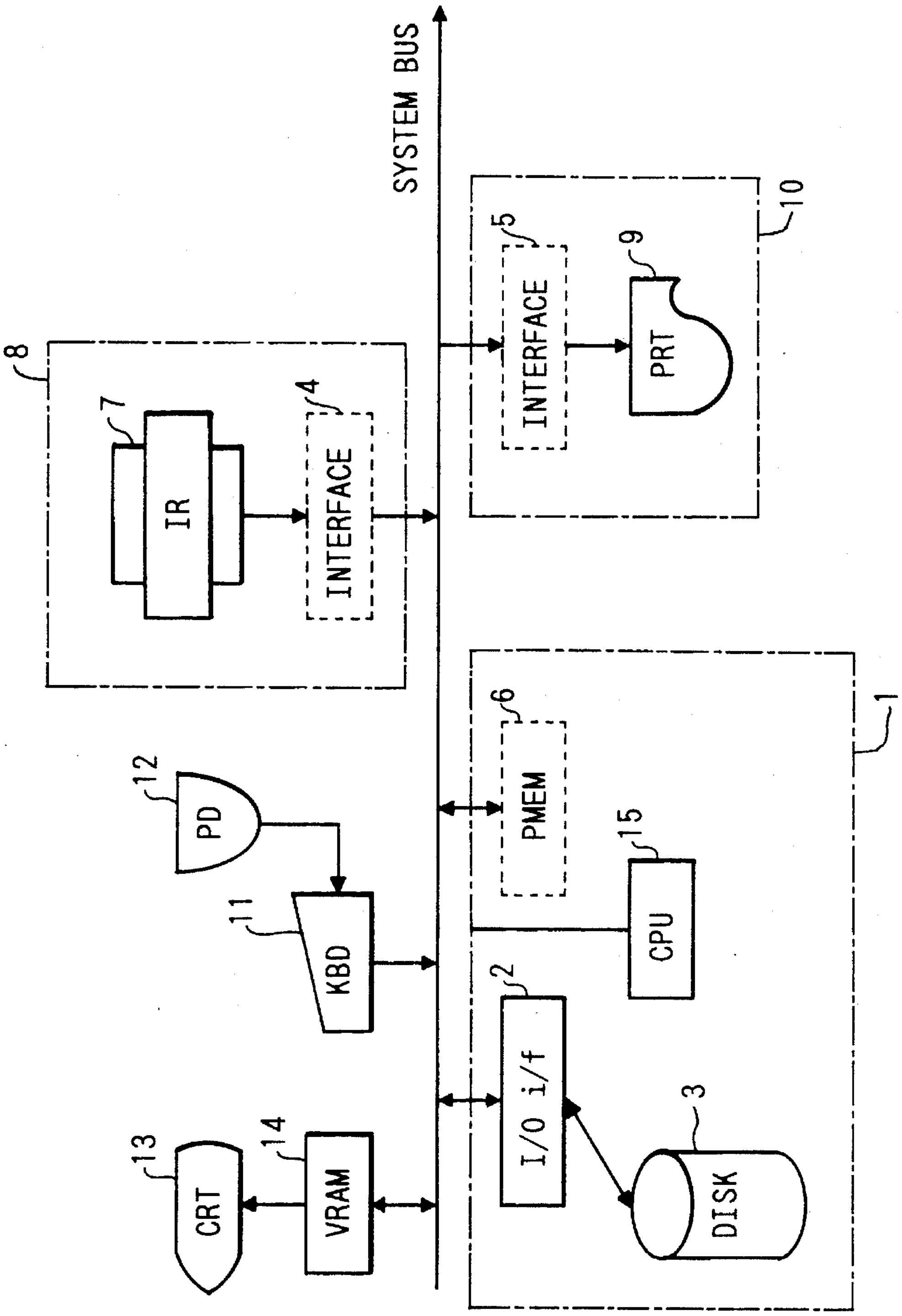
FIG. 1 is a block diagram showing a figure editing apparatus according to an embodiment of the present invention.

FIG. 1 is a block diagram of the figure editing apparatus which employs the present invention. Figures to the processing of which the present invention is applied include character images and other images. Various operations of the present invention are applicable to operations in all devices such as a copying machine, a facsimile machine, and a printer. The arrangement of the block diagram in FIG. 1 is not limited to a specific one, but can be replaced with an equivalent one. The blocks in FIG. 1 may be constituted by one device or a plurality of devices. A system in which a program is supplied to a device such as a workstation to achieve the functions of the present invention is also incorporated in the present invention. The present invention further incorporates both a graphic processing method and a graphic processing apparatus.

The graphic processing apparatus includes a control unit 1, an image input unit 8, and an image data output unit 10.

The control unit 1 includes an I/O i/f 2 serving as an interface with a hard disk or the like, a PMEM (Program Memory) 6 serving as an internal memory constituted by a RAM (Random Access Memory), an external storage device or disk 3 such as a hard disk, and a CPU (Central Processing Unit) 15. The PMEM 6 stores programs represented by flow charts (to be described later).

The image input unit 8 includes an IR (Image Reader) 7 serving as an image input unit for reading an image of an original placed on an original table and an interface 4 for interfacing with a system bus.

A CRT (Cathode-Ray Tube) 13 serving as an image processing display section of this graphic processing apparatus is connected to the control unit 1 through a VRAM (Video Memory) 14 in which data to be displayed on the CRT 13 is developed. A PD (Pointing Device) 12 for editing and processing image information on the CRT 13 is connected to the control unit 1 through a keyboard 11 for receiving a key input. The PD 12 arbitrarily moves a cursor in the X and Y directions to select a command image or the like to designate an operation designated by the selected command. At the same time, the PD 12 receives an arbitrary point of a figure displayed on the CRT 13 as coordinate information.

The image data output unit 10 includes a PRT (printer) 9 for outputting a hard copy as an image processing result in the graphic editing system, an interface 5 for interfacing with the PRT 9. The PRT 9 may be a laser beam printer, a bubble-jet printer for performing printing using inks, or the like.

An operation for processing a character pattern as one of figures will be exemplified below.

[Functional Block]

Figure 2:
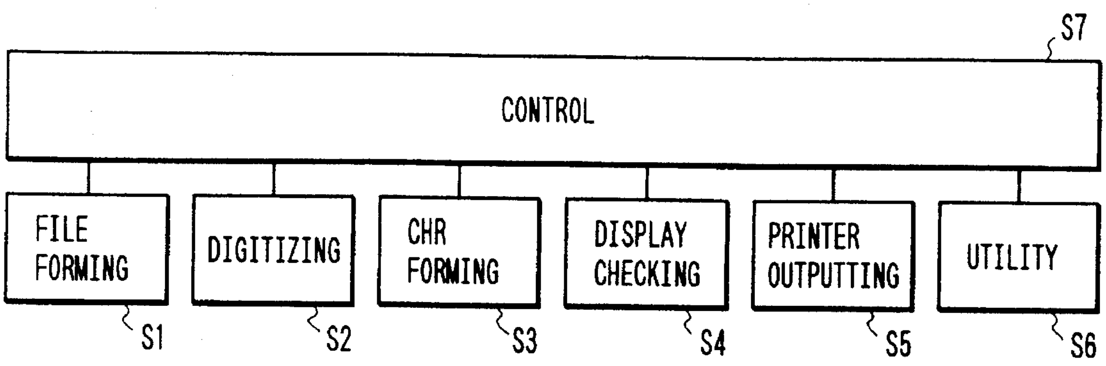
FIG. 2 is a functional block diagram of the figure editing apparatus of this embodiment.

FIG. 2 is a functional block diagram of the graphic editing apparatus which employs the present invention.

Referring to FIG. 2, in file forming S1, an area for storing character data, i.e., both an original data file and a font data file, are assured in the disk 3.

In digitizing S2, an original is read by the IR 7 and is converted into bit map data. An extraction process (to be described later) of the bit map data is performed and is converted into a form subjected to character forming S3 (to be described below). The converted data are stored in the original and font data files in the disk 3 (to be described in detail later).

In the character forming S3, the original and font data files formed in the digitizing S2 and stored in the disk 3 are loaded in the PMEM 6. Editing portions to be edited by using various functions (to be described later) and the edited original and font data are stored in the original and font data files in the disk 3.

In display checking S4, the font data formed in the character forming S3 is read out from the disk 3 and loaded in the PMEM 6. The loaded data is written in the VRAM 14 and displayed on the CRT 13.

In printer outputting S5, the font data formed by the character forming S3 is read from the disk 3 and loaded in the PMEM 6. The loaded data is processed and is output to the PRT 9.

In utility S6, the original and font data files formed in the digitizing S2 and the original and font data files formed in the character forming S3 are edited and managed.

Control S7 is a control part for controlling the respective functions described above.

The features of .the respective functions will be described below with reference to FIGS. 3 to 7.

[Digitizing]

Figure 3:
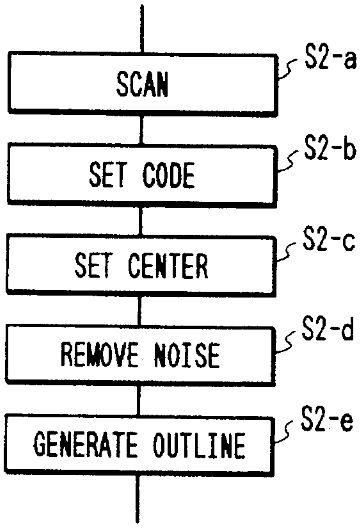
FIG. 3 is a block diagram for explaining a digitizing function of this embodiment.

The digitizing S2 has functions as shown in FIG. 3. That is, the digitizing S2 comprises a "scan" step S2-a, a "set code" step S2-b, a "set center" step S2-c, a "remove noise" step S2-d, and a "generate outline" step S2-e.

In the "scan" step S2-a, an original is scanned by the IR 7, and scanned image data is stored in the disk 3.

In the "set code" step S2-b, character codes are assigned to image data of the respective characters read in the "scan" step S2-a.

In the "set center" step S2-c, the center of each character is set for the corresponding image data. That is, a body frame is set.

In the "remove noise" step S2-d, the image data of each character is edited.

In the "generate outline" step S2-e, original data (to be described in detail later) and an outline (to be described in detail later) are generated from the image data of each character. The generated data are respectively stored in the original and font data files of the disk 3.

[Character Forming S3]

The character forming S3 in FIG. 2 will be described below. The character forming S3 has functions shown in FIG. 4. The functions of the character forming S3 are classified from its nature into display control S8, character data modification S9, character information display S10, character information I/O S11, and character data registration/completion S12.

The display control S8 has a function of controlling display during character data modification S9 (to be described later), i.e., a function of controlling states of characters displayed on the CRT 13. More specifically, these functions are of scroll S8-a, zoom S8-b, a standard size S8-c, original ON.OFF S8-d, sample ON.OFF S8-e, outline painting S8-f, line/curve display S8-g, line ON.OFF S8-h, cursor ON.OFF S8-i, and re-display S8-J.

The scroll S8-a performs scrolling of the display screen.

The zoom S8-b performs enlargement reduction in a display image.

The standard size S8-3 functions to display a currently displayed scrolled, enlarged, or reduced character at a predetermined screen position at a predetermined size.

The original ON.OFF S8-d determines whether the original data is displayed or not in an editing area A-1-1 (FIG. 30A) of the CRT 13 during the character data compensation S9.

The sample ON.OFF S8-e determines whether a sample point (to be described later) is displayed or not in an editing area (to be described later) of the CRT 13 during the character data correction S9.

The outline paining S8-f switches whether the font data currently displayed in the editing area A-1-1 (FIG. 30A) of the CRT 13 is displayed by only outlines during the character data modification S9 or the font data is displayed while the interior of each character is painted.

The line/curve display S8-g switches whether the font data currently displayed in the editing area A-1-1 (FIG. 30A) of the CRT 13 by an outline during the character data correction S9 or the font data is displayed by an aggregate of lines obtained by simply connecting sample points with lines.

The line ON.OFF S8-h switches whether or not the body frame and various lines which are set in the "set line" step S11-b (to be described later) are displayed in the editing area A-1-1 (FIG. 30A) of the CRT 13 during the character data modification S9.

The cursor ON.OFF S8-i switches whether a cursor displayed in the editing area A-1-1 (FIG. 30A) of the CRT 13 is displayed as a small cursor or a long cursor extending on the entire screen during the character data correction S9.

The character data modification S9 has a function of editing font data such as sample points, outlines, and line segments. That is, the character data modification S9 has functions of point insertion S9-a, point deletion S9-b, point attribute reversal S9-c, point movement S9-d, point alignment S9-e, outline deletion S9-f, outline movement S9-g, imaginary line generation S9-h, circling S9-i, figure generation S9-j, center movement S9-k, and undo.redo S9-1.

The point insertion S9-a is a function of inserting a sample point in an arbitrary portion of an outline.

The point deletion S9-b is a function of deleting any one sample point or a line segment constituted by a plurality of sample points.

The point attribute reversal S9-c is a function of changing an attribute of any sample point from that of an end point to that of an intermediate point and vice versa.

The point movement S9-d is a function of performing movement of any sample point, i.e., a function of changing coordinates of a sample point.

The point alignment S9-e is a function of aligning a coordinate of one or each of a plurality of designated sample points to an x- or y-coordinate of any sample point.

The outline deletion S9-f is a function of deleting any outline.

The outline movement S9-g is a function of moving any outline or line segment, i.e., a function of changing coordinates.

The imaginary line generation S9-h is a function of generating an outline in any editing area.

The circling S9-i is a function of changing a line segment having any shape of any portion into a computed optimal regular ellipse.

The figure generation S9-j is a function of generating an outline as of a circle or a polygon in any editing area.

The center movement S9-k is a function of changing a positional relationship of all outlines with respect to a body frame.

The undo.redo S9-1 is a function of canceling data modification for a straight line and returning a state to the previous state.

The character information display S10 has functions of displaying various pieces of information of font data.

That is, the character information display S10 has functions of displaying various pieces of information of the font data, i.e., point coordinate display S10-a and list display S10-b.

The point coordinate display S10-a is a function of displaying attributes of sample points and their x- and y-coordinates on the display.

The list display S10-b is a function of displaying font data position information with respect to the body frame, body frame information, font data information, and the like on the display.

The character information I/O S11 has functions for receiving various pieces of information of the font data and setting various display lines on the editing screen. That is, the character information I/O S11 has a character information input S11-a and line setting S11-b.

The character information input S11-a is a function of inputting various pieces of information of the font data.

The line setting S11-b is a function of displaying various lines serving as references for character modified on the editing screen.

The character data registration/completion S12 stores font data corrected on the editing screen into the font data file in the disk 3 and calls the next font data on the editing screen or completes character forming.

[Display Checking]

Figure 5:
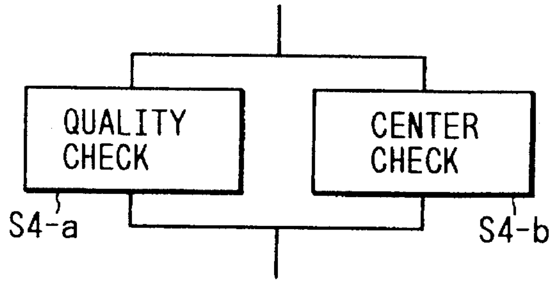
FIG. 5 is a block diagram for explaining a display check function of this embodiment.

The display checking in FIG. 2 is to check a pattern on a screen having various functions shown in FIG. 5. That is, the display checking S4 include a quality check S4-a and a center check S4-b.

The quality check S4-a displays a character for checking quality of font data on the CRT 13.

The center check S4-b is a function of displaying a character for checking the center of the quality items of the font data on the CRT 13.

[Printer Outputting S5]

Figure 6:
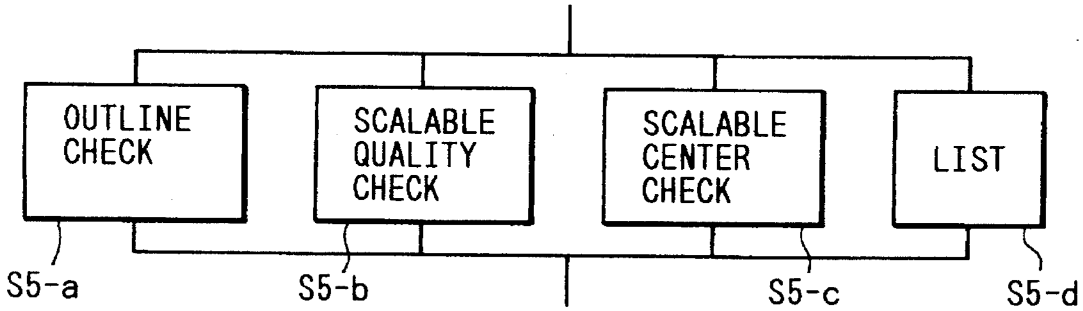
FIG. 6 is a block diagram for explaining a printer output function of this embodiment.

The printer outputting S5 in FIG. 2 has the following functions shown in FIG. 6. That is, the printer outputting S5 has functions of an outline check S5-a, a scalable quality check S5-b, a scalable center check S5-c, and a list S5-d.

The outline check S5-a is a function of outputting printed matters at the PRT 9 so as to check them for quality of font data, sample point information, line width information, and the like.

The scalable quality check S5-b is a function of outputting printed matters for checking quality of the font data at the PRT 9.

Of all the quality items of the font data, the scalable center check S5-c outputs printed matters for checking centers at the PRT 9.

The list S5-d is a function of outputting printed matters for various pieces of information such as font data information position with respect to the body frame, body frame information, font data information, and the like.

[Utility S6]

Figure 7:
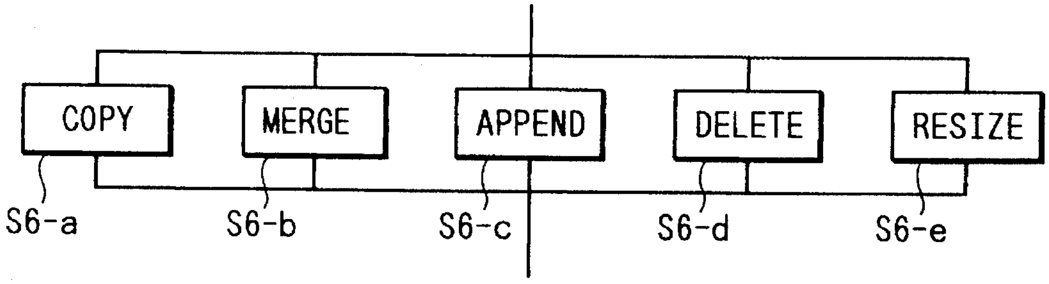
FIG. 7 is a block diagram for explaining a utility function of this embodiment.

The utility S6 shown in FIG. 2 has functions shown in FIG. 7. That is, these functions are of copy S6-a, merge S6-b, append S6-c, delete S6-d, and resize S6-e.

The copy S6-a is a function of copying original and font data files stored in the disk 3.

The merge S6-b is a function of merging the original and font data files stored in the disk 3.

The append S6-c is a function of adding data to the original and font data files stored in the disk 3.

The delete S6-d is a function of deleting the original and font data files from the disk 3.

The resize S6-e is a function of compressing or enlarging the font data file stored in the disk 3.

[Explanation of Terms]

Terms and operations required for explaining the present invention will be described below.

Original data is defined as image data read by the IR 7 such that its outline is expressed by eight adjacent data. The original data is referred to as an original, and a file which stores the original data is referred to as an original data file. The original data file is formed in the disk 3 shown in FIG. 1.

Font data will be described with reference to FIG. 9. Outlines are represented by solid curves a1 and a2, respectively. The outline is defined as a three-dimensional spline curve, a straight line, and a combination thereof.

Circles a3 in FIG. 3 of curve control points are points except for start and end points of a curve and are called intermediate points. Squares a4 represent the start and end points of a line and are called end points. The end and intermediate points are called sample points. The terms "end point" and "intermediate point" indicate points themselves or point attributes as natures of the points.

A file which stores this font data is called a font data file. The font data file is formed in the disk 3 in FIG. 1.

Figure 11A:
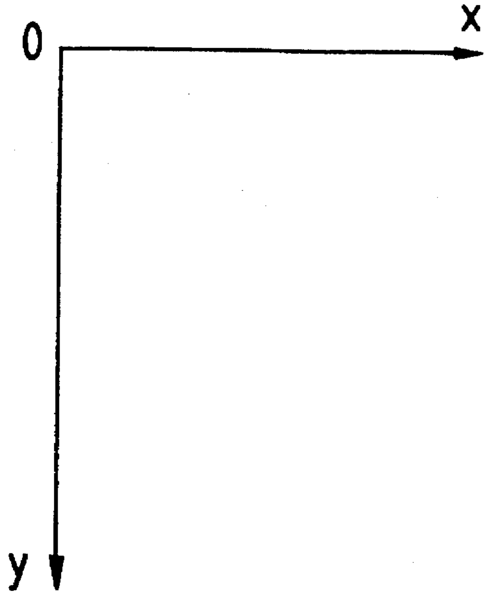
FIGS. 11A and 11B are views for explaining a coordinate system of this embodiment.
Figure 11B:
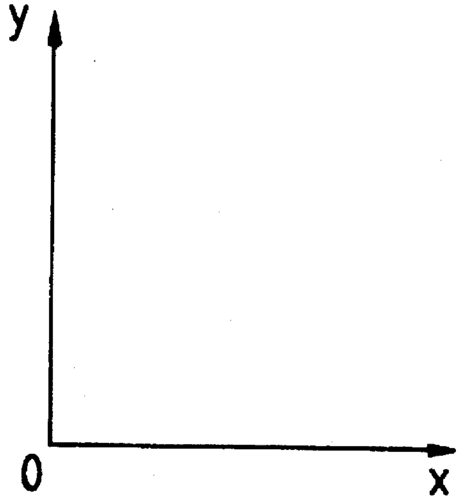

In order to deal with the above font data, an absolute coordinate system and a design coordinate system are appropriately applied, as shown in FIG. 11. These coordinate systems have different y-axis directions. The absolute coordinate system is suitable for dealing with data, while the design coordinate system is suitable for causing an operator to design a character.

Operations of this embodiment will be described below.

An operation is started upon movement of the PD 12 in FIG. 1 or depression of a button. The PD 12 in this embodiment has three buttons which are called a left button, a central button, and a right button from the left. Button operations of the PD are as follows:

Button depression,

Button release,

Movement while a PD button is kept depressed, and

Movement while a PD button is kept released

The following terms will be used as combinations of the above operations in this embodiment.

Click

The click is defined as a series of operations, i.e., button depression and button release without any movement of the PD.

Double Click

A PD button is depressed twice within a predetermined period of time. A PD button may be clicked three or four times to effect a desired function.

Drag

The drag is an operation of moving the PD while a PD button is kept depressed.

Release

The release is an operation of releasing a depressed button. An end of drag is effected by this release.

Pick

The pick is an operation of moving the PD to a target position and depressing a button. The type of button is not limited to a specific one.

Menu Selection

The menu selection is performed by picking a desired menu with, e.g., the left button.

Undo

The undo is an operation of returning a change in figure by the previous operation to a previous state. Examples of the undo operations are as follows:

1. to cancel a selected point
2. to cancel a position where the PD 12 is clicked
3. to return changed figure data into data prior to the change and to return the display state to the previous display state accordingly

[Definition of Symbols]

Symbols used for explaining the present invention will be defined as follows.

Assume that an end point is represented as Ei, an intermediate point is represented as Mi, and both the end and intermediate points are referred to as Pi.

An outline is represented as Li.

Input data is represented as Ni.

A position input is represented as Ii.

[Outline Data Storage Section]

Figure 10A:
FIGS. 10A to 10E are views for explaining an outline data storage section of this embodiment.
Figure 10B:
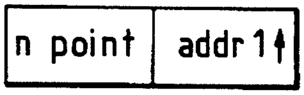
Figure 10C:
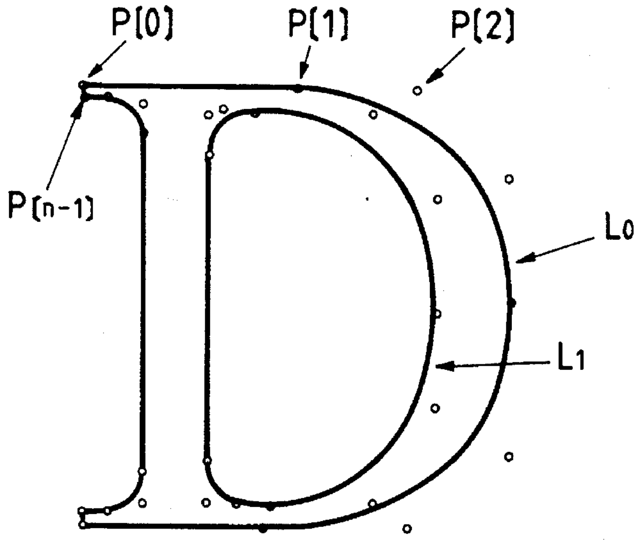
Figure 10D:
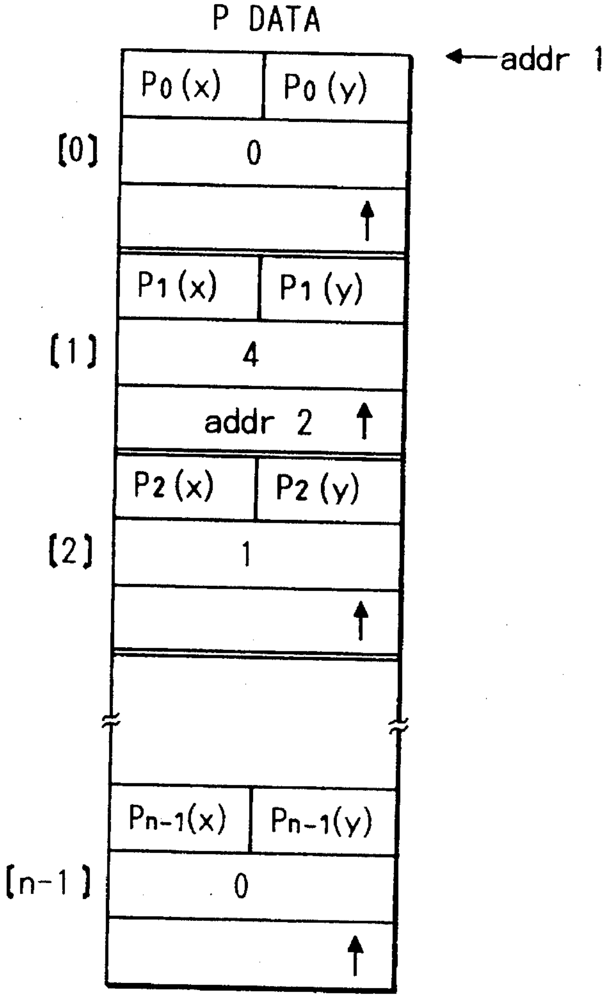
Figure 10E:
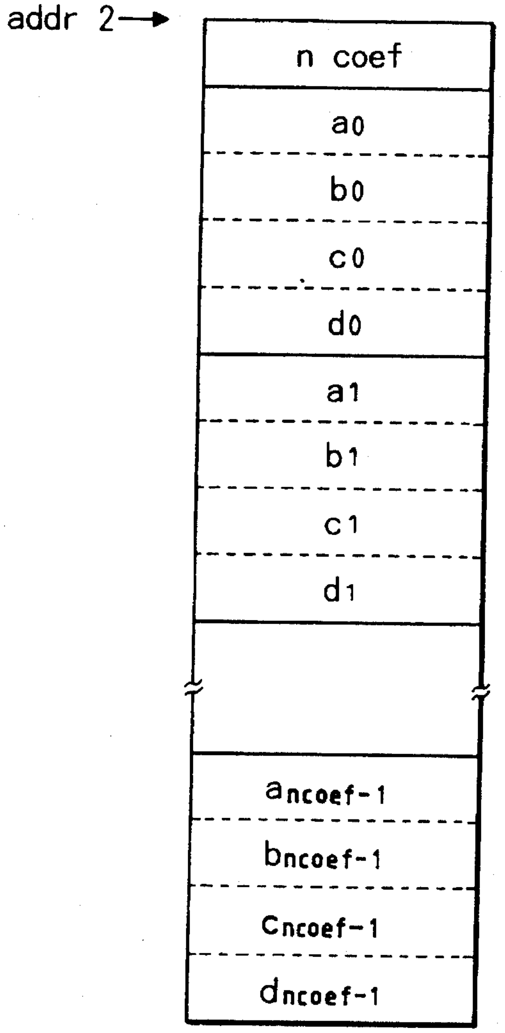

FIGS. 10A, 10B, 10D, and 10E show detailed structures of an outline data storage section in the RAM of the PMEM 6. FIG. 10A shows an area for storing the number nloop of outlines constituting a character pattern. FIG. 10B shows an array of an area for storing the number npoint of sample points constituting each outline and an address addr1 of the sample point information storage area. FIG. 10D is a view showing an array of an area for storing sample point information. The sample point information represents an address of an array (FIG. 10E), i.e., an area for storing coordinate values x and y, detailed point attributes, and curve attributes if a sample point is the start point of a curve. FIG. 10E shows an area for storing attributes of a curve (in this case, a three-dimensional spline), i.e., the number ncoef of coefficients for determining a curve and coefficients $a_n$, $b_n$, $c_n$, and $d_n$ (n=0, 1, . . .) of the three-dimensional spline. It is natural that the structure of the area for storing curve attributes (FIG. 10E) be changed when parameters representing curve attributes are changed. The structures shown in FIGS. 10A, 10B, 10D, and 10E will be described in detail when a pattern "D" in FIG. 10C is exemplified. Since the character pattern in FIG. 10C is constituted by two outlines L0 and L1, the value stored in the area of FIG. 10A is given as nloop=2. Since FIG. 10B shows an array of a size corresponding to the number of outlines, the array has a size of 2, so that the outlines L0 and L1 have values of 17 and 13, respectively. In the sample point information storage area in FIG. 10D, a point P[0] is an end point, which is not a start point of a curve. In this case, a point attribute point of PDATA[0] is zero. A point P[1] is an end point which is a start point of a curve, so that a point attribute value of PDATA[1] is the number of samples constituting the curve, i.e., 4 in this case. Since the point P[1] is the start point of the curve, an address of the curve attribute storage area in FIG. 10E is stored. The number ncoef of the curve attribute storage area (FIG. 10E) which stores the address corresponding to PDATA[1] is one, and $a_O$, $b_O$, $c_O$, and $d_O$ are stored in the VRAM.

Modification operations such as point deletion and point movement performed by an operator with the PD 12 are realized by referring to and/or changing the contents shown in FIGS. 10A, 10B, 10D, and 10E.

A change in display on the CRT13 is performed such that the contents in FIGS. 10A, 10B, 10D, and 10E are referred to, the referred data are converted into bit map data, and the bit map data are transferred to the VRAM 14.

[File Forming]

The file forming S1 in FIG. 2 will be described below.

Figure 8:
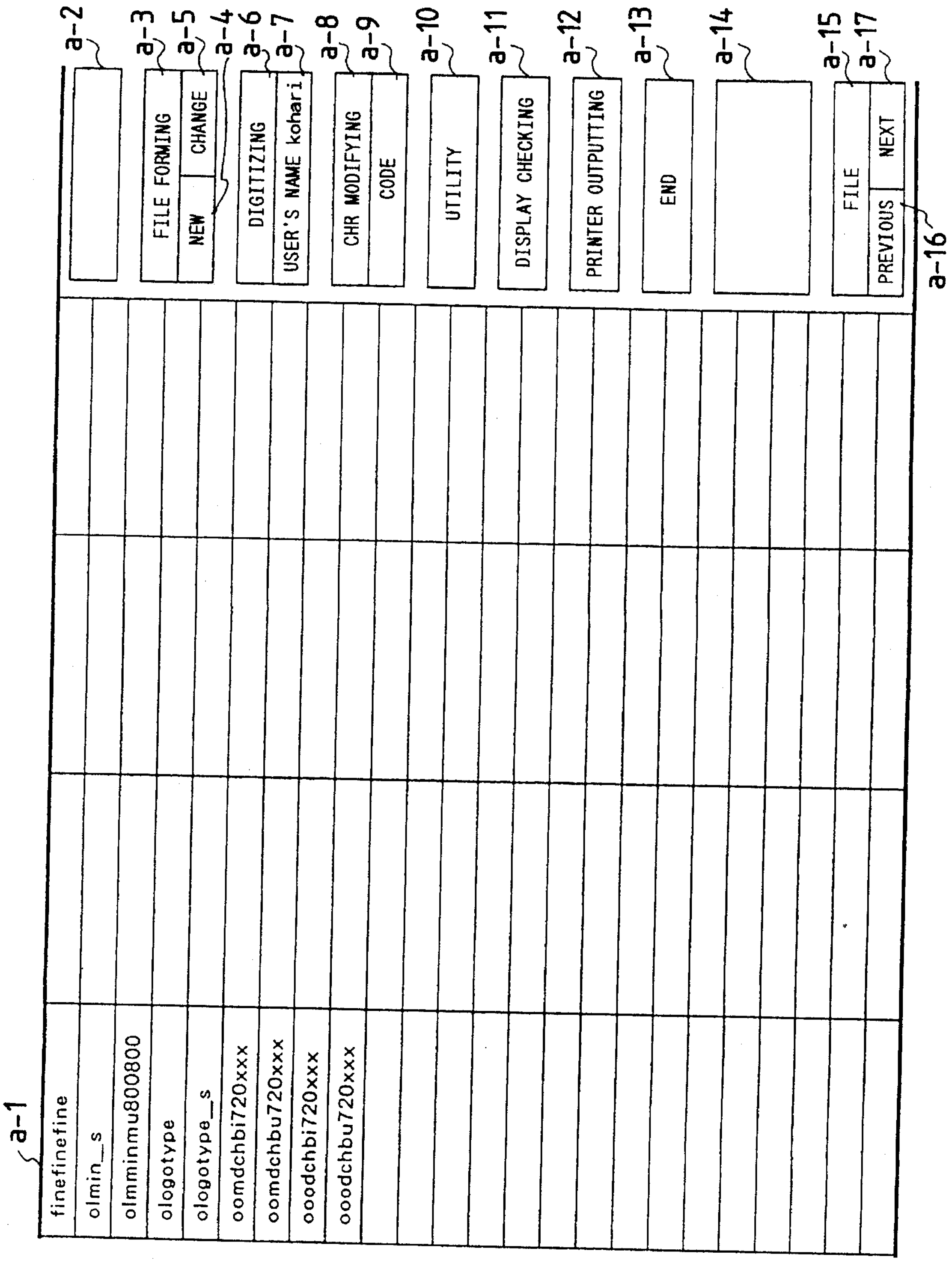
FIG. 8 is a view showing an initial screen of the figure editing apparatus of this embodiment.
Figure 12:
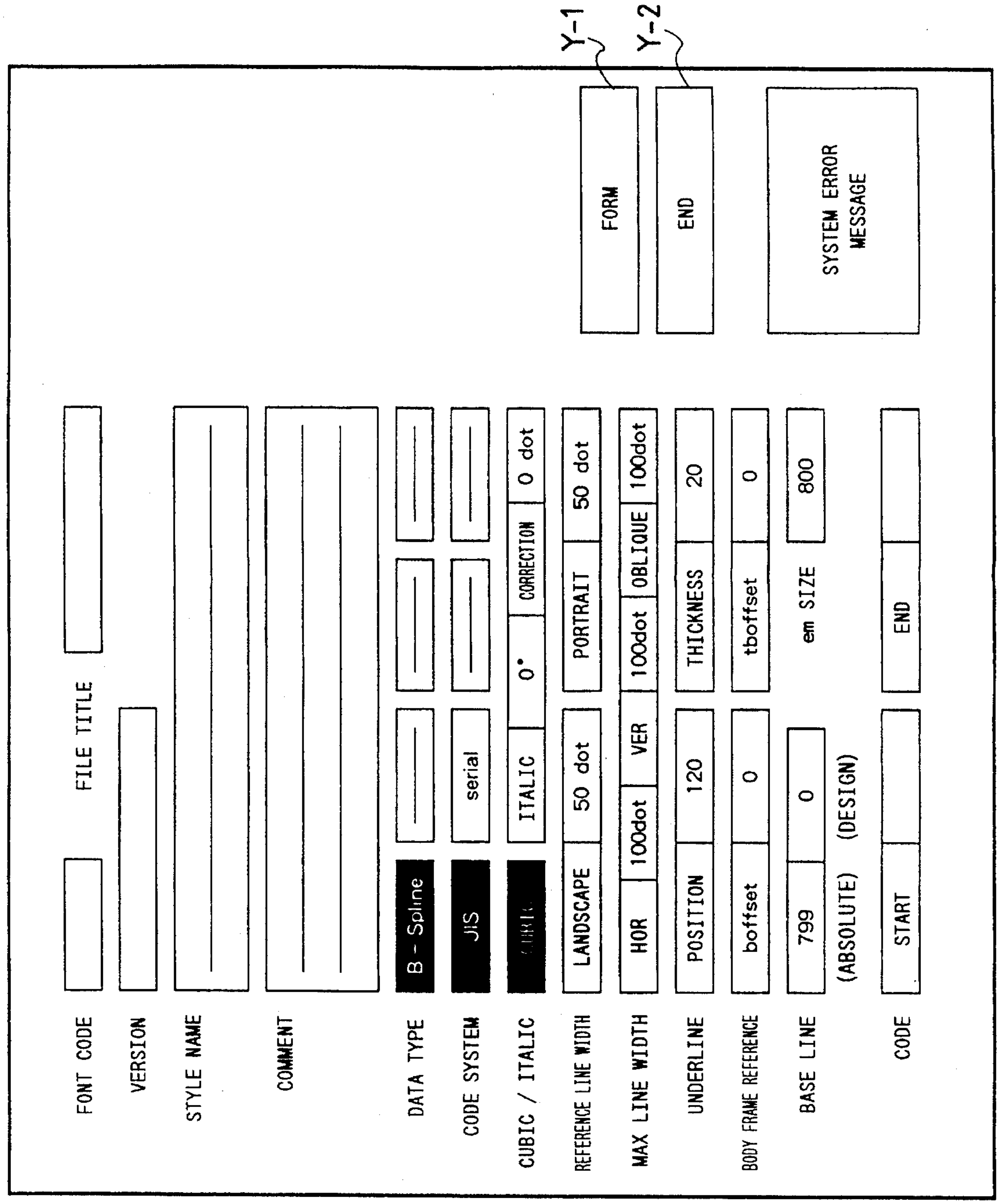
FIG. 12 is a view for explaining a file forming process of this embodiment.

FIG. 8 is a file forming menu displayed on the CRT 13. A new file or change is picked with the PD from this file forming menu, so that the screen is shifted to a file forming screen in FIG. 12. In order to change the file, the currently stored contents are displayed. Each item is picked with the PD and input data is entered on the KBD (Keyboard). An item of "form" Y-1 is picked with the PD to form a new file or change a header. When an item of "end" Y-2 is picked, the display state returns to that shown in FIG. 8, and file forming is completed.

Files include an outline data file, an original data file, a bushu data file, an element data file, and the like. All these files have the following file structure shown in FIG. 13.

A header has data to be managed in units of files and information associated with a file structure. An index has a code of each data and information associated with a storage address or the like of this data. A manager for vacant area manages a vacant area of data. A data section is an area for storing data each figure in units of blocks.

Digitizing

The digitizing (S2) in FIG. 2 will be described below. The digitizing is a process of automatically forming an original data file and a font data file from original characters.

This process includes the following steps as shown in the flow chart in FIG. 3.

More specifically, these steps are as follows:

"Scan" step

"Set code" step

"Set center" step

"Remove noise" step

"Generate outline" step

The formed original and font data files are stored in the disk 3 shown in FIG. 1.

"Digitizing" is displayed at a position a-2 (FIG. 8) by picking a font code a-1 with the PD 12. "Digitizing" in a-6 is picked to shift the screen to a digitizing initial screen in FIG. 14.

A font code is displayed in an area b-1, and an area b-2 is a message area. A digitizing menu is represented by b-3, and submenus are represented by b-4 to b-6. Each menu can be picked with the PD 12.

Digitizing is performed in units of pages. The present invention has two digitizing modes, i.e., digitizing of one page consisting of 15 characters and digitizing of one page consisting of 9 characters. A maximum number of pages to be digitized is 5. The flow chart in FIG. 3 corresponds to the menu b-3. In each page, the PD 12 cannot pick the next menu unless the previous step is completed, i.e., in an order except for the order of the flow of FIG. 3.

Figure 15:
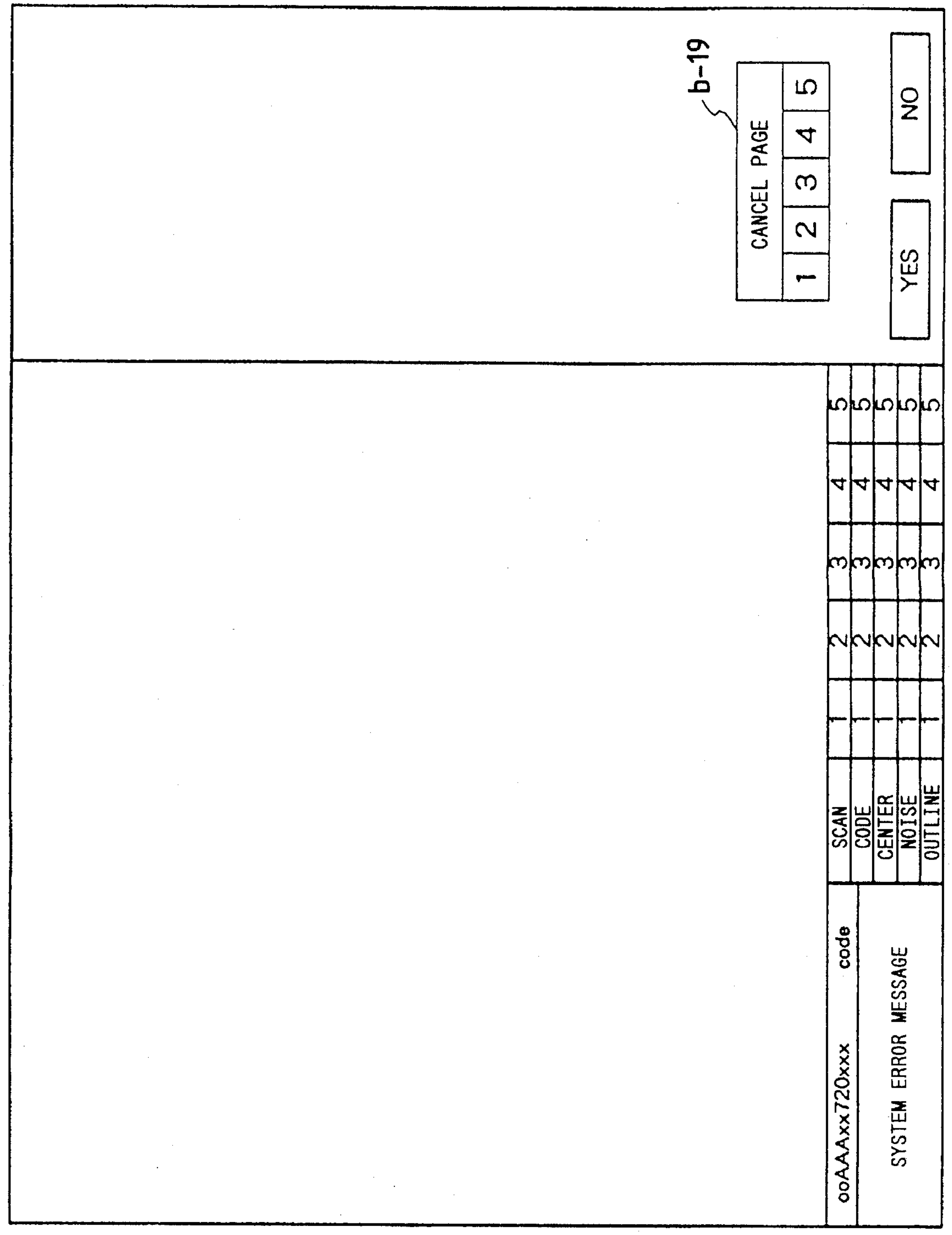
FIG. 15 is a flow chart for explaining the digitizing process of this embodiment.

Managefiles are prepared for individual users to manage the in-operation states of digitizing. Each managefile is a matrix having a size of a page count times a character count. Flags of the completed steps are set in units of characters. The menu column of the completed step is reversed to black and this step cannot be picked again. When the submenu b-5 is picked with the PD 12, the display is shifted to that shown in FIG. 15. Any page number is picked and "YES" is picked to initialize the flag of the managefile of this page, thereby canceling digitizing of this page.

When the submenu b-6 is picked with the PD 12 to complete digitizing, and digitizing is started again, the operation is started from the interrupted step. When digitizing of one page from the "scan" step to the "generate outline" step is completed, the flag of the managefile of this page is initialized, and all the menu columns of this page in the menu b-3 are reversed to white, and any item can be picked.

The resolution of the IR 7 can be set to an environment variable of the CPU 15. When the environment variable is referred to during scanning, any resolution can be obtained.

Figure 16:
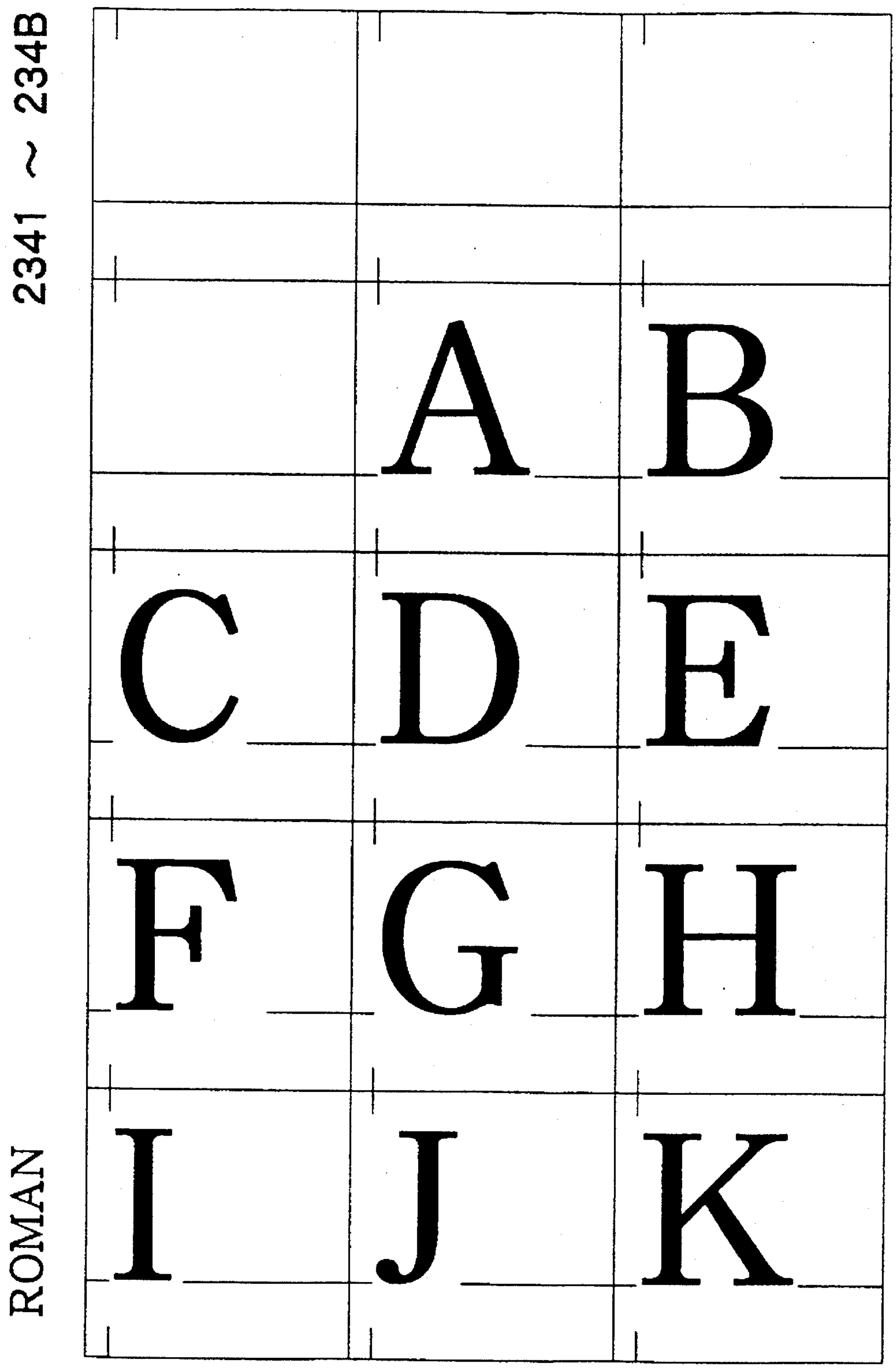
FIG. 16 is a view for explaining a scanning process of this embodiment.
Figure 17:
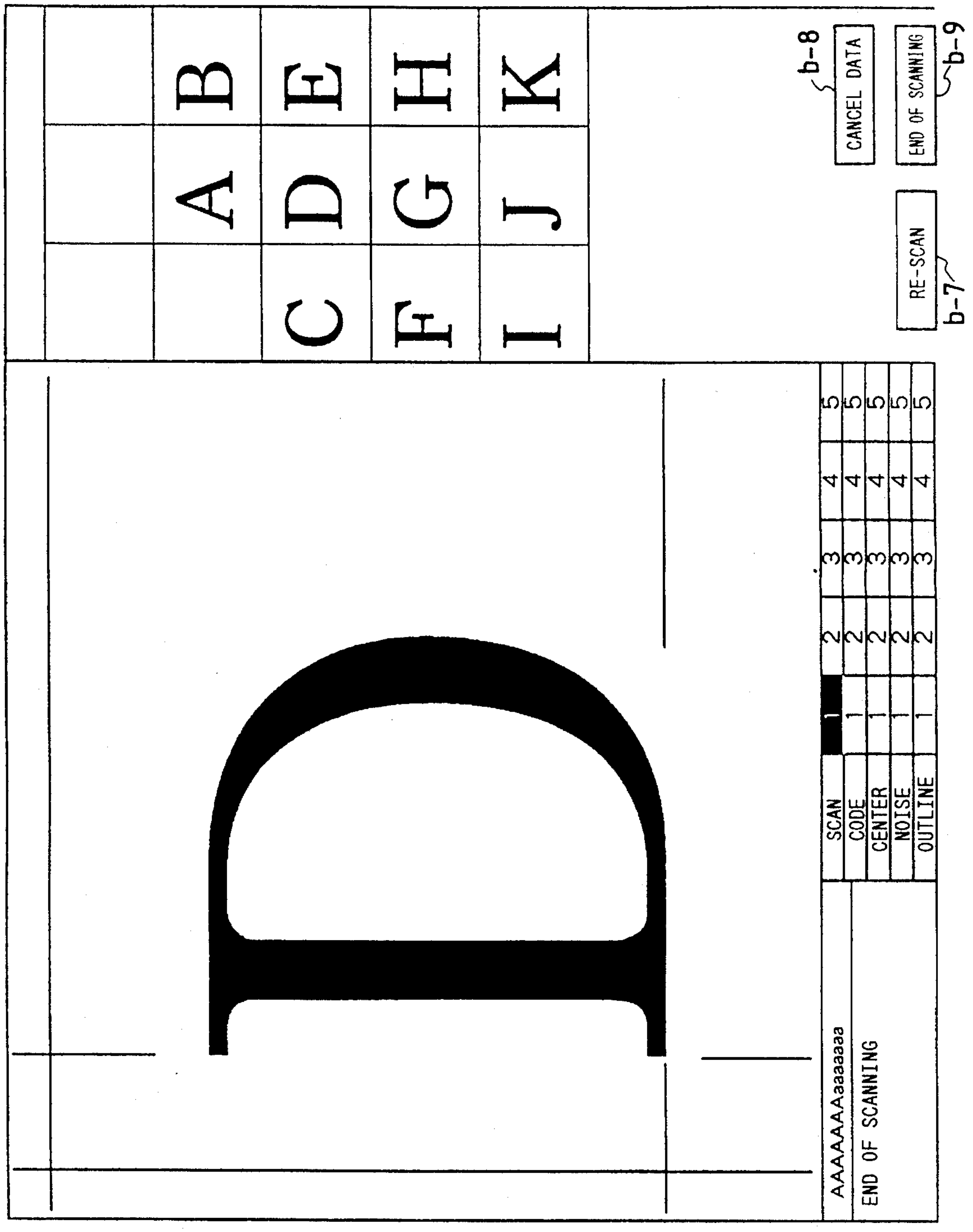
FIG. 17 is a view for explaining the scanning process of this embodiment.

A center mark representing the position of an original and a scanning direction are marked on an original base and are read during scanning, thereby automatically detecting original warping and the scanning direction, thereby appropriately performing the process. FIG. 16 shows an original.

Figure 19:
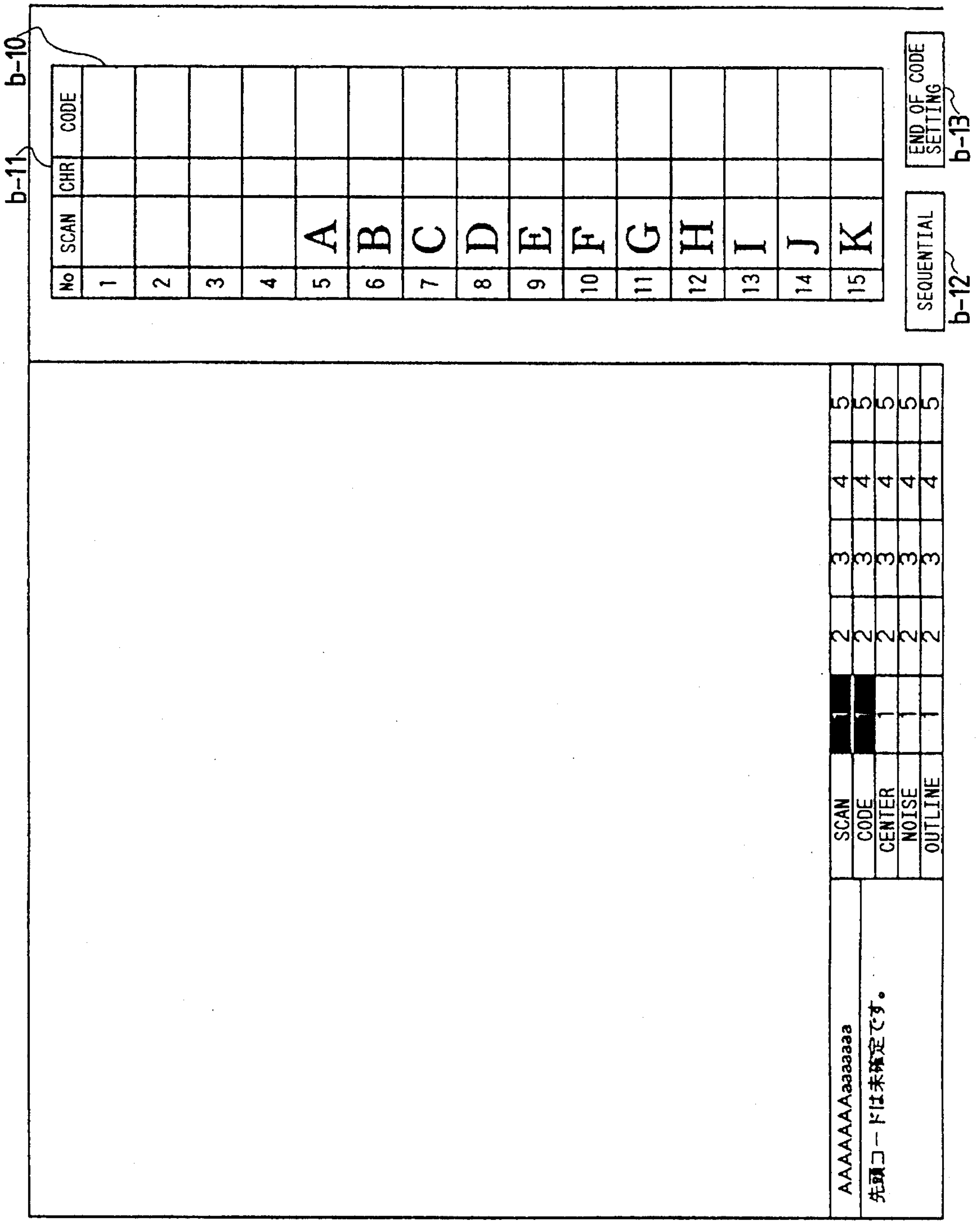
FIG. 19 is a view for explaining a code setting process of this embodiment.

For example, reduced image data of an image read by the IR 7 is displayed in a menu column which requires to determine a specific one of the image data as in a scan column of FIG. 19.

.Scan

Figure 18:
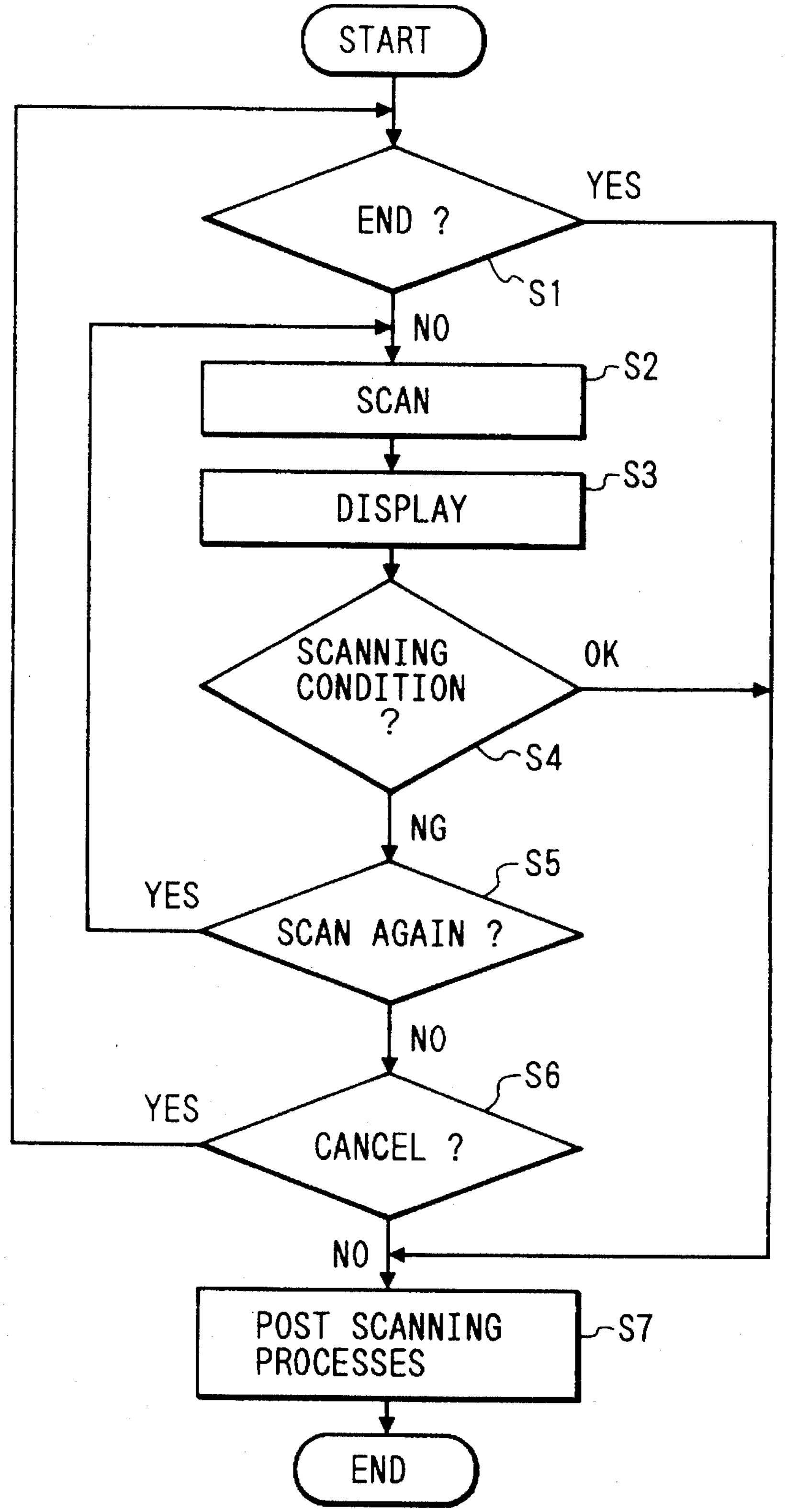
FIG. 18 is a flow chart for explaining the scanning process of this embodiment.

Scan procedures will be described with reference to a flow chart in FIG. 18. A menu is selected with the PD 12. If end of scanning (b-9) is detected, the flow is ended (step 1). When scanning of one of the first to fifth pages (1 to 5) is to be performed, the IR 7 is operated to read image data of the respective characters constituting a one-page original and store the image data from the PMEM 6 to the disk 3 in a predetermined order (step 2).

Figure 13:
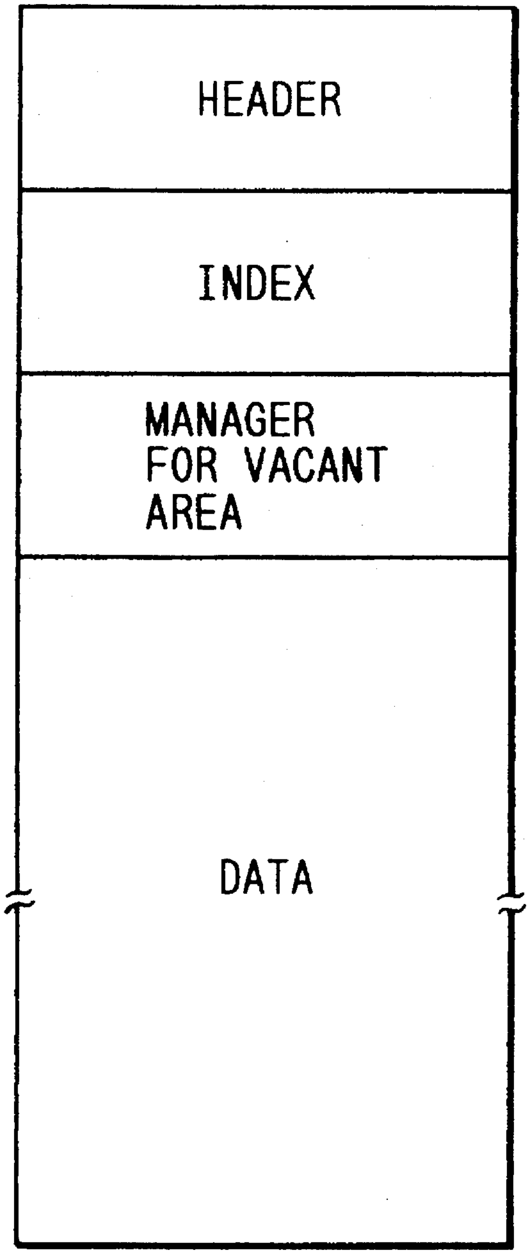
FIG. 13 is a view showing a font data file structure of this embodiment.

As shown in FIG. 13, fifteen reduced characters are displayed on the CRT 13, and one character located at the center of the array of these fifteen reduced characters on the original is enlarged and displayed (step 3). A center mark is attached to each character of the original, so that rotation and warping of the original can be detected.

"Re-scan" (b-7) is picked with the PD 12, as needed, to perform re-scanning (step 5). At this time, a character to be re-scanned is designated with the PD 12, and partial re-scanning can be performed. "Cancel data" (b-8) is picked to cancel scanning of this page, and at the same time the corresponding original data in the disk 3 is also deleted (step 6).

The managefile is updated, i.e., post scanning processes are performed (step 7), and the flow is ended.

."Set Code" Step

Figure 14:
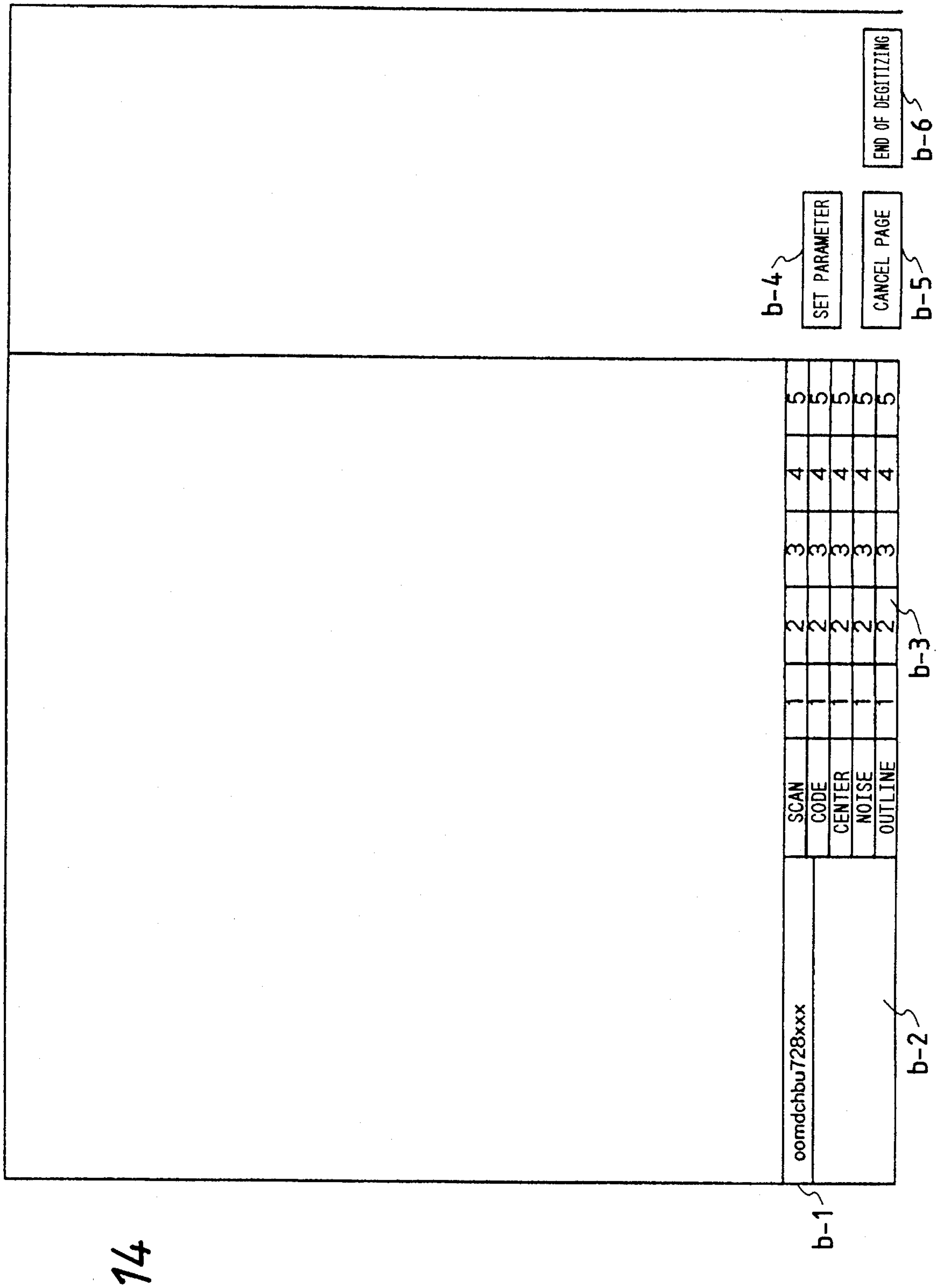
FIG. 14 is a view for explaining a digitizing process of this embodiment.

One of the page numbers 1 to 5 is selected for setting a code from the menu b-3 in FIG. 14 and is picked with the PD 12 to obtain a screen shown in FIG. 19. In this case, the end of scanning must be established for a page number of a specific page to be picked.

Figure 20:
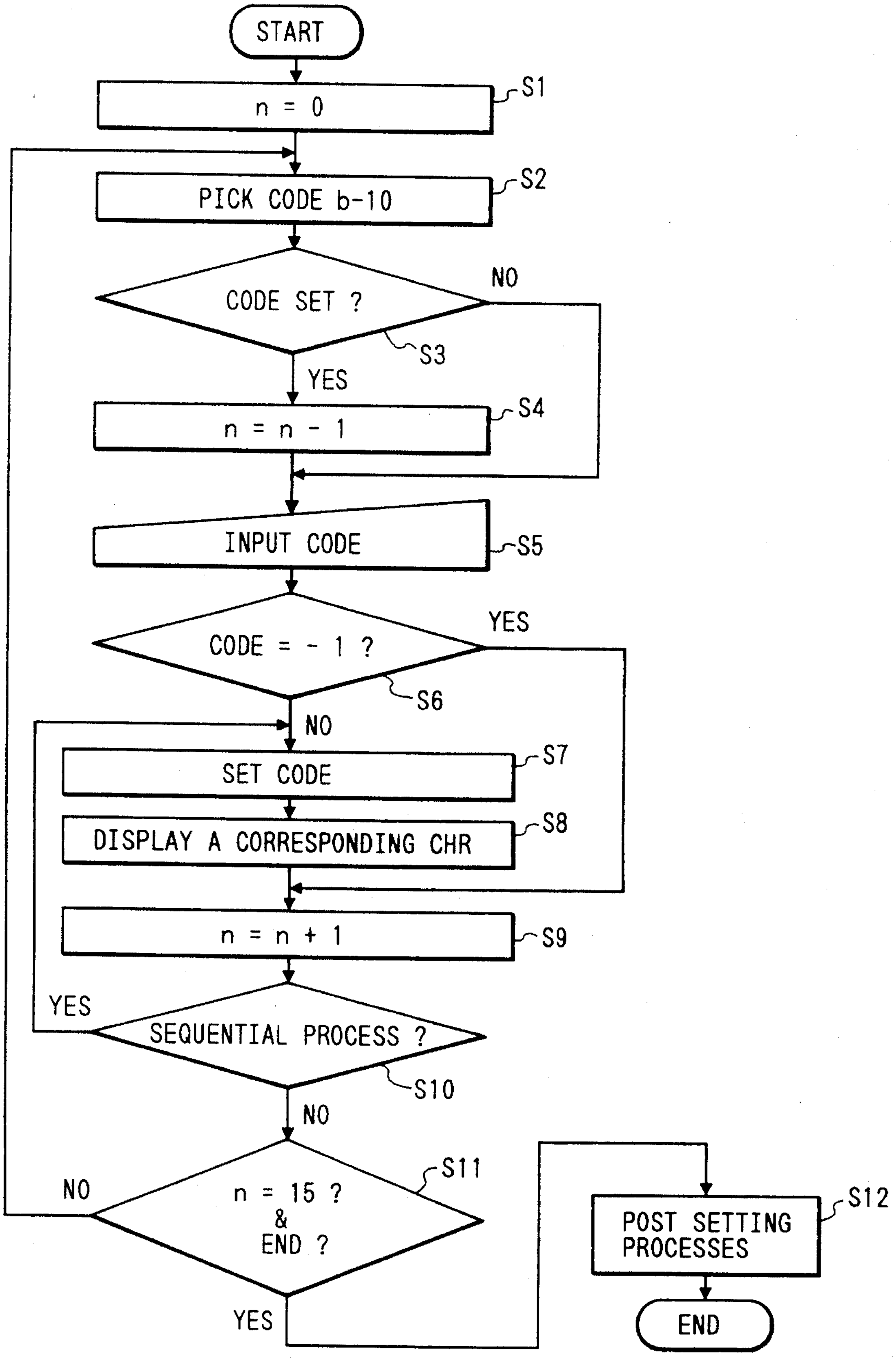
FIG. 20 is a flow chart for explaining the code setting process of this embodiment.

The "set code" procedures will be described with reference to a flow chart in FIG. 20. Variables are initialized (step 1). A code b-10 is picked to allow an input of a code from the KBD 11 (step 2). If the picked code is a set code (step 3), the number of set characters is decremented by one (step 4). When a code is input from the KBD 11 (step 5) and is set (step 7), a character corresponding to this character code is displayed in the corresponding column of b-11 (step 8). The number of set characters is incremented by one. For example, if a code system is a JIS code system and a specific code is given as "2344", then a character "D" is displayed.

It is possible to neglect subsequent characters and not to generate outlines by inputting data of −1 (step 6).

A sequential process (b-12) is picked to perform the sequential process on the basis of the code system (step 10).

When codes of all characters are set and an "end of code setting" (b-13) is picked with the PD 12 (step 11), the managefile is updated, i.e., the post setting processes are performed to end the flow (step 12).

."Set Center" Step

Figure 21:
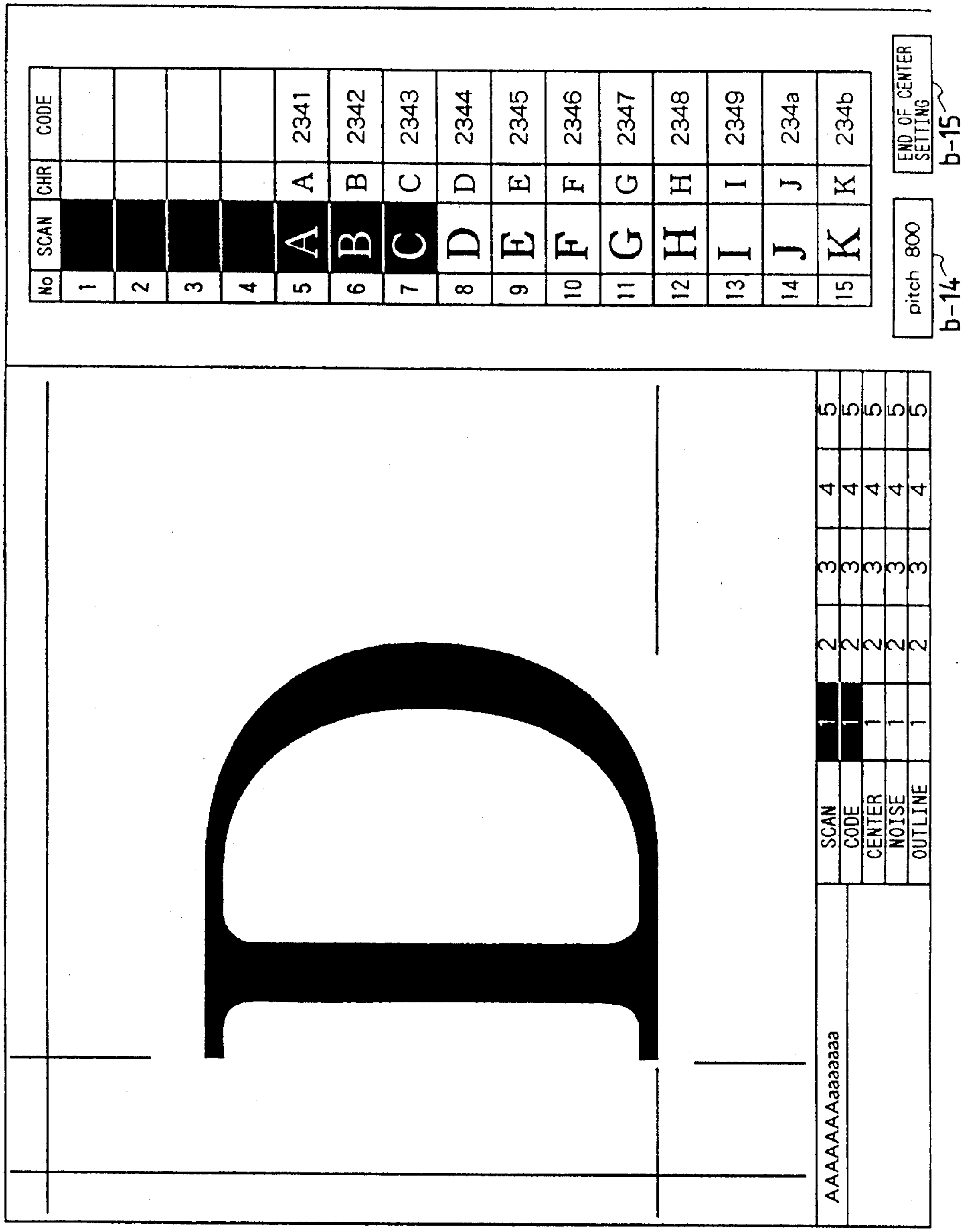
FIG. 21 is a view for explaining a center setting process of this embodiment.

One of the page numbers 1 to 5 for the "set center" step is selected with the PD 12 to obtain a screen in FIG. 21. Note that the "set code" step must be completed for a page number of a specific page to be picked.

Figure 22:
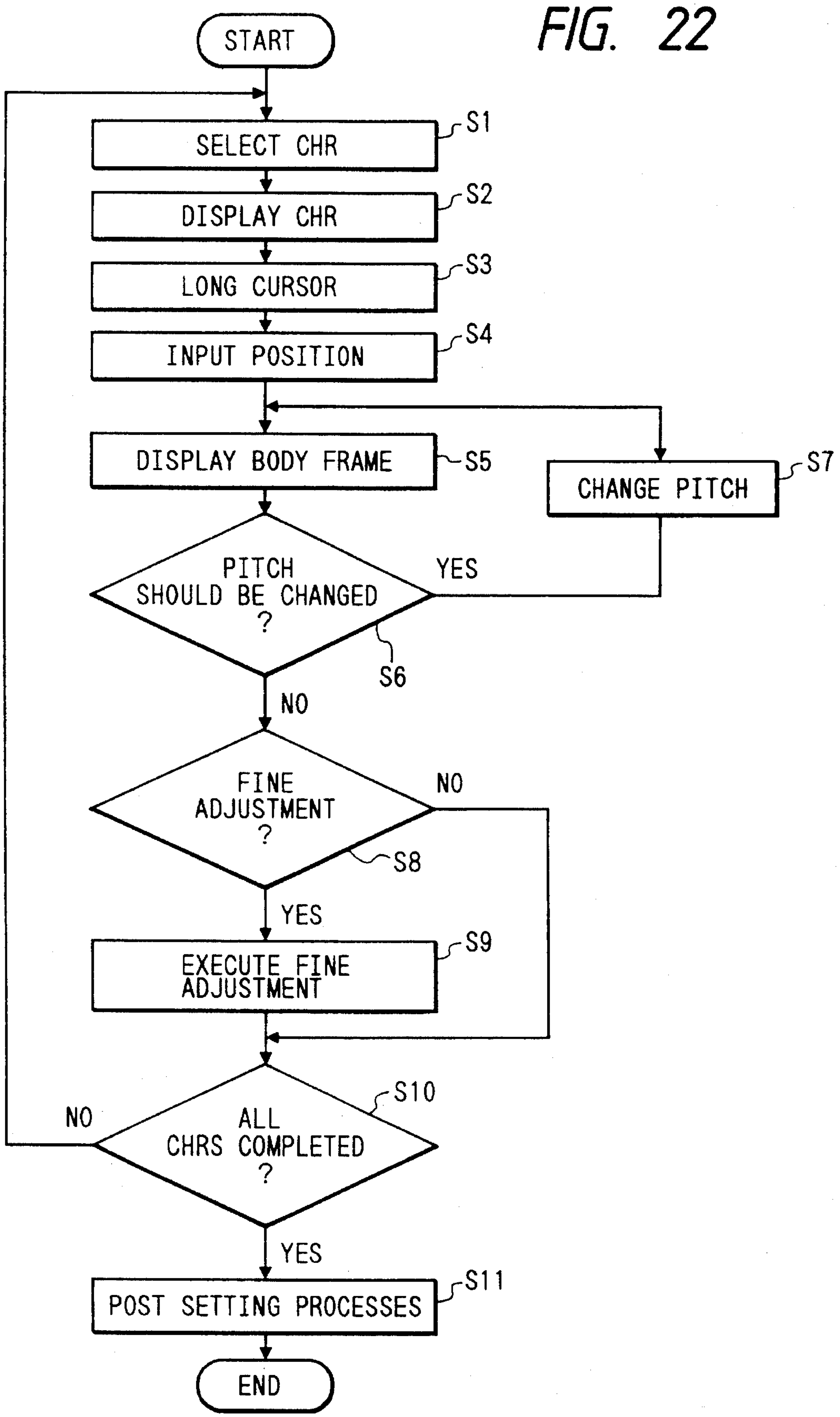
FIG. 22 is a flow chart for explaining the center setting process of this embodiment.

The "set center" procedures will be described with reference to a flow chart in FIG. 22. A scan column of a character subjected to the "set center" step is picked with the PD 12 (step 1). The picked image data is displayed (step 2), and a cursor of the PD 12 is changed to a long cursor (step 3), so that the "set center" step can be executed. The cursor is aligned with the center mark formed on the original base, and the left button of the PD 12 is clicked (step 4) to display a body frame in the screen (step 5). Thereafter, the center is moved with a direction key of the KBD 11 in units of dots to perform fine adjustment (step 8).

A pitch b-14 is picked with the PD 12 (step 6) or a size of a body frame is input from the KBD 11 (step 7) to change the size of the body frame. It is also possible to automatically input a pitch from an OCR or a character code.

Center setting can be automatically performed in units of characters by picking the next character. When setting of all characters is completed, and the next menu is picked in the main menu b-3 or "exterior of the body frame" (b-15) is picked (step 10), the managefile is changed and completed (step 1).

."Remove Noise" Step

Figure 23:
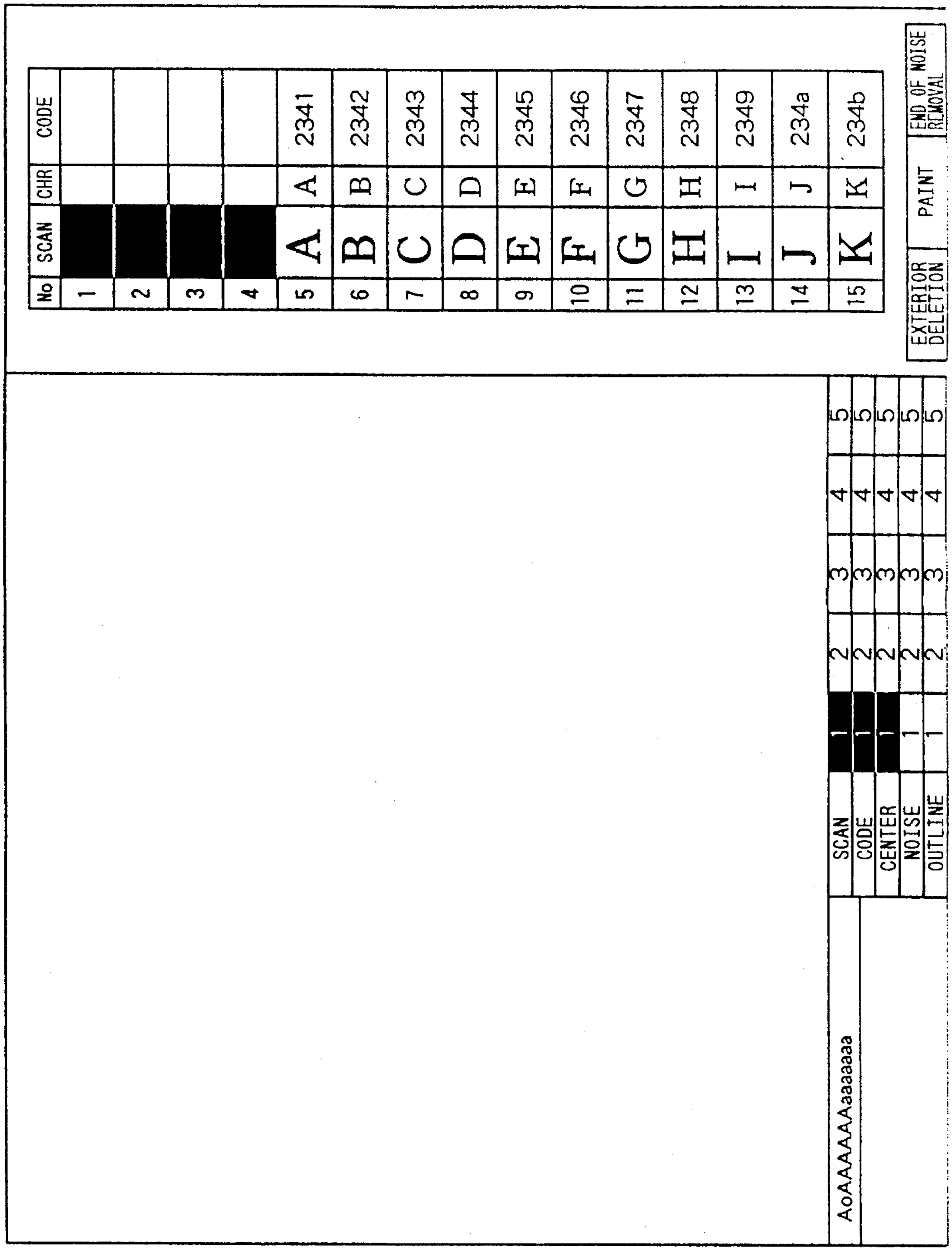
FIG. 23 is a view for explaining a noise removal process of this embodiment.

An appropriate page for the "remove noise" step is picked from the page numbers 1 to 5 with the PD 12 in the main menu b-3, and the display state is changed to that shown in FIG. 23. In this case, the "set center" step of a page to be selected must be completed.

Figure 24:
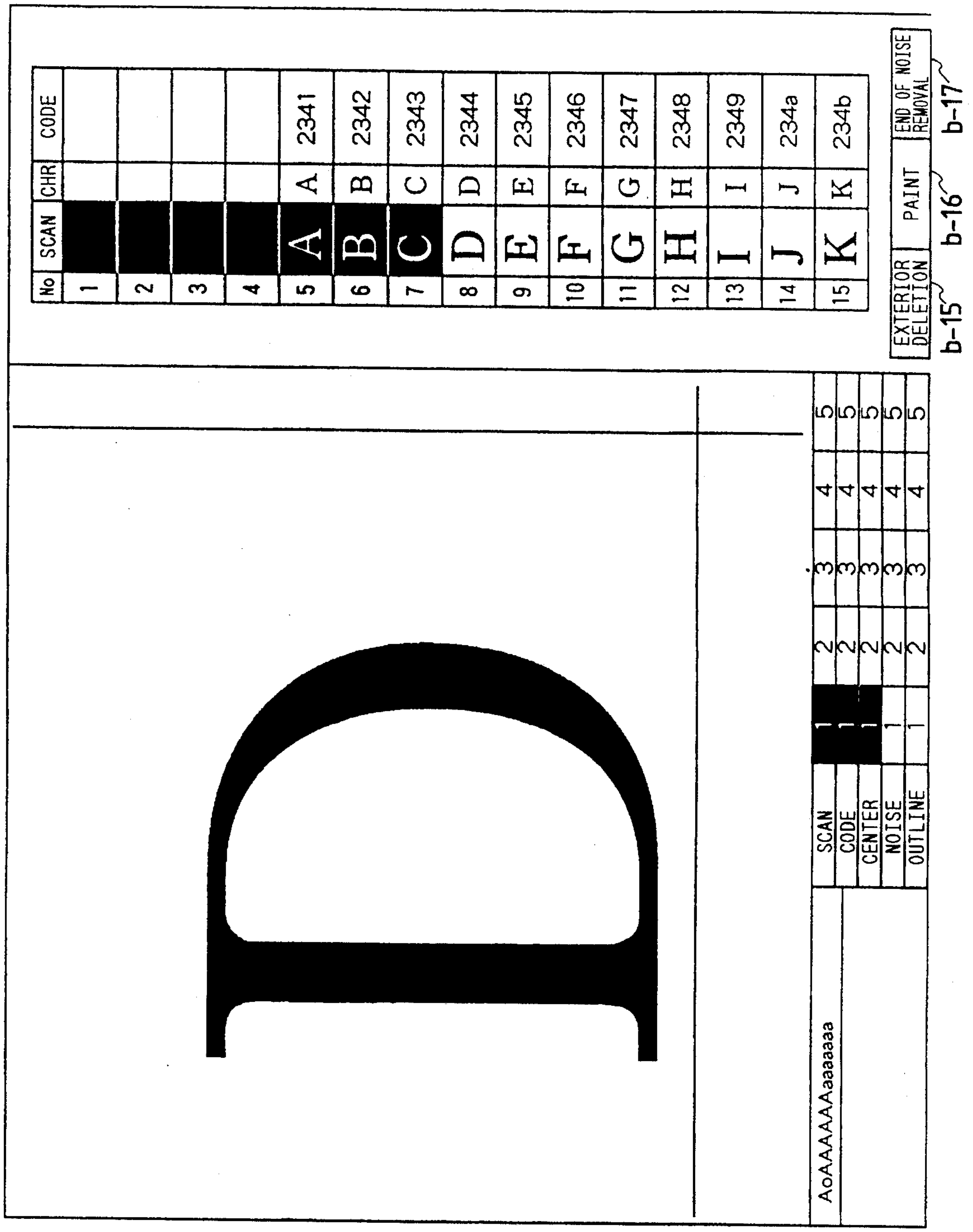
FIG. 24 is a view for explaining the noise removal process of this embodiment.
Figure 25:
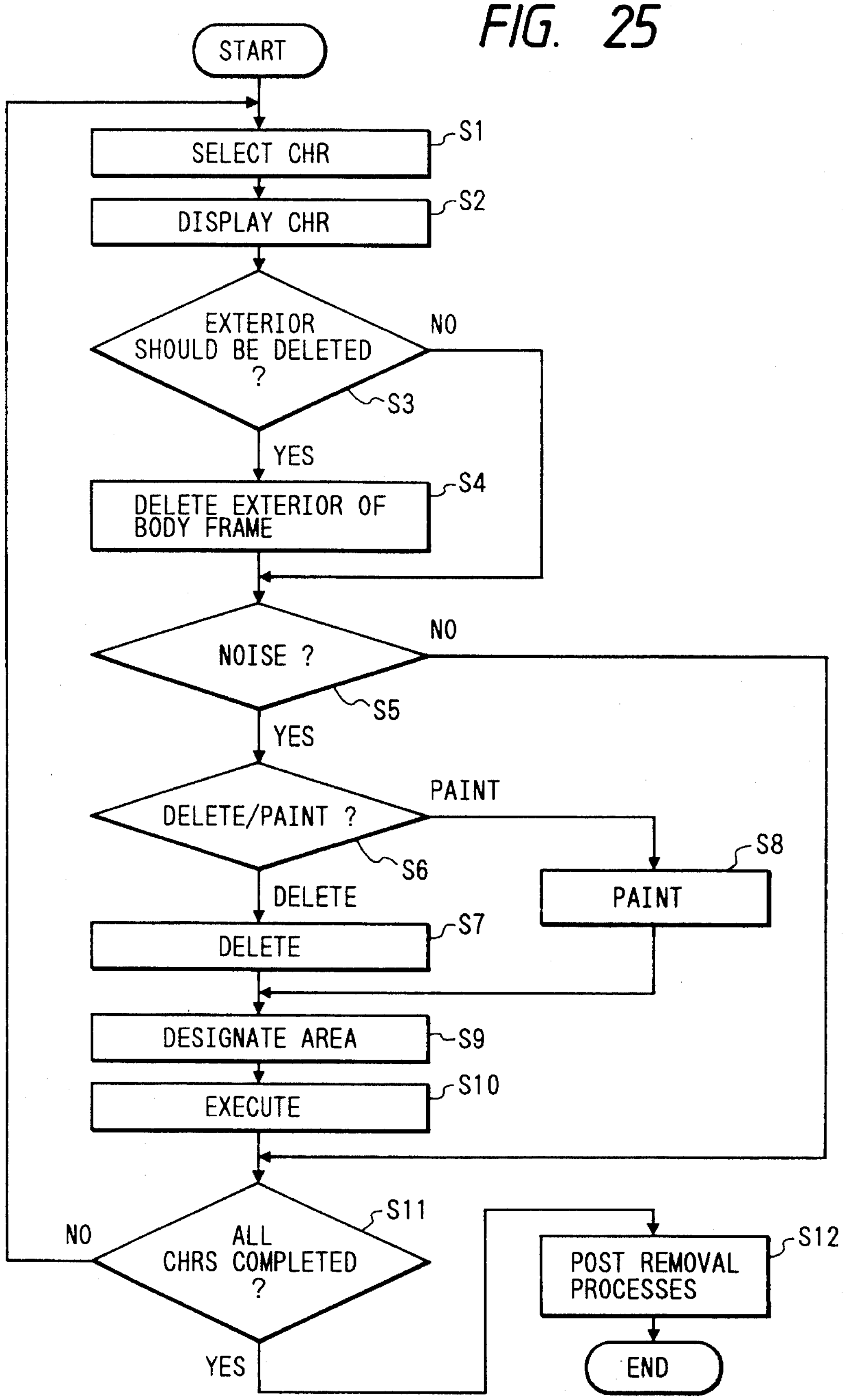
FIG. 25 is a flow chart for explaining the noise removal process of this embodiment.

The "remove noise" procedures will be described with reference to a flow chart in FIG. 25. A scan column of a character subjected to the "remove noise" step is picked with the PD 12 (step 1). Image data is displayed, as shown in FIG. 24 (step 2). "Noise" is defined as components except for a necessary image, such as partial image omissions occurring during reading with a scanner, and dust and register marks of an original.

Noise is removed by setting a corresponding bit of image data stored in the PMEM 6 to ON/OFF. In this case, assume that a necessary portion of the image data, i.e., a portion expressing characters correspond to bits of "1" (ON).

According to the present invention, the concept of a body frame is introduced, and a function of deleting the body frame by setting all bits outside the body frame to be OFF and a function of setting the interior or exterior of a designated rectangle to be ON or OFF are provided.

"Exterior Deletion" (b-15) is picked with the PD 12 to execute deletion of the exterior of the body frame (steps 3 and 4). If noise is present (step 5), painting b-16 is picked with the PD 12 by a kind of noise (step 6) to set the interior of the rectangle to be ON (step 8) or OFF (step 7). When the PD 12 is dragged to designate an area (step 9), and the "remove noise" step is executed (step 10).

The next character is picked to complete removal of the noise of this character (step 11), and the image data is stored in the disk 3. Display of the picked scan column is reversed to indicate that noise removal of this character is completed.

When noise removal of all characters is completed and the end of noise removal (b-17) is picked with the PD 12 or the next menu is picked from the main menu b-3 (step 11), the managefile is changed, and the flow is ended (step 12).

The "remove noise" step can be automatically executed in the next outline generation.

."Generate Outline" Step

Figure 26:
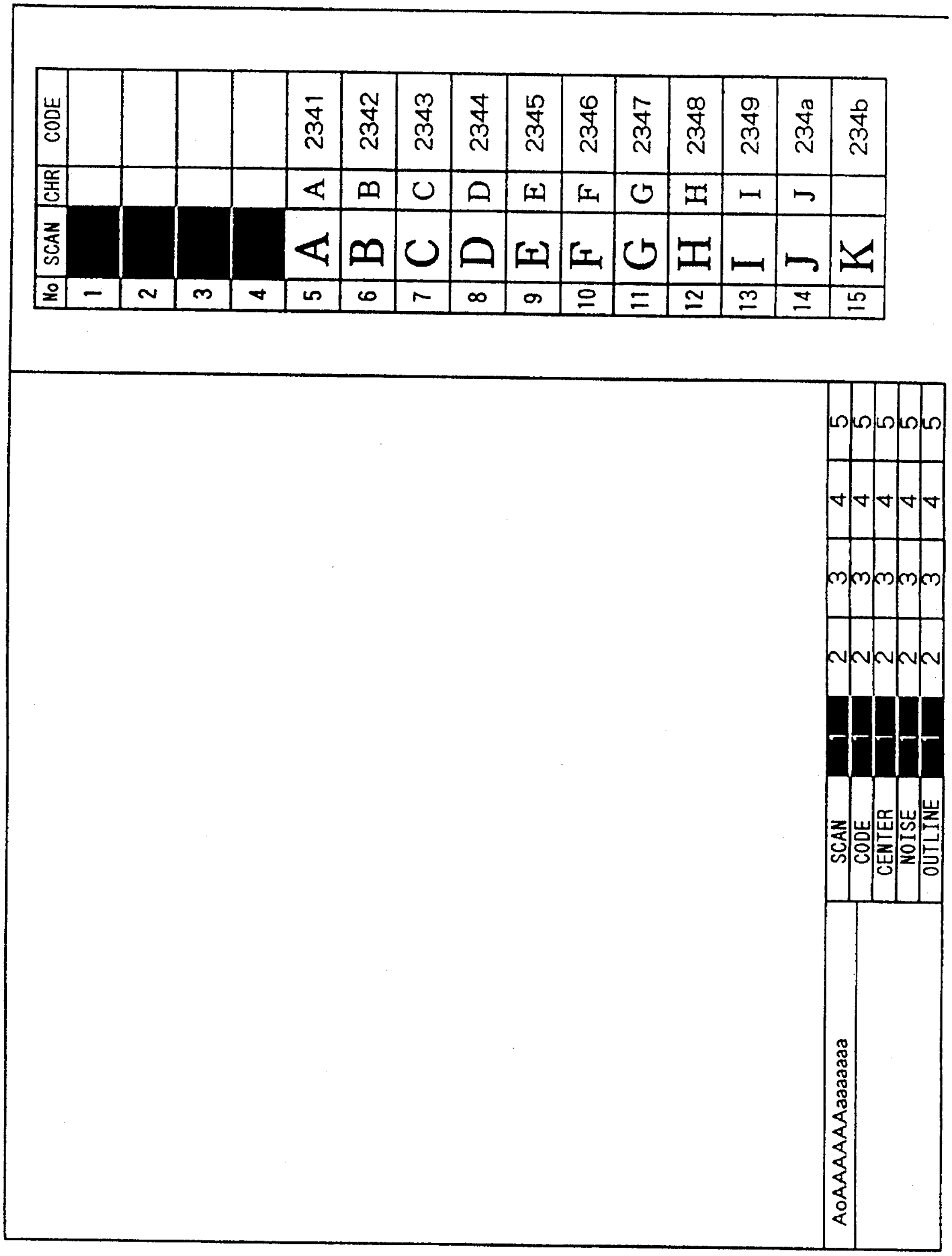
FIG. 26 is a view for explaining an outline generation process of this embodiment.

An appropriate page number for the "generate outline" step is selected in the main menu b-3 with the PD 12 to automatically start the "generate outline" step (FIG. 26). In this case, the "remove noise" step must be completed for a page number of a specific page to be picked.

Figure 27:
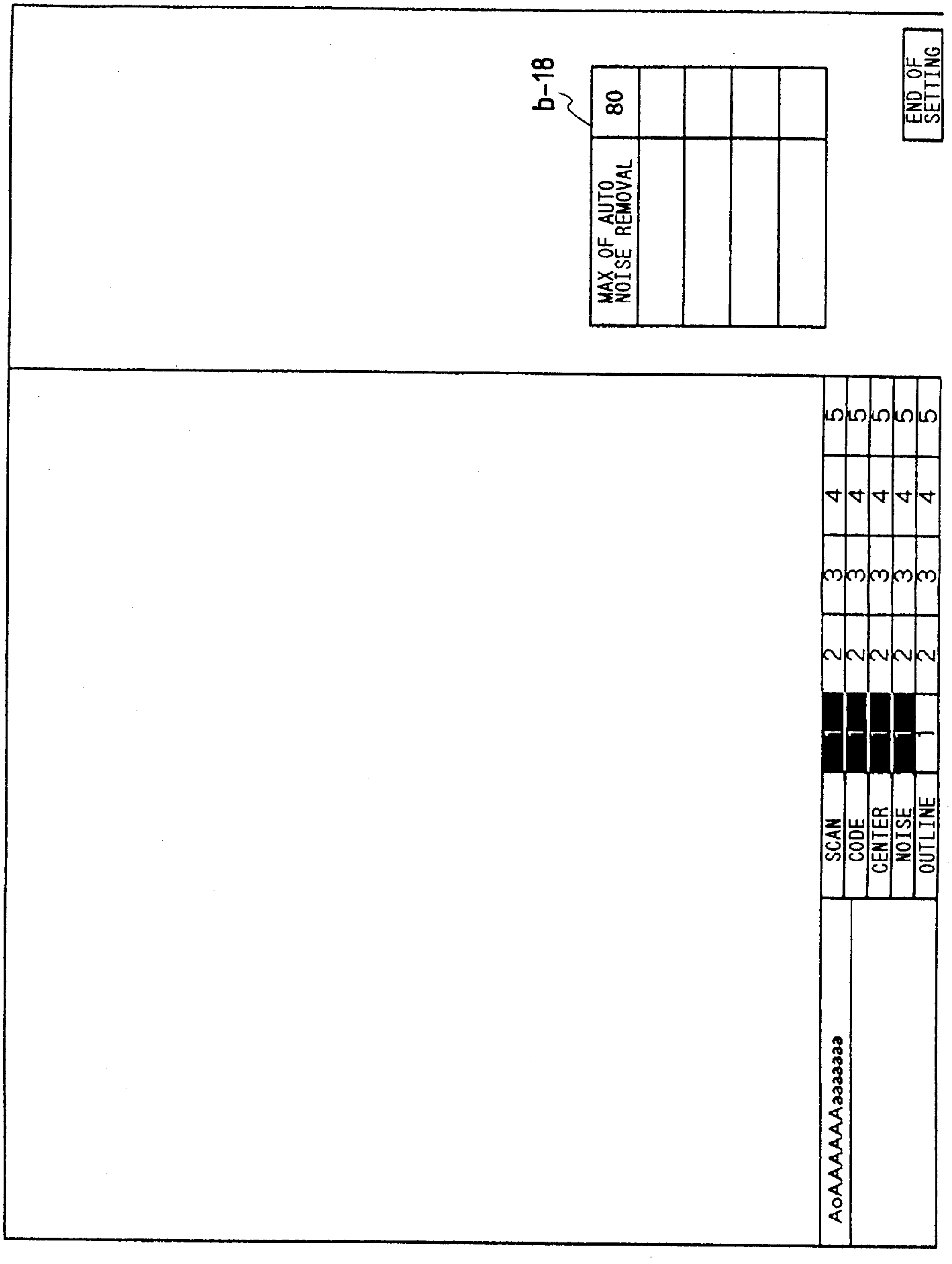
FIG. 27 is a view for explaining the outline generation process of this embodiment.
Figure 28:
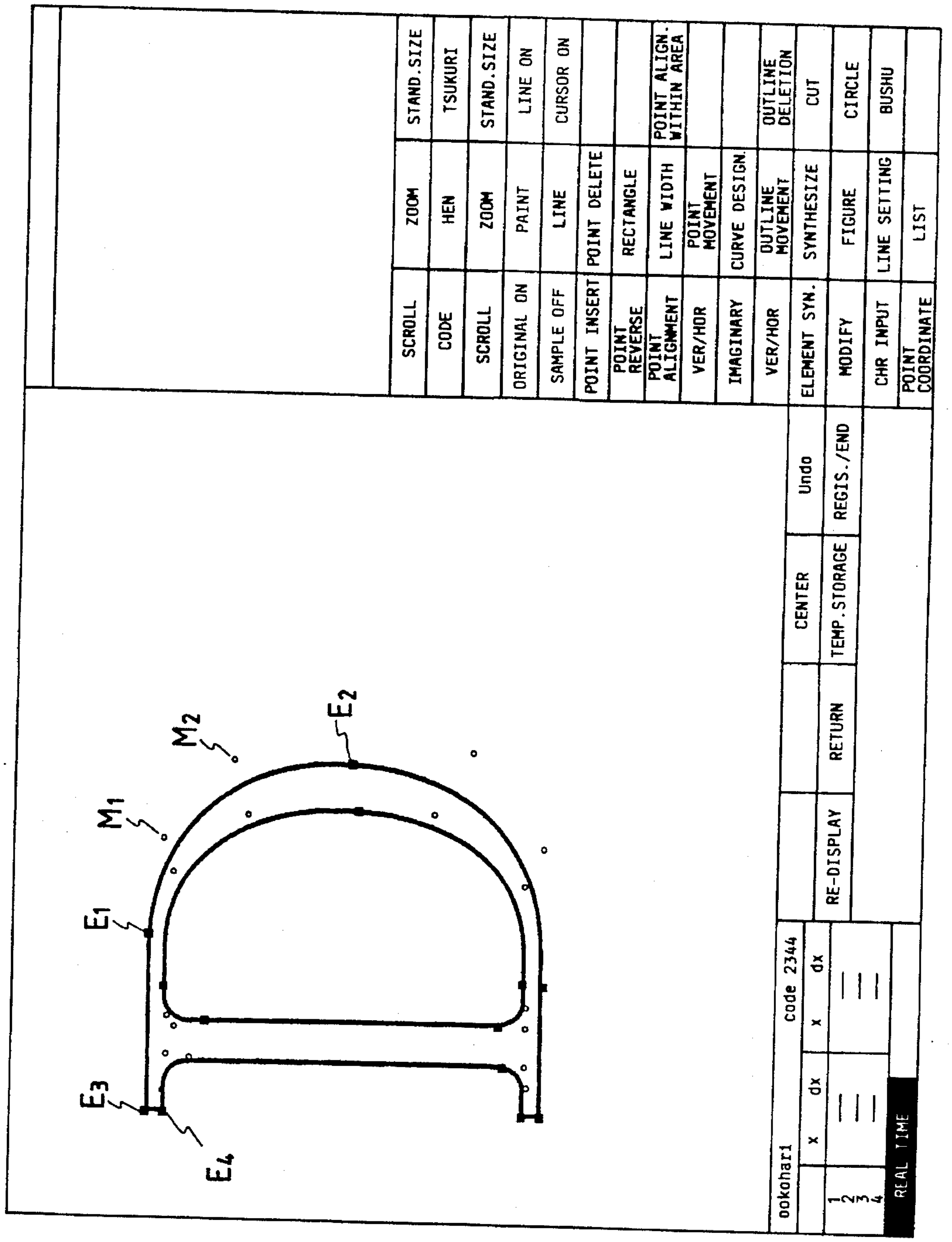
FIG. 28 is a view for explaining the outline generation process of this embodiment.
Figure 29:
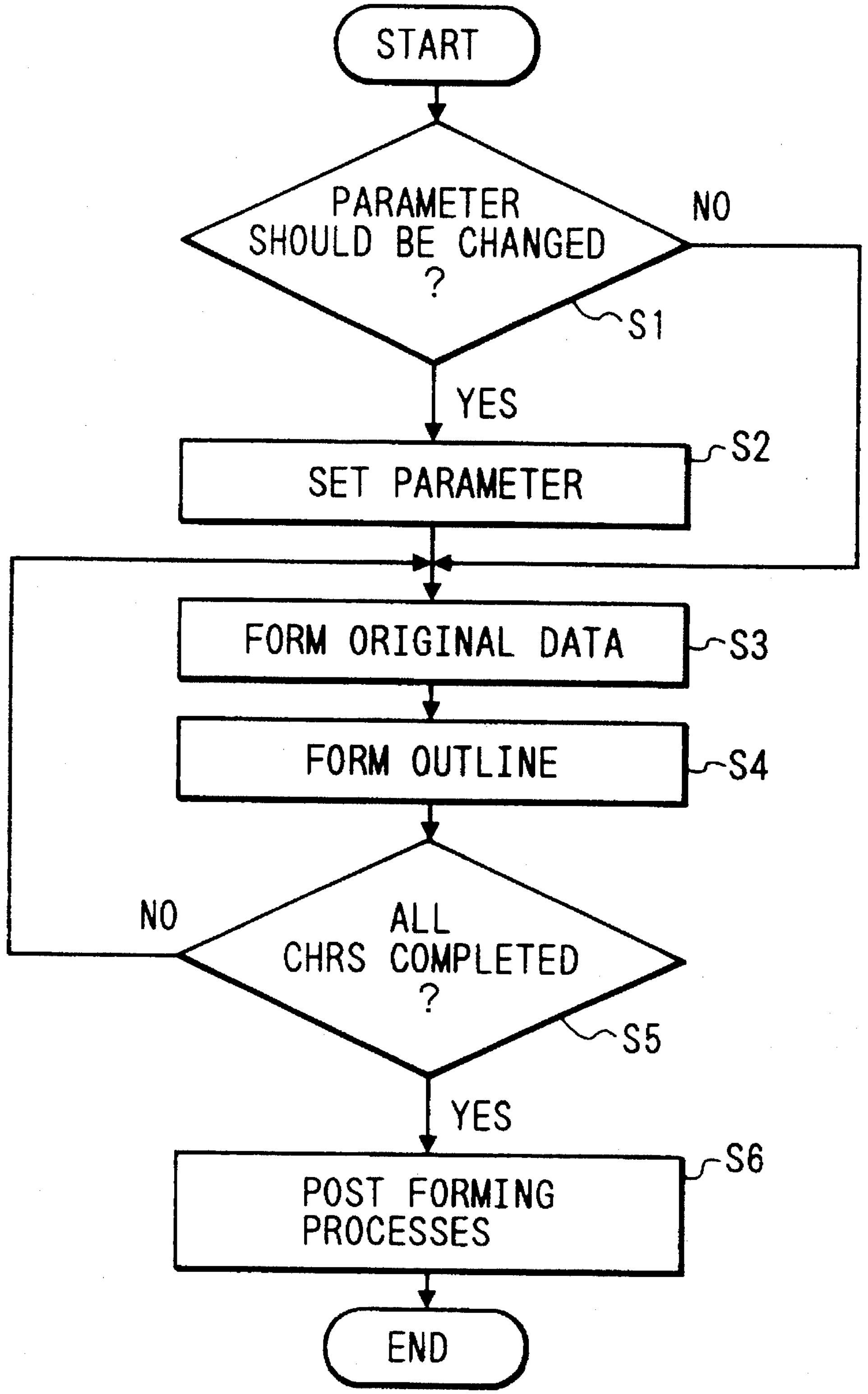
FIG. 29 is a flow chart for explaining the outline generation process of this embodiment.

The "generate outline" procedures will be described with reference to a flow chart in FIG. 29. When a parameter setting menu b-4 is picked with the PD 12 (step 1), the maximum of auto noise removal is displayed, as shown in FIG. 27. The initialized menu value (default value) of the maximum is set to be 80. This value indicates the number of dots constituting the outline. As a result of tracking of the outline, an outline having a small value is regarded as noise and is not detected as an outline point array. For example, isolated points each consisting of 24 dots are regarded as noise. This value can be changed by picking the "max. of auto noise removal" (b-18) and entering a value from the KBD 11 (step 2). A feature point extraction parameter and an automatic sample point generation parameter during automatic generation of the font data can be changed. An optimal outline data generation method can be controlled depending on different styles such as a style (e.g., a Gothic style) having many straight line portions and a style (e.g., a handwritten style) having many curve portions.

Parameters corresponding to styles are stored in the PMEM 6.

An outline point array is extracted from image data from which noise is removed, thereby forming original data (step 3). The original data is stored in the disk 3. The original data can be referred to on the CRT 13 during character forming, as needed. Image data such as a character is generally constituted by a plurality of outlines. In this case, all point arrays representing the "inner boundary" of the image data are extracted.

The extracted point array data are constituted by pairs of coordinate values (xi,yi) from the reference point of the image data. A method of extracting an outline point array can be realized by a method proposed by the present applicant as in Japanese Laid-Open Patent Application No. 64-71767 or a general outline tracking method.

Feature points are extracted from the resultant original data to determine whether feature points represent a straight or curve portion. Font data representing a character is automatically generated (step 4 in FIG. 29). The feature points include an end point (E4) of an outline point array, as indicated by ■ (square), a maximum or minimum point (E2), and end points (E1 and E3) of a straight portion. After the feature points are extracted, a point array section determined as a curve portion, i.e., a section between E1 and E2, is subjected to a spline fitting process. Necessary sample points M1 and M2 are automatically generated to express this section.

This spline fitting is performed for all curve sections, and font data representing one character is generated in the memory. The font data is stored in the font data file formed in the disk 3 in accordance with the already designated character codes.

When outline generation for all characters is completed (step 5), the managefile is automatically initialized, and the flow is ended (step 6).

[Character Forming]

Figure 30A:
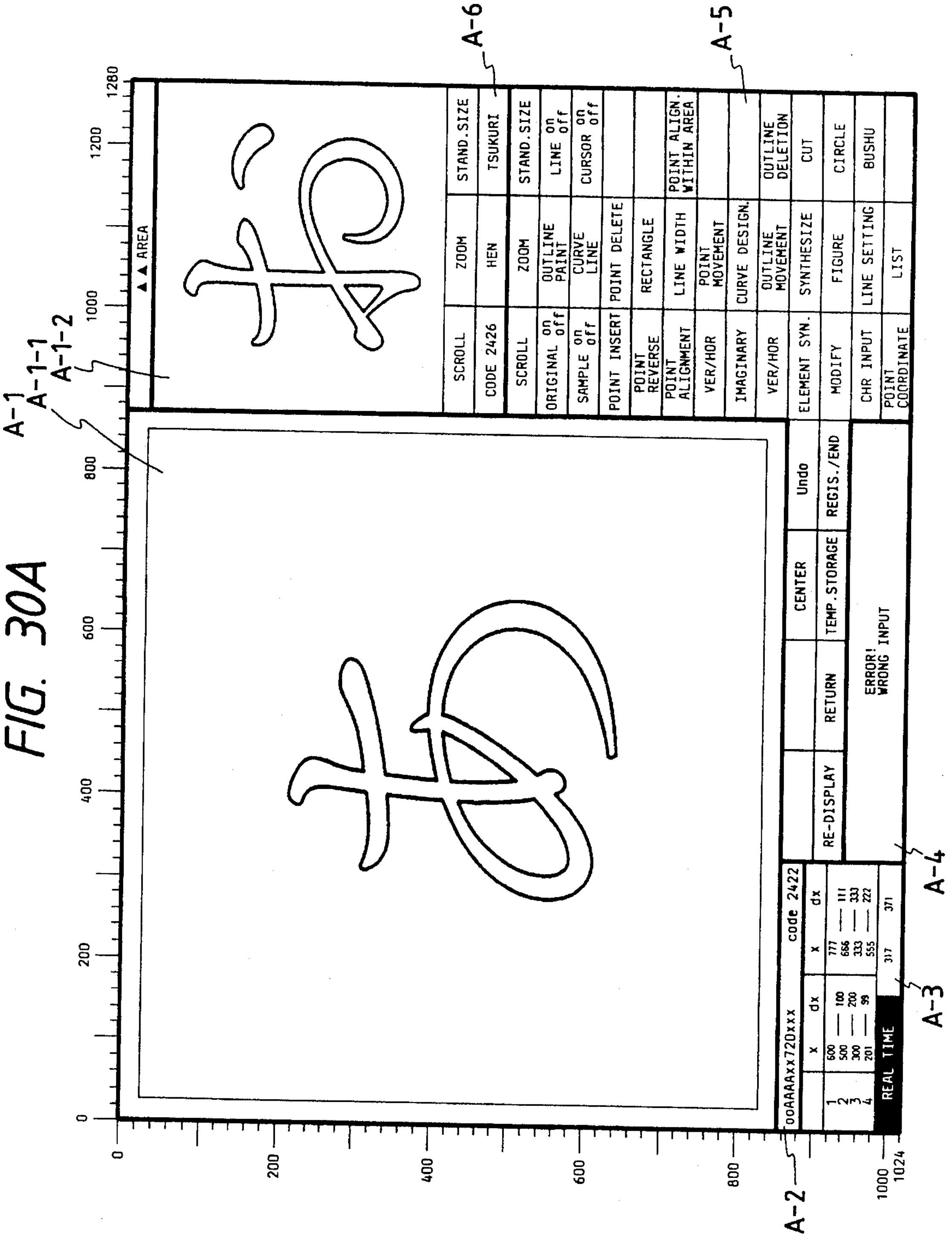

Character forming is performed by performing various operations on the basic menu screen shown in FIG. 30A. Processes are exemplified by characters. However, the processes are not limited to those of characters. A basic screen or frame is constituted by 1,280×1,024 pixels or less. The contents shown in FIG. 30A will be described below. The screen has a character display area A-1 consisting of the editing area A-1-1 for displaying a character pattern during editing and a synthesis area A-1-2 for displaying a synthesis pattern.

A code area A-2 displays a character code at the right portion and a font code at the left portion. The character code represents a code of the character pattern during editing. The font code represents a file name including a character pattern during editing.

In a coordinate area A-3, a value of the "real time" is represented by x- and y-coordinate values of a currently controlled point. Numbers 1 to 4 above the "real time" area indicate four latest coordinate values x and y together with differences dx and dy between the four latest points and the immediately preceding points. The screen is scrolled so that new points are controlled in an order-from 4 to 1.

A message area A-4 displays error messages for various operations.

A menu area A-5 is used to form a character and is divided into five areas respectively shown in FIGS. 30B to 30F.

Each menu process is basically completed by another menu pick. An execution order and the number of execution times are not limited to each menu.

The menu area shown in FIG. 30B is associated with a change in screen display such as scrolling and re-display of a character pattern during editing.

These menus are controlled by an interrupt menu control scheme (to be described later) different from the normal menu control scheme.

Display control operations are not exclusive from each other. For example, a combination of zoom and scroll can be used.

The menu area in FIG. 30C is associated with character data modification such as deformation control, synthesis control, and point control.

The menu area in FIG. 30D is an area for displaying character data such as point coordinates.

The menu area in FIG. 30E is an area for setting character data such as a pitch and setting lines.

The menu area in FIG. 30F is associated with character data storage such as return, temporary storage, registration/end.

The synthesis pattern control menu area A-6 is divided into two areas respectively shown in FIGS. 30G and 30H.

FIG. 30G shows a menu area used for changing an image display such as scroll of a synthesis pattern. The menu area in FIG. 30G is an interruption menu as in the editing display control menu in FIG. 30B.

FIG. 30H shows a synthesis pattern call menu.

A character modifying operation is started with a call of character data into the editing area A-1-1 in FIG. 30A.

The character data is loaded from a character data storage area of the disk 3 in FIG. 1 into the PMEM 6 in FIG. 1 through the I/O i/f 2 in FIG. 1. The character data is processed into display data in the PMEM 6, and the display data is transferred to the VRAM 14 in FIG. 1. The display data is then displayed on the CRT 13 in FIG. 1.

In the character modifying operation after the call of character data, a protocol between an end point and an intermediate point is provided for adding line width information so as to standardize the design and prevent degradation of display quality in a specific size.

This protocol is given as follows. An end point must be a maximum or minimum point on a continuous curve of an outline, and an intermediate point must be located on a horizontal or vertical line passing through the end point.

Figure 4:
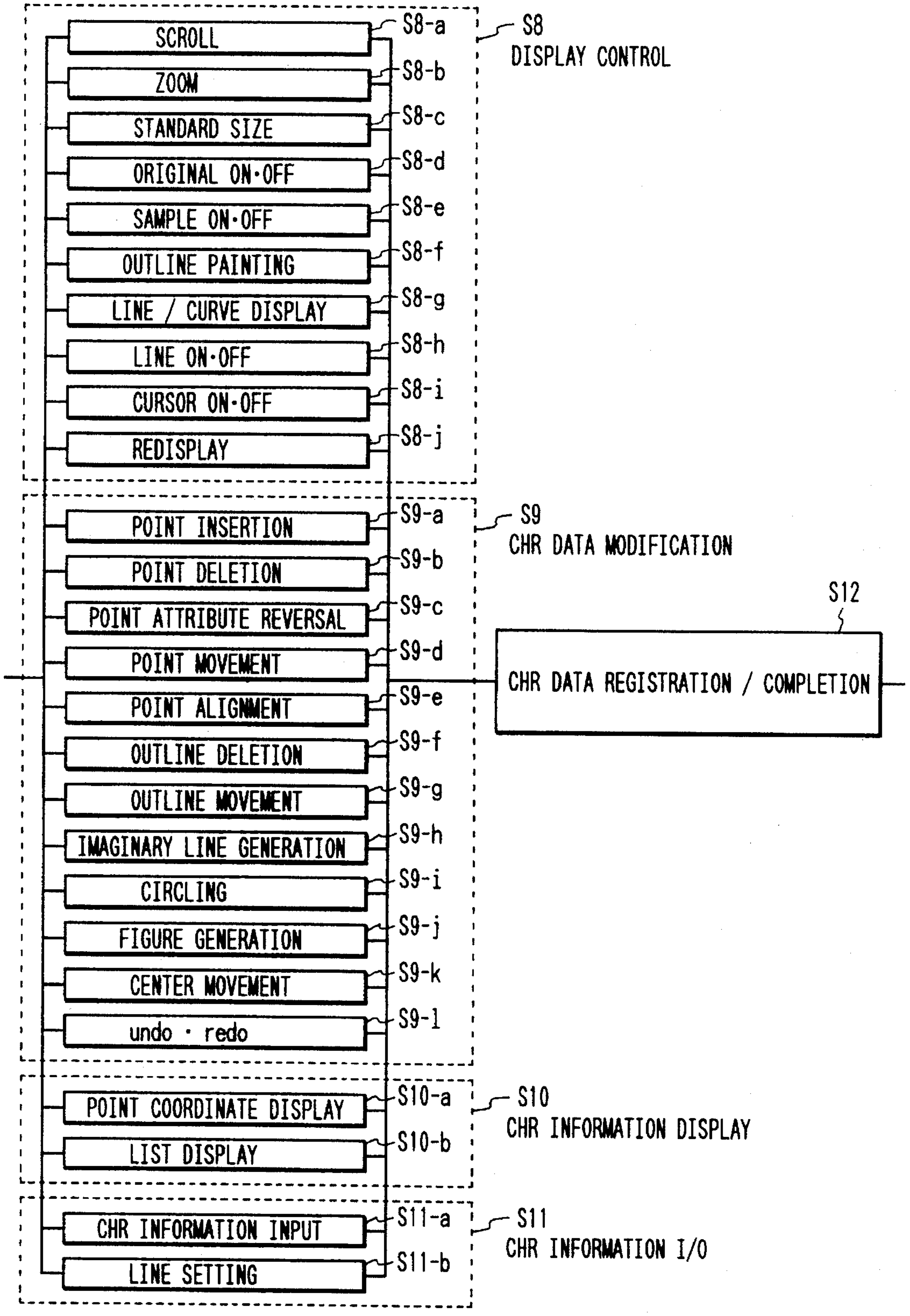
FIG. 4 is a block diagram for explaining a character forming function of this embodiment.

The point movement S9-d and the point alignment S9-e in FIG. 4 are based on this protocol.

Figure 9:
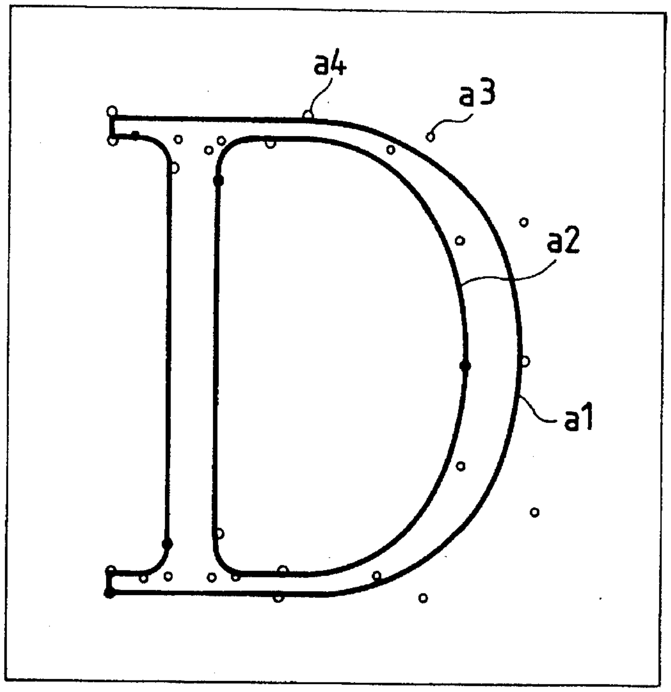
FIG. 9 is a view for explaining font data of this embodiment.

In the menu of the character data modification S9 in FIG. 9, when a sample point display is required and a sample point is not displayed during the menu pick in the character data modification S9, the sample point is automatically displayed.

After the call of the character data, a modification operation is performed by operating the PD 12 and the KBD 11. This operation will be described with reference to FIG. 1.

PD operations such as menu selection and sample point selection have been described in the "explanation of terms".

A highly accurately input such as movement of a sample point in units of several dots is performed by operating a direction key on the KBD 11.

The PD 12 has three buttons, as previously described, and these three buttons are appropriately used in each menu.

When the PD and the direction keys are operated, the input data is transferred to the PMEM 6. In the PMEM 6, data is loaded from the disk 3 to the PMEM 6, as needed. Alternatively, data in the PMEM 6 is changed and processed. The resultant data is transferred to the VRAM 14 and is displayed on the CRT 13.

Undo.Redo

The undo.redo will be described below.

Execution timings of the undo.redo function are determined in operation steps of each menu process as follows. For example, the right button of the PD 12 is clicked to execute an undo.redo operation to execute the undo and the redo (undo of undo) to be performed in each processing step. Alternatively, an undo.redo menu may be provided. At the time of menu selection, an undo.redo menu is executed for the immediately preceding change of figure data.

Figure 31:
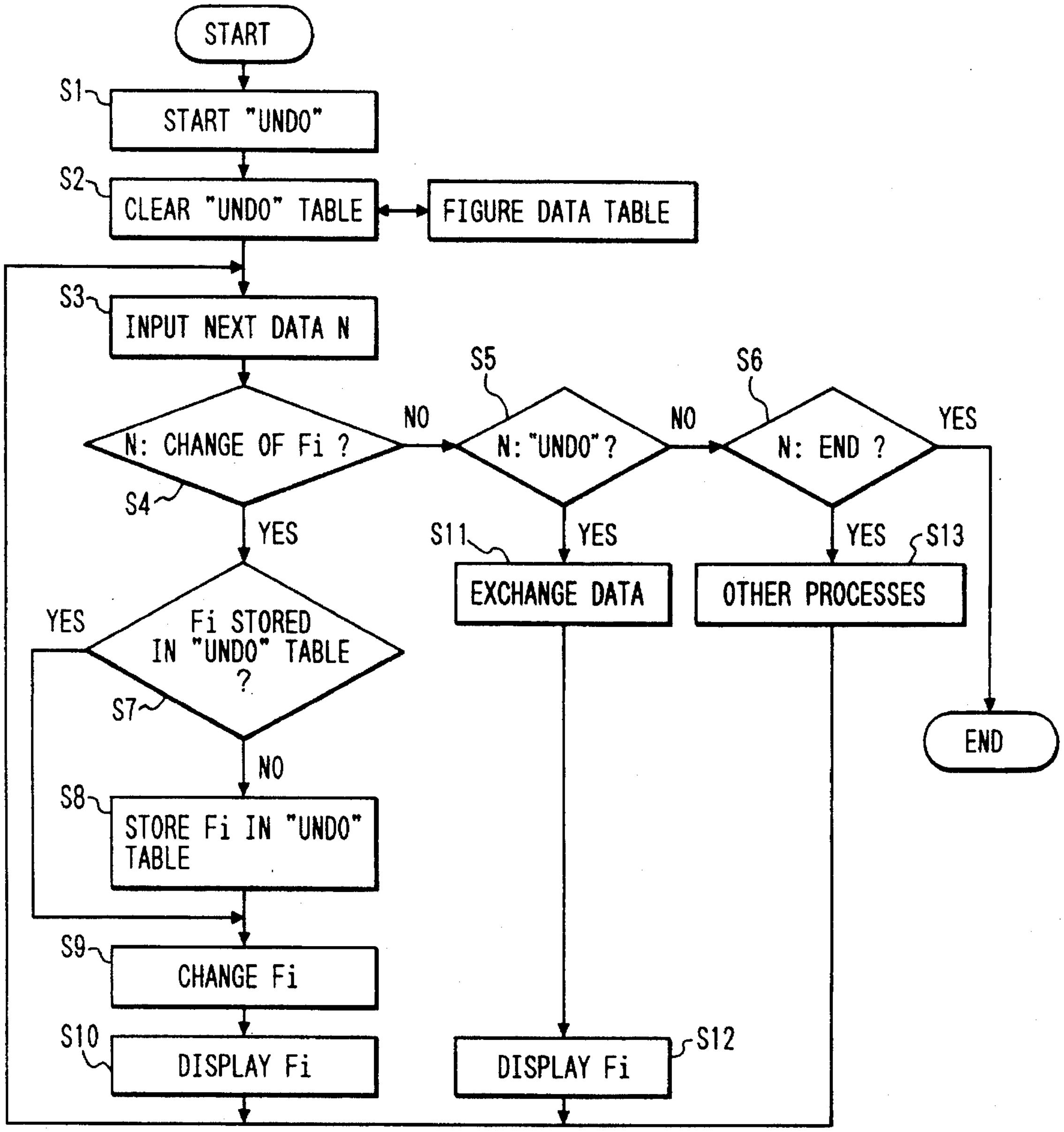
FIG. 31 is a flow chart for explaining "undo-redo" during the character forming Of this embodiment.

FIG. 31 is a flow chart showing an undo.redo operation executed by a change of figure data. A figure data table stores figure data in FIGS. 10A, 10B, 10D, and 10E. Each figure is represented by Fi where i is the figure number. An undo table has the same table format as in the figure data table. The undo table is cleared by a figure number of the designated figure Fi of the figure data table and a table in which data are sequentially stored. The undo table can exchange the figure Fi having the same number as that of the figure data table. In the flow chart of FIG. 31, step 1 is a step of designating that the current state is returned to the previous state set upon execution of the undo operation. This designation is determined in accordance with a process of each menu. When a menu is designated, the content of the undo table is cleared (step 2). The next data N is input by an operator. In step 4, when an operation for changing the figure Fi (e.g., when one of the vertices of the figure Fi is deleted), and when the figure Fi is not stored in the undo table in step 7, the undo table is changed to have the data prior to the change. The Fi data in the figure data table is stored as the nonchanged data together with the figure number in the undo table (step 8). The data in the figure data table Fi is changed in step 9, and the change result is displayed (step 10). The apparatus waits for input of the next data N (step 3).

If the Fi is already stored in the undo table in step 7, the flow jumps step 8 and advances to step 9. More specifically, after the data of the figure Fi is cleared in the undo table in step 7, the flow advances to step 8 when designation of a change is performed for the first time in step 7.

When the input N represents undo designation in step 4 (step 5), all data Fi in the undo table are exchanged with those in the figure data table (step 11). The exchange result is processed as in step 10, and the display process is performed in step 12. Thereafter, the apparatus waits for the input of the next data (step 3). When an end is designated in step 5 (step 6), this menu process is completed. However, if the input N represents another designation, other processes are performed in step 13, and the flow returns to step 3.

When undo designation is detected again in step 5, all the figures Fi in the undo table are exchanged again. That is, a redo operation is performed. The undo/redo procedures are repeated in steps 11 to 12.

Interruption Menu Control

Interruption menu control will be described below. The interruption menu is a menu executed without interrupting an operation during this operation of a normal character data modifying menu.

Figure 32A:
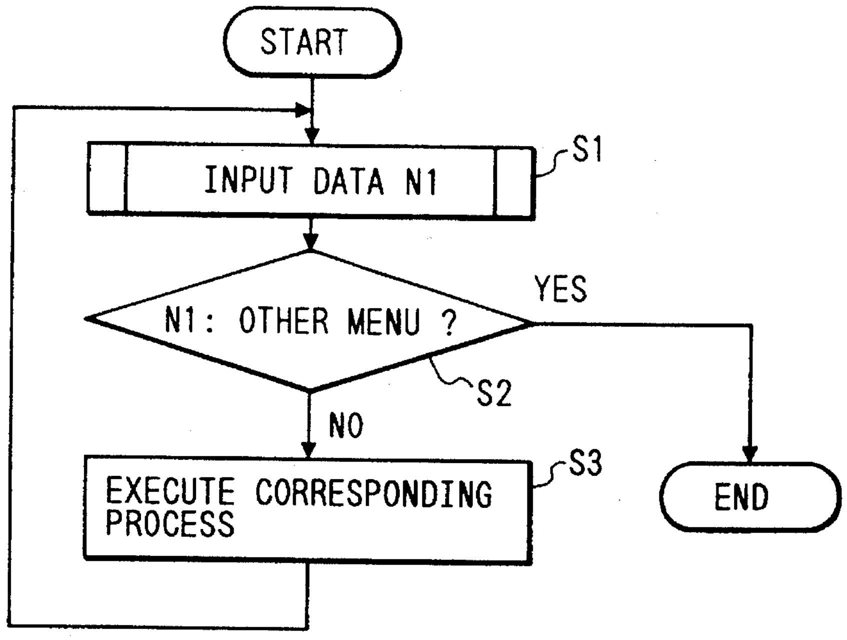
FIGS. 32A and 32B are flow charts for explaining interruption control during the character forming of this embodiment.
Figure 32B:
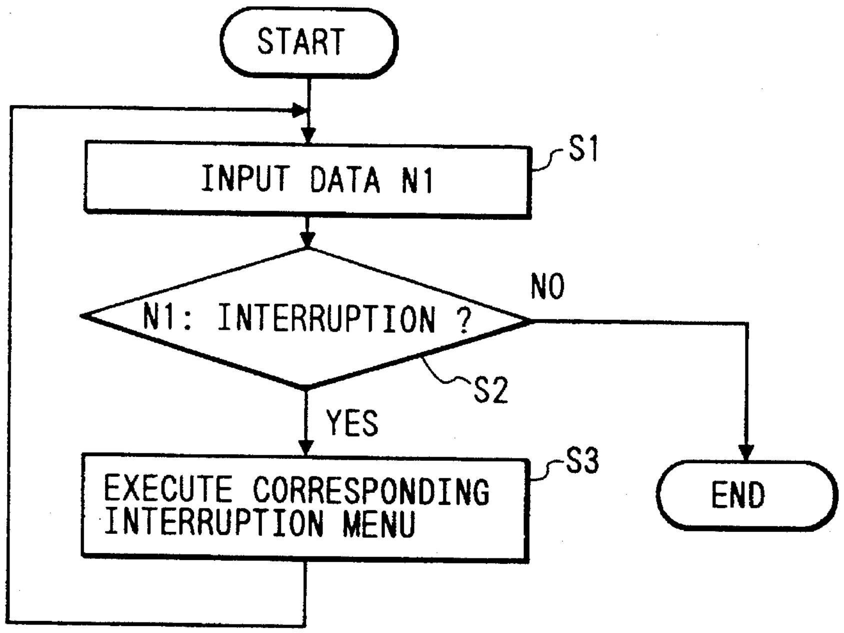

FIGS. 32A and 32B are flow charts for explaining a method of controlling and executing an interruption menu. FIG. 32A is a flow chart for briefly explaining a flow of the procedures of each normal character data modifying menu, and FIG. 32B is a flow chart for explaining an input control subroutine in FIG. 32A.

In the input control subroutine, inputs from the PD 12 and the KBD 11 are received and input information from an operator so as to represent whether the input indicates a menu pick or a sample point pick.

The process flow in the character data modifying menu will be described with reference to FIG. 32A.

Whether the type of menu is an interruption menu is determined in advance by setting a corresponding flag or the like. In step 1, an input from the operator is received (N1). If the input N1 represents another (other) menu, this menu is executed, and the flow is ended. Otherwise, a process corresponding to each menu content is executed (step 3), and the apparatus waits for an input by the operator (step 1). These operations are repeated to execute each menu process. Each menu can be executed without designating the end of each menu.

The input control subroutine or section will be described with reference to FIG. 32B. Input information from the operator is received and is defined as N1. The content of the input N1 is determined in step 2. If the N1 does not represent an interruption menu, N1 is output, and the flow is ended. However, if the N1 represents an interruption menu, each interruption menu process is performed in step 3, and the next input is awaited (step 1). In this case, the input control subroutine is not completed. That is, when an interruption menu is designated by the operator, this is processed in the input control subroutine, and the steps in FIG. 32A are not interrupted.

[Display Control]

Figure 33:
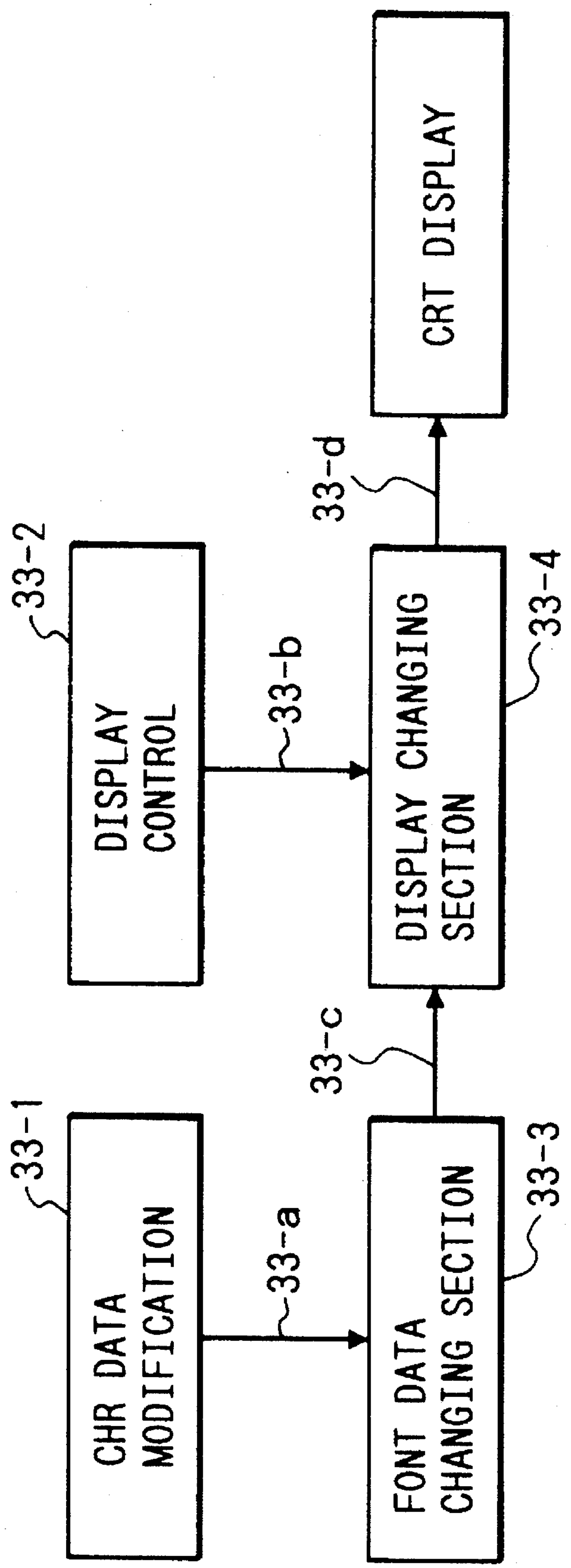
FIG. 33 is a block diagram showing display control during the character forming of this embodiment.

FIG. 33 is a chart briefly showing a flow of display control in the character forming S3. A character data modification section 33-1 has each function of character data modification S9 in FIG. 4. A display control section 33-2 has each function of display control S8 in FIG. 4. A font data changing section 33-3 performs a change process of font data. A display changing section 33-4 performs a change of display data. The sections 33-1 to 33-4 are stored in the PMEM 6. A request 33-a indicates to request a change of font data in the font data changing section 33-3 when an actual change of font data occurs in the font data changing section 33-3. Similarly, a request 33-b is sent from the display section 33-2 to the display changing section 33-4 to change the display data. A request 33-c is sent to the display changing section 33-4 to change a display upon a change of font data. A request 33-d is sent from the display changing section 33-4 to the CRT (CRT display) 13 through the VRAM 14. The flow in FIG. 33 will be described in more detail. When the character data modification section 33-1 changes font data during character data modification, the data changing request 33-a is sent to the font data changing section 33-3. The font data changing section 33-3 actually changes the font data and outputs the display changing request 33-c to the display changing section 33-4. The display changing section 33-4 refers to font data to form display data. The display changing section 33-4 then sends the display request 33-d to the CRT 13 to display the display data on the CRT 13. When the display change requests 33-b are present in the two display control sections, only the display data is changed in the display changing section 33-4, and the changed data is displayed on the CRT 13.

Each function of the display control section 33-2 is the interruption menu. Even if the request 33-b is sent from the display control section 33-2 to the display changing section 33-4, the request 33-a and the process in the font data changing section 33-3 are not influenced.

The operation of the display changing section 33-4 will be described with reference to FIGS. 33, 34A, and 34B.

Figure 34A:
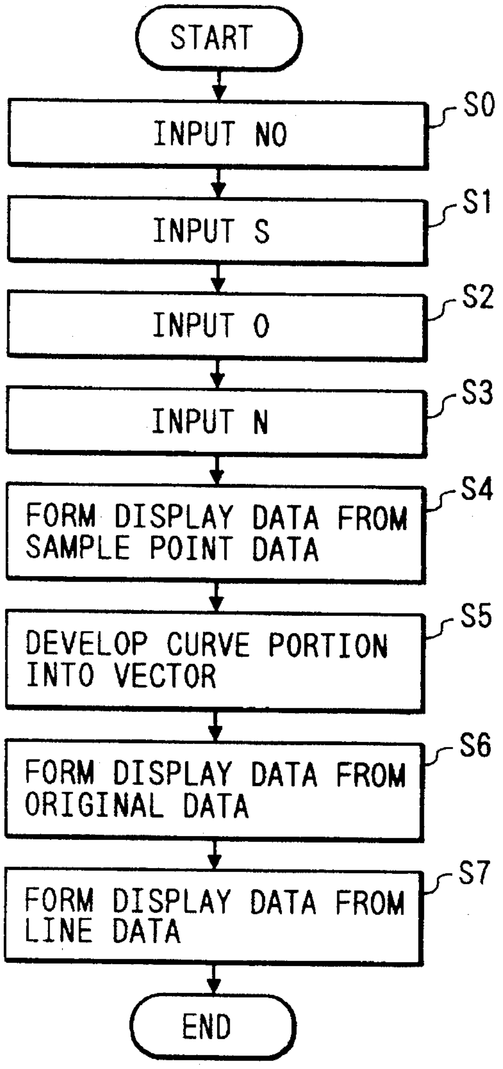
FIGS. 34A and 34B are flow charts for explaining the display control during the character forming of this embodiment.
Figure 34B:
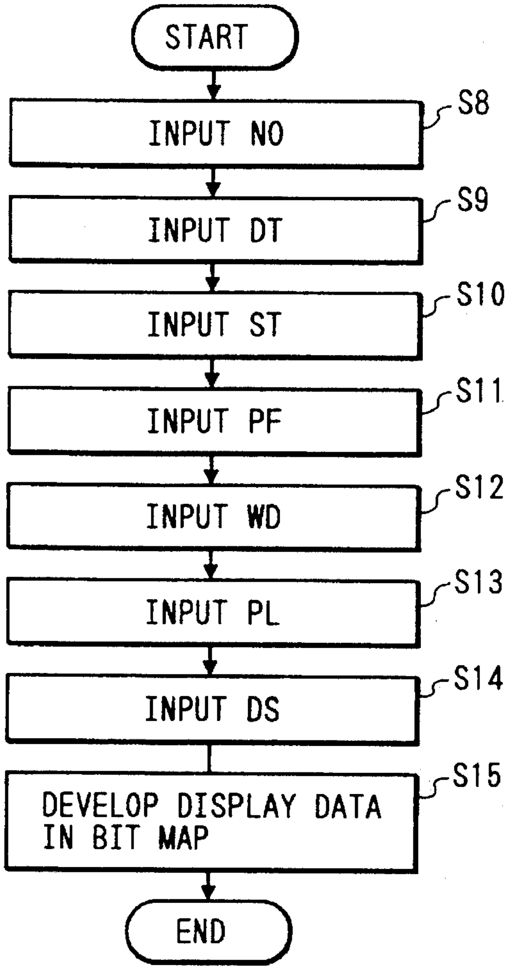

The process contents of the display changing section 33-4 are divided into two parts in FIGS. 34A and 34B. More specifically, FIG. 34A shows a flow of a display data forming process, and FIG. 34B shows a flow of a display process of the display data. Referring to FIG. 34A, font data, original data, and line data constitute a data set. A number No. assigned to this data set, a display enlargement factor S, display reference point coordinates O, and a curve division section N serving as a parameter for dividing a curve portion of the font data into straight lines are input. The font display data, the original display data, and the line display data, which are developed into a display coordinate system, are output in correspondence with the display data number No. When the No. value is changed to obtain a plurality of output data sets.

The font display data, the original display data, the line display data, all of which are output data in FIG. 34A, the data number No. of these data, a flag DT for selecting desired one of the data constituting the data set, a display form ST of the selected data, a flag PF for determining whether the selected data is painted and displayed, a flag WD representing a data display destination, a flag PL for designating a plane, and a flag DS for designating actual display or deletion are input, and these input data are developed as bit map data in the VMEM, as shown in FIG. 34B.

The respective steps will be described in a sequential order.

In step 1, a display enlargement factor or zoom factor S is input. In step 2, coordinates O serving as a display reference after zooming are input. The parameters S and O are generally the same as those required to convert coordinates from an absolute coordinate system to a display coordinate system. In step 3, a curve division section N is input. In step 4, font data in the PMEM 6 are coordinate-converted using the parameters S and O to form sample point display data (FIG. 35C) from the sample point data of the font data (FIG. 10D).

In step 5, a curve portion is developed into a short vector from the sample point display data formed in step 4, the coefficients of FIG. 10E, and the parameter N. The number of divisions can be changed with a change in value of the N. Data developed as the short vector is stored in the PMEM as short vector data (FIG. 10D).

Figure 35A:
FIGS. 35A to 35D are views for explaining an outline data storage section during the character forming of this embodiment.
Figure 35B:
Figure 35C:
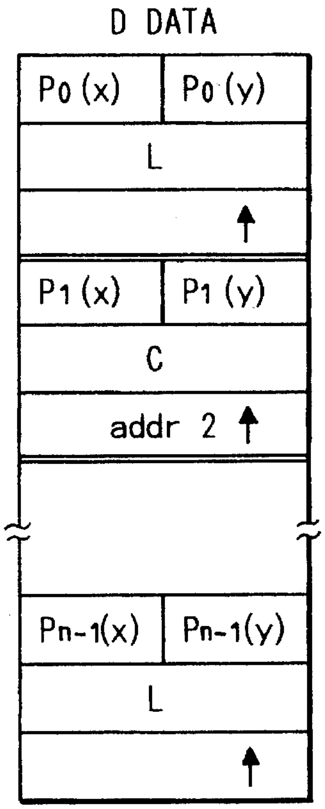
Figure 35D:
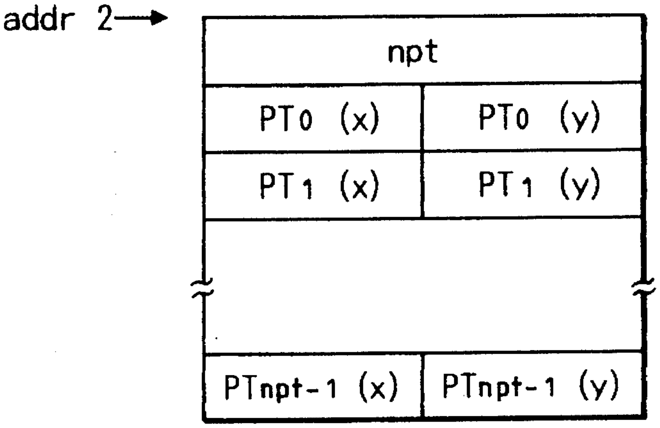

FIGS. 35A to 35D will be described below. The contents of FIGS. 35A and 35B are the same as those of FIGS. 10A and 10B. DDATA in FIG. 35C is obtained such that coordinates P0(x) and P0(y) to Pn−1(x) and Pn−1(y) are converted into display data. A point attribute L indicates a line start point; and C, a curve start point. When the curve start point C is detected, an address of an area in which a curve portion is developed into a short vector is shown in FIG. 35D. FIG. 35D shows the area in which a point coordinate count npt and npt coordinate values are stored.

In step 6, coordinate conversion of the original data in the PMEM is performed as in step 4. The original display data is stored in the PMEM. A similar operation is performed for the line data of step 7.

FIG. 35B will be described below.

In step 8, a flag number No. for determining a specific data set constituted by the font display data, the original display data, and the line display data formed in FIG. 35A is input. In step 9, the flag DT for determining a specific-type of data of the data set represented by the flag number No. is input. If DT =1, the font display data is input. If DT=2, the original display data is input. If DT=3, the line display data is input.

In step 10, the display form ST is input. The display form ST is valid only when DT=1. The display form can take three values. If ST=1, a curve of the DDATA is displayed. If ST=2, a straight line of the DDATA is displayed. If ST=3, a sample point of the DDATA is displayed. If the curve is to be displayed, an address addr2 is referred to when the point attribute is the point attribute C in FIG. 35C. Data which contains short vector data and is connected by line segments is defined as display data. When the straight line is to be displayed, data obtained by sequentially connecting only data of FIG. 35C and only the data of the sample point coordinates serve as display data.

When the sample point is to be displayed, data representing a square for an end point or a circle for an intermediate point according to point attributes serves as display data.

Figure 36A:
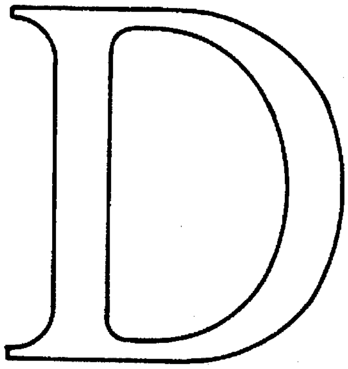
FIGS. 36A to 36C are views for explaining the display control during the character forming of this embodiment.
Figure 36B:
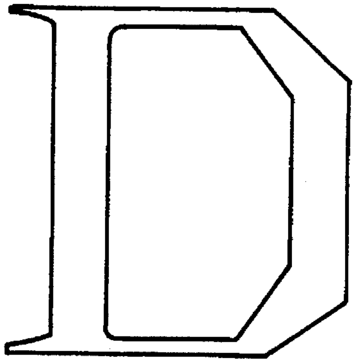
Figure 36C:
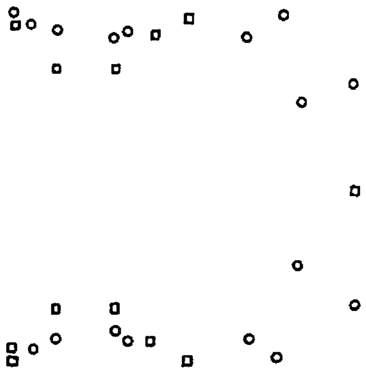

FIGS. 36A, 36B, and 36C show a curve display, a straight line display, and a sample point display, respectively.

In step 11, the flag PF representing whether the outlines of the display data selected in steps 8 and 9 and formed in step 10 are to be painted is input. If PF=0, the outlines are displayed. If PF=1, painting is designated. If this data is the line display data, this flag is not referred to.

In step 12, an area for displaying the display data formed up to step 11 is input. WD may be a window.

In step 13, if the VRAM can have a plurality of planes, the flag PL for designating a display destination plane is input. If the VRAM has only one plane, this flag is neglected.

In step 14, the flag DS representing display/deletion at the time of development in the VRAM is input.

In step 14, the display data selected by the flag DT is developed into a bit map in the VRAM 14 in accordance with the ST, DF, WD, PL, and DS. When this step is completed, data is sent from the VRAM to the CRT and is displayed on the CRT.

One data number No. designated in FIGS. 36A and 36B is assigned to one display destination area WD1.

By combining the DT, ST, and PF, various display combinations can be obtained.

Each function of display control will be described below. Referring to FIG. 4, all display control contents (S8-a to S8-J) are interruption menus. Even if each function is executed during the character data modification, the character modification operation cannot be interrupted.

Scroll

Figures 37, 37A:
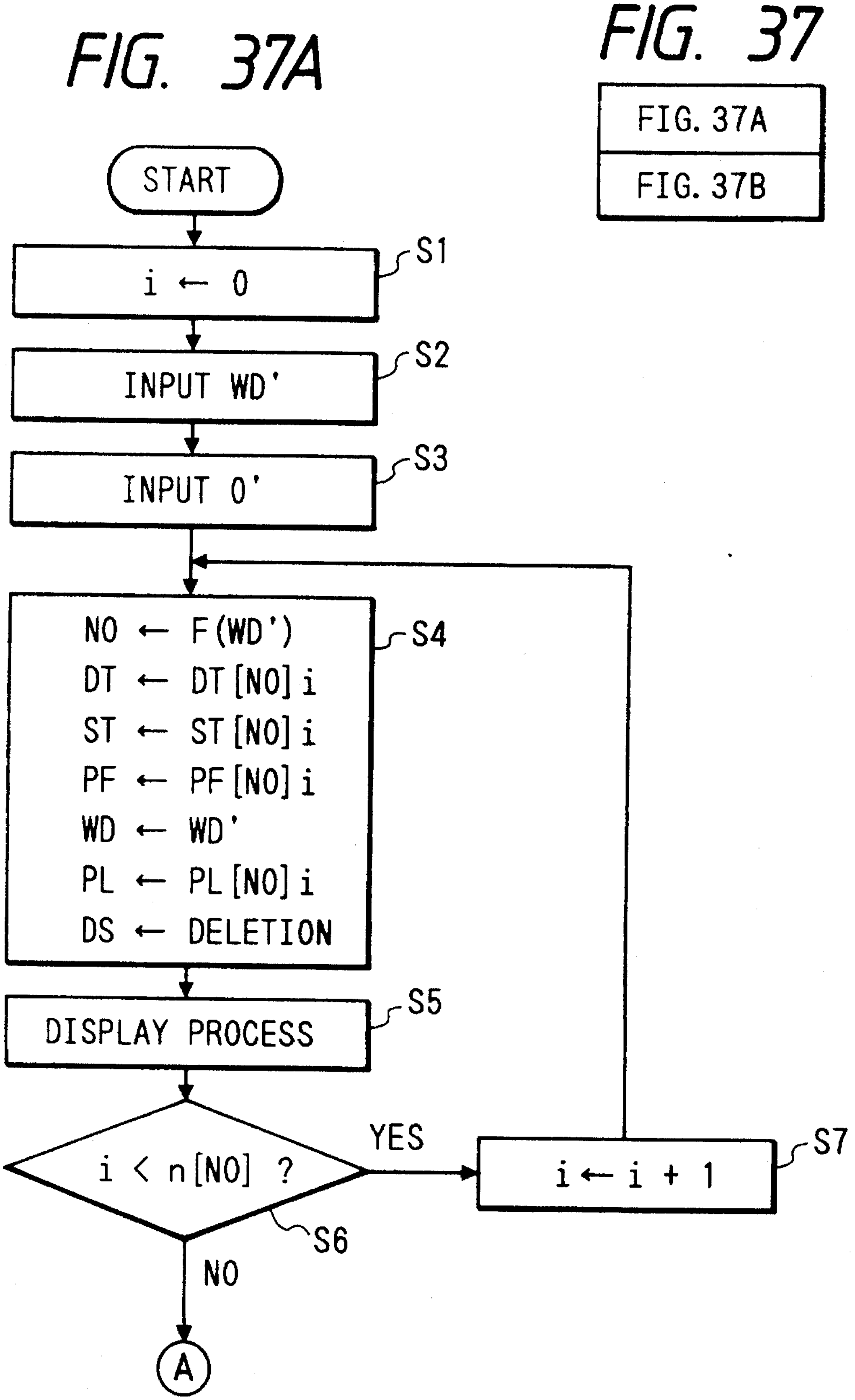
FIG. 37, consisting of FIGS. 37A and 37B, is a flow chart for explaining a scroll process of this embodiment.
Figure 37B:
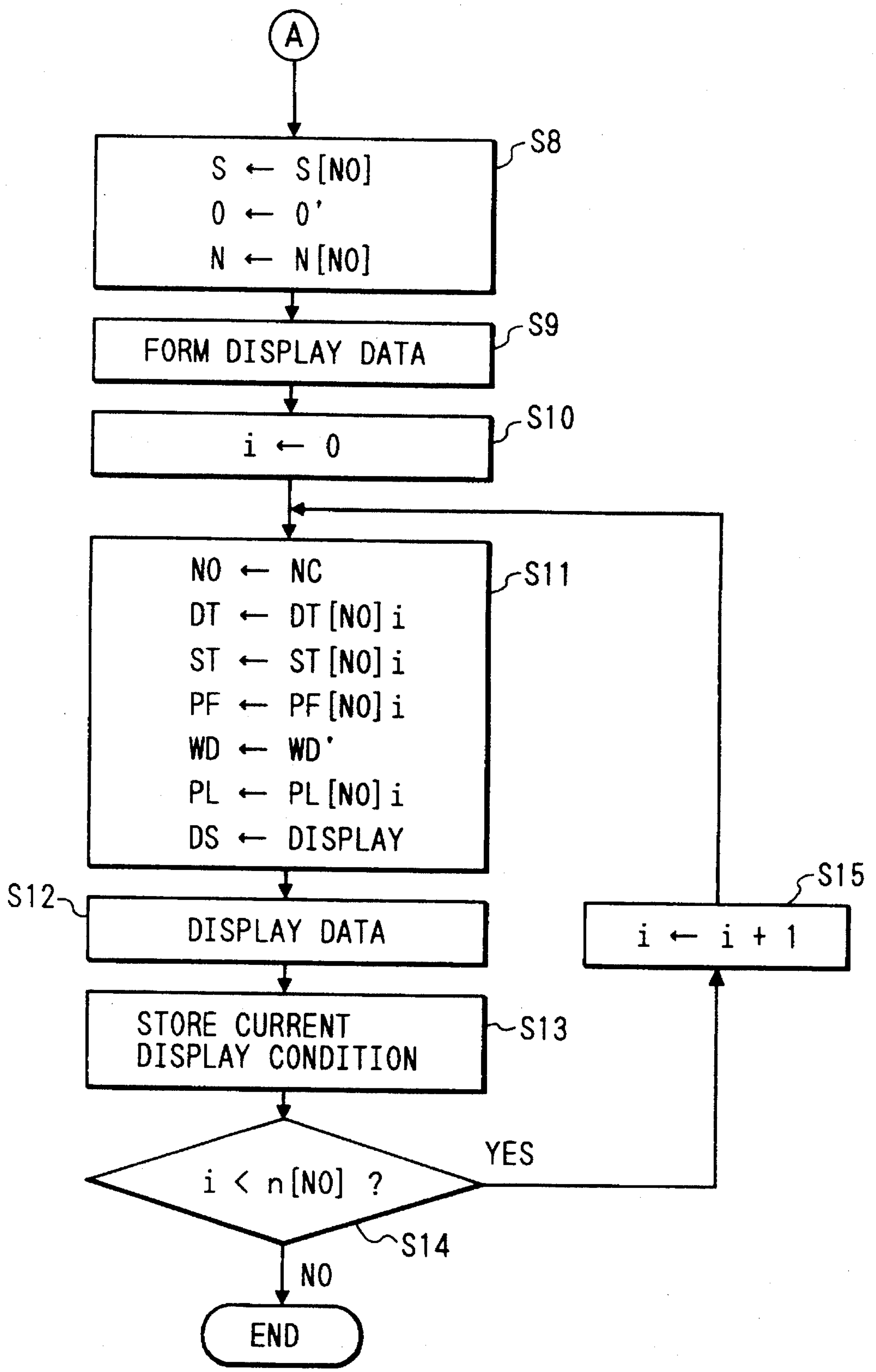

The scroll S8-a will be described below. FIG. 37 is a flow showing scroll steps. In step 1, i is initialized. In step 2, a display destination area WD' is input. If an editing area is to be scrolled, this display destination area is the WD' editing area. In step 3, a reference point O' is input from the PD 11. In step 4, values NO, DT, ST, PF, WD, PL, and DS serving as display process inputs are set. One number NO. is present for each designated WD, and F is a function of correlating WD with No. Assume that the number of display data currently displayed is n, and that n current display states are stored together with kinds DT(No.)i (i=0, . . . , n−1) of (data) in the PMEM. Current values of the DT, ST, PF, and Pi are substituted into these parameters, and "deletion" is substituted into the display flag DS, thereby canceling the display process in step 5. Step 6 is a step of determining whether the operations in steps 4 and 5 are repeated for all (n) data types. If there is any data in a display state, the parameter i is incremented in step 7, and the operations in steps 4 and 5 are repeated.

Steps of performing a display operation upon scrolling will be described below.

The scale S, the reference point O, and the curve division section N, all of which are required to form display data, are input for the display data number No. The value O' input in step 3 is substituted into the value of the reference point O. The current values corresponding to the display data number No. are substituted into the values of the scale S and the curve division section N.

Display data is formed in accordance with the display data forming procedure in step 9. In step 10, i=0 is set. In step 11, input values required for the display process are set. The current states corresponding to the No. are substituted into the DT, ST, PF, and PL. The WD' input in step 2 is substituted into the WD, and "display" is substituted into the DS.

A display operation is performed in accordance with the display process in step 12. The current display state is stored in the PMEM in step 13. This process is repeated by the number of times corresponding to the number of data, and the flow is ended.

Figure 38:
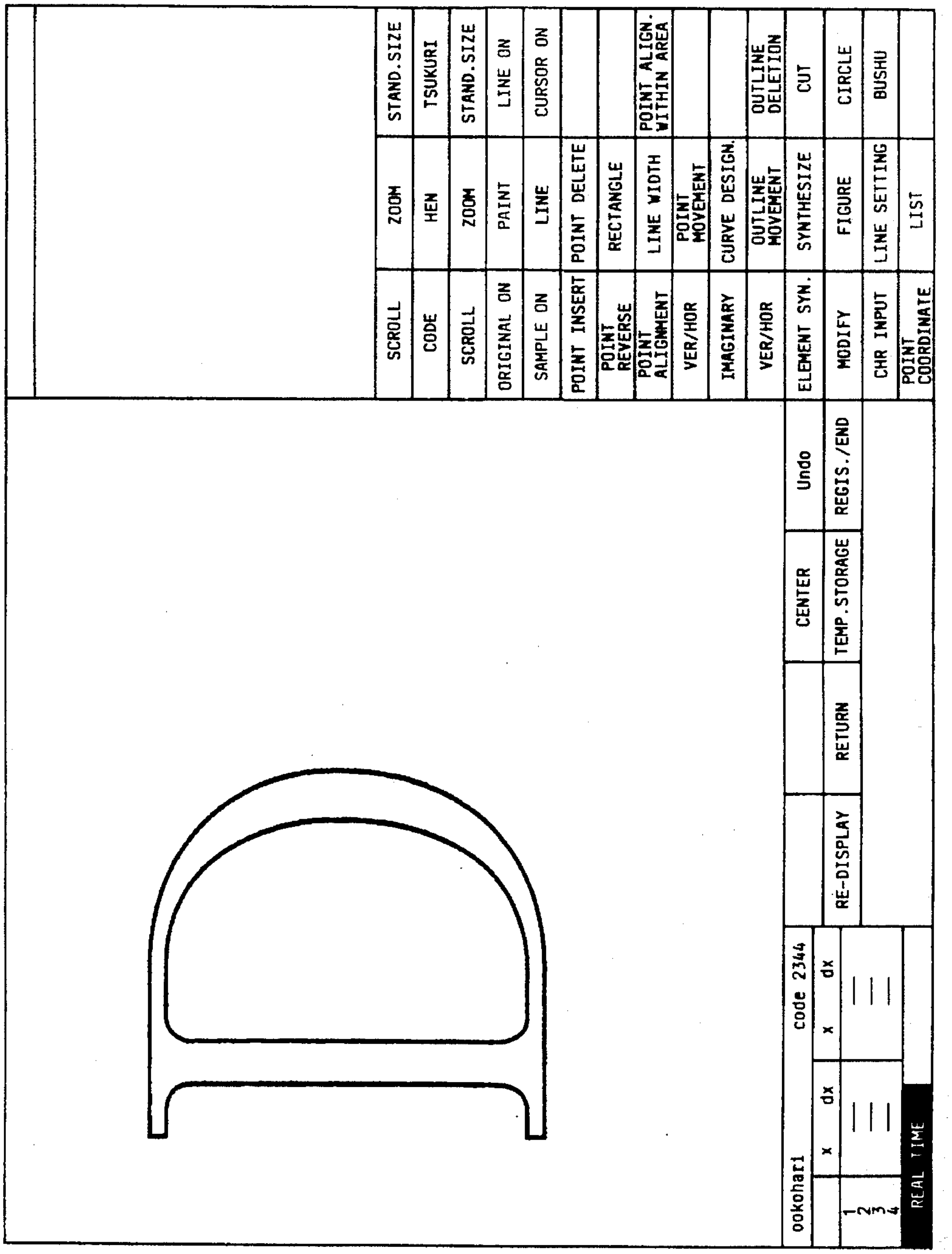
FIG. 38 is a view for explaining the scroll process of this embodiment.
Figure 39:
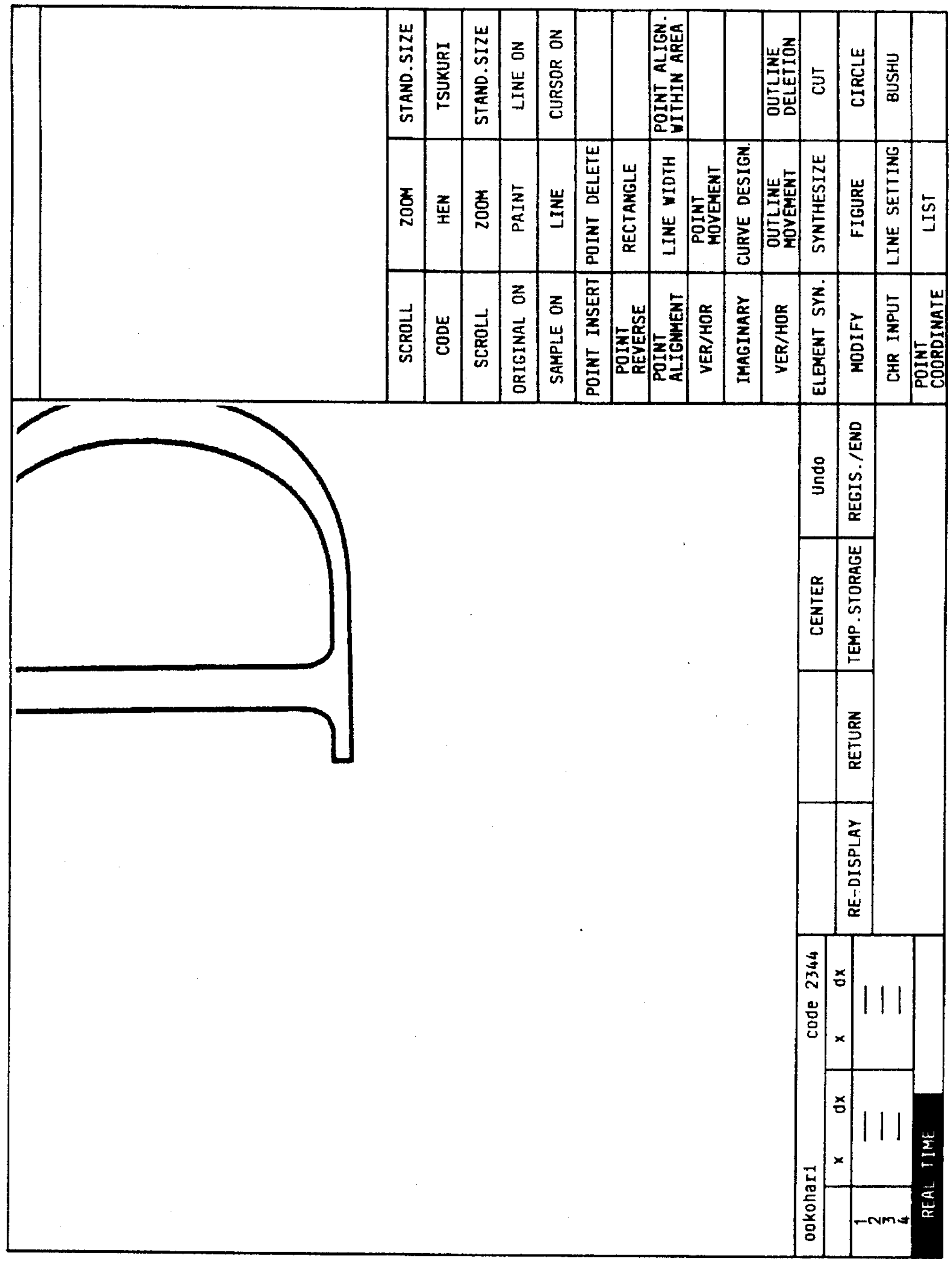
FIG. 39 is a view for explaining the scroll process of this embodiment.

FIG. 39 shows a state wherein the character in FIG. 38 In the WD', the editing area No is the number corresponded by F (WD'), and the display the kind of data is of font data. Therefore, n=1. In addition, the flag PF designates no painting.

Zoom

Zooming will be described below.

In the zoom process, the value S described in the scroll process is newly added as an operator's input, and the subsequent processes are the same as those of scrolling. After step 3, the step of inputting the scale value S' is added, and the scale value S' is substituted into S in step 8. An WD' input section, an O' input section, and an S' input section will be described, and a description of the remaining parts will be omitted.

Figures 40, 40A:
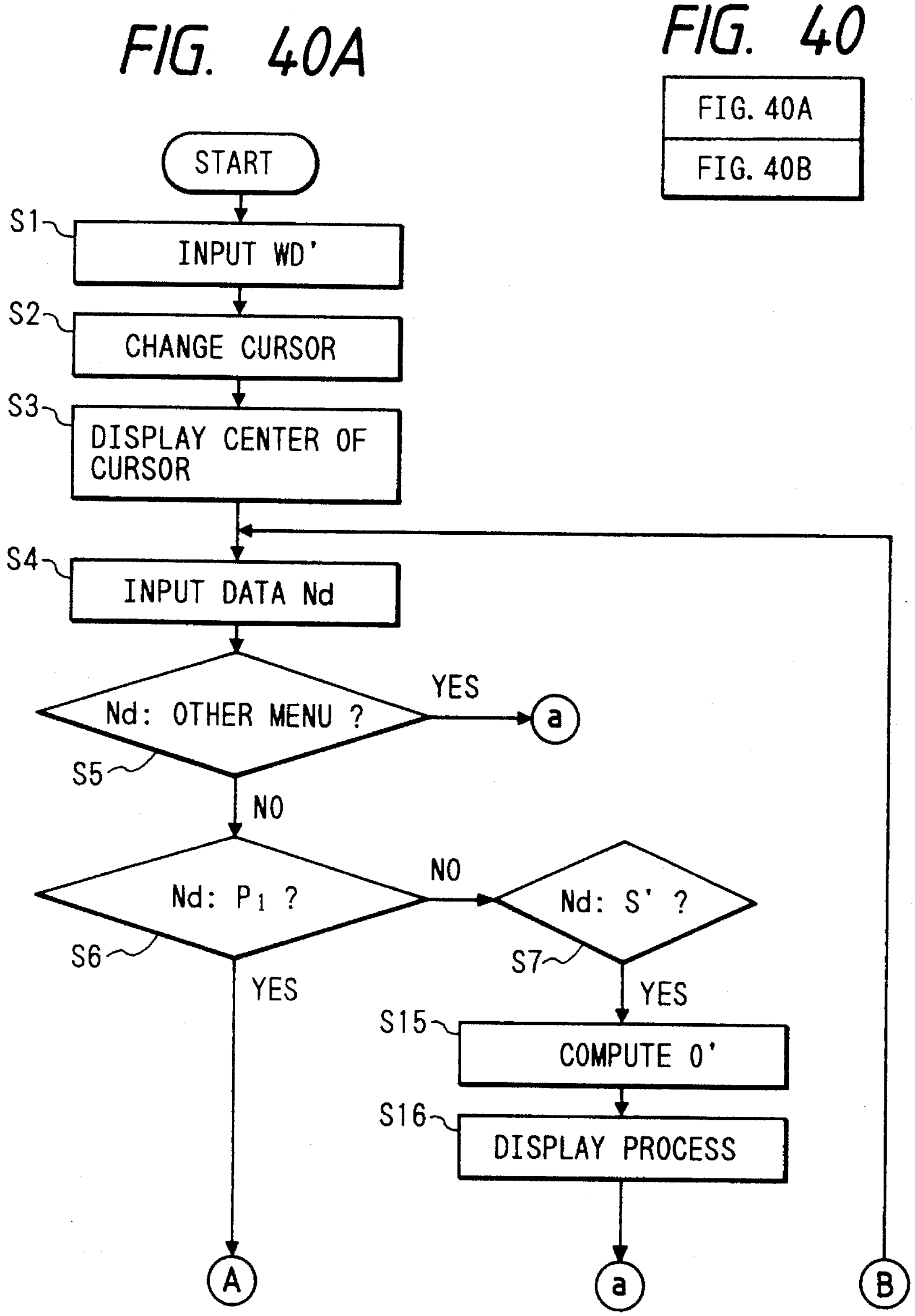
FIG. 40, consisting of FIGS. 40A and 40B, is a view for explaining a zoom process of this embodiment.
Figure 40B:
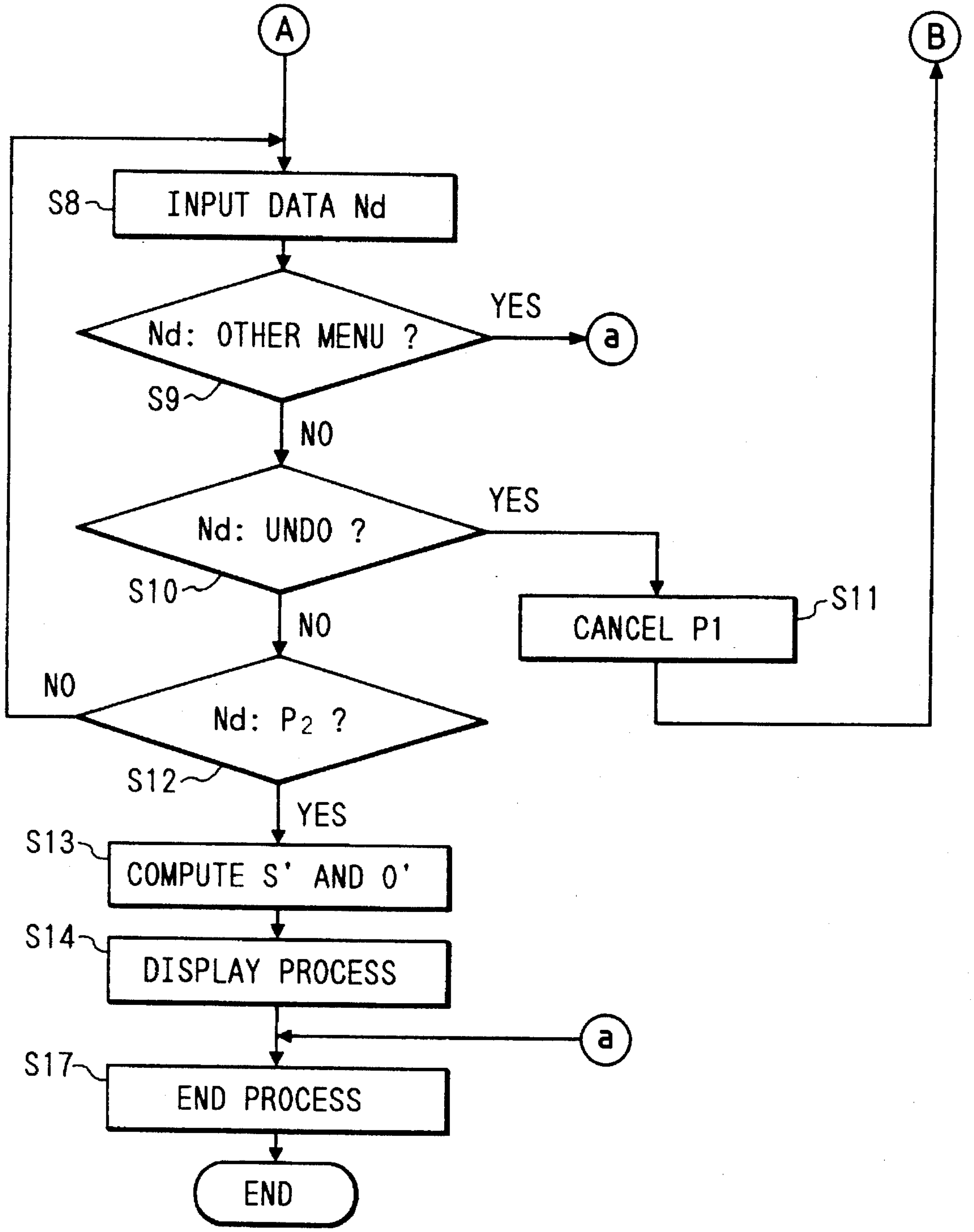

These input sections will be described with reference to FIG. 40.

In step 1, the display destination WD' is input. If the display destination WD' represents zooming within the editing area, the editing area is substituted into the display destination WD'. The shape of the cursor is changed into a long cursor in step 2. The cursor indicates the center of display in step 3 (to be described later). In step 4, an input by the operator is awaited. If the input Nd represents another menu pick, the end process is performed in step 17, and the flow is ended. The end process includes an operation for returning the shape of the cursor to the initial shape and an operation for not displaying the center of display. If the first rectangular point P1 is input in step 6, the apparatus waits for an input of the next rectangular point P2 in step 8. If the input Nd represents another menu in step 9, the ending process is performed, and the flow is ended. If the input Nd represents undo designation (step 10), the point P1 is canceled (step 11), and the flow returns to step 4. If the second rectangular point P2 is designated in step 12, the enlargement factor and the center are defined as follows:

Enlargement factor $S'=\min(H/h,\ W/w)$

Center $O'$=Center of Rectangle where h and w are the length and width of a rectangle having the points P1 and P2 defining a diagonal line, and H and W are the length and width of an area designated by the display destination WD', respectively.

In step 14, the values WD', S' and O' are updated, the display process is performed, and the flow is ended.

In step 6, when the enlargement factor is input, the value of the reference point O' is substituted by the current value, and the display process is similarly performed in step 16. Input operations in steps 6 and 7 are performed as follows. If the left button is clicked, the point P1 is input. If the central button is clicked, the enlargement factor is input. The enlargement factor set in step 7 is designated as follows. If a portion above the center in the display destination area is clicked, enlargement is designated. However, a portion below the center is clicked, reduction is designated. In this case, a distance from the center to the clicked position can determine the value of the enlargement factor.

Figure 41:
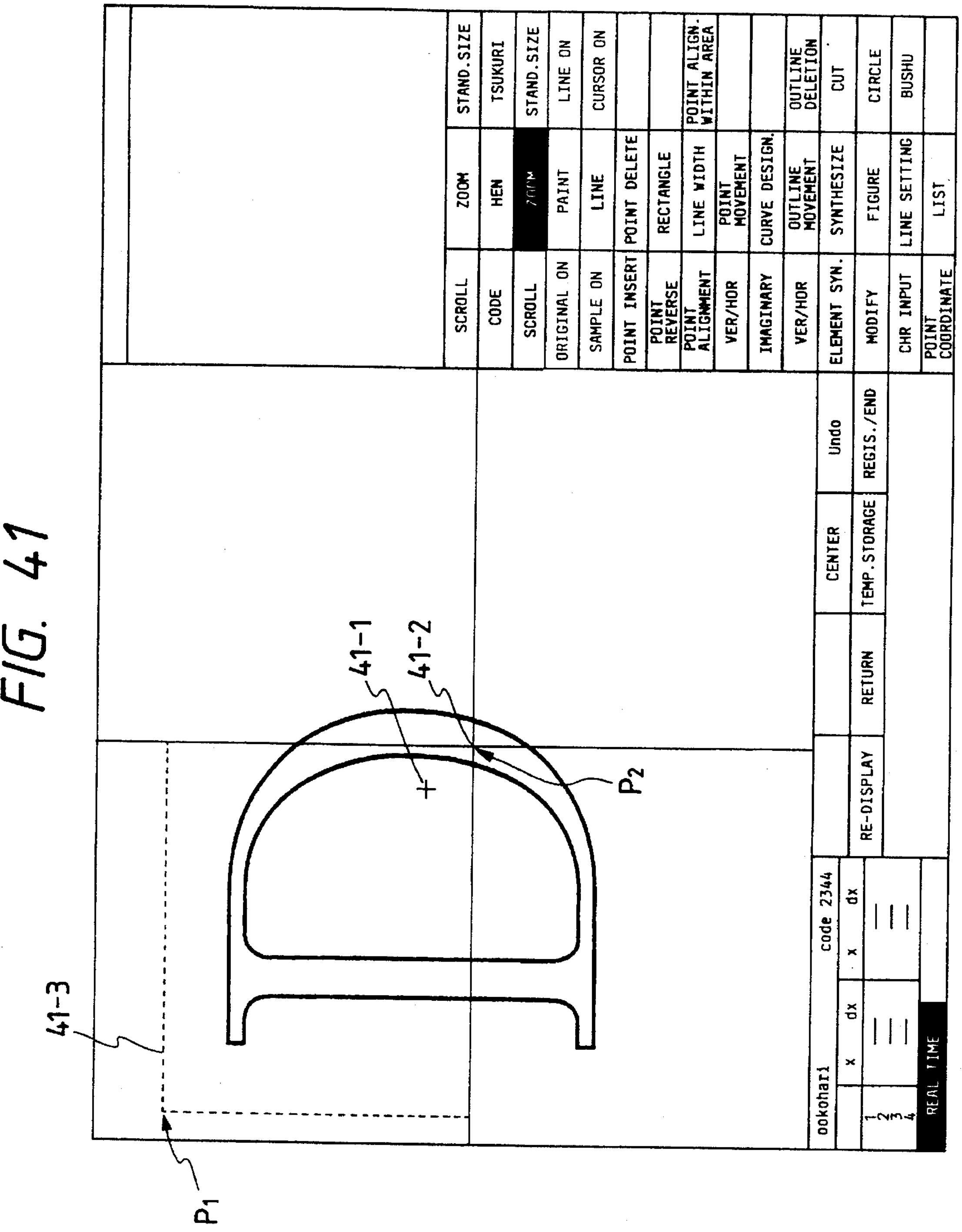
FIG. 41 is a view for explaining the zoom process of this embodiment.
Figure 42:
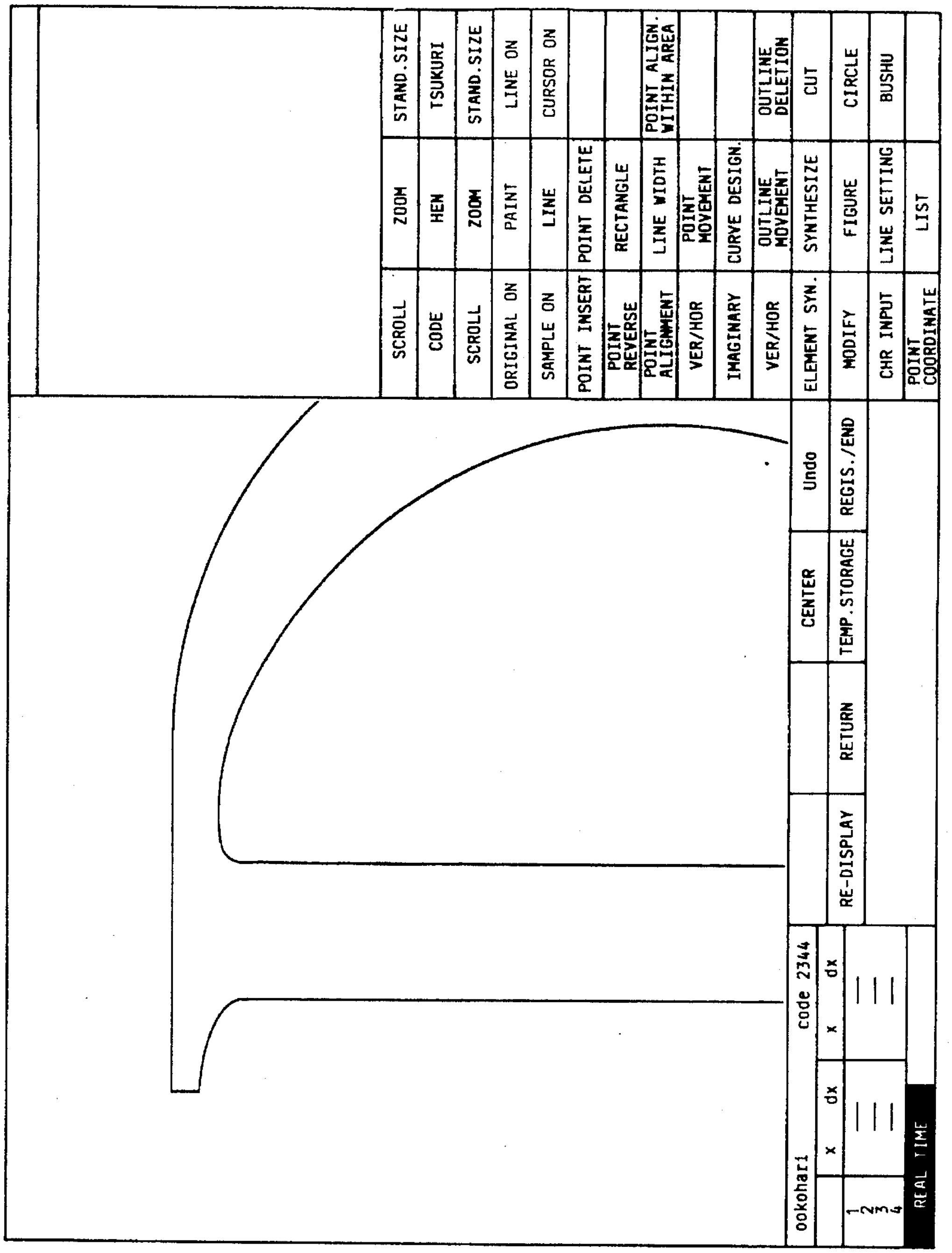
FIG. 42 is a view for explaining the zoom process of this embodiment.

FIG. 41 shows a zoom process screen. This screen has a display center 41-1, a long cursor 41-2, and a rectangular echo 41-3. An enlarged state by zoom designation at the points P1 and P2 is shown in FIG. 42.

A zoom process for a synthesis screen is executed by changing the value WD, as a matter of course.

Standard Size

The standard size will be described below.

The standard size is a function of immediately returning a scrolled or zoomed display state into the original size at the original display position. The original display state indicates that one dot of font data is caused to correspond to one pixel in the display area, and the center of the body comes to the center of the display area.

In the display changing section described above, the initial scale S0, the initial reference point O0, and new data are respectively input as the scale S, the reference point O, and the value of the area WD'.

Original ON.OFF

The original ON.OFF will be described below.

This menu is a toggle menu. Every time this menu is picked, the original display is turned on or off.

In the display changing section, "No←F(WD')" (where WD' is the display destination or target area), and "DT←2"

are designated. If the original is currently displayed, "DS-Nondisplay" is set and input. However, if the original is not currently displayed, "DS-Display" is designated and input to execute the original ON.OFF function. The value PL is changed to display the original display data in a plane different from that of the font display data. In this case, the original display data can be superposed on the font display data, as a matter of course.

Sample ON.OFF

The sample ON.OFF will be described below.

This menu is also a toggle menu. In the display changing section, "No←F(WD')", "DT←1", and "ST←3" are input.

Figure 43:
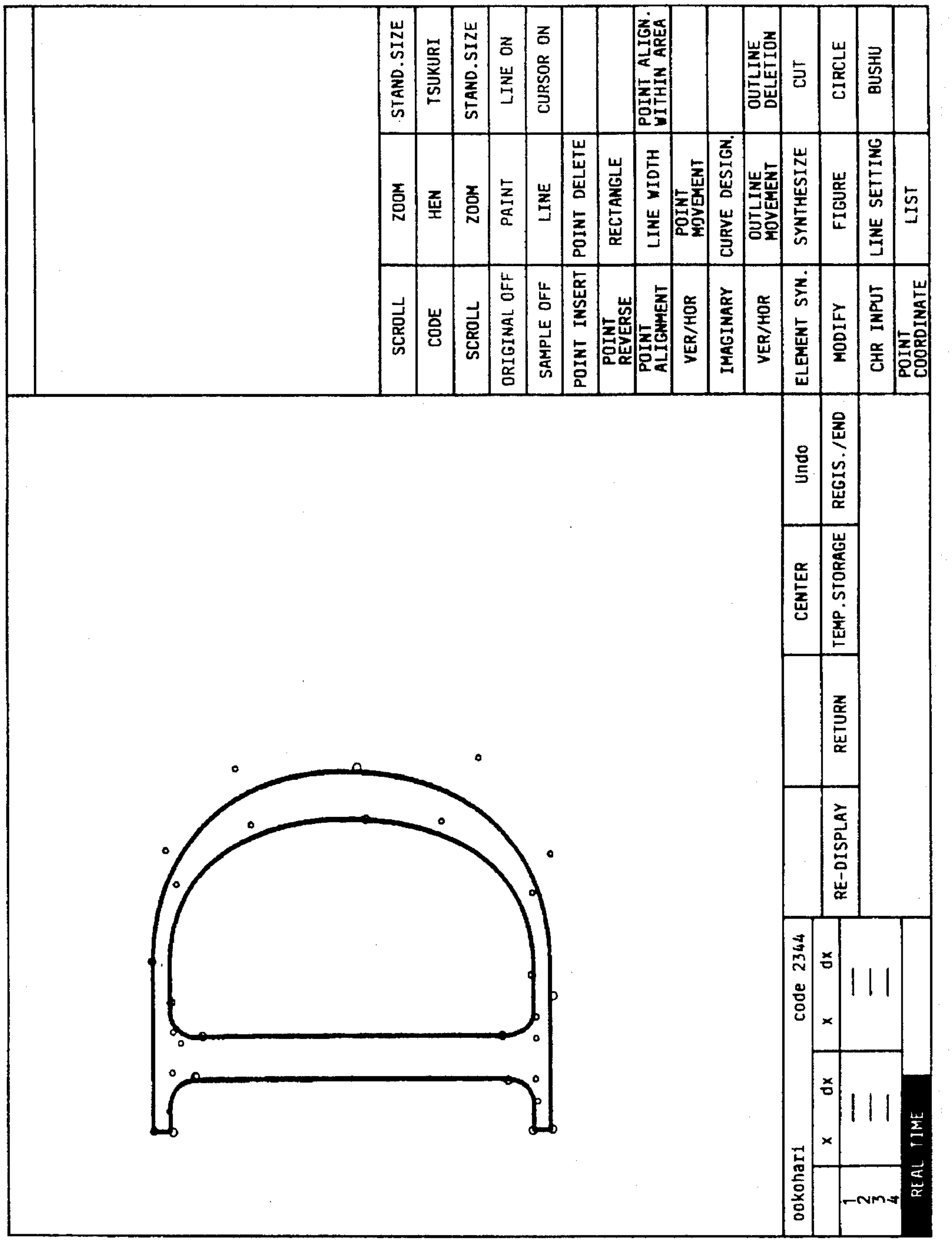
FIG. 43 is a view for explaining sample point ON.OFF process of this embodiment.

FIG. 43 shows the sample ON state and the original ON state.

Outline Painting

This menu is also a toggle menu. "No←F(WD')", "PF←ON", and "DS←Display/Deletion" are set to switch the display mode every menu pick, thereby alternately displaying outlines of a character or its painted state. In this case, when the PL value is changed to set a plane different from that of the font display data. In this case, the outline or painted image can be superposed on the font display data.

FIG. 44 is a view showing a painting ON state.

Line ON.OFF

Lines such as auxiliary lines will be described later. The line ON.OFF menu represents a function of displaying or not displaying a line currently displayed in the line setting menu by picking this menu. The line ON.OFF menu is also a toggle menu.

In the display changing section, "No←F(WD')" and "DT←3" are input.

Figure 45:
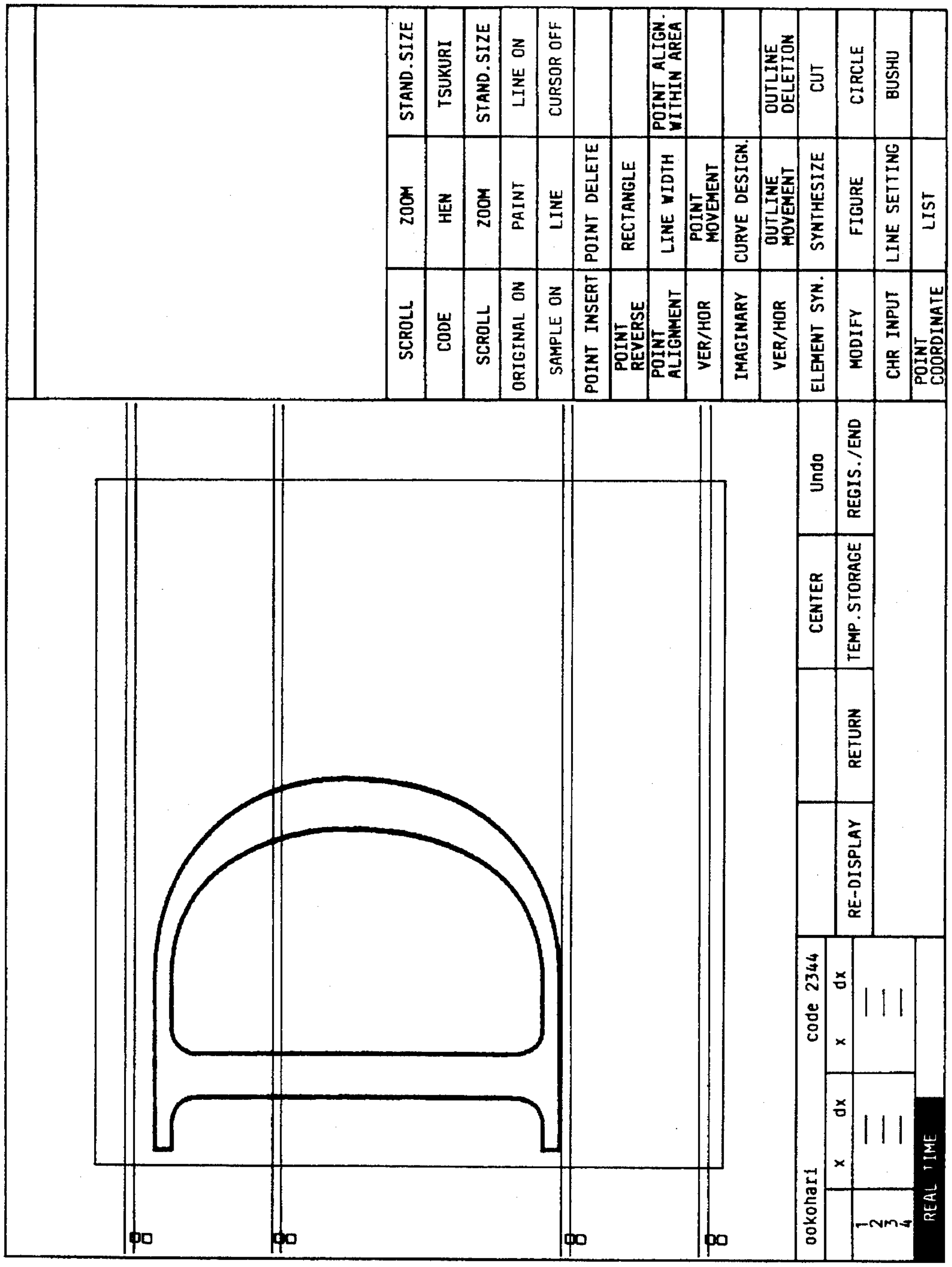
FIG. 45 is a view for explaining a line ON.OFF process of this embodiment.

FIG. 45 shows a line ON state.

Cursor ON.OFF

Figure 46A:
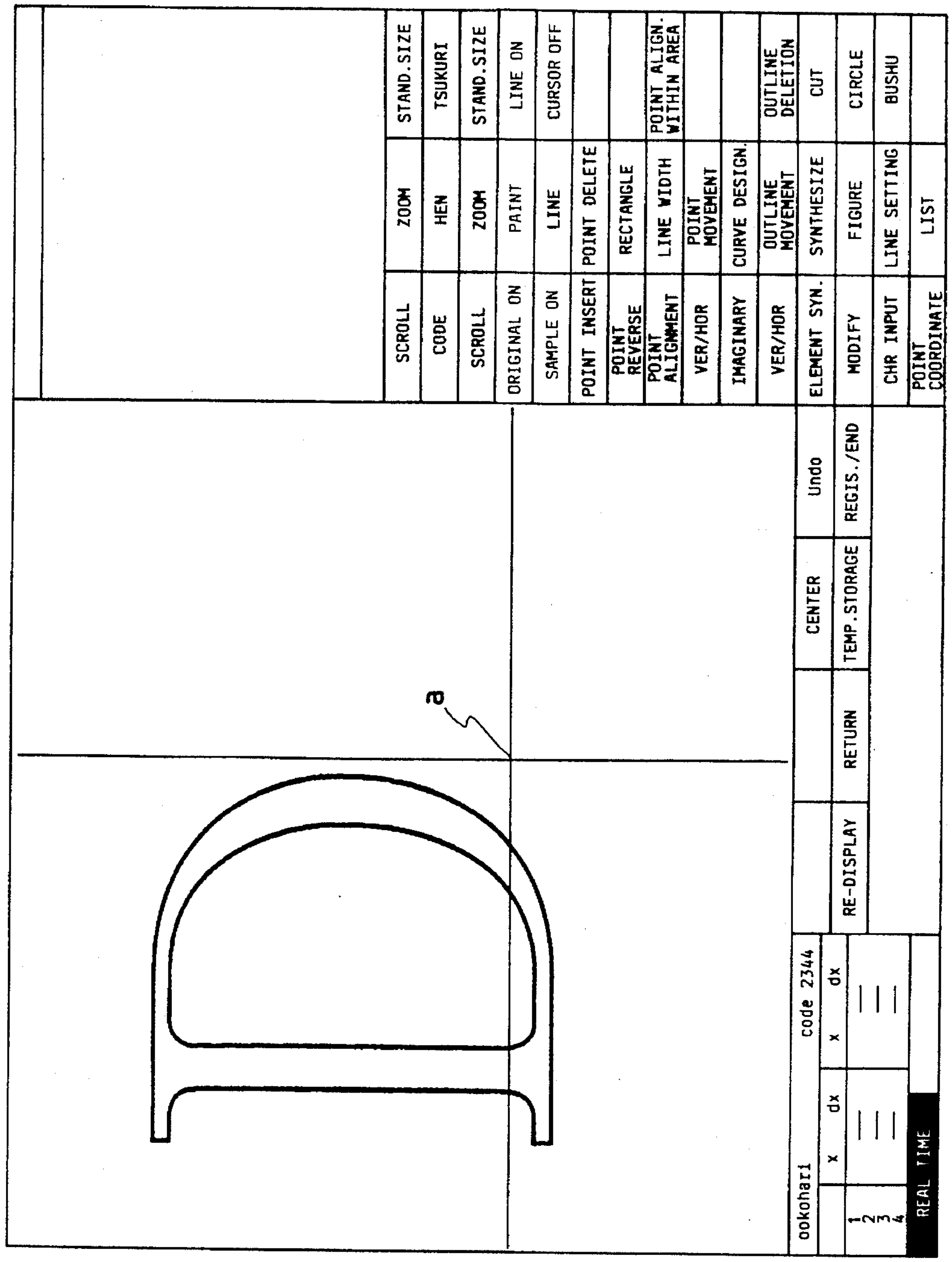
FIGS. 46A and 46B are views for explaining a cursor ON.OFF process of this embodiment;.
Figure 46B:
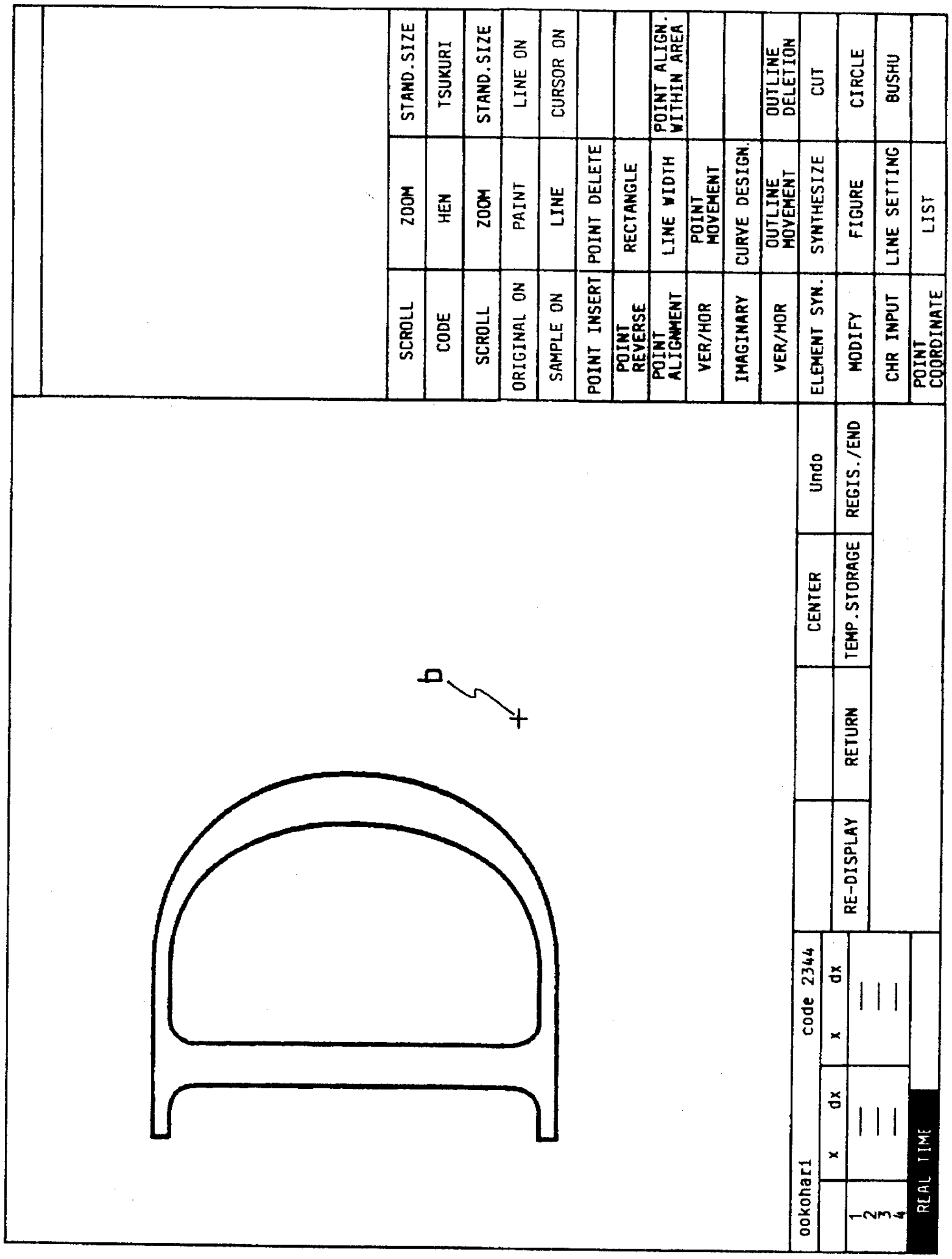

Cursors to be switched are a long cursor shown in FIG. 46A and a short cursor in FIG. 46B. In the cursor ON state, the long cursor is displayed. In the cursor OFF state, the short cursor is displayed. In this case, display control can be performed by a general method of changing the cursor and a processing method as in the display changing section having cursor data as display data in the same manner as the display changing section described above.

Re-display

Re-display S2-10 in FIG. 4 will be described below.

The re-display function is to refresh a display screen and re-displays a new screen when noise is mixed in the display screen or a line disappears due to an external influence.

Figure 47:
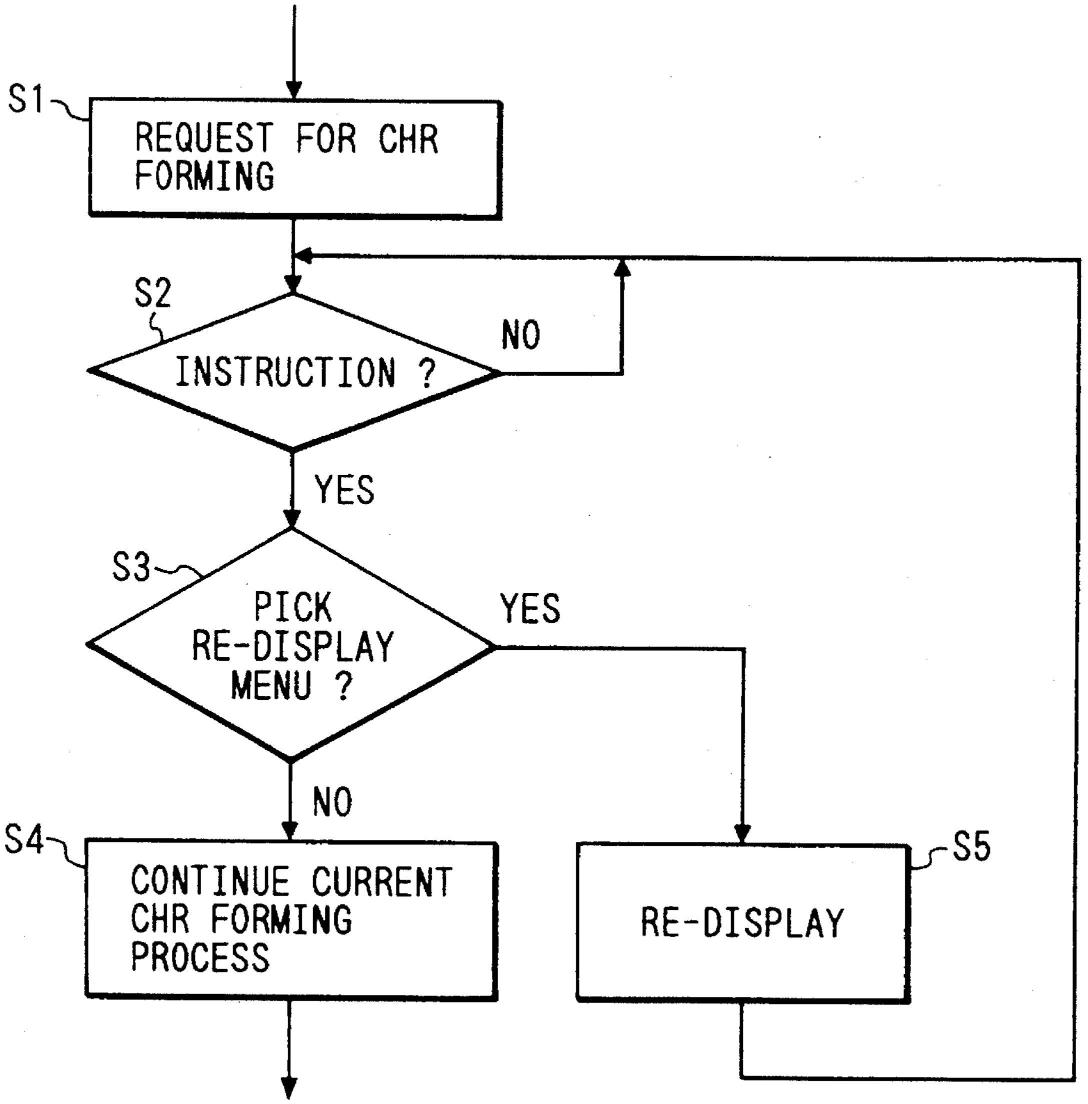
FIG. 47 is a view for explaining a re-display process of this embodiment.

FIG. 47 is a flow chart for explaining re-display operations. In a state (step 1) wherein a request for character forming is awaited, when instructions are input from the PD 12 and the KBD 11 (step 2), the inputs indicate a re-display menu pick (step 3), the re-display process is performed (step 5), and the flow returns to the original input wait state (step 2). If the inputs indicate a pick except for the re-display menu pick, the current character forming process is continued (step 4). This re-display menu is an interruption menu which does not interrupt the character forming operation.

In the re-display process in step S5, character data in the PMEM 6 is processed into display data on 10 the basis of the current display state with reference to font data, menu data, message data, and echo data. The display data is developed into the VRAM 14, and the developed data is displayed on the CRT 13.

A method of re-displaying font data can be realized such that all display data are simultaneously deleted in the display process of FIG. 34B and are displayed in the same display state.

Point Insertion

Figure 48:
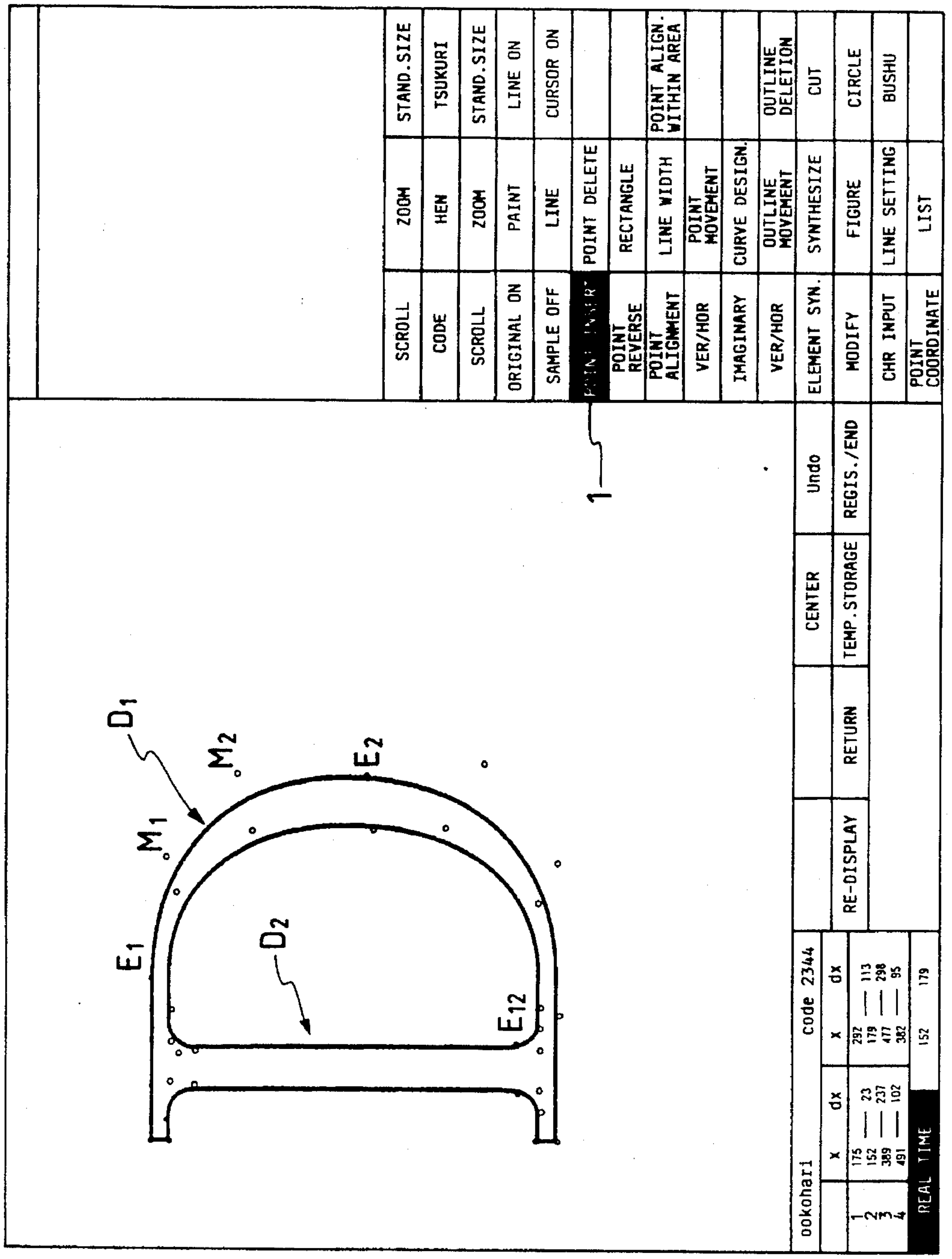
FIG. 48 is a view for explaining a point insertion process of this embodiment.
Figure 49:
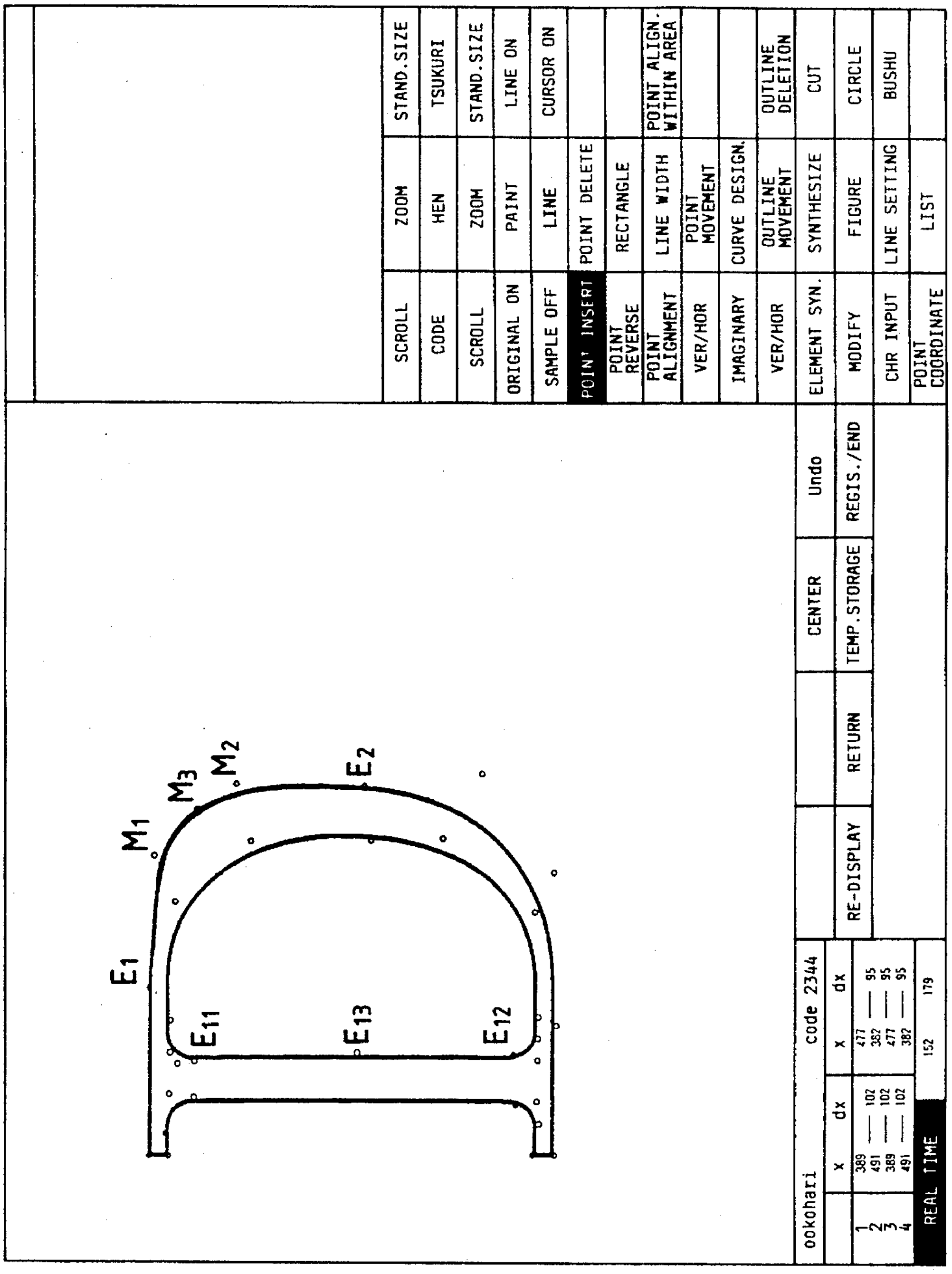
FIG. 49 is a view for explaining the point insertion process of this embodiment.

The point insertion S9-a in FIG. 4 will be described in detail with reference to FIGS. 48 and 49.

The point insertion function is called by picking a "POINT INSERTION" menu.

The point insertion function is a function of inserting one or two sample points between two adjacent points and moving the inserted sample points to change a line segment or curve. FIG. 48 shows a state before point insertion. When two adjacent points M1 and M2 are designated, a section E1M1M2E2 is changed into a section E1M1M3M2E2 in FIG. 49 as a result of sample point insertion.

In this embodiment, the position of an insertion point is given as a middle point between two adjacent points, and the point attribute of the sample point to be inserted is determined in accordance with the following rules. As indicated by a section D2 of FIG. 48, if the two adjacent points are end points, a designated section is a line segment, the point attribute of the insertion point is given as an end point. As indicated by a section D1 of FIG. 48, when one or both of the two adjacent points are intermediate points, a designated section is a curve. In this case, the point attribute of the insertion point is given as an intermediate point.

In addition, in order to change a line segment section into a curve section by a simple operation, there is provided a function of inserting two intermediate points between two adjacent end points. In this case, the positions of the insertion points are defined as equally divided points between the two adjacent end points.

Figure 50A:
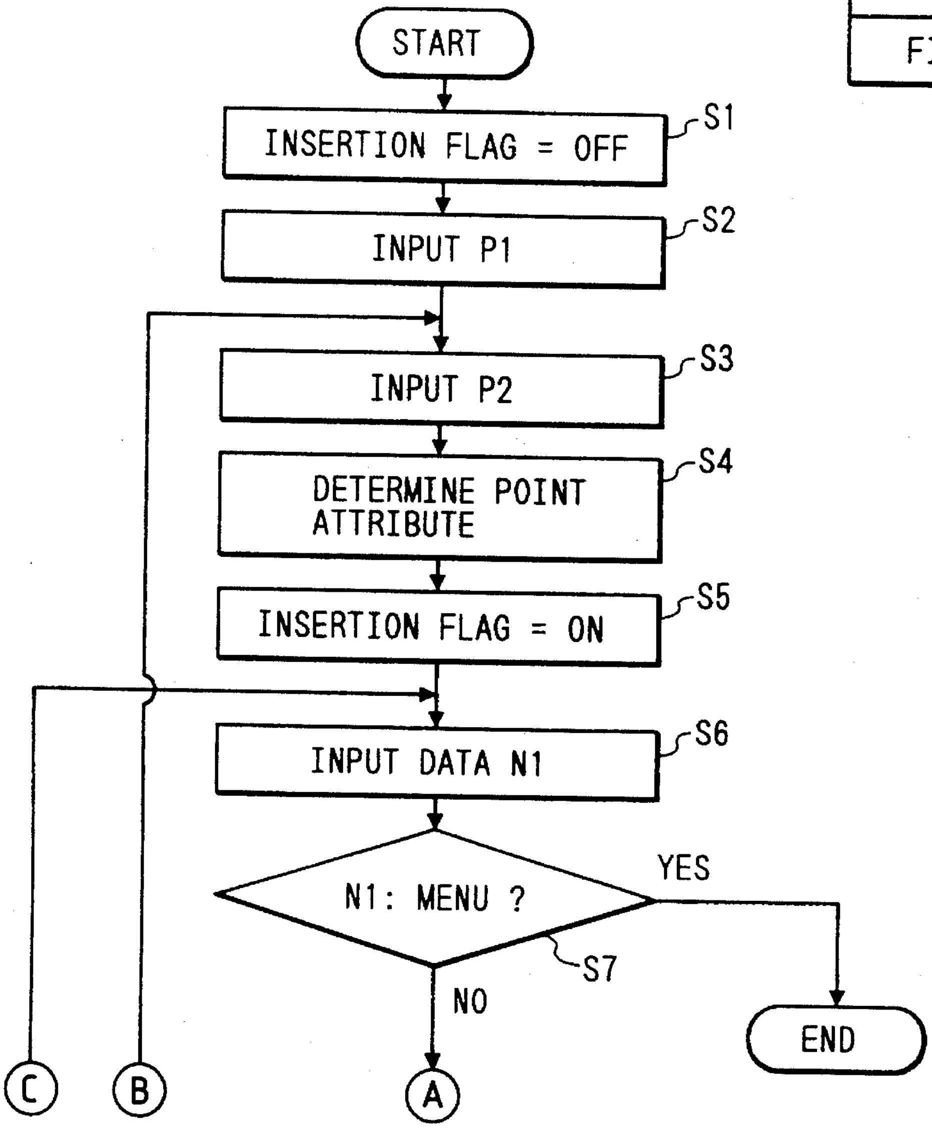
FIG. 50, consisting of FIGS. 50A and 50B, is a view for explaining the point insertion process of this embodiment.
Figure 50:
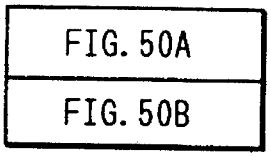
Figure 50B:
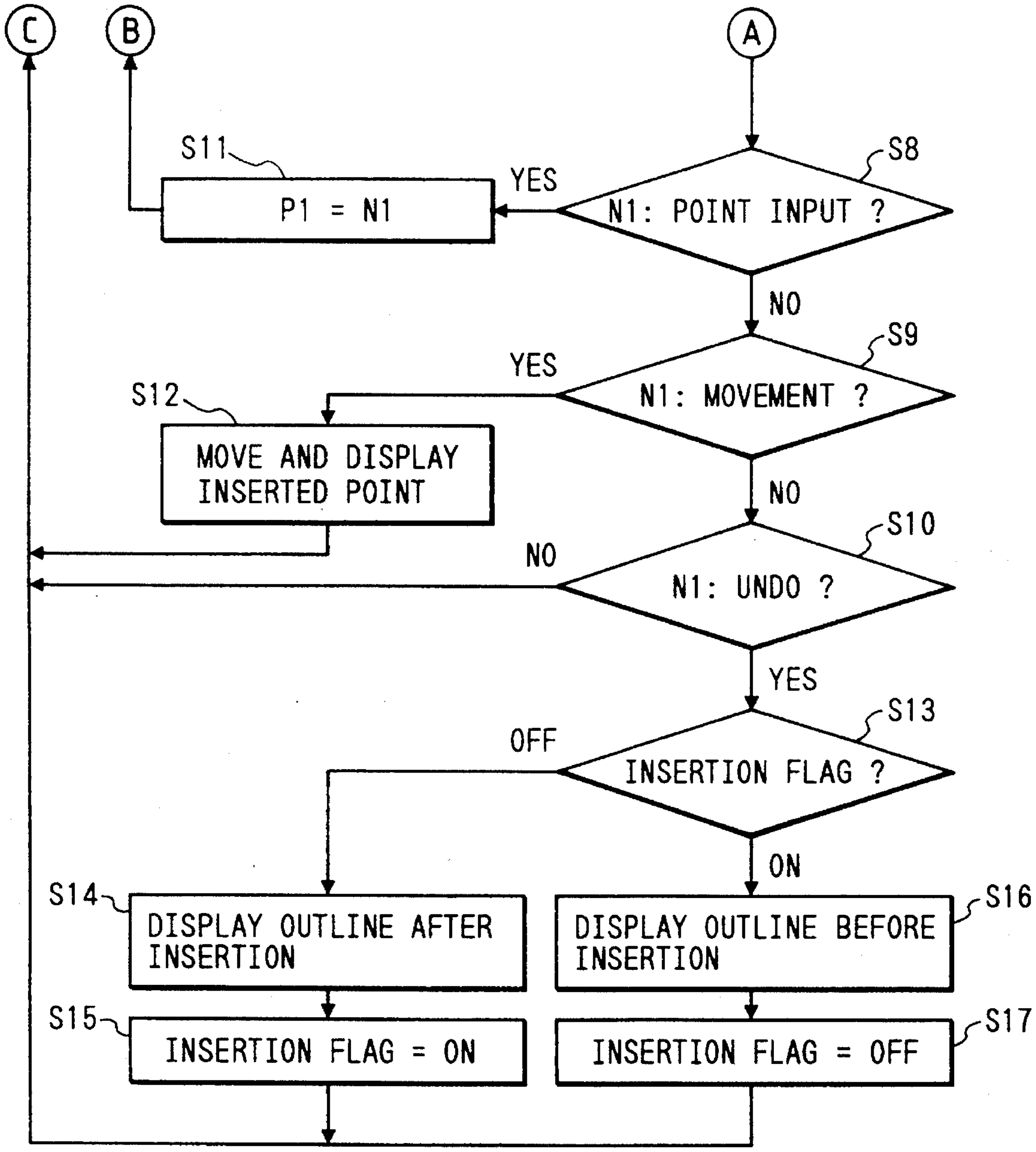

The point insertion procedures will be described with reference to a flow chart in FIG. 50.

In step 1, a flag "insertion FLAG" determining whether point insertion has been completed is initialized to be OFF. In step 2, one point in the CRT editing area is selected with the left button of the PD 12 and is defined as P1. In step 3, a point P2 adjacent to the point P1 is selected as in-step 2. The point attributes of the insertion points are determined in accordance with the point attribute determining rules using the point attributes of the points P1 and P2. Curve parameters of a section susceptible to an influence of point insertion are computed again and are displayed on the CRT 19 through the VRAM 14. In step 5, the insertion FLAG is set ON. In step 6, the next input is received to determine the content of the input in steps 7 to 10. As a result of this determination, if the input represents a menu pick, this function is completed. However, if the input represents a point input, the input is defined as an input of the first point in step 11, and operations from step 3 will be repeated. If the input designates movement (i.e., a . direction key on the KBD 11), the point inserted in step 11 is moved in step 12, and a changed outline of the inserted point is displayed on the CRT 13 through the VRAM 14. The flow then returns to step 6. If the input in step 6 represents an undo operation (the left button of the PD 12), the insertion FLAG is determined in step 13. If the insertion FLAG is set ON in step 13, the outline is returned to the one displayed before the sample point is inserted in step 4 (i.e., the inserted sample point is deleted, and the previous outline is re-displayed). In step 17, the insertion FLAG is set OFF. If OFF in step 13, the outline generated upon point insertion is displayed in step 14 (i.e., the point is inserted again, and the outline is re-displayed). In this case, the insertion FLAG is set ON in step 15. Deletion and re-insertion of the inserted point, and re-display of the outline can be performed with the right button of the PD 12.

In order to effect the function (insertion of two intermediate points) of changing the line segment section into the curve section, point input operations in steps 2 and 3 are performed using the central button of the PD 12. In step 4, after the two intermediate points are inserted, the outline (or section) is displayed on the CRT 13 through the VRAM 14.

Figure 112:
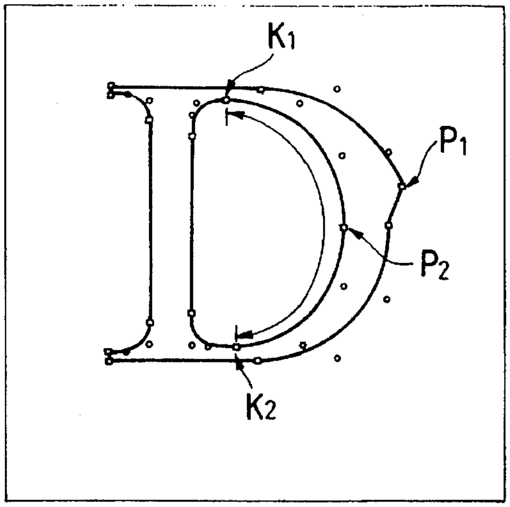
FIG. 112 is a view showing a display sate of sample points of this embodiment.

The point deletion S9-b will be described with reference to FIG. 112 below. The point deletion function is effected by picking the "point deletion" menu with the PD 12.

Figure 113:
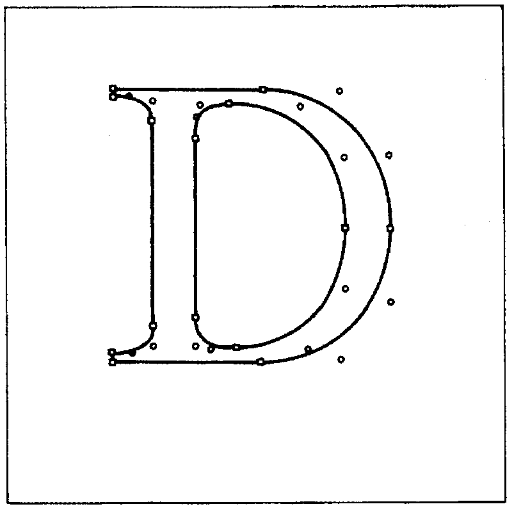
FIG. 113 is a view showing a deleted sample point P1 in this embodiment.
Figure 114:
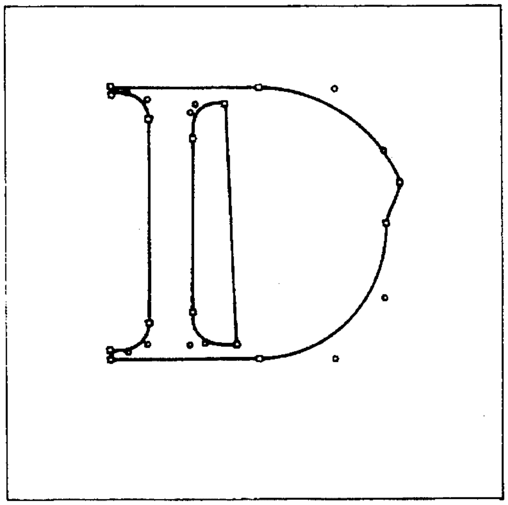
FIG. 114 is a view showing a state wherein a sample point included in a section K is deleted in this embodiment.
Figure 115A:
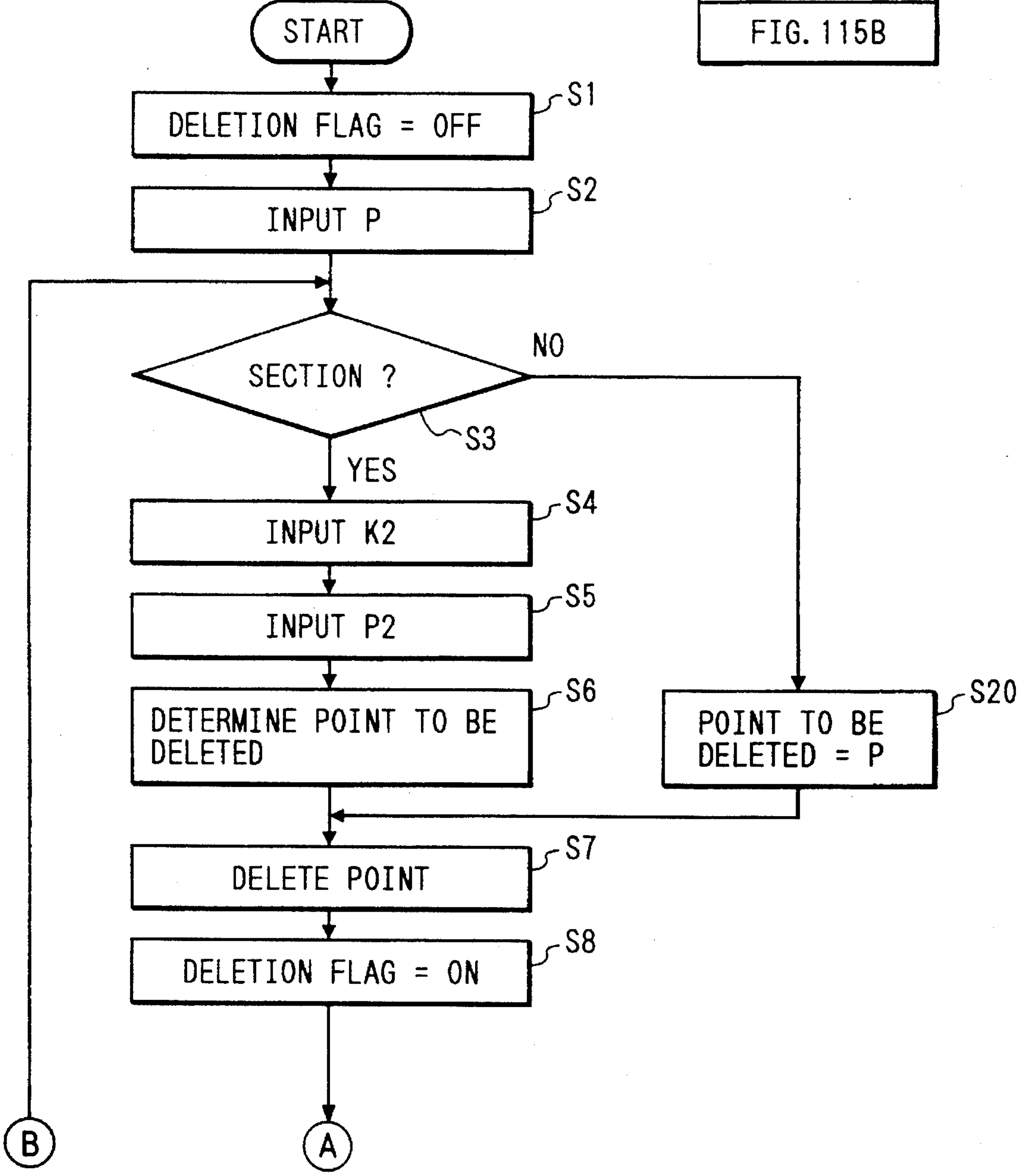
FIG. 115, consisting of FIGS. 115A and 115B, is a flow chart of a point deletion process of this embodiment.
Figure 115:
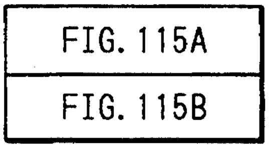
Figure 115B:
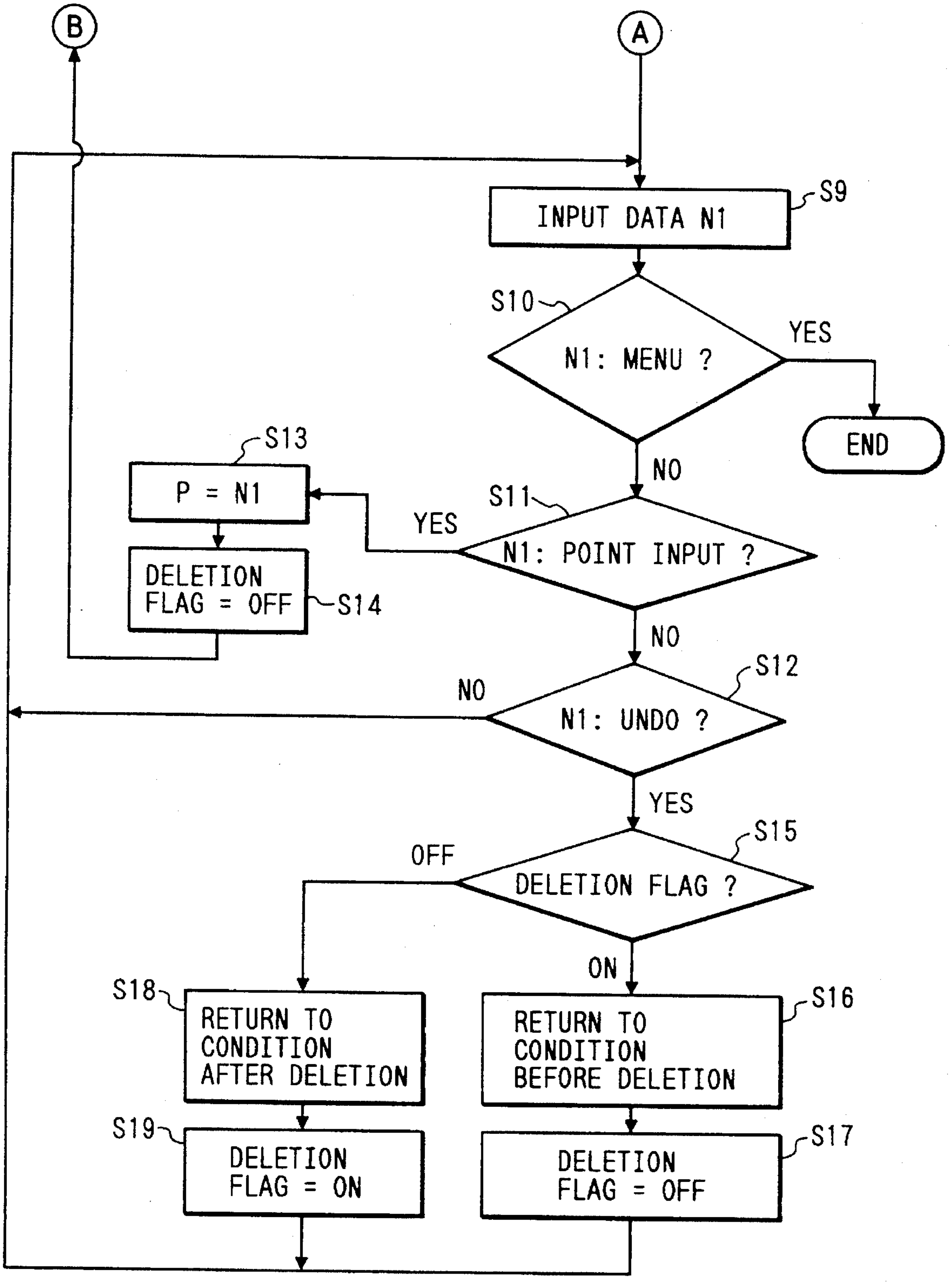

The point deletion function is to delete any arbitrary sample point on an outline or a plurality of sample points within any area, interpolate a curve, and display the interpolated curve. FIG. 113 shows a state wherein a sample point P1 in FIG. 112 is deleted, and FIG. 114 shows a state wherein sample points included in a section K in FIG. 112 are deleted.

The point deletion procedures will be described with reference to a flow chart of FIG. 115 and FIGS. 112, 113, and 114.

In step 1, a flag "deletion FLAG" for determining whether a sample point has been deleted is initialized to OFF. In step 2, the first point is input from the PD 12. It is determined in step 3 whether the input from the PD 12 designates a section (i.e., depression of the central button). If YES in step 3, a point P is determined as a section end point K1. A section end point K2 and a point P2 within the section are input from the PD 12 in steps 4 and 5. A sample point to be deleted is determined from the points K1, K2, and P2 in step 6. When the input from the PD 12 in step 2 does not designate a section, the input is determined as designation of one-point deletion. The point P input in step 2 is determined to be a sample point. In step 7, the sample point determined in step 6 or 20 is deleted from FIG. 10D, and a curve parameter table in FIG. 10E is re-formed, and display data is formed. The formed display data is displayed on the CRT 13 through the VRAM 14.

In step 9, the next input is received, and the content of the input is determined in steps 10 to 12. As a result of determination, when the input represents a menu pick, this function is completed. However, when the input represents a point input, the input is defined as an input of the first point in step 13. The deletion FLAG is set OFF in step 14, and the operations from steep 3 are repeated. If the input in step 9 represents an undo operation (the right button of the PD 12) (determination in step 12), the deletion FLAG is determined in step 15. If the deletion FLAG is set ON in step 15, the condition before sample point deletion is displayed on the CRT 13 through the VRAM 14 in step 16. In step 17, the deletion FLAG is set OFF- If OFF 10 in step 15, the condition after sample point deletion is displayed on the CRT 13 through the VRAM 14 in step 18. In step 19, the deletion FLAG is set ON. The return of the deleted sample point and re-deletion can be performed by using only the right button of the PD 12 (e.g., the display state in FIG. 112 is changed to that in FIG. 113 by only the operation of the right button).

Point Deletion

The point deletion S9-b will be described in detail with reference to FIGS. 51A to 51G and 51A' to 51G'. This function can be called by picking the "POINT DELETION" menu with the PD 12. At this time, when all sample points are not displayed on the CRT 13, all the sample points on the character outlines can be displayed by this menu pick.

Figure 51A:
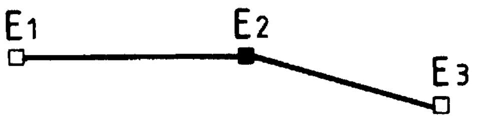
FIGS. 51A to 51G and 51A' to 51G' are views for explaining a point deletion process of this embodiment.
Figure 51A:
Figure 51B:
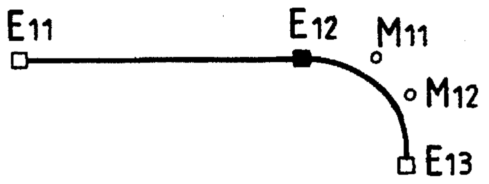
Figure 51B:
Figure 51C:
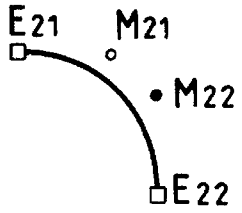
Figure 51C:
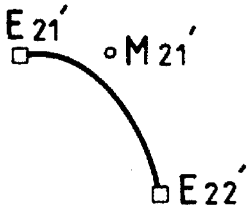
Figure 51D:
Figure 51D:
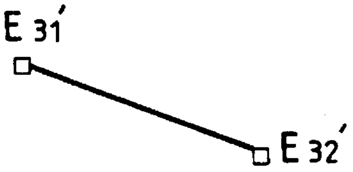
Figure 51E:
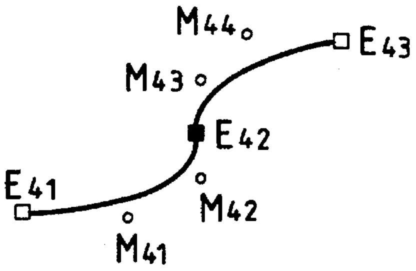
Figure 51E:
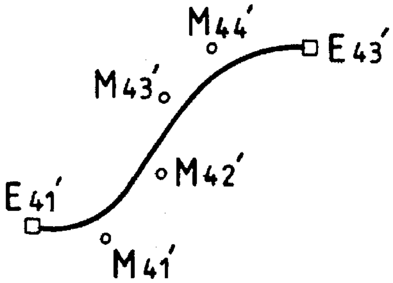

The point deletion function is a function of deleting a designated point or a plurality of points within a designated section, and modifying line segments. When one point is to be deleted, a target point is picked with the left button of the PD 12. When a plurality of points within the designated section are to be deleted, three points, i.e., two points just outside both ends of the deletion section and an arbitrary point within the designated section, are picked with the central button of the PD 12. FIGS. 51A to 51G and 51A' to 51G' show actual point deletion. FIGS. 51A to 51G show states or conditions before point deletion and FIGS. 51A' to 51G' show states after point deletion. More specifically, FIG. 51A shows a state wherein both sides of a point to be deleted are constituted by straight lines. This polygonal line in FIG. 51A is interpolated into a single straight line in FIG. 51A'. FIGS. 51B and 51E show states wherein both sides of points to be deleted are constituted by a straight line and a curve and by curves, respectively. When the points are deleted in the states of FIGS. 51B and 51E, new curves are obtained as shown in FIGS. 51B' and 51E', respectively. When a point to be deleted is an intermediate point, as shown in FIG. 51C, point deletion can produce a new curve interpolated by the remaining intermediate point, as shown in FIG. 51C'. When only one intermediate point of a curve (FIG. 51D) is deleted, the curve is interpolated as a straight line, as shown in FIG. 51D'.

Figure 51F:
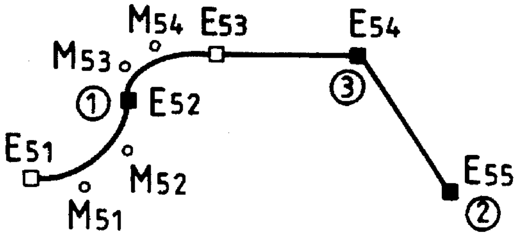
Figure 51F:
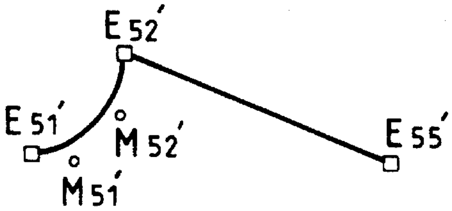
Figure 51G:
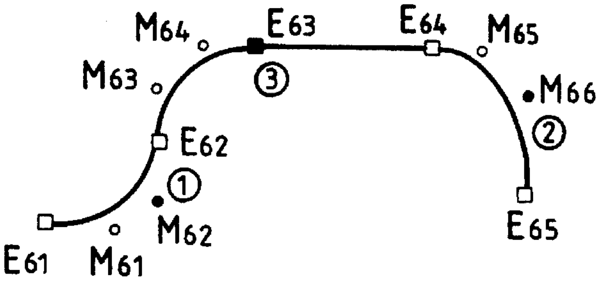
Figure 51G:
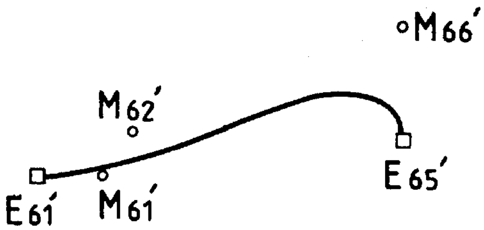

In point deletion within the designated section, when two first picked points E51 and E55 are end points (FIG. 51F), after the third point E54 is picked, a straight line can be obtained by interpolation (FIG. 51F'). If one or both of two first picked points M62 and M66 are intermediate points, a curve is obtained by interpolation (FIG. 51G') after the third point E63 is picked.

Point Attribute Reversal

Figure 52:
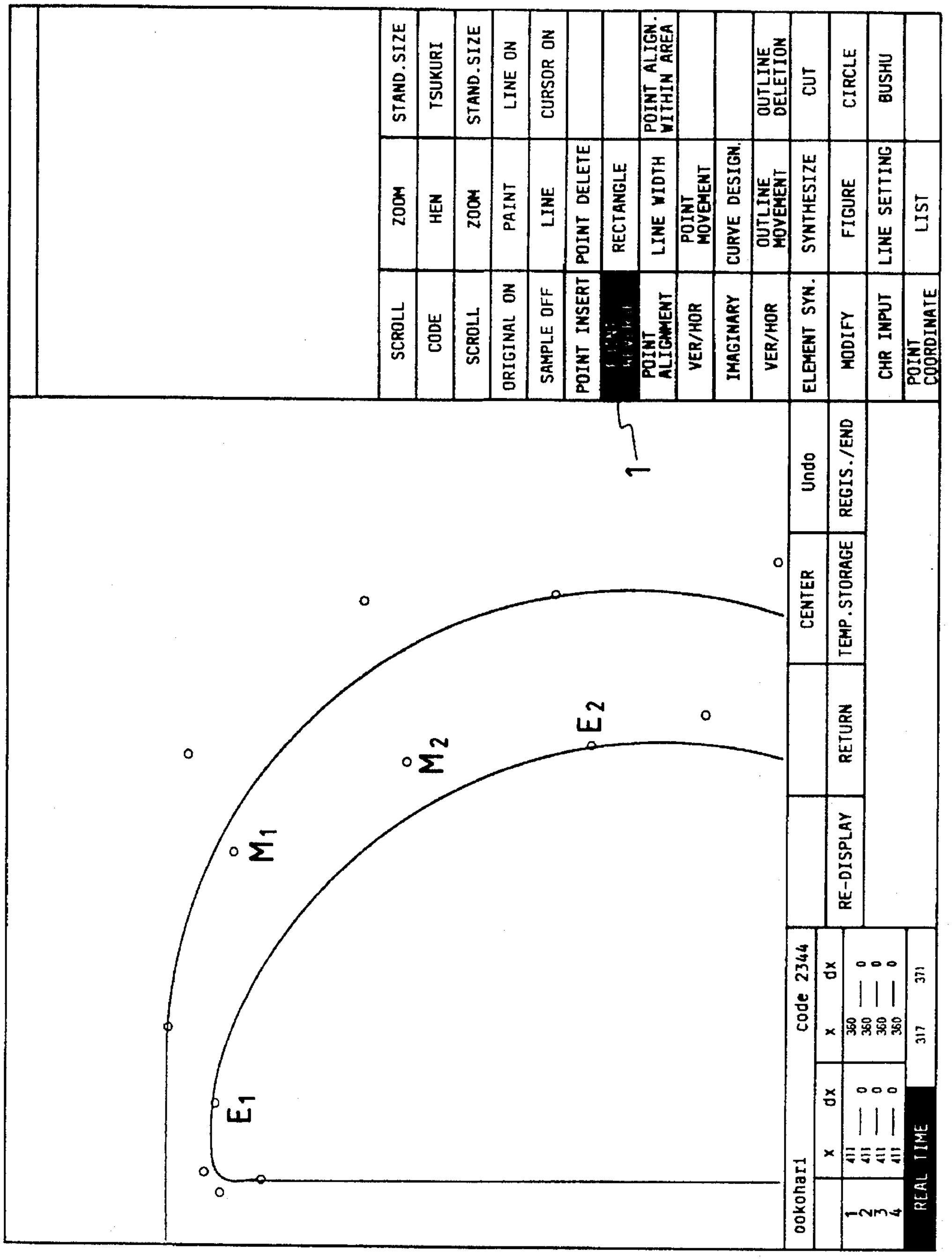
FIG. 52 is a view for explaining point attribute reversal process of this embodiment.
Figure 53:
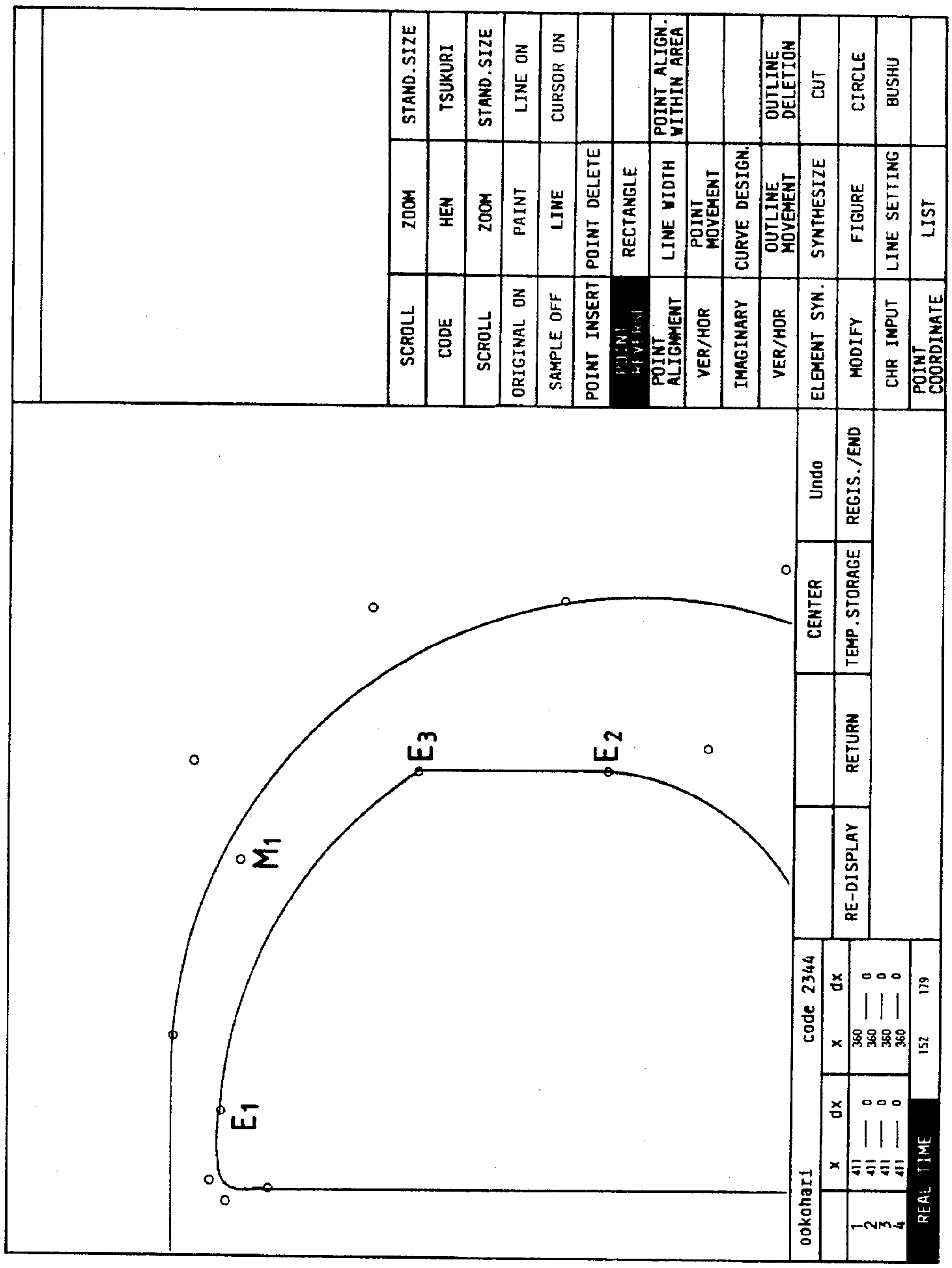
FIG. 53 is a view for explaining the point attribute reversal process of this embodiment.

The point attribute reversal S9-c in FIG. 4 will be described with reference to FIGS. 52 and 53. This function can be called by picking the "POINT REVERSE" menu.

The point attribute reversal function is to reverse an attribute of a selected sample point, i.e., to change the sample point to an intermediate point if the sample point is an end point and to change the sample point to an end point if the sample point is an intermediate point, thereby modifying an outline.

Figure 54:
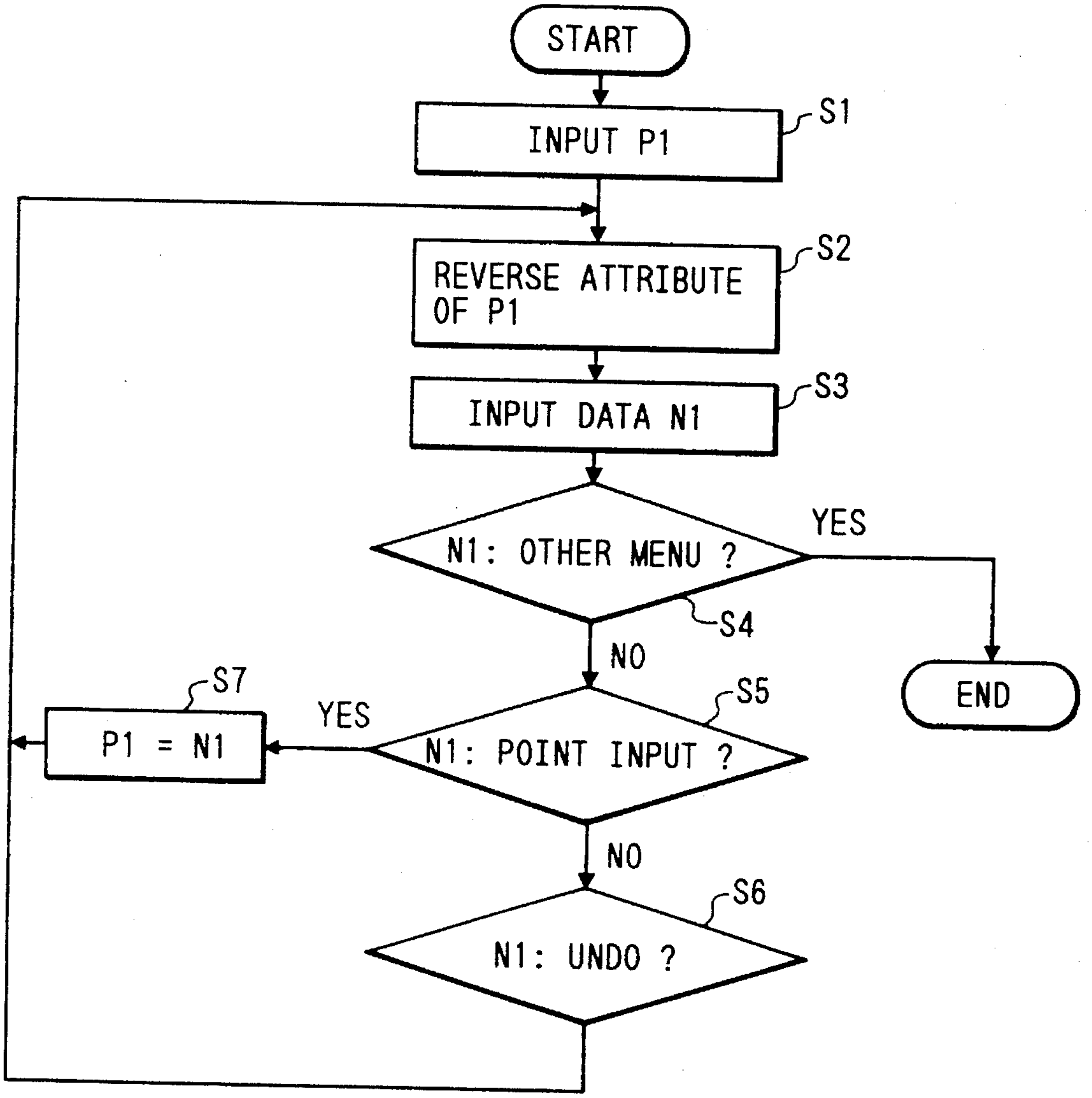
FIG. 54 is a flow chart for explaining the point attribute reversal process of this embodiment.

The point attribute reversal procedures will be described with reference to a flow chart in FIG. 54 and editing screens shown in FIGS. 52 and 53.

One point, e.g., a point P1 (M2) within the CRT editing area is picked in step 1. In step 2, with reference to the point attributes (FIG. 10B) stored in the PMEM 6, end and intermediate points are reversed. The curve parameter table in FIG. 10D is changed. Data in FIGS. 10A, 10B, and 10D are processed into display data, and the changed outline is displayed on the CRT 13 through the VRAM 14. In the case of FIG. 52, the point M2 is changed to an end point, and points E1, M1, M2, and E2 are changed to points E1, M1, E3, and E2 shown in FIG. 53.

In step 3, the next input is received. The content of the input is determined in steps 4 to 6. As a result of determination, if the input represents a menu pick, this function is completed. However, if the input represents a normal point input, the input is defined as P1 in step 7. Operations from step 2 will be repeated. If the input in step 3 represents an undo operation (the right button of the PD 1), the point attribute of the point P1 is reversed again in step 1, so that the condition before the current condition can be returned. In this case, the state returns from the state of FIG. 53 to that of FIG. 51.

Point Movement

The point movement S9-d will be described with reference to FIGS. 55A to 55C, 56, and 57. This function can be called by picking the "POINT MOVEMENT" or "VERT/HOR" menu with the PD 12.

The point movement function is to basically one selected point to an-arbitrary position or in the X- or Y-axis direction and at the same time to modify and display a line segment. In order to move the selected point, the following three methods are available. That is, (1) in picking the PD 12, the picked button is not released and the PD 12 is dragged and is released at an arbitrary position. In this case, states of changes in line segments upon point movement are displayed by broken lines in real time. (2) A point is selectively moved in the four directions in units of dots by using direction keys on the KBD 11. (3) An arbitrary numeric value representing the number of dots for movement is input on the KBD 11, and the point is selectively moved in the four directions in units of dots by using direction keys Of the KBD 11. When movement using direction keys is continuously performed, a movement amount from the second time returns to the initial value of one dot.

A point subjected to movement is normally one picked point. However, assume that a picked point has an attribute as an end point, that the attribute of a point adjacent to the selected point is an intermediate point, and that the X- or Y-coordinate is the same as that of the selected point. One or two adjacent points are displayed in black as in the selected point and are moved together with movement of the selected point.

Figure 55A:
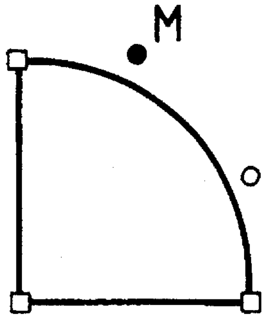
FIGS. 55A to 55C are views for explaining a point movement process of this embodiment.
Figure 55B:
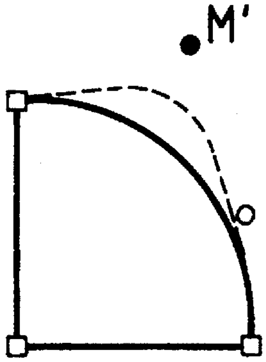
Figure 55C:
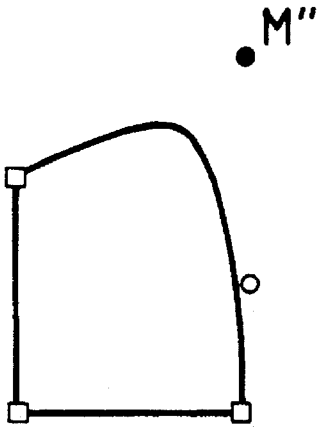

FIG. 55A shows a state wherein a point M to be moved is picked. FIG. 55B shows a state wherein a picked point M' is being dragged with the PD 12, and a new line segment is displayed in a dotted line in real time upon movement of the point M'. FIG. 55C shows a state wherein a moved point M" is fixed at the movement destination, and at the same time the modified line segment is newly displayed.

Figure 56:
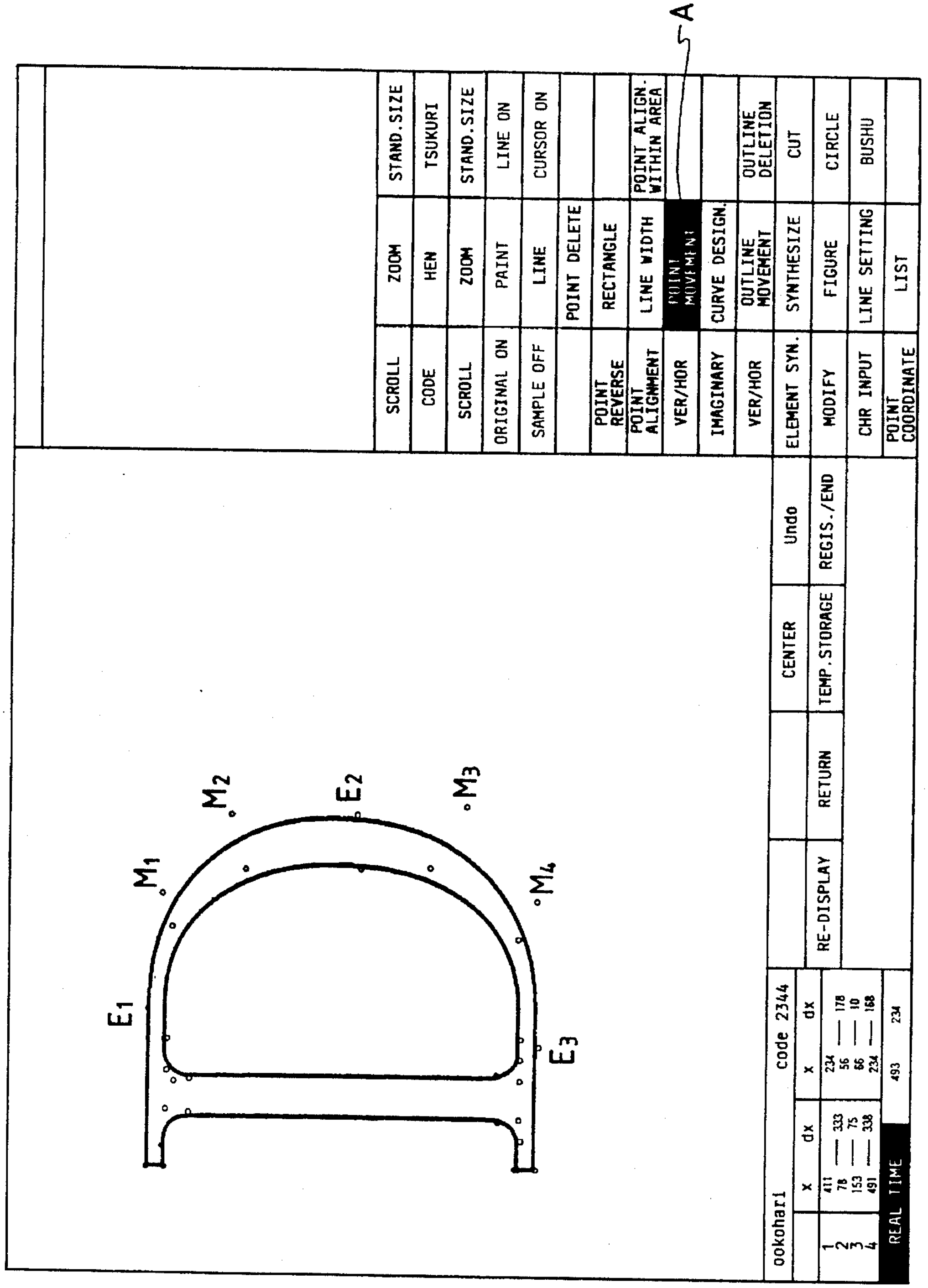
FIG. 56 is a view for explaining the point movement process of this embodiment.

FIG. 56 shows a state wherein a point E2 to be moved is picked. At this time, the point E2 is an end point of a curve E1E2 and a curve E2E3. Since intermediate points M2 and M3 have the same X-coordinate as that of the end point E2. Therefore, the points M2 and M3 are reversed in black as in the point E2.

Figure 57:
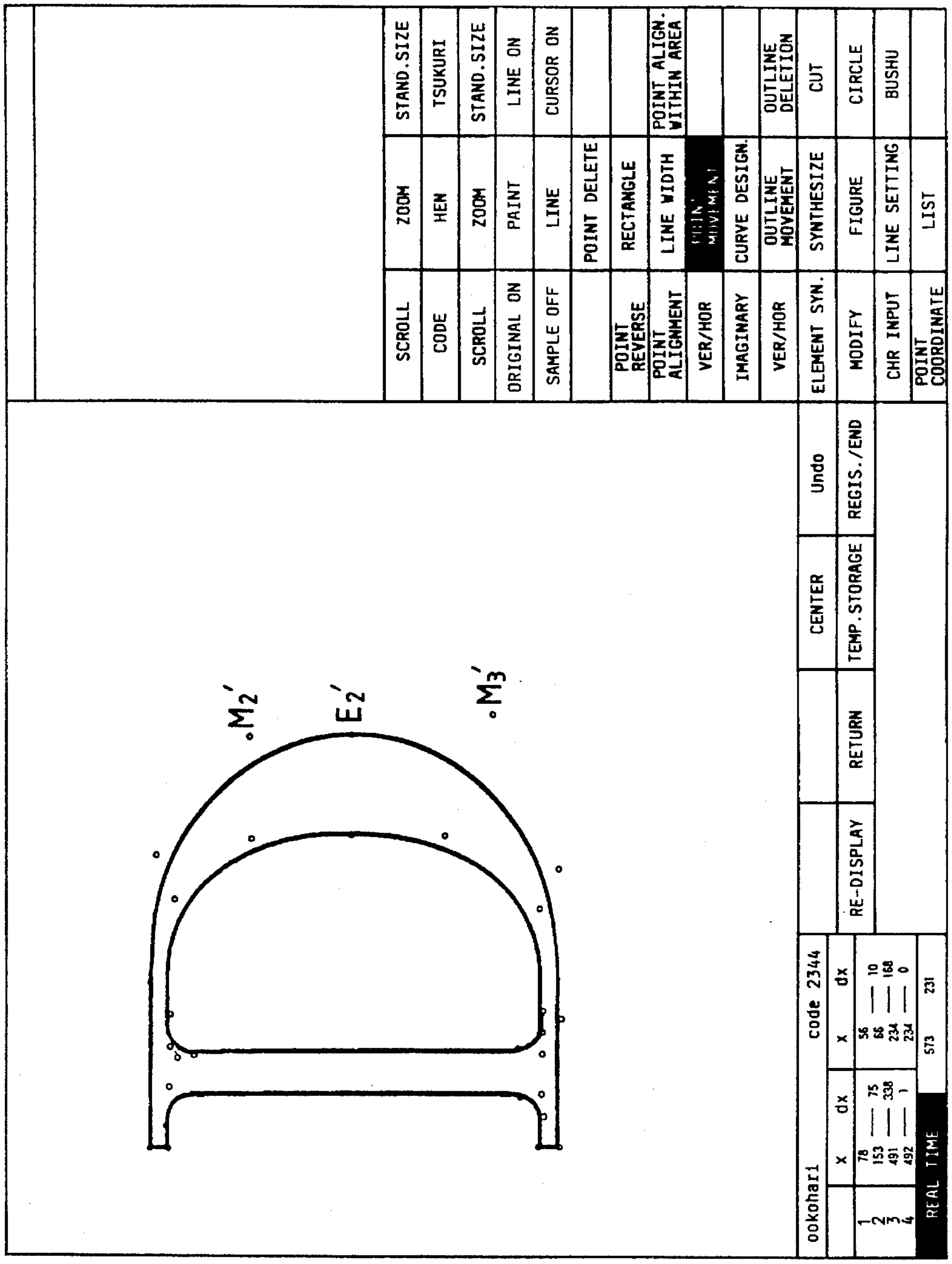
FIG. 57 is a view for explaining the point movement process of this embodiment.

FIG. 57 shows a state wherein a picked point E2' is moved to the right. At the same time, points M2' and M3' are also moved while a positional relationship with the point E2' is kept maintained. A newly modified line segment is displayed.

Figure 58:
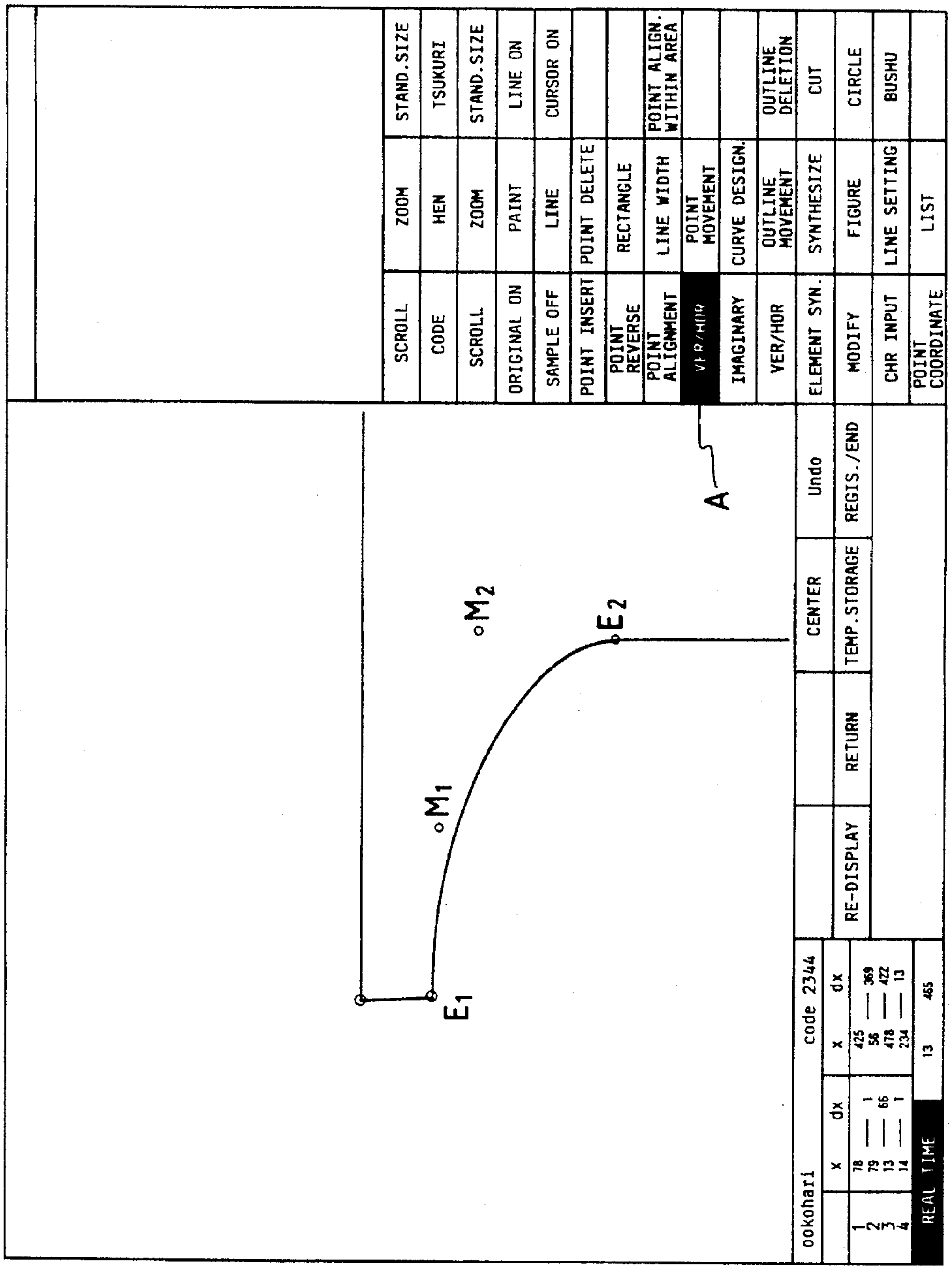
FIG. 58 is a view for explaining the point movement process of this embodiment.
Figure 59:
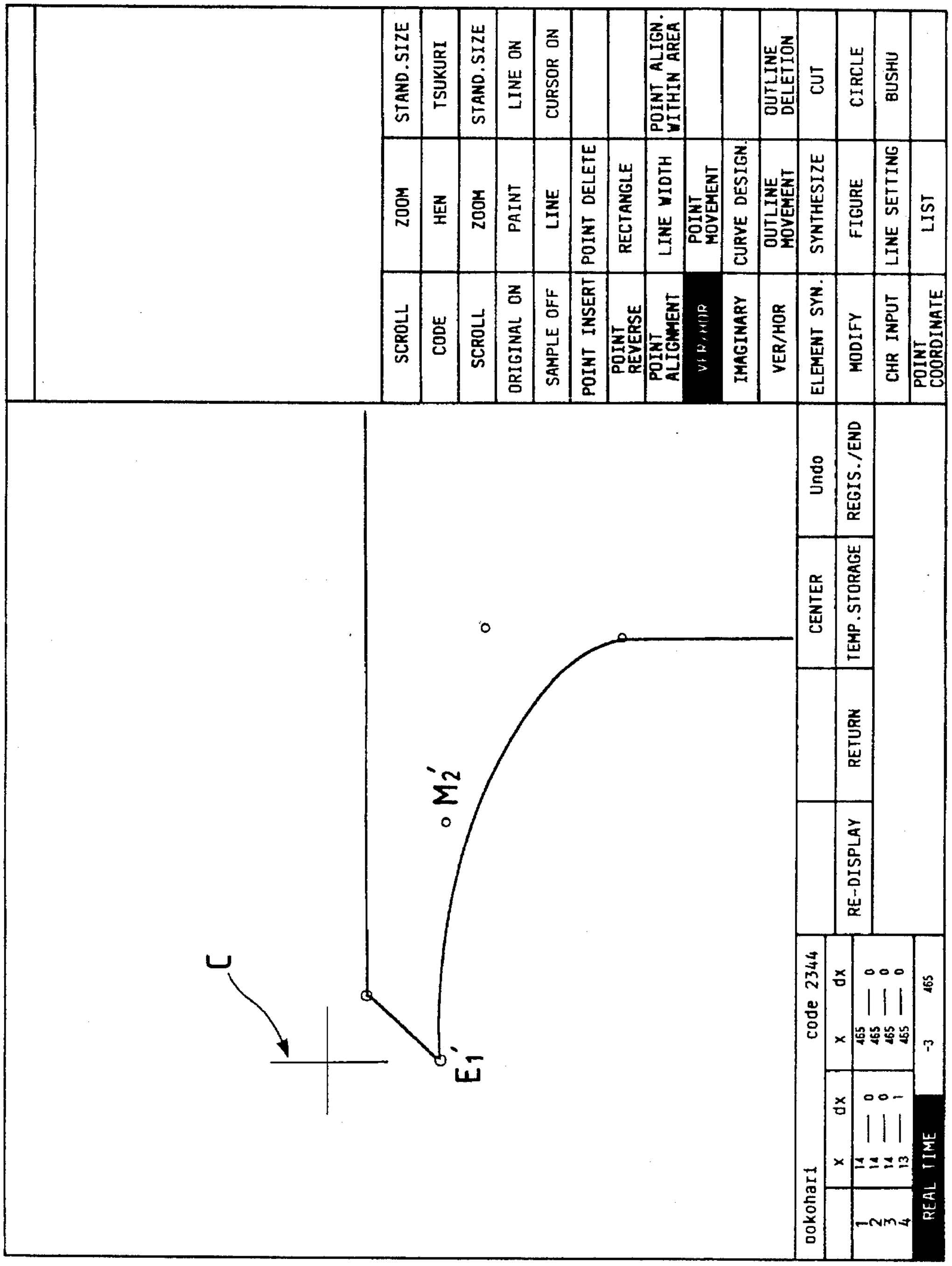
FIG. 59 is a view for explaining the point movement process of this embodiment.

FIGS. 58 and 59 show states wherein the movement directions are restricted to the X- and Y-axis directions, respectively.

Figure 60:
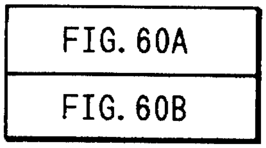
FIG. 60, consisting of FIGS. 60A and 60B, is a view for explaining the point movement process of this embodiment.
Figure 60A:
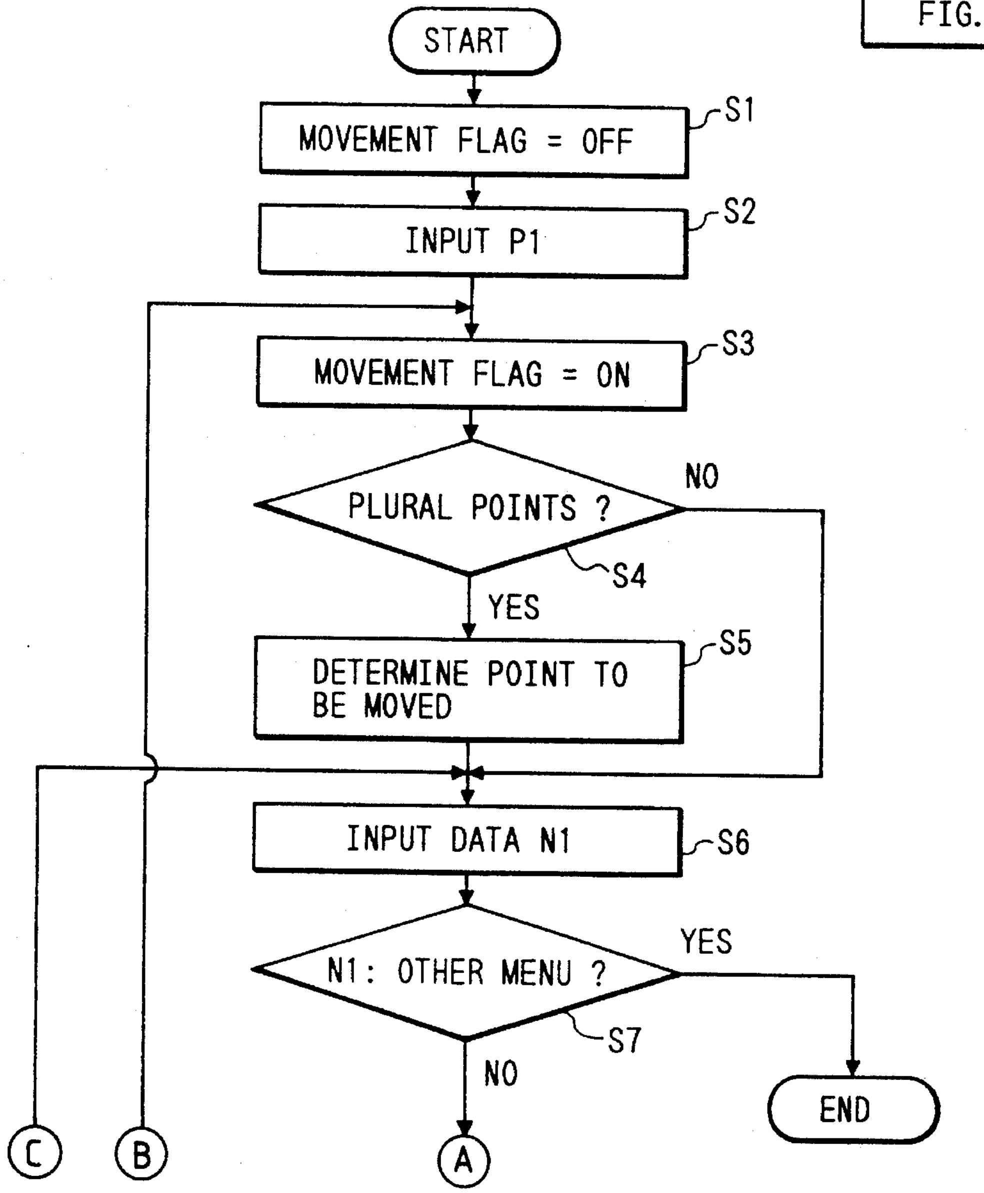
Figure 60B:
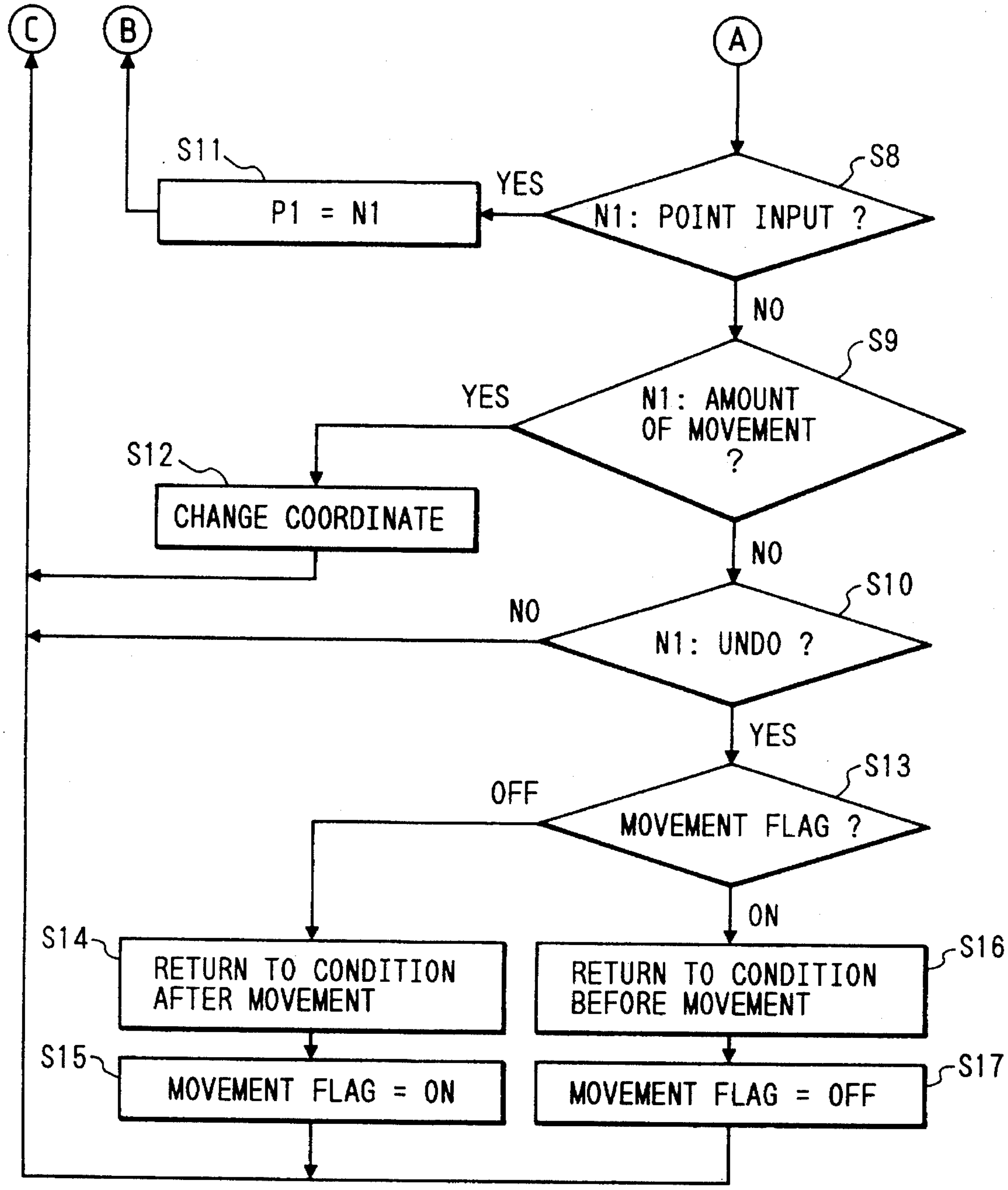

The point movement procedures will be set using a flow chart of FIG. 60 and the editing screens of FIGS. 56 and 57.

A movement FLAG representing whether a sample point has been moved is initialized to OFF in step 1. In step 2, one point P1 in the CRT editing area is picked in step 2. The movement FLAG is set ON in step 3. It is determined in step 4 whether the picked point is moved together with the adjacent points. In step 5, the data table (FIGS. 10A, 10B, 10D, 10E, and 10F) stored in the PMEM is referred to, and a point to be moved is determined. This determination is performed with reference to the determination reference described above.

A point subjected to movement is normally one picked point. However, assume that a picked point has an attribute as an end point, that the attribute of a point adjacent to the selected point is an intermediate point, and that the X- or Y-coordinate is the same as that of the selected point. One or two adjacent points are displayed in black as in the selected point and are moved together with movement of the selected point.

In step 6, the next input is received. The content of the input is determined in steps 7 to 10. As a result of determination, if the input represents a menu pick, this function is completed. If the input represents a normal point input, the input is defined as an input of a point P1 in step 11, and operations from step 3 will be repeated. If the input corresponds to one of the cases (1) to (3), the coordinates P1(x) and P1(y) in FIG. 10B are changed, display data is reformed, and the formed display data is displayed on the CRT 13 through the VRAM 14. If the input represents an undo operation (the right button of the PD 12), the state of the movement FLAG is determined in step 13. If the movement FLAG is ON, the outline shape currently displayed is returned to the state before sample point movement. In step 17, the movement FLAG is set OFF. If OFF in step 13, after the outline shape currently displayed is returned to the state after sample point movement, the movement FLAG is set ON in step 15. When the movement FLAG is set ON/OFF and the outline data before movement and the outline data during movement are stored in .the PMEM. The return/removement of the moved point can be performed with only an operation of the right button of the PD 12 in steps 14 and 15 and steps 16 and 17.

Point Alignment

The point alignment S9-e will be described with reference to FIGS. 61A to 61E. This function can be called by picking the "POINT ALIGNMENT" or "POINT ALIGN. WITHIN AREA" menu with the PD 12. When this function is called, a line cursor in the Y direction is displayed on the screen.

The point alignment function is to move the X- or Y-coordinate of any sample point to the X- or Y-coordinate of a reference point, and at the same time to modify and display a line segment. In order to perform point alignment, an alignment direction, i.e., X- or Y-axis direction is selected. This selection can be performed by displaying the line cursor on the screen and depressing the central button of the PD 12. When the "point alignment" menu is picked, the Y-coordinate, i.e., horizontal line cursor is displayed. In this state, the flow can advance to the next step in point alignment in the Y-coordinate, i.e., the horizontal direction. In order to perform alignment in the X-coordinate, i.e., vertical direction, the line cursor is changed to the one in the X-coordinate, i.e., vertical direction by depressing the central button of the PD 12. In this case, the X- and Y-coordinates of the line cursor can be changed by using the central button of the PD 12. While the line cursor is kept displayed on the screen, an arbitrary sample point is picked with the left button of the PD 12 to select a reference point. The selected reference point is reversed and displayed in black. The line cursor, i.e., the reference line is displayed at the X- or Y-coordinate which is the same as that of the reference point. At this time, a cross hair cursor different from the reference line is displayed. Positional correction of the reference point (reference line) can be performed using direction keys on the KBD 11 in units of dots. Sample points to be aligned except for the reference point are selected according to one of the following two methods. One method is that each point is picked one at a time, and the other method is to select points within a designated rectangle. Sample point selection is executed by depressing the central button of the PD 12. At this time, a line segment is modified and displayed in real time. Point alignment can be continuously performed while a cross hair cursor is displayed.

Figure 61A:
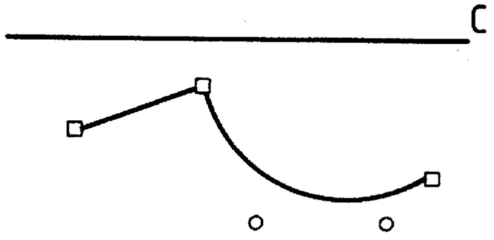
FIGS. 61A to 61F are views for explaining a point alignment process of this embodiment.
Figure 61B:
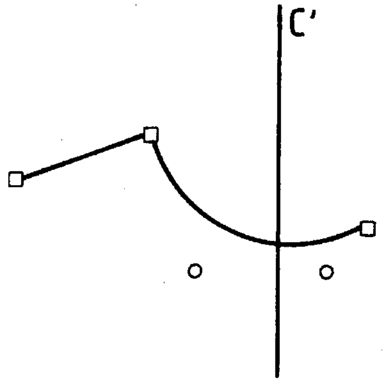
Figure 61C:
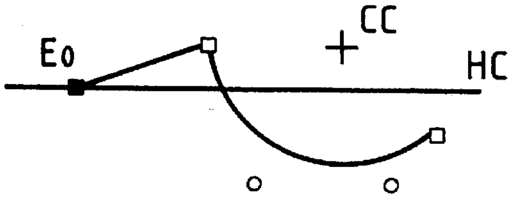
Figure 61D:
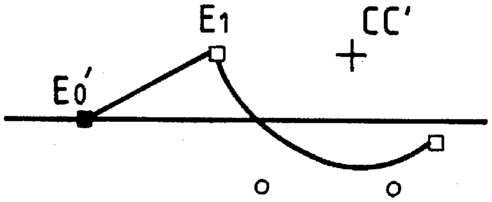
Figure 61E:
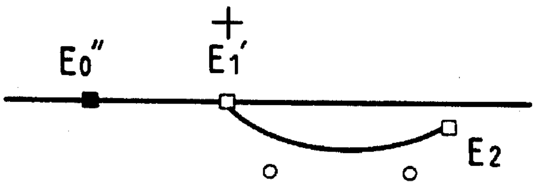
Figure 61F:
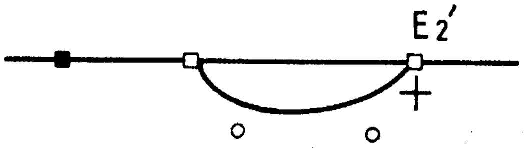

FIGS. 61A to 61F are views showing point alignment steps in a sequential order. FIG. 61A shows an initial screen in which the "point alignment" menu is picked. The line cursor in the Y-coordinate direction is displayed on the screen. FIG. 61B shows a screen in which the cursor is changed into the line cursor in the X-coordinate direction with the central button of the PD 12. Note that re-depression of the central button of the PD 12 causes return to the screen in FIG. 61A. FIG. 61C shows a state wherein a reference point E0 is picked with the left button of the PD 12 while the line cursor in the Y-coordinate direction is kept displayed. At this time, the line cursor is fixed as a reference line as the Y-coordinate of the reference point reversed and displayed in black, and the cross hair cursor CC is displayed on the screen. FIG. 61D shows a state wherein position correction of the reference point is performed downward by several dots. FIG. 61E shows a state wherein point alignment is performed for a point E1 in FIG. 61D. The cross hair cursor CC' is aligned with the point E1, and the point E1 is moved to a Y-coordinate point E1' having the same Y-coordinate as that of the reference point with the central button of the PD 12, thereby modifying and displaying the line segment. FIG. 61F shows a state wherein point alignment is continuously performed for the point E2 in FIG. 61E.

Figure 62:
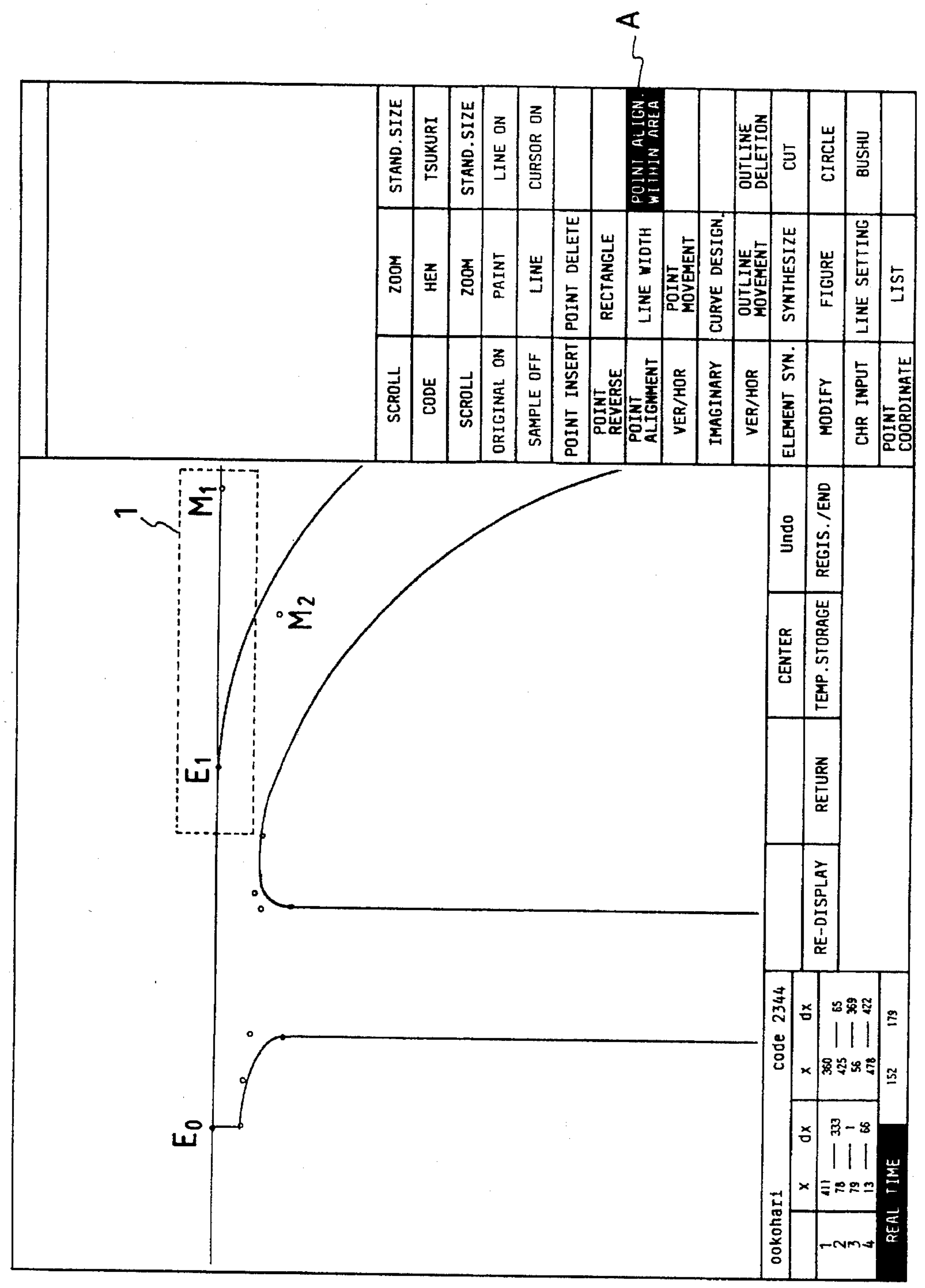
FIG. 62 is a view for explaining the point alignment process of this embodiment.
Figure 63:
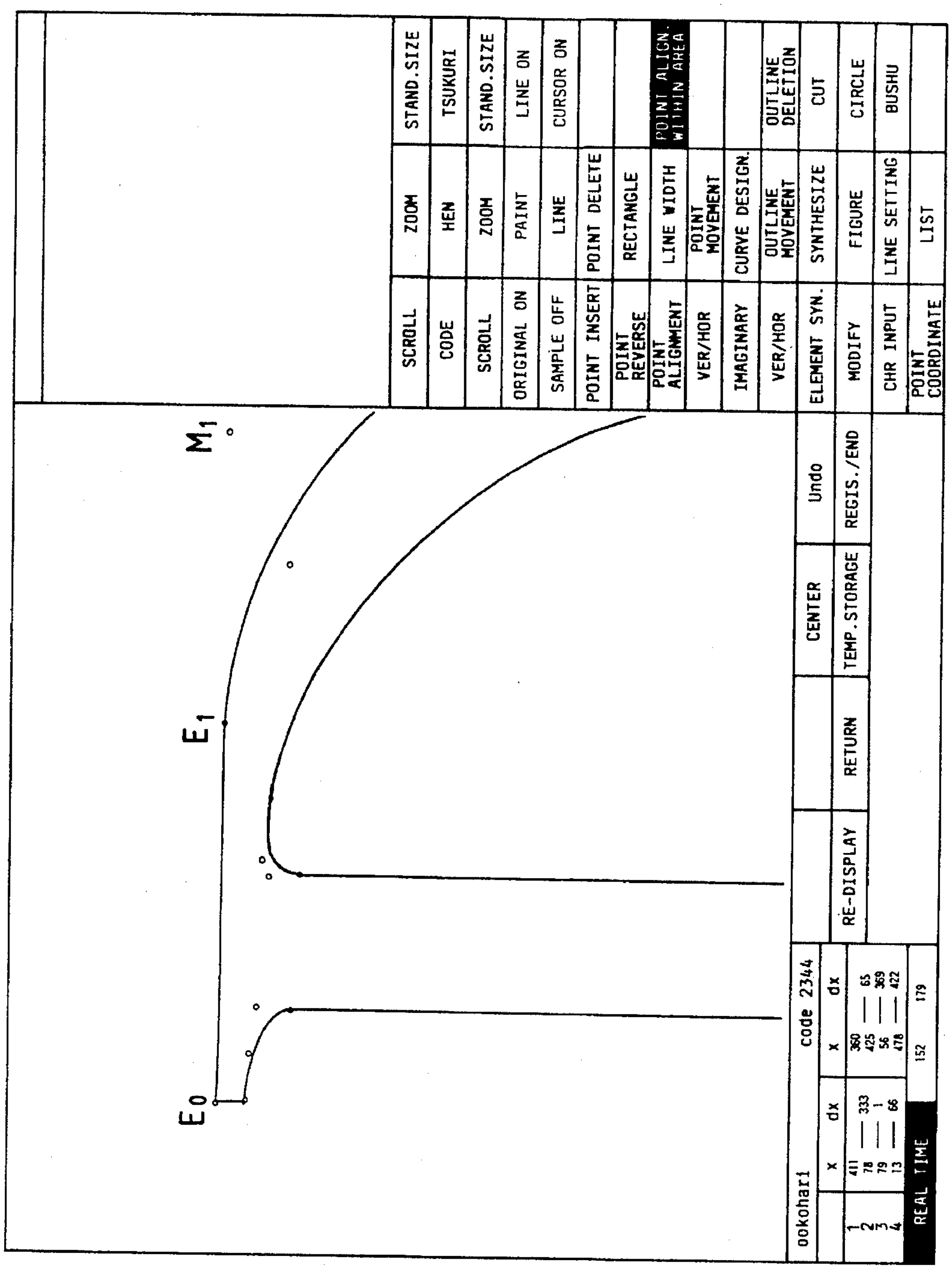
FIG. 63 is a view for explaining the point alignment process of this embodiment.

FIGS. 62 and 63 are views showing point alignment within a designated area.

The screen in FIG. 62 includes a reference point E0, a designated rectangle 1, sample points E1 and M1 included in the rectangle 1, and a point M2 outside the rectangle. That is, the points E1 and M1 are selected as points subjected to alignment. Note that target sample points inside and outside the rectangle can be arbitrarily added or canceled.

FIG. 63 shows a state wherein points E1 and M1 are aligned with a point E0.

The point alignment procedures will be described with reference to a flow chart in FIG. 64-1 and the editing screens of FIGS. 61A to 61F. The movement FLAG representing whether a point has been moved is initialized to OFF in step 1. Coordinates of one point, e.g., E0 within the CRT editing area are input from the PD 12. In step 3, a vertical or horizontal line is generated as a reference line from the coordinate point input in step 1. The generated vertical or horizontal line is displayed on the CRT 13 through the VRAM 14. In step 4, an amount of movement designated by direction keys on the KBD 11 is input. In step 5, the coordinates P(x) and P(y) (FIG. 10D) of the point E0, i.e., the reference line are changed on the basis of the movement amount input in step 4. The curve parameter table in FIG. 10E is re-formed, and display data is formed. The display data is then displayed on the CRT 13 through the VRAM 14. The reference line is also re-displayed in accordance with the movement amount.

Figures 1, 64:
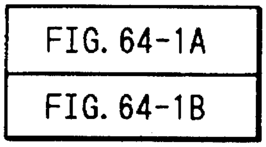
Figures 1A, 64:
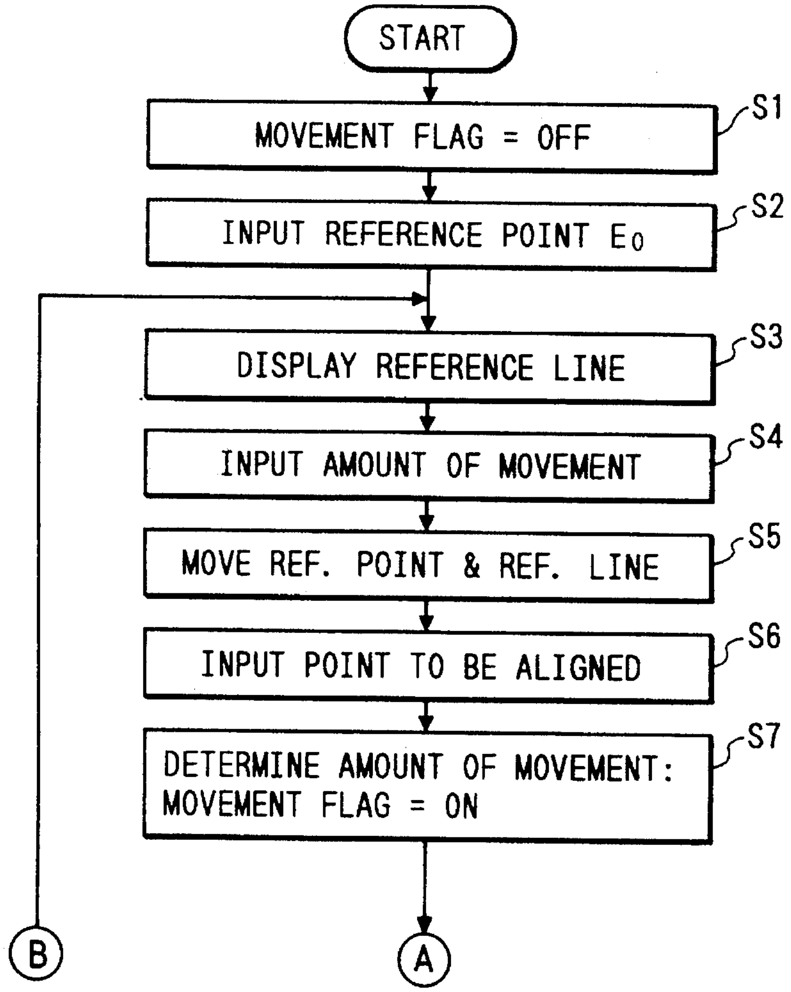
Figures 1B, 64:
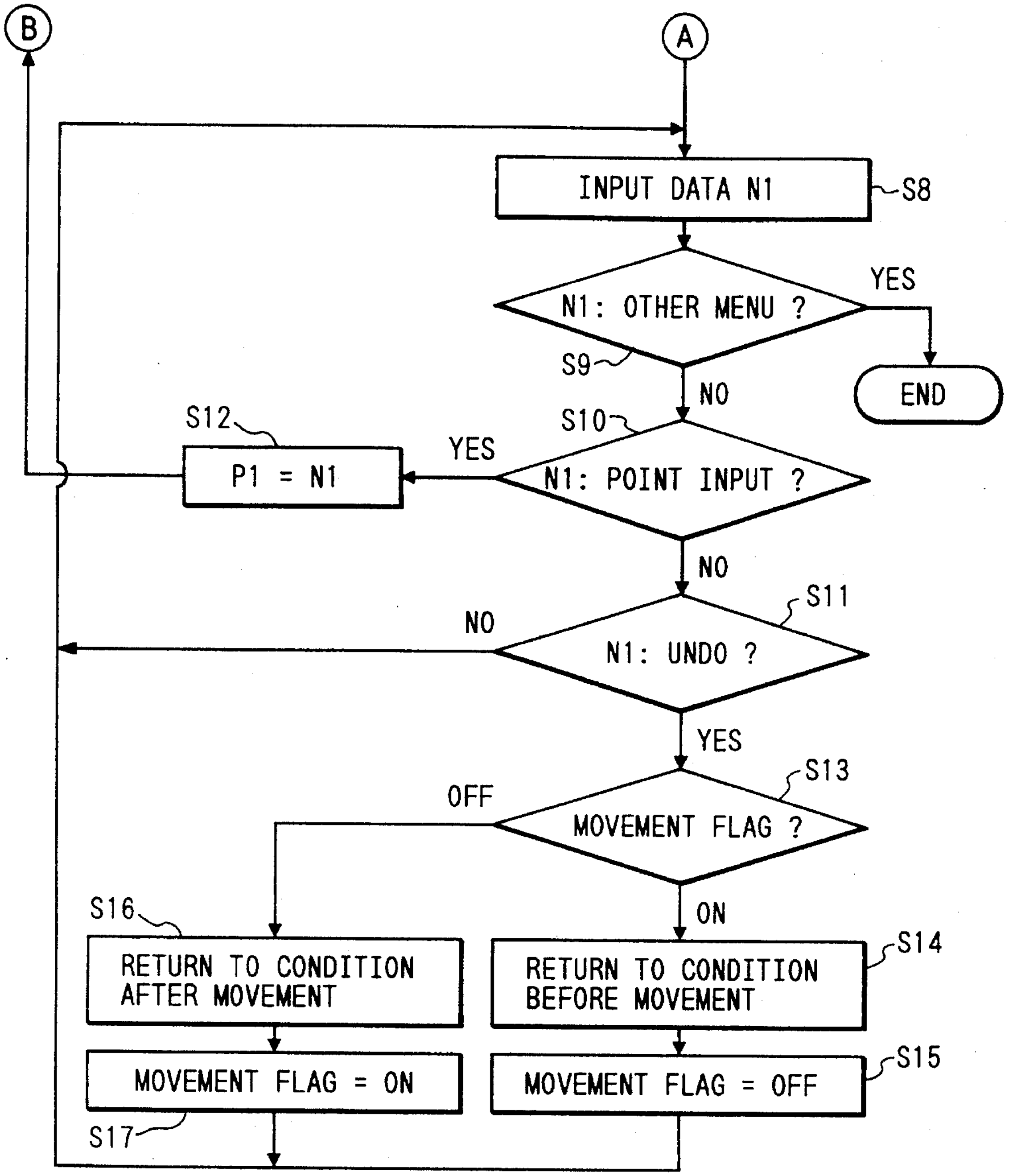
Figures 2, 2A, 64:
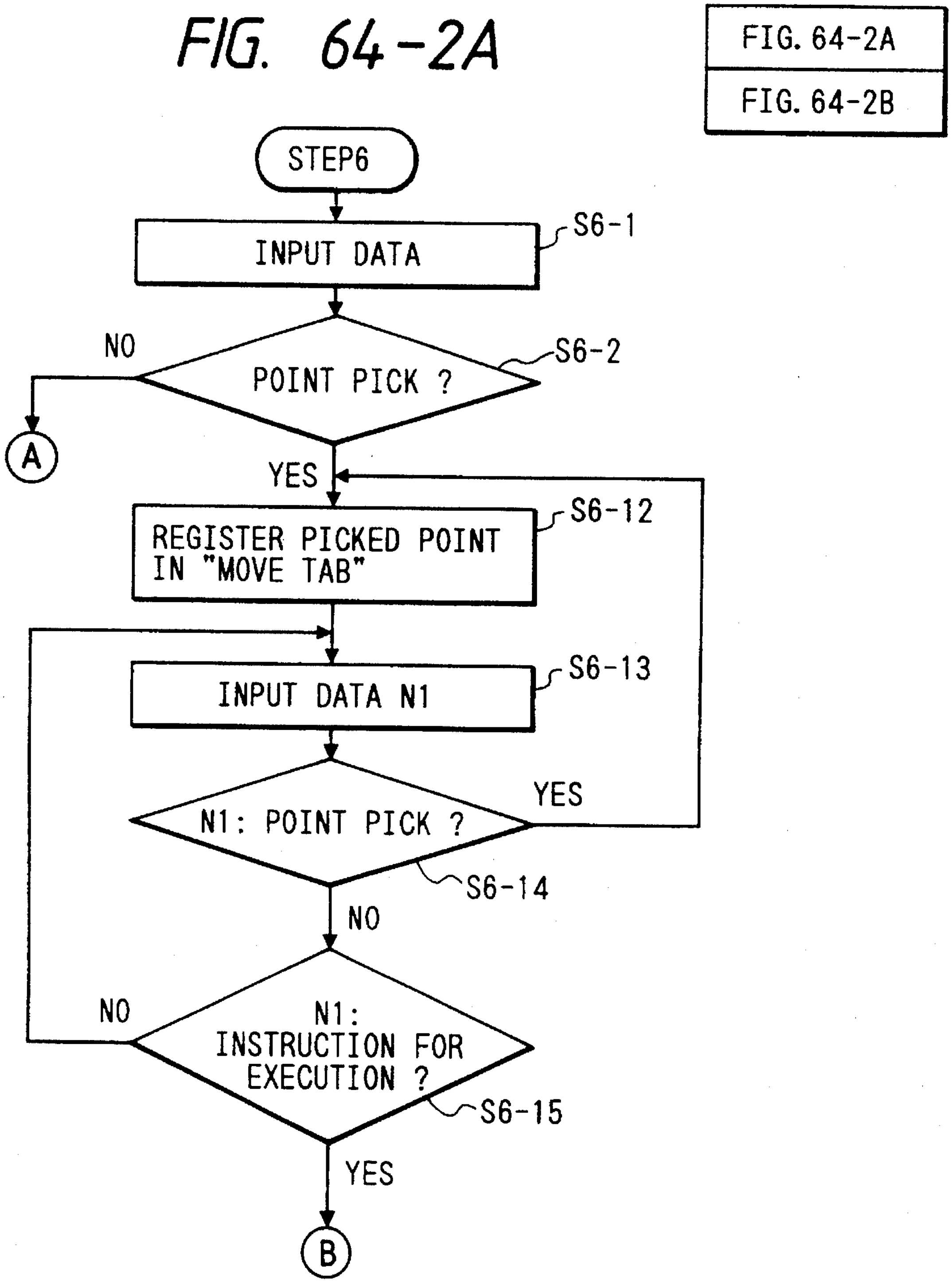
Figures 2B, 64:
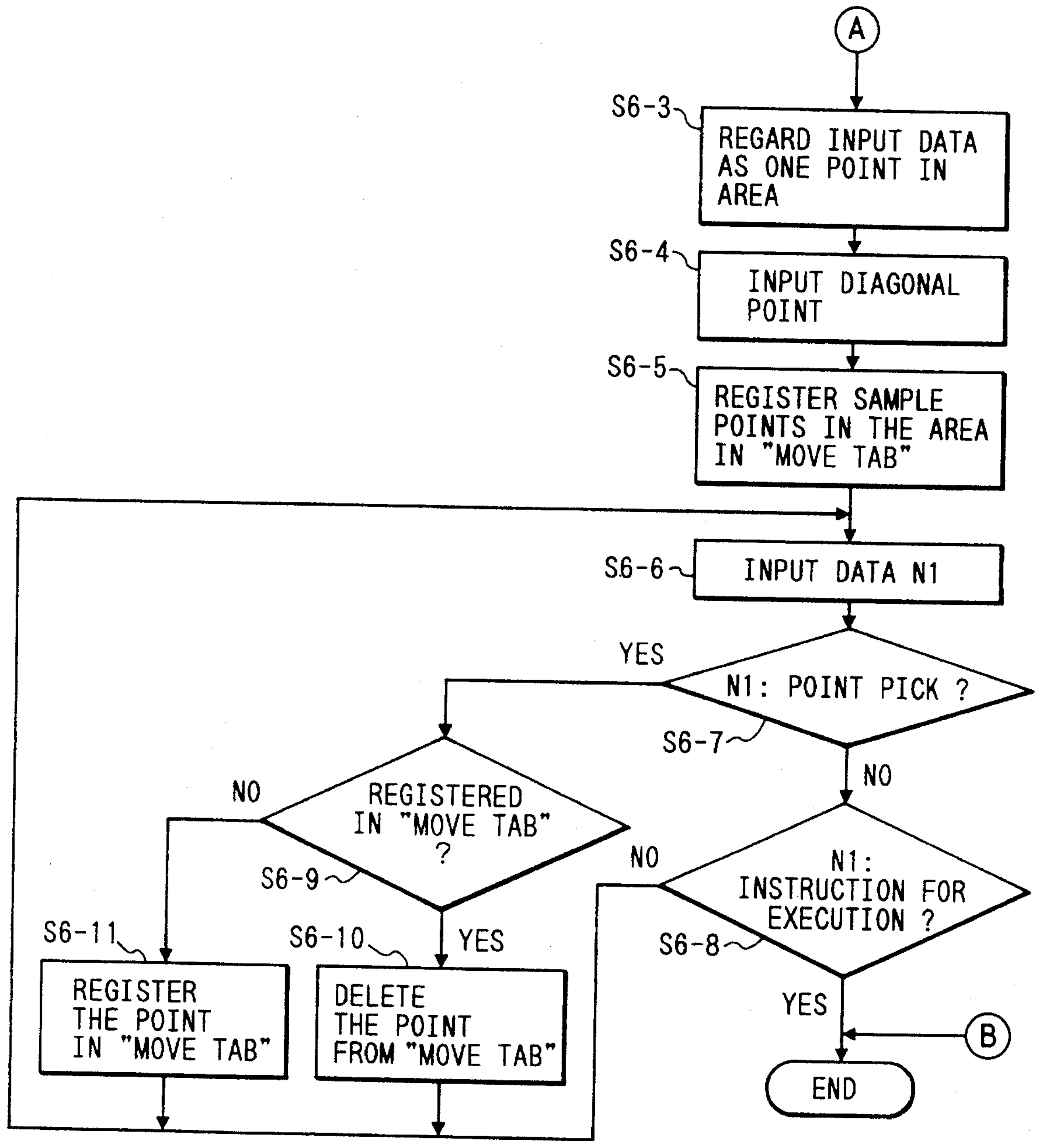
Figures 3A, 64:
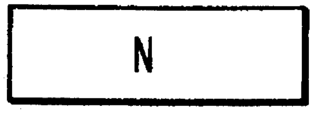
Figures 3B, 64:
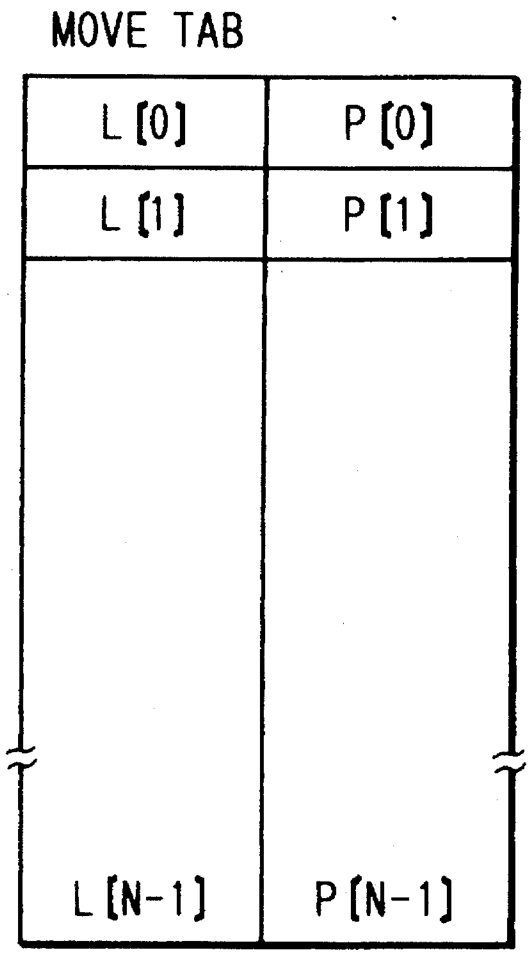

In step 6, a method of designating a sample point to be aligned is determined in accordance with an input from the PD 12 to form a movement point table shown in FIGS. 64-3A and 64-3B. The movement point table comprises an area (FIG. 64-3A) for storing the number of movement points and a MOVETAB (FIG. 64-3B) consisting of a movement point outline No.L[i] and a sample point No.P[i]. The movement point table is present in the PMEM. Step 6 will be described in detail with reference to a flow chart in FIG. 64-2. In step 6-1, data from the PD 12 is input. It is determined in step 6-2 whether the input represents a point pick (left button). If YES in step 6-2, the picked sample point is registered in the MOVETAB in step 6-12. The next input is received in step 6-13, and the content of the input is determined in steps 6-14 and 6-15. As a result of determination, if the input represents the point pick, operations from step 6-12 are repeated. However, if the input is determined to designate execution (the central button of the PD 12) in step 6-13, step 6 is completed, and operations from step 7 are executed. If the input in step 6-1 does not represent a point pick, the input is determined in step 6-3 to represent designation of an area. The position of the PD 12 in step 6-1 is determined as coordinates of one point of the area. Coordinates of a diagonal point with respect to the point designated in step 6-1 are determined for the area in step 6-4. Sample points included in the area determined in steps 6-3 and 6-4 are searched with reference to the coordinates P(x) and P(y) of FIG. 10D, and the searched coordinates are registered in the MOVETAB. The next input is received in step 6-6, and the content of the input is determined in steps 6-7 and 6-8. As a result of determination, if the input represents a point pick, it is determined in step 6-9 whether the picked point is registered in the MOVETAB. If YES in step 6-9, information of the picked point is deleted from the MOVETAB in step 6-10. If NO in step 6-9, the picked point is registered in the MOVETAB in step 6-11. If the input is determined to designate execution (the central button of the PD 12) in step 6-6, step 6 is completed, and operations from step 7 are executed.

A movement amount is determined with reference to the coordinates P(x) and P(y) (FIG. 10D) stored in the PMEM, the data (FIGS. 10D and 10E) before the change are kept stored in the PMEM 6. These stored data are defined as PDATA'. The coordinate P(x) or P(y) is set to have the same value as that of the reference point, and the curve parameter table in FIG. 10E is re-formed. Display data is formed and displayed on the CRT 13 through the VRAM 14. The movement FLAG is set ON. A state or condition after movement is shown in FIG. 61E. The next input is received in step 8, and the content of the input is determined in steps 9 to 11. As a result of determination, if the input represents a menu pick, this function is completed. However, if the input represents a normal point input, the operations from step 3 will be repeated by using the input point serves as a reference point in step 12. If the input in step 8 represents an undo operation (the right button of the PD 12), the movement FLAG is determined in step 13. If the movement FLAG is set ON, the condition before point movement is displayed in step 7. That is, in step 7, the data is returned to the PDATA' stored in the PMEM 6, and the movement FLAG is set OFF in step 15. If the movement FLAG is set OFF, the data PDATA changed in step 7, i.e., the condition after movement is displayed in step 16. The movement FLAG is set ON in step 17.

When the movement FLAG is ON/OFF-controlled to change the display between the PDATA and the PDATA' in the PMEM 6. The moved point is stored in the PDATA (after movement) and the PDATA' (before movement) in the PMEM 6. Since the current condition is determined by the status of the movement FLAG. The moved point is returned to the point before movement in steps 13 and 14 and steps 15 and 16. In addition, the moved point is further moved to another position with only the operation of the right button of the PD 12.

Outline Deletion

Figure 65:
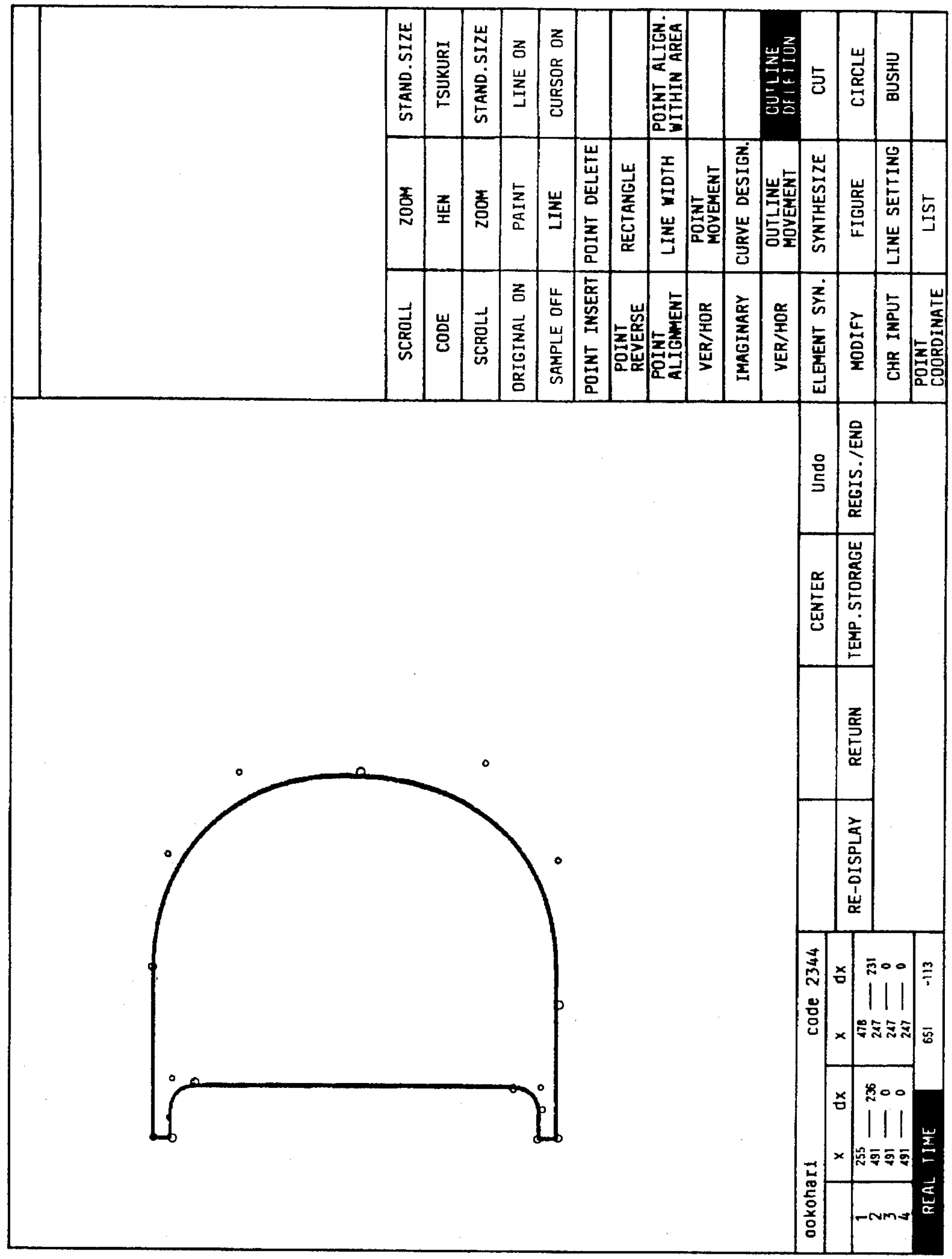
FIG. 65 is a view for explaining an outline deletion process of this embodiment.
Figure 67:
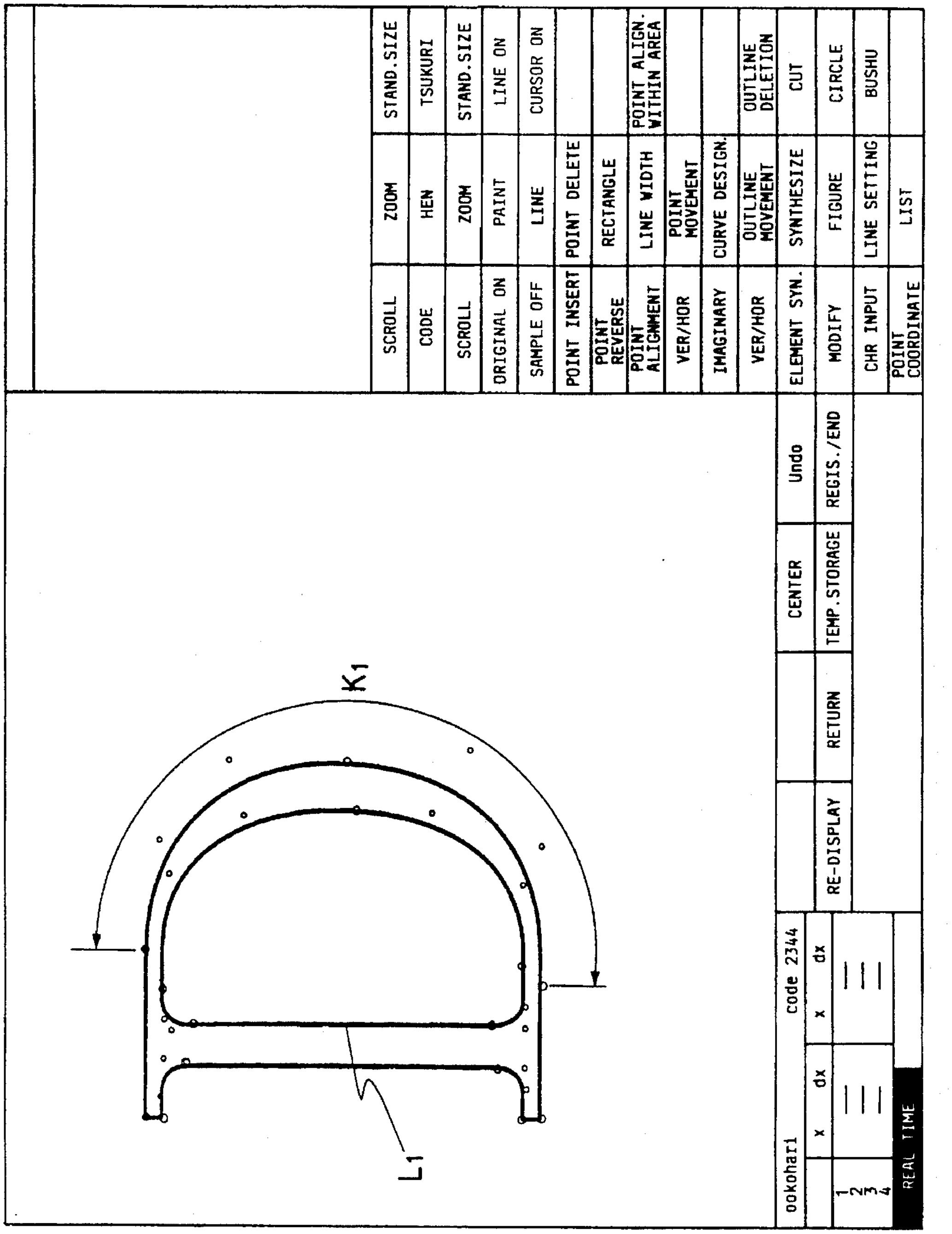
FIG. 67 is a view for explaining an outline movement process of this embodiment.

The outline deletion S9-f in FIG. 4 will be described with reference to FIG. 67 (outline movement) and FIG. 65.

This function is started by picking the "OUTLINE DELETION" menu with the PD 12.

The outline deletion function is to allow an operator to delete any outline in an editing area. When an outline L1 in FIG. 67 is deleted, a state shown in FIG. 65 is obtained.

Figure 66:
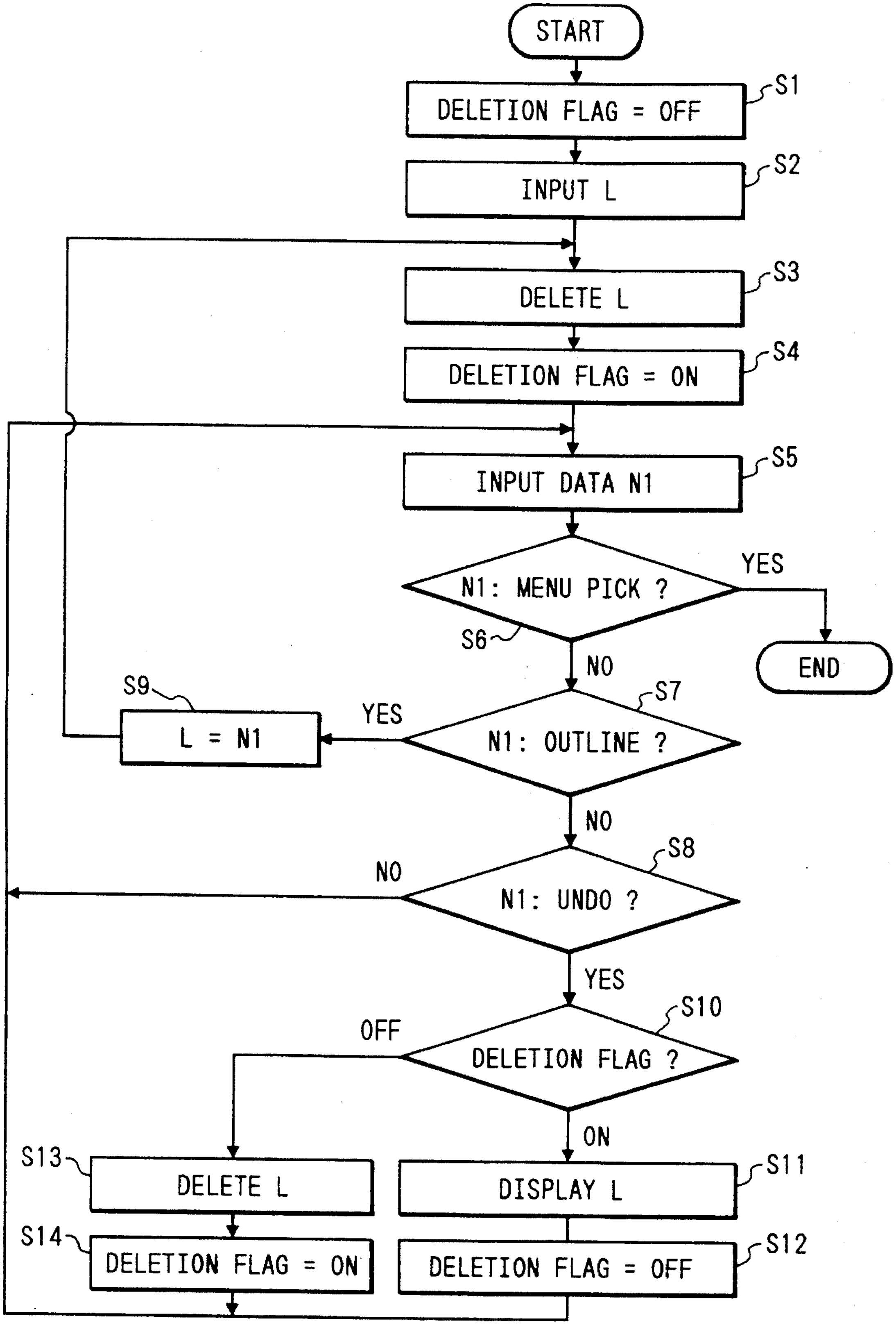
FIG. 66 is a flow chart for explaining the outline deletion process of this embodiment.

The outline deletion procedures will be described with reference to a flow chart in FIG. 66. A flag "deletion FLAG" representing whether an outline is deleted is initialized to OFF in step 1. In step 2, an outline L in step 2 is input from double click information of a point from the PD 12. In step 3, the outline L is deleted from the CRT 13 through the VRAM 14. In step 4, the deletion FLAG is set ON. In step 5, the next input is received, and the content of the input is determined in steps 6 to 8. As a result of determination, if the input represents a menu pick, this function is completed. If the input represents a normal outline input (i.e., double clicking of a point with the PD 12), the input is defined as L, and operations from step 3 are repeated. If the input in step 5 represents an undo operation (right button of the PD 12), the state of the deletion FLAG is determined in step 10. If the deletion FLAG is determined to be ON, the outline L is displayed in step 11, and the deletion FLAG is set OFF in step 12. If OFF in step 10, the outline L is deleted in step 13, and the deletion FLAG is set ON in step 14.

The deletion and re-display of the deleted outline can be performed with only the right button of the PD 12 in steps 11 and 12 and steps 13 and 14.

Outline Movement

Figure 68:
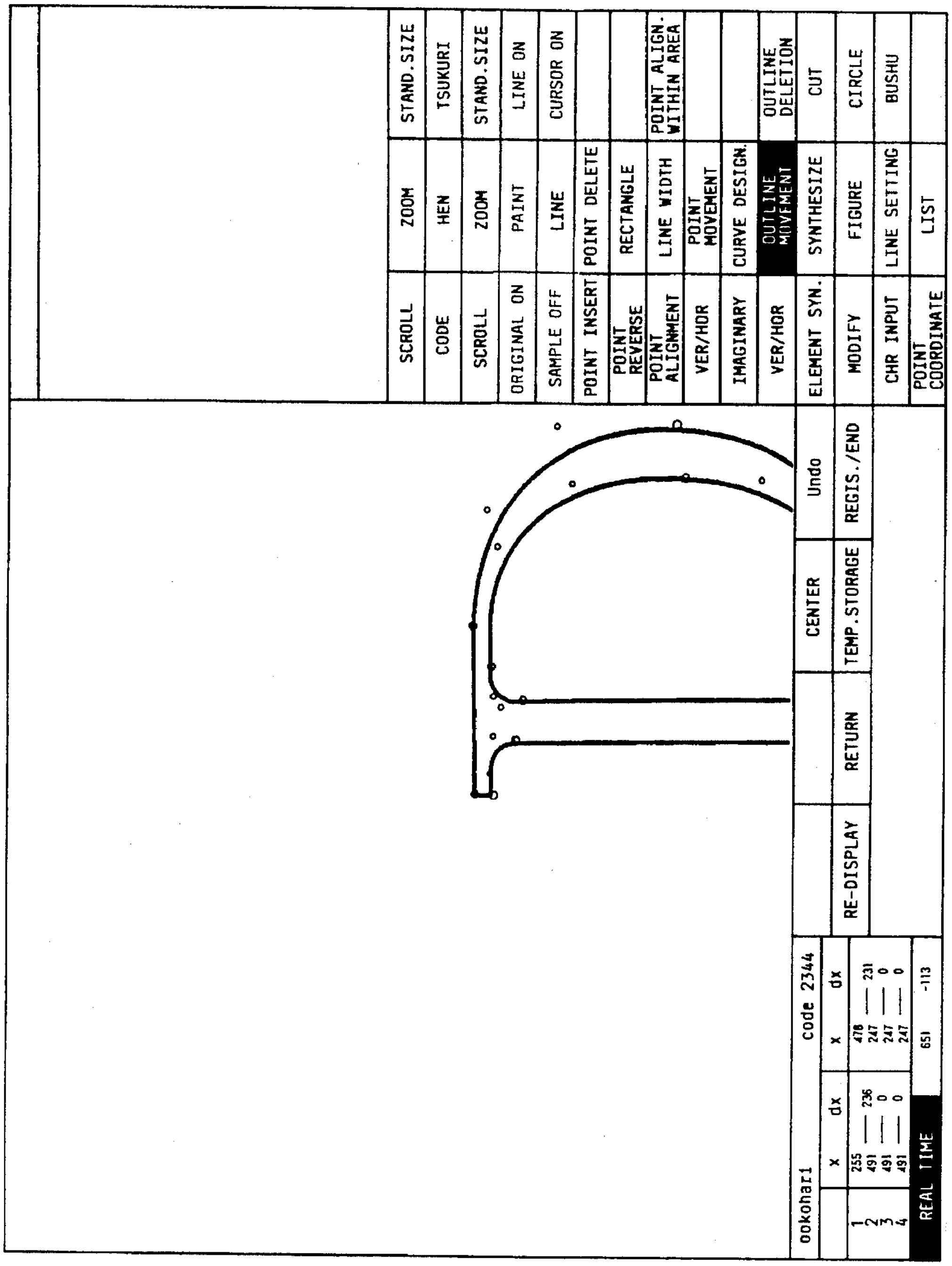
FIG. 68 is a view for explaining the outline movement process of this embodiment.
Figure 69:
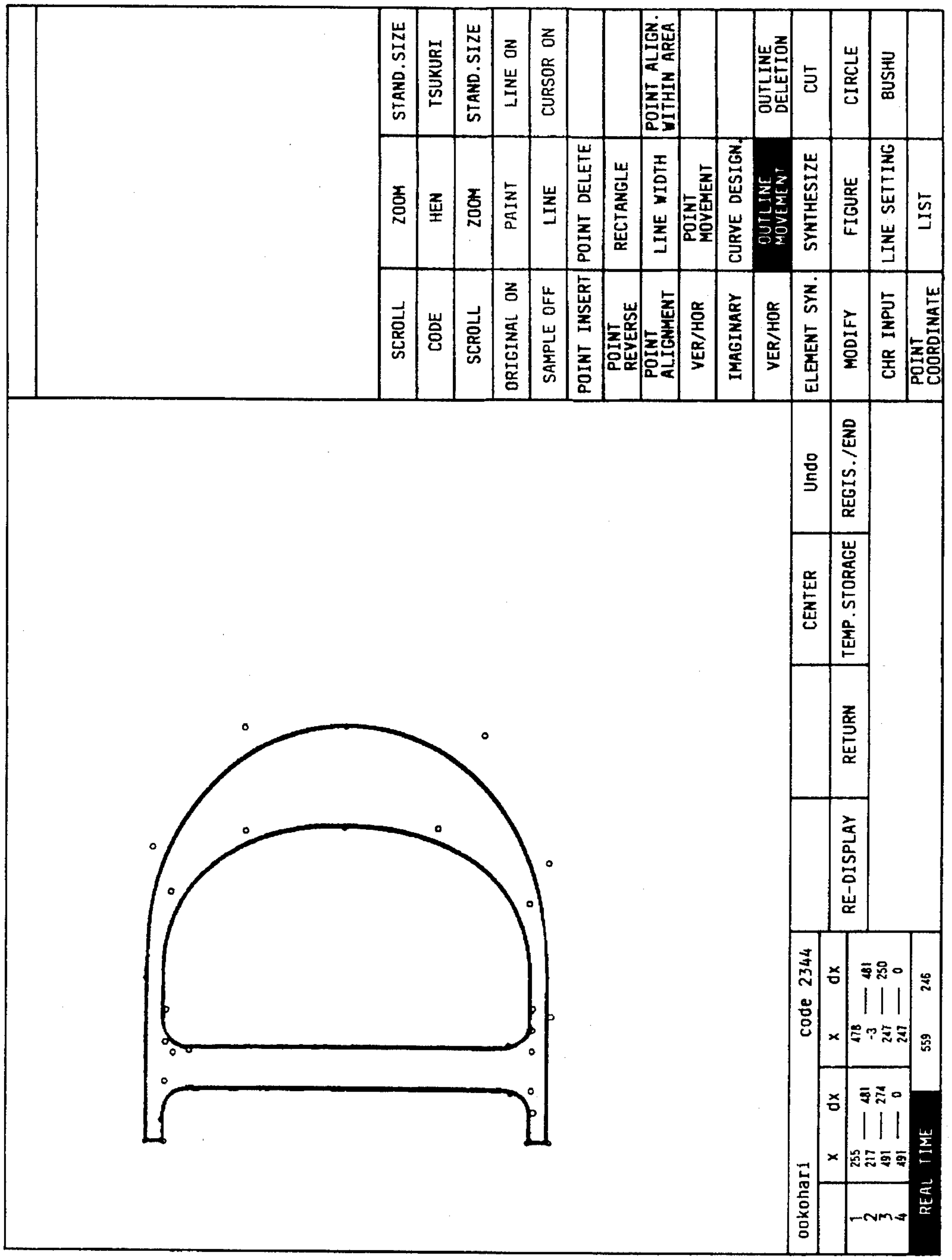
FIG. 69 is a view for explaining the outline movement process of this embodiment.

The outline movement will be described with reference to FIGS. 67, 68, and 69. The outline movement is started by picking the "OUTLINE MOVEMENT" menu with the PD 12.

The outline movement function is to move at least one character outline or a designated section thereof in any direction or in either the X or Y direction by an arbitrary amount. FIG. 67 shows character data before movement. FIG. 68 shows a case wherein two outlines constituting a character "D" are moved in any direction. FIG. 69 shows a case wherein a section K1 is moved in the X direction.

Figures 70, 70A:
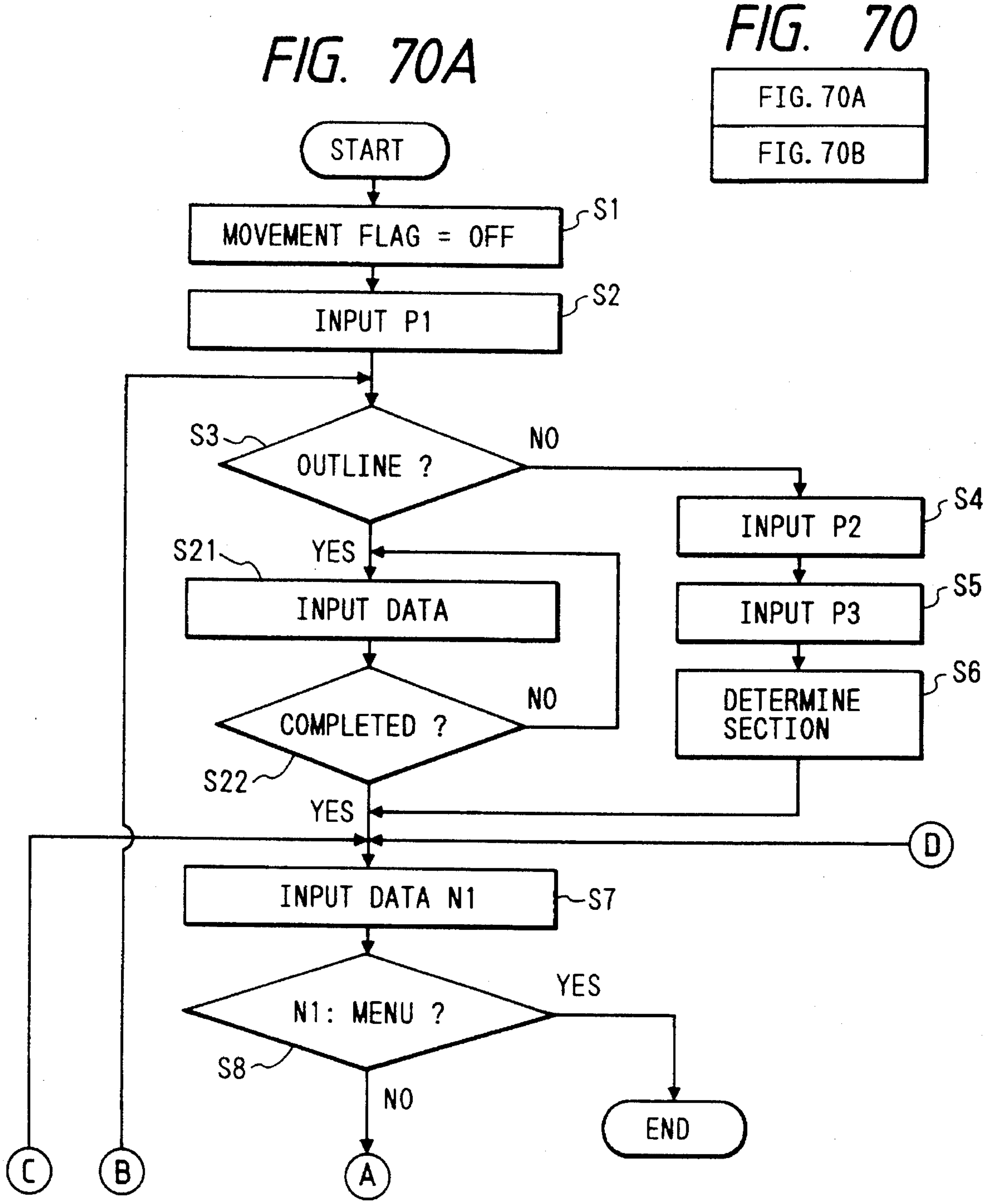
FIG. 70, consisting of FIGS. 70A and 70B, is a view for explaining the outline movement process of this embodiment.
Figure 70B:
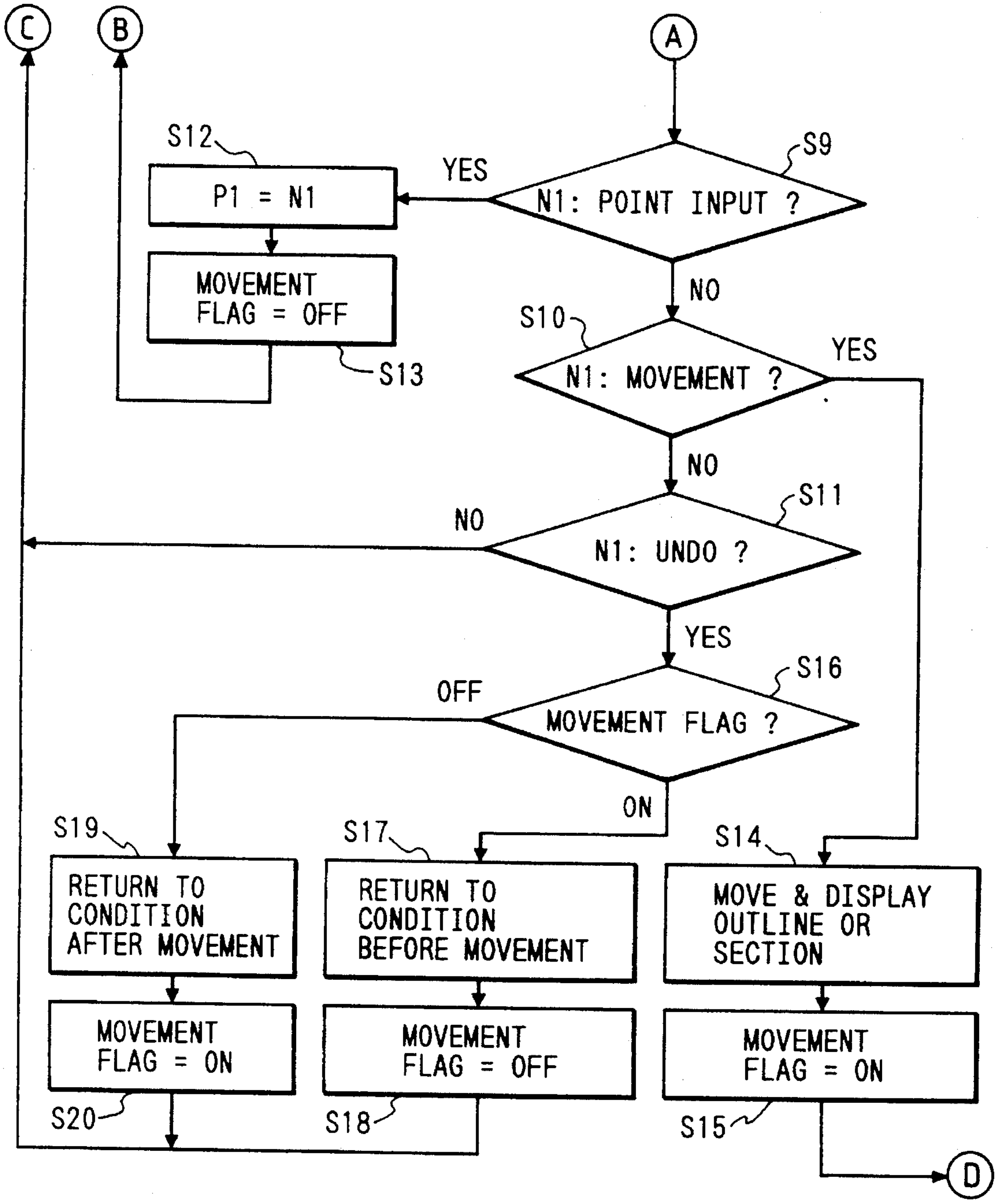

The outline movement procedures will be described with reference to a flow chart in FIG. 70. In step 1, a flag "movement FLAG" representing whether an outline or a section is moved is initialized to OFF in step 1. The first point is input from the PD 12 in step 2. It is determined in step 3 whether the input from the PD 12 in step 2 represents outline designation (i.e., double clicking). If YES in step 3, the process continues until input of outlines to be moved is ended in steps 21 and 22. If NO in step 3, the point P1 input in step 2 is regarded as an end point of the section. In step 4, the other end point of the section is input with the PD 12. In step 5, points in the section are input to determine a movement section in step 6.

The next input is received in step 7, and the content of the input is determined in steps 8 to 11. As a result of determination, if the input represents a menu pick, this function is completed. If the input represents a normal point input, the input point is defined as the first point in step 12, and the operations from step 3 are repeated. If the input represents designation of a movement amount and a movement direction with direction keys and ten keys on the KBD 11 or designation of a movement destination by dragging with the PD 12, display data of the outline or the section is formed again in step 14. The data after movement is displayed on the CRT 13 through the VRAM 14. The movement FLAG is set ON in step 15. If the input in step 7 represents an undo operation (the right button of the PD 12) (determination in step 11), the status of the movement FLAG is determined in step 16. If the movement FLAG is set ON, the condition of the outline or section before movement is displayed on the CRT 13 through the VRAM. 14 in step 17. In step 18, the movement FLAG is set OFF. If the determination in step 16 is determined to be OFF, the condition of the outline or section after movement is displayed on the CRT 13 through the VRAM 14. In step 20, the movement FLAG is set ON. The return and re-movement of the moved outline or section can be performed with only the right button of the PD 12.

A function of moving the outline or section in either X or Y direction can be realized with reference to the kinds of input data (step 7) in step 14.

Imaginary Line Generation

The imaginary line generation S9-h in FIG. 4 will be described below.

Description of Principle

The imaginary line generation function is to allow an operator to form (generate) an arbitrary outline in an editing area independently of character outline data. An outline thus formed can be subjected to various changes (e.g., point insertion and point movement) as in normal outlines in other functions after the imaginary line generation function is canceled, thereby obtaining any shape. A difference between the imaginary line and the character outline is that the imaginary line is mainly used to form a character and is not recognized as a character outline, and that the imaginary line is not stored in the font data file in "registration/completion".

Figure 71:
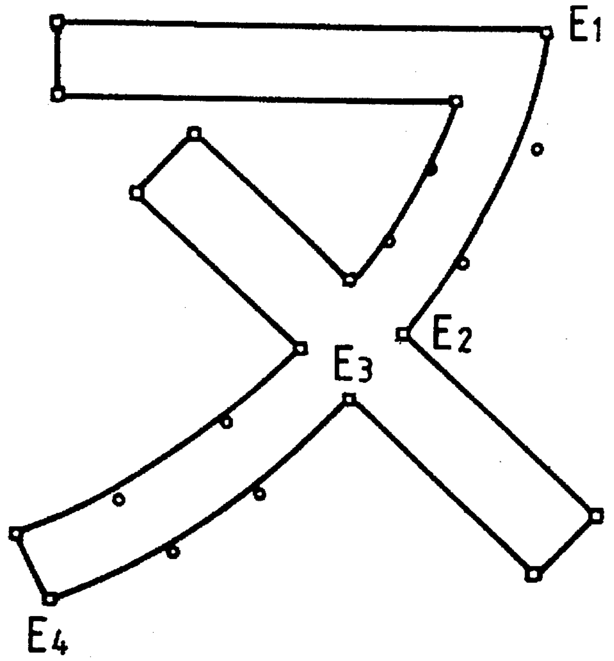
FIG. 71 is a view for explaining an imaginary line generation process of this embodiment.
Figure 72:
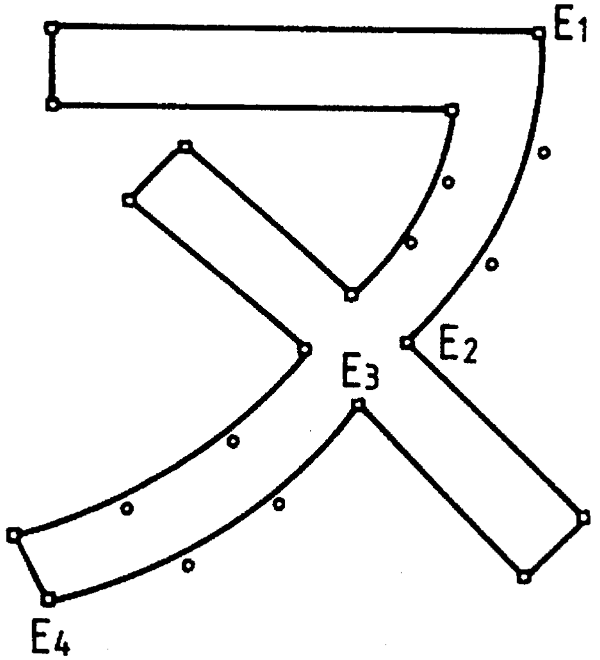
FIG. 72 is a view for explaining the imaginary line generation process of this embodiment.

A main application purpose of the imaginary line is to use it as a template (underlay). In this sense, design, check, and editing of continuous curves, i.e., curves having a section of E1 and E2 and a section of E3 and E4 in FIGS. 71 and 72 can be facilitated.

Figure 74:
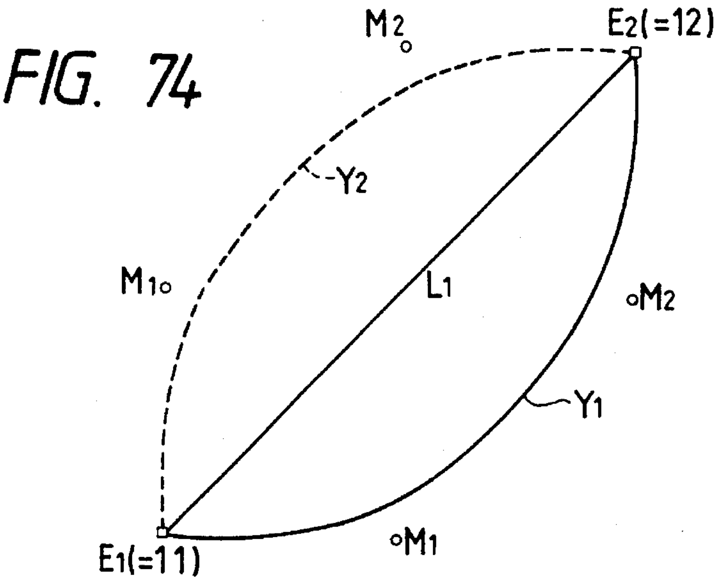
FIG. 74 is a view for explaining the imaginary line generation process of this embodiment.

The first outline shape formed as the imaginary line can be freely changed as in the normal outline data. The first shape may be a rectangular or circular shape. In this embodiment, an arcuated figure is used as the imaginary line, as shown in FIG. 74.

Description of Flow Chart

Figure 73A:
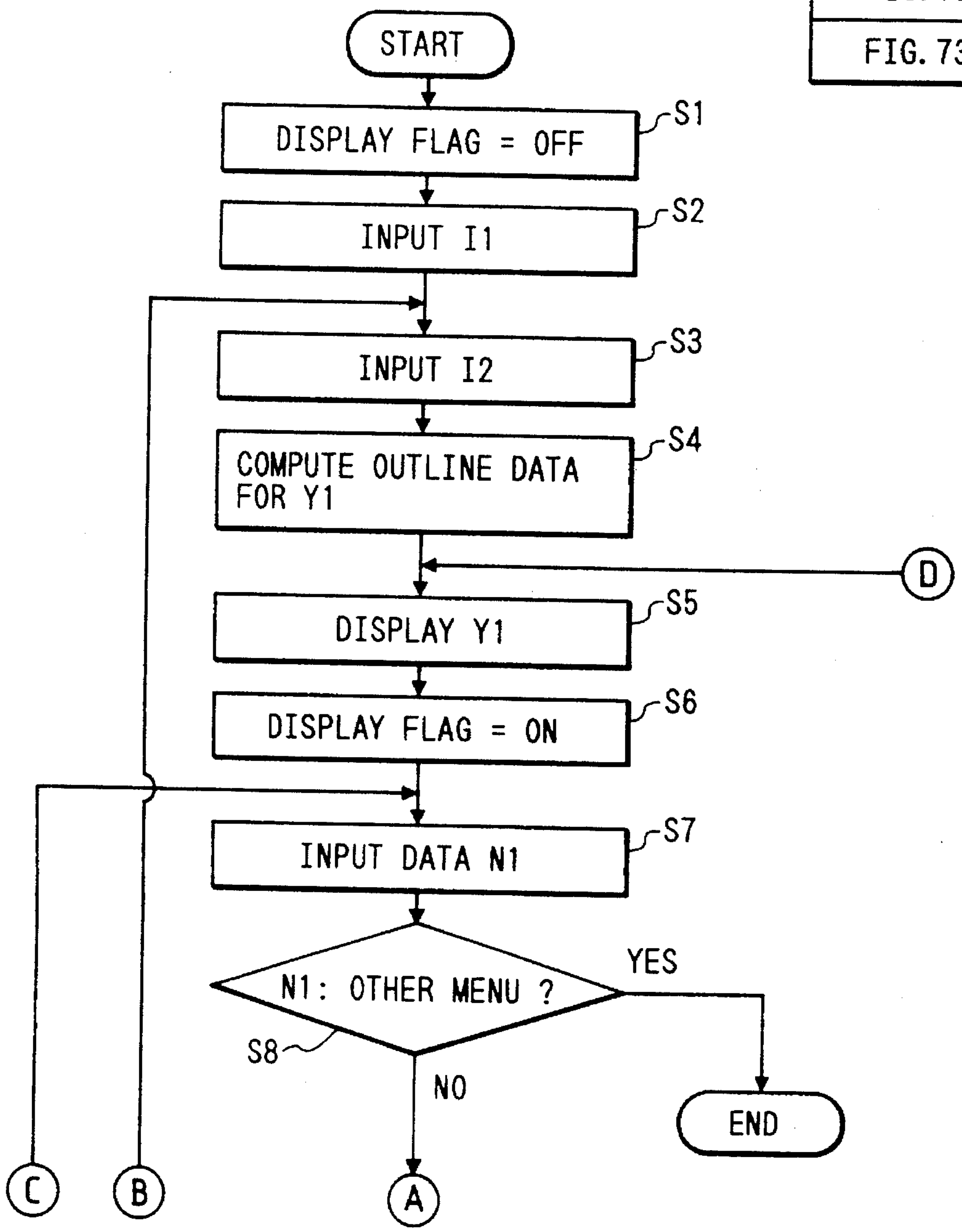
FIG. 73, consisting of FIGS. 73A and 73B, is a flow chart for explaining the imaginary line generation process of this embodiment.
Figure 73:
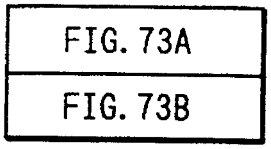
Figure 73B:
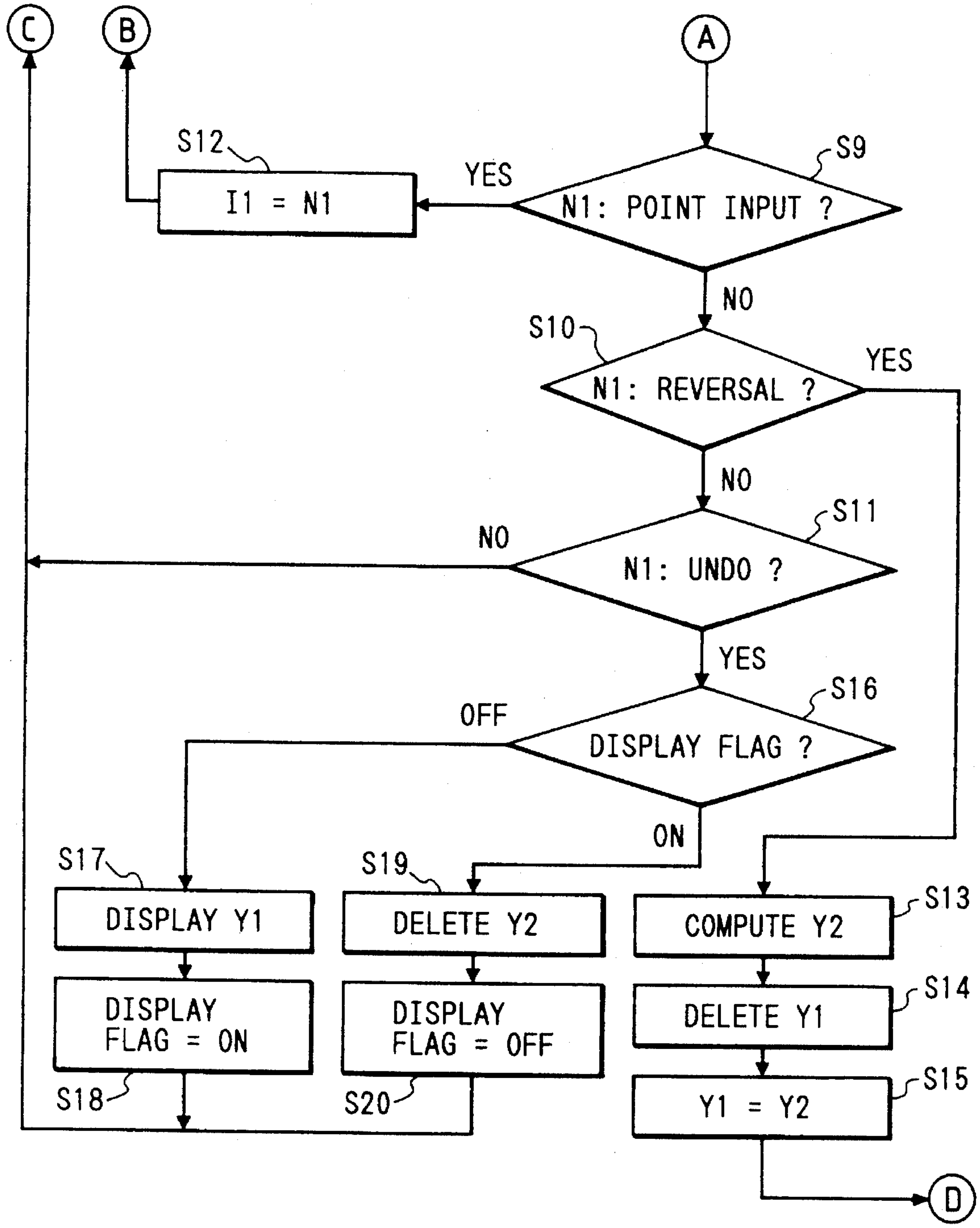

The imaginary line generation procedures will be described with reference to a flow chart in FIG. 73 and an editing screen in FIG. 74. A flag "display FLAG" representing whether an arcuated figure is displayed is initialized to OFF in step 1. In step 2, coordinates of one point, e.g., Ii in the CRT editing area are input with the PD 12. The coordinates of, e.g., a point I2 are similarly input in step 3. Outline data (sample point coordinates) of the arcuated figure Y1 are computed from the coordinate values of the points I1 and I2 in step 4. The outline Y1 is constituted by end points E1 and E2 and intermediate points M1 and M2, as shown in FIG. 74. The coordinate values of these sample points are computed as follows:

$$E1x=I1x$$
$$E1y=Iiy$$
$$E2x=I2x$$
$$E2y=I2y$$
$$M1x=I1x+(I2x=I1x)*K$$
$$M1y=I1y$$
$$M2x=I2x$$
$$M2y=I2y-(I2y-I1y)*K$$

where K is the constant stored in the PMEM 6 and is given as 0.155 in FIG. 74. The computed outline data Y1 is displayed on the CRT 13 through VRAM 14 in step 5. The display FLAG is set ON in step 6. The next input is received in step 7, and the content of the input is determined in steps 8 to 11. As a result of determination, if the input represents a menu pick, this function is completed. If the input represents a normal point input, the input point is defined as the first point in step 12, and operations from step 2 are repeated. If reversal designation (the central button of the PD 12) is detected, a reversed image Y2 of the arcuated image Y1 obtained in step 4 is computed (step 13). The arcuated figure Y1 currently displayed is deleted in step 14. The arcuated figure in step 14 is replaced with data of the arcuated figure Y1, and the flow returns to step 5. That is, the reversed figure Y2 is displayed on the side represented by the broken line in FIG. 74. If the input in step 7 represents an undo operation (the right button of the PD 12) (determination in step 11), the status of the display FLAG is determined in step 16. If the display FLAG is set ON in step 16, the arcuated figure Y1 currently displayed is deleted in step 19. In step 20, the display FLAG is set OFF. If OFF in step 16, the sample point data of the arcuated figure Y1 are displayed in step 17, and the display FLAG is set ON in step 18. Deletion and re-display of the formed arcuated figure can be performed with only the right button of the PD 12.

Circling

Figure 75:
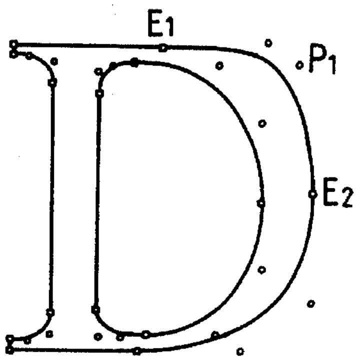
FIG. 75 is a view for explaining a circling process of this embodiment.

The circling S9-i in FIG. 4 will be described with reference to FIG. 75.

This function is called by picking the "CIRCLE" menu on the CRT 13. This function provides a means for easily changing the shape of a curve portion of an outline displayed in the editing area of the CRT 13 into an arc or a part of an ellipse. A curve portion such as an arc or a part of an ellipse is obtained by B-spline approximation. For this purpose, control points are automatically generated. A mathematically strict arc or a strict part of an ellipse need not be formed.

Figure 78:
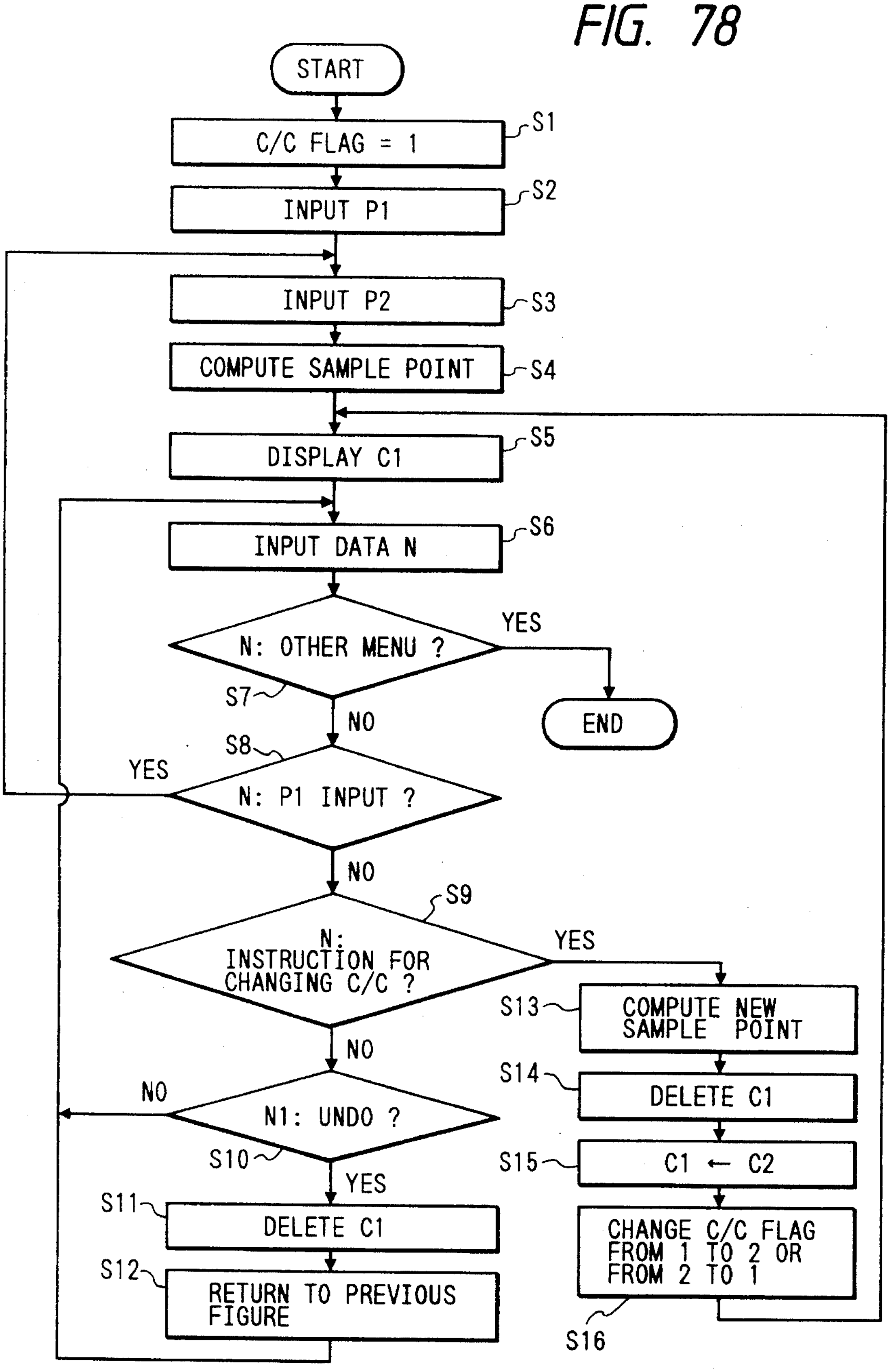
FIG. 78 is a flow chart for explaining circling of this embodiment.

The circling procedures will be described with reference to FIG. 78.

In step 1, a C/C flag (Convex/Concave) flag is set to 1. In step 2, an end point P1 as one of the sample points on a figure is input. In step 3, an end point P2 adjacent to the end point P1 on the same outline is input. A sample point for generating a new part of an ellipse from a curve in the corresponding section is computed from the points P1 and P2 in step 4. If coordinates of the point P1 are given as (E1*x*,E1*y*) and coordinates of the point P2 are given as (E2*x*,E2*y*), an intermediate point can be computed as follows.

Figure 76:
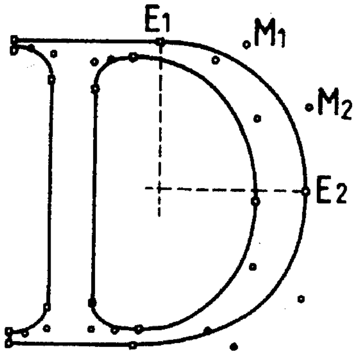
FIG. 76 is a view for explaining the circling process of this embodiment.

Intermediate points M1 and M2 are generated by the x-coordinate of the end point E1 and the y-coordinate of the end point E2, as shown in FIG. 76 and are replaced with the sample points in the section of E1-P1-E2.

Coordinates (M1*x*,M1*y*) and (M2*x*,M2*y*) of the generated intermediate points M1 and M2 are computed by the following mathematical expressions. However, selection of the optimal mathematical expression is determined by the C/C flag shown in FIG. 78.

Figure 77:
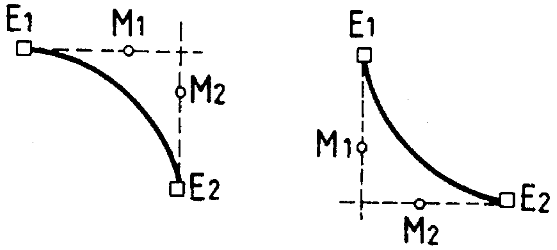
FIG. 77 is a view for explaining the circling process of this embodiment.

$M1x=E1x+(E2x-E1x).K$ or $E1x$ $M1y=E1y$ or $E2y+(E1y-E2y).K$ $M2x=E2x$ or $E1x+(E2x-E1x).K$ $M2y=E2y+(E1y-E2y).K$ or $E2y$ where K is the constant stored in the PMEM 6. In this manner, the arc or the part of the ellipse in the case of FIGS. 77A and 77B can be easily generated as described above.

A curve portion C1 is displayed in step 5. The next data N is received-in step 6, and the content of the input is determined in steps 7 to 10. If the input N represents a menu pick, this function is completed. If the input N represents designation of changing the C/C flag, a sample point upon a change in C/C flag is computed in step 13. The computed figure is defined as C2. After the figure C2 is deleted in step 15, the figure C2 is defined as C2 in step 15. If the C/C flag is set to be 1, it is updated to 2, and the vice versa (step 16). The flow then returns to step 5 to display the figure C1.

If the input N represents an undo operation, the figure C1 is deleted to restore the original figure (step 12). The flow returns to step 6, and the apparatus waits for receiving the next data.

Figure Generation

Figure 79:
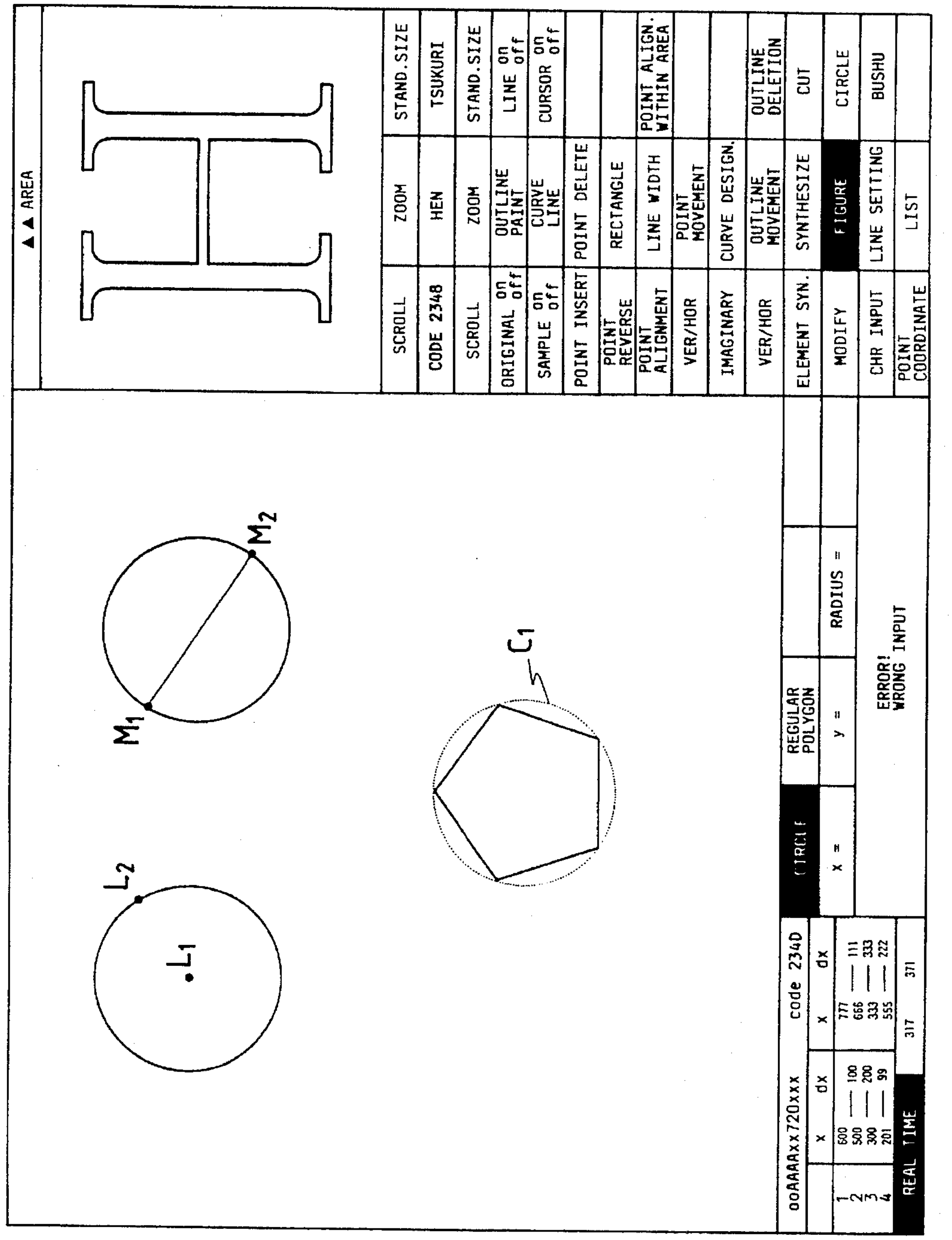
FIG. 79 is a view for explaining a figure generation process of this embodiment.

The figure generation S9-j will be described with reference to FIG. 79. This function is called by picking the "FIGURE" menu, so that a figure such as a circle or regular polygon can be easily generated. Generation of a circle or regular polygon is determined by selecting an appropriate submenu on the CRT. In this apparatus, since all curves are expressed by B-spline approximation, parameters for representing a circle are not coordinates (x,y) of the center of the circle and a radius R. B-spline control points enough to approximate a circle are automatically generated. Methods of generating a-circle are a method of designating the center, e.g., L1 of a circle and one arbitrary point, e.g., L2 on a circumference in the editing area, a method of designating two points, e.g., M1 and M2, constituting a diameter of a circle, and a method of inputting coordinates of the center and a radius. When a circle is designated with the PD, a circle determined by L2 or M2 can be updated on the CRT in accordance with movement of the PD. When a regular polygon is to be formed, a circle C1 corresponding to its inscribed polygon is formed and positioned, and then the number of vertices of the inscribed polygon is input.

Center Movement

The center movement S9-k in FIG. 4 will be described with reference to FIG. 80. This function can be called by picking the "CENTER" menu.

Figure 80:
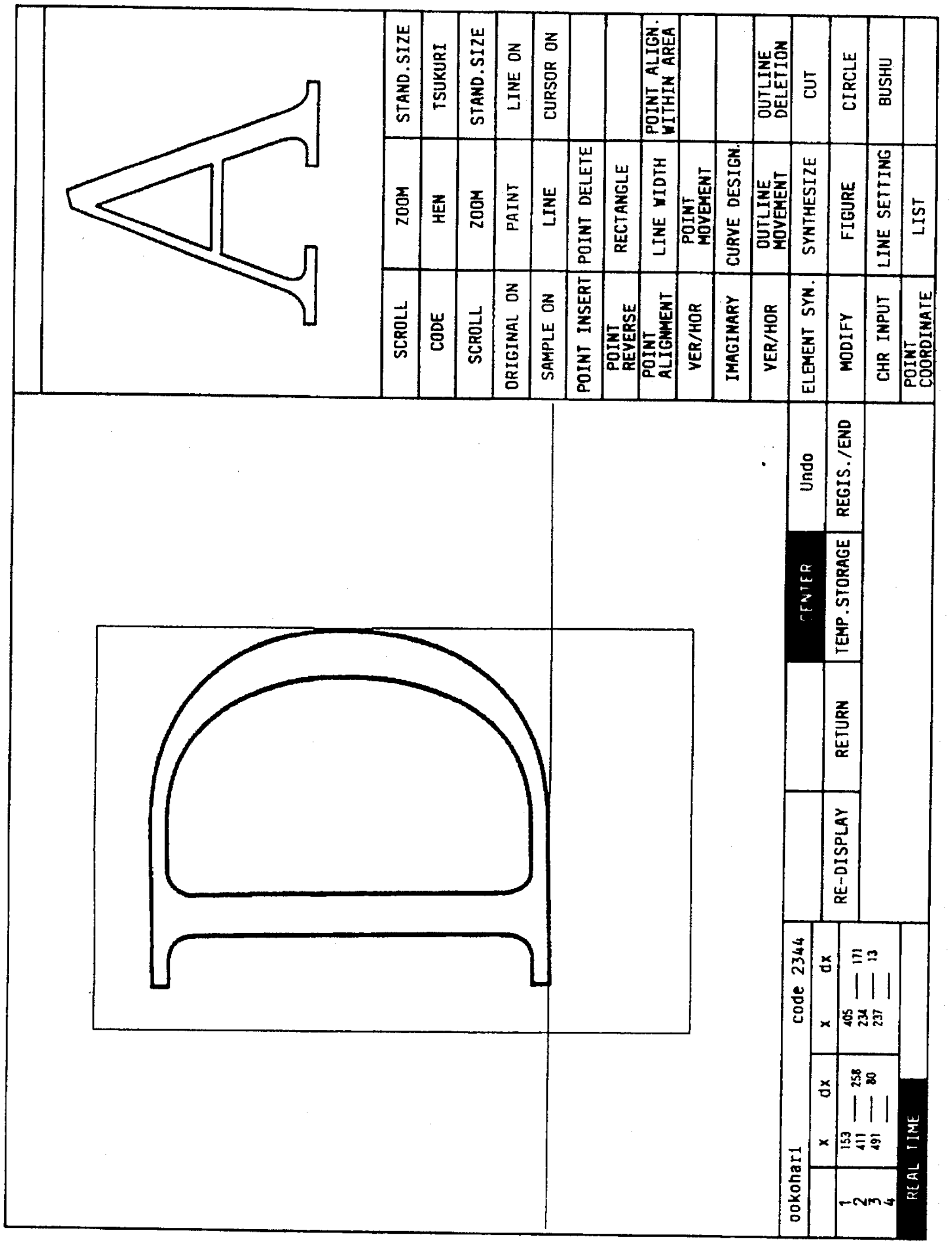
FIG. 80 is a view for explaining a center movement process of this embodiment.
Figure 81:
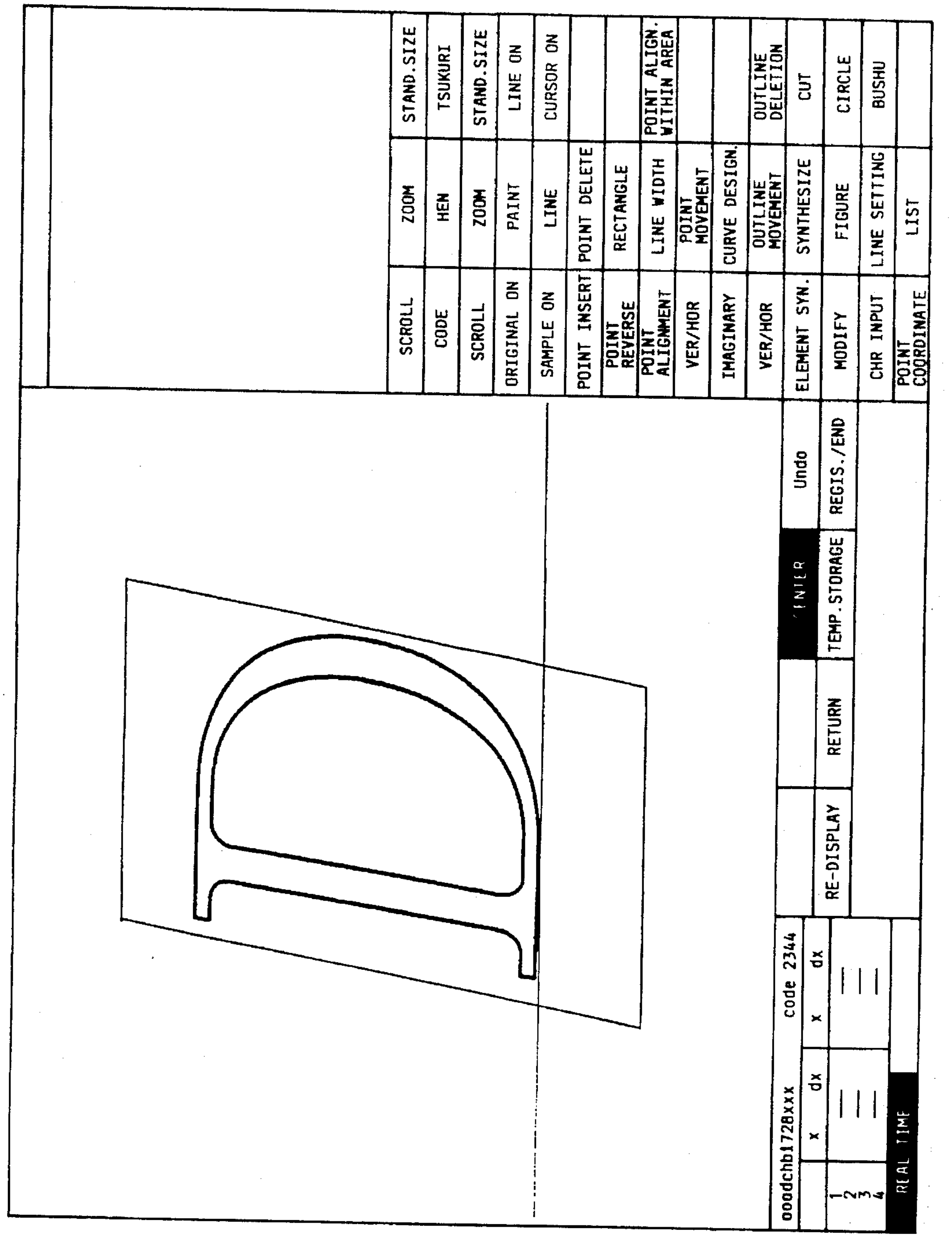
FIG. 81 is a view for explaining the center movement process of this embodiment.

The center movement function is to display a body frame and a base line, as shown in FIG. 80, and to change a positional relationship between the body frame and all outlines by using direction keys. If a target object is an italic character, an italic body frame is displayed, as shown in FIG. 81.

The center movement procedures will be described with reference to a flow chart in FIG. 83 and editing screens in FIGS. 80 and 82. A flag "movement FLAG" representing whether center movement has been performed is initialized to OFF in step 1. In step 2, in order to facilitate center movement setting, deletion of the imaginary lines, the original display OFF state, the sample point display OFF state, a curve, an outline (painting OFF state), and the cursor display OFF state are displayed on the CRT 13 through the VRAM 14. In step 3, the body frame and the base line are displayed from the character information stored in the PMEM as in step 2. At this time, a currently displayed editing screen is shown in FIG. 80. Direction data is input by direction keys on the KBD 11 in step 4. In step 5, on the basis of the data input in step 4, the body frame and the base line are movably displayed instead of displaying all outlines so as to achieve high-speed display. During center movement, since a positional relationship between the body frame, the base line, and the outlines is required to be known, the above display mode does not pose any problem. In step 5, a movement amount is stored in a PMEM.

The next input is received in step 6, and the content of the input is determined in steps 7 to 10. As a result of determination, if the input represents a menu pick, this function is completed. If the input represents designation of the movement direction with direction keys, the movement FLAG is set OFF in step 18, and operations from step 5 are repeated. If the input is made by the return key on the KBD 11, sample point coordinates of all outlines are changed in step 11 from the movement amounts dx and dy stored (step 5) in the PMEM:

$$Px[i]=Px[i]-dx$$

$$Py[i]=Py[i]-dy$$

Figure 82:
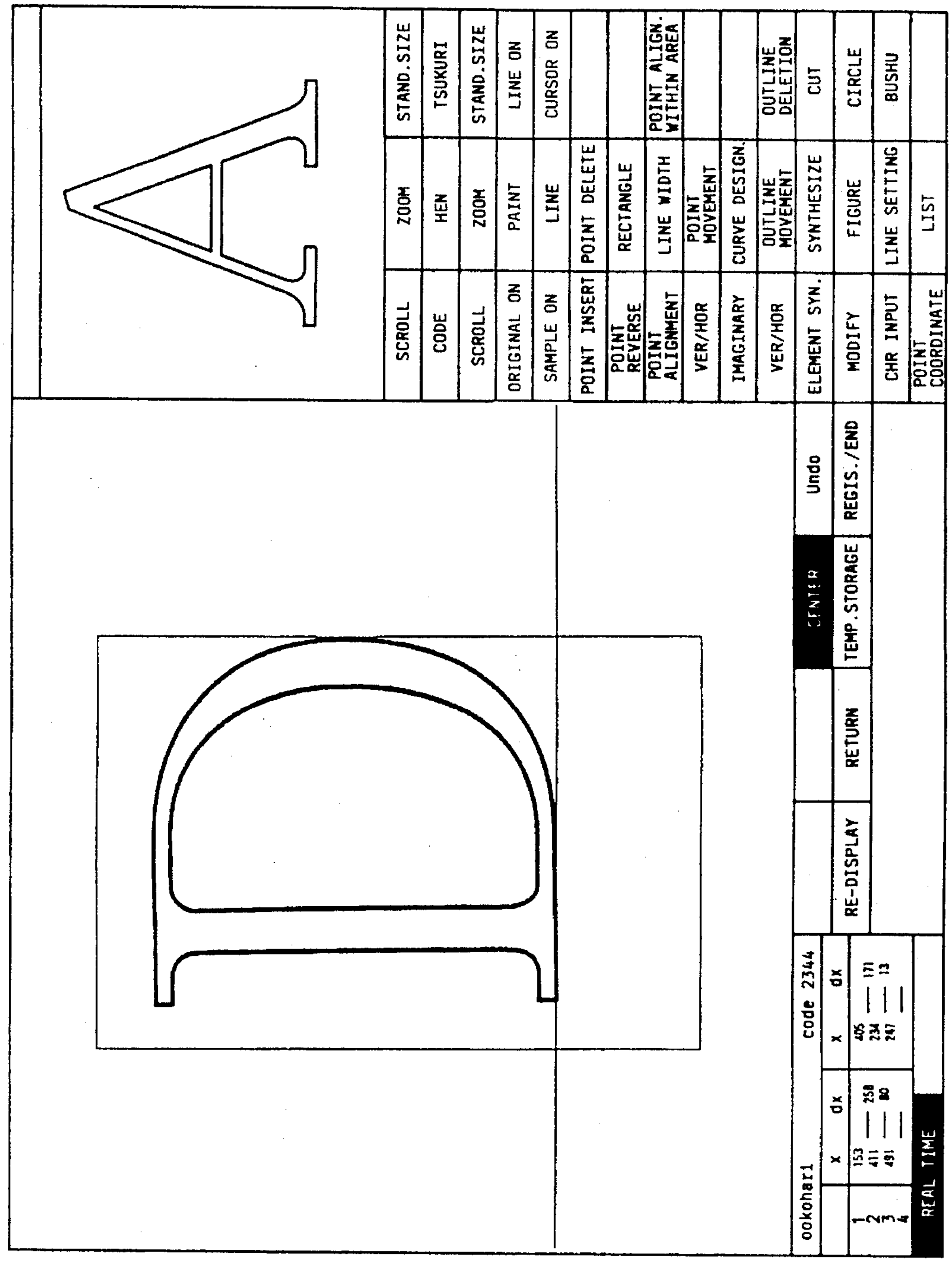
FIG. 82 is a view for explaining the center movement process of this embodiment.
Figure 83A:
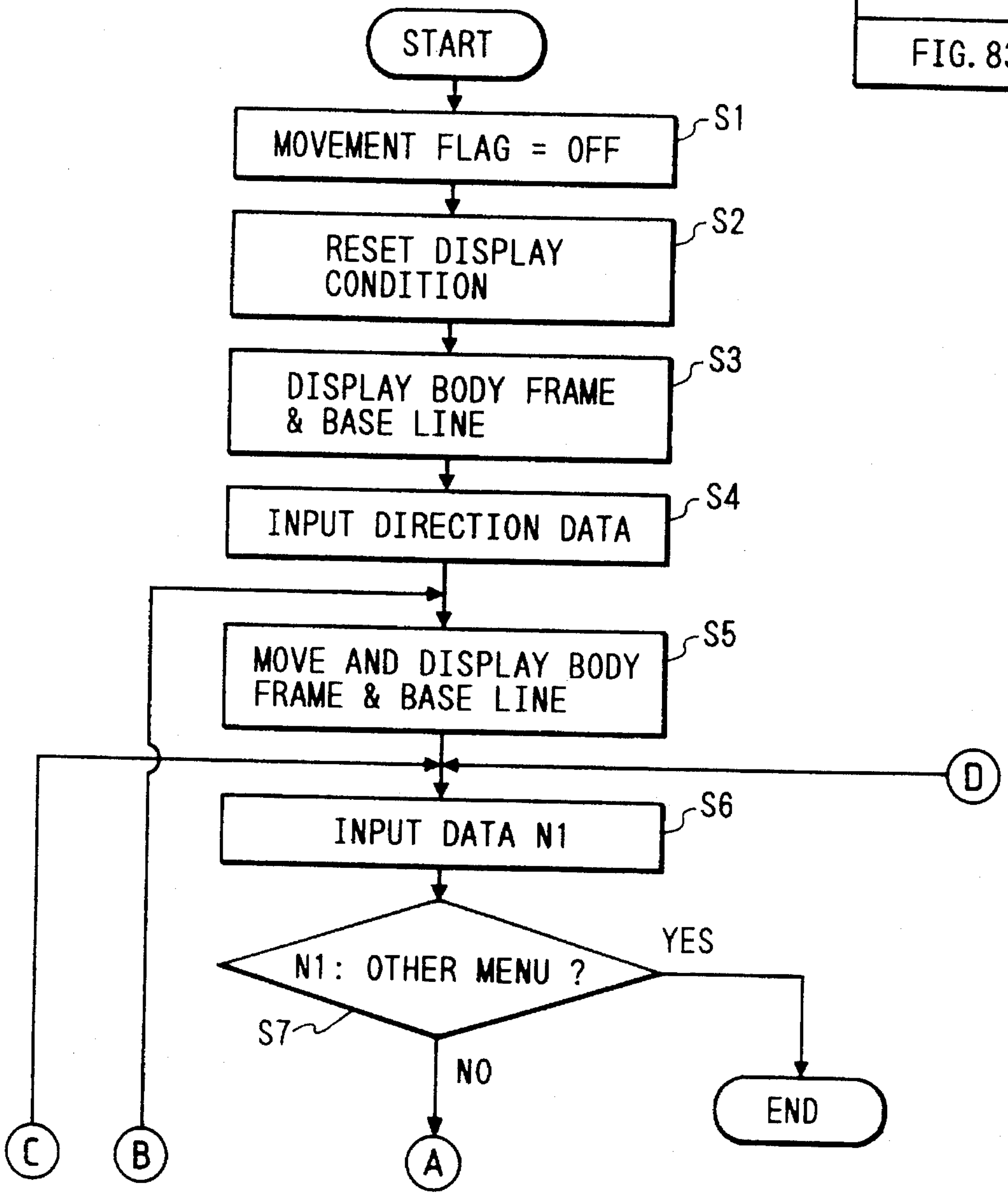
FIG. 83, consisting of FIGS. 83A and 83B, is a flow chart for explaining the center movement process of this embodiment.
Figure 83:
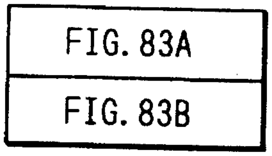
Figure 83B:
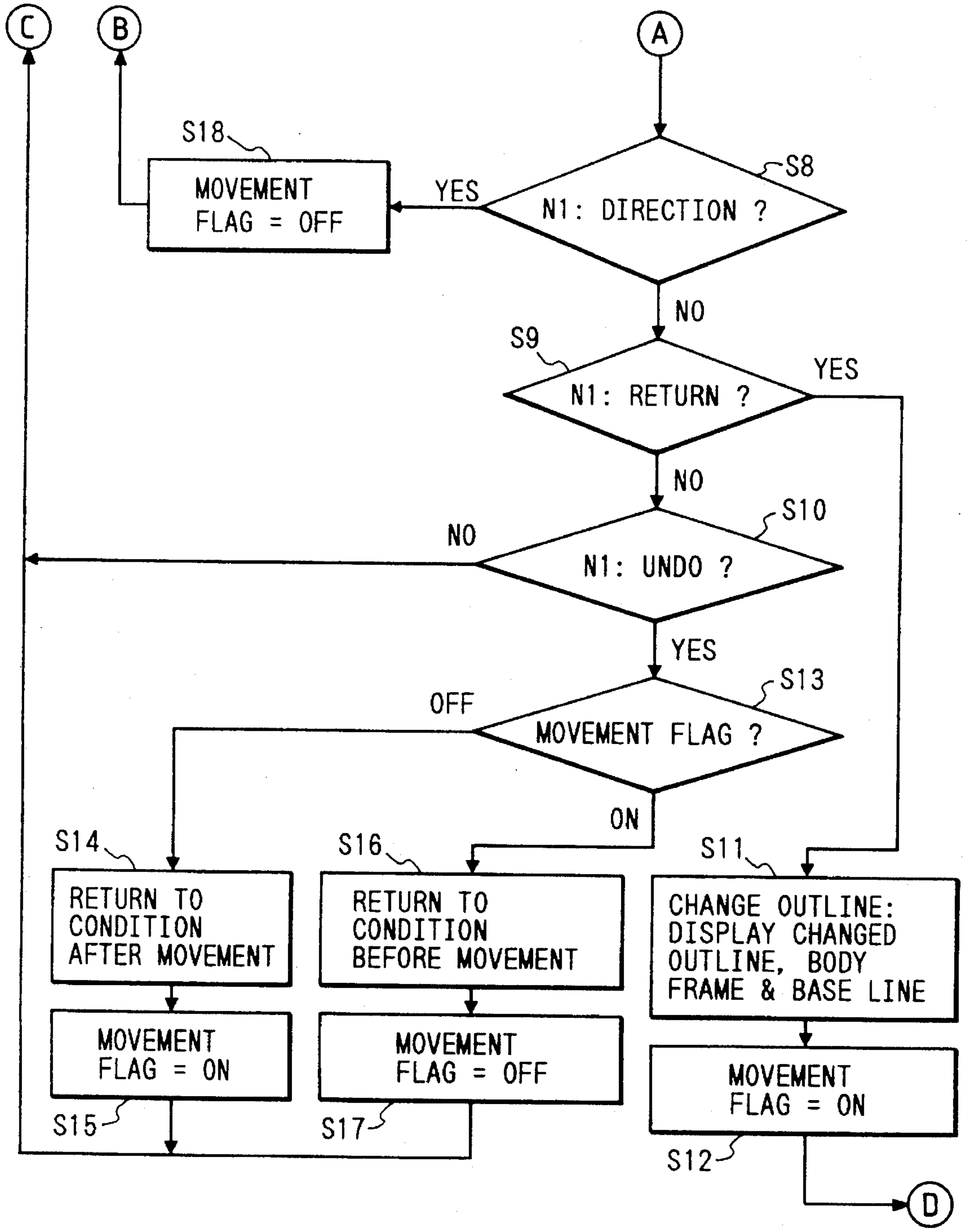

The changed outline data, the body frame (step 5) before the movement and the base line (step 5) before the base line are displayed on the CRT 13 through the VRAM 14, as shown in FIG. 82. The movement FLAG is set ON in step 12, and the flow returns to step 6. If the input in step 6 represents an undo operation (the right button of the PD 12) (step 10), the status of the movement FLAG is determined in step 13. If the movement FLAG is ON, the condition before movement is returned in step 16, and the movement FLAG is set OFF in step 17. If OFF in step 13, the condition after movement is returned in step 11. The movement FLAG is set ON in step 15. Return or re-movement of the moved outline data can be performed with only the right button of the PD 12.

Undo/Redo

The undo/redo menu is obtained by giving an undo.redo process as a menu and executes its function. For example, when this menu is picked by one of other menu picks at the end processes of step 6 in FIG. 31, the same process as in steps 11 and 12 in FIG. 31 is performed to realize the undo-redo function.

Point Coordinate Display

Figure 84:
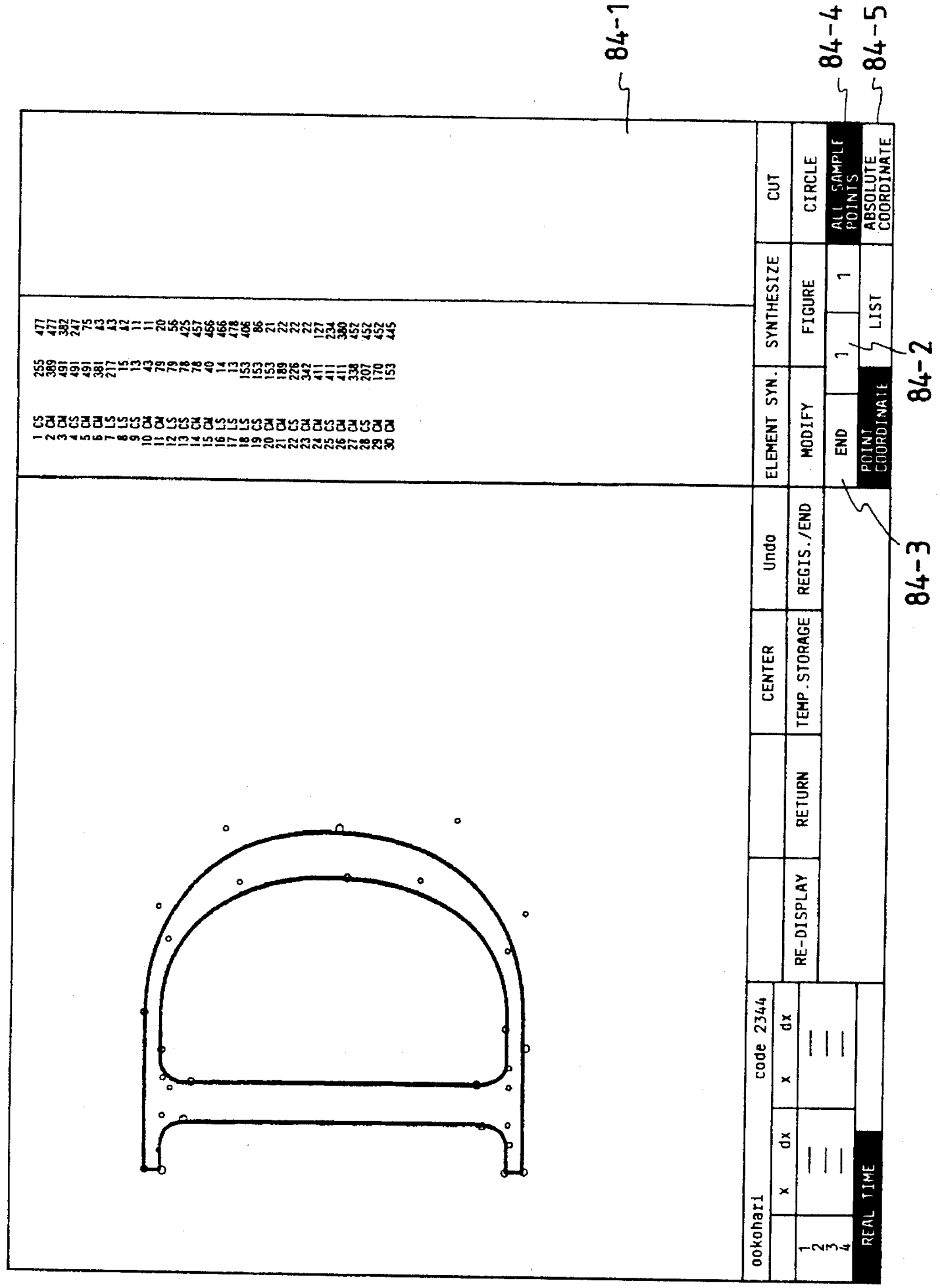
FIG. 84 is a view for explaining the point coordinate display process of this embodiment.

The point coordinate display S10-a in FIG. 4 will be described with reference to FIGS. 84 and 85.

The point coordinate function is to pick coordinate values of sample points of font data in two coordinate systems (the absolute coordinates and the design coordinates) by means of sample points in the editing area, thereby displaying coordinate values in an echo area or displaying a list of all the sample points.

The point coordinate display procedures will be described with reference to a flow chart in FIG. 85.

In step 1, all sample points in menu 4 and a coordinate system switching menu of menu 5 are displayed. In step 2, the apparatus waits for input of the next data N. If the input N is a sample point pick, the coordinate values picked in step 4 are displayed in the coordinate area. Display of the coordinate values in the coordinate area will be described in detail later.

If the input N represents a pick of menu 5 in step 5, a current coordinate system is switched between the absolute coordinate system and the design coordinate system in step 6. This menu is a toggle menu. At this time, if table 1 is displayed, coordinate values displayed in table 1 are rewritten. If the input N represents selection of menu 4, menu 2 for executing scrolling of table 1, menu 3 for ending scrolling, and table 1 for displaying a list of all sample points are displayed. Table 1 displays a point number, a point attribute, an x-coordinate, and a y-coordinate in the order named. If all the sample points cannot be simultaneously displayed in this area, the next page is looked by the scroll menu. If the input N represents a pick of menu 2 in step 9, table 1 is scrolled (step 10). A display of the next page is expressed by ↑, and a display of the next page is expressed by ↓. When the input represents a pick of the ending menu or another menu, the ending process (step 12) is performed, and the flow is ended. The ending process includes return of the menu and deletion of table 1 if it is displayed.

Figure 86:
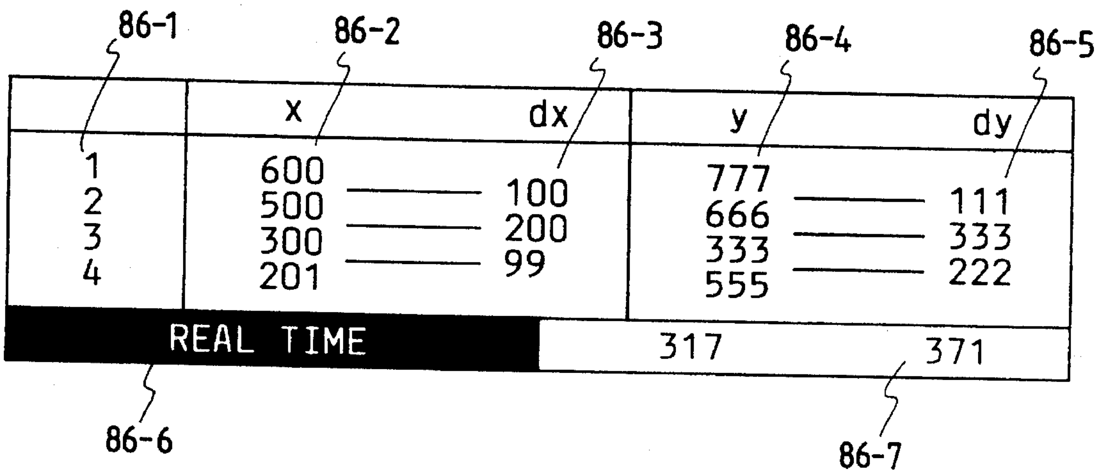
FIG. 86 is a view for explaining the point coordinate display process of this embodiment.

The echo of the coordinate values in the coordinate area will be described with reference to FIG. 86.

A method of displaying coordinate values of picked sample values is as follows. A column 86-1 indicate echoed coordinate numbers 1 to 4. A column 86-2 indicates x-coordinates of the picked sample points in the current coordinate system. A column 86-4 indicates y-coordinates of the picked sample points in the current coordinate system. When the y-coordinate is displayed up to the fourth one, the echo of the next coordinate is set to be the fourth echo position. The coordinate value located at the fourth echo position is shifted to the third echo position, and scrolling is performed upward. Columns 86-3 and 86-5 indicate differences between the values of the current points and values of the immediate preceding echoed points, thereby detecting a distance between two points. Echo to this area can be performed as in sample point pick operations for other character forming operations in addition to the function of the point coordinate menu. A column 86-6 represents a toggle menu for determining whether a real-time echo of coordinates is to be performed. If this toggle menu is ON, coordinate values during dragging of the sample points are displayed in an area 86-7 in real time.

List Display

Figure 87:
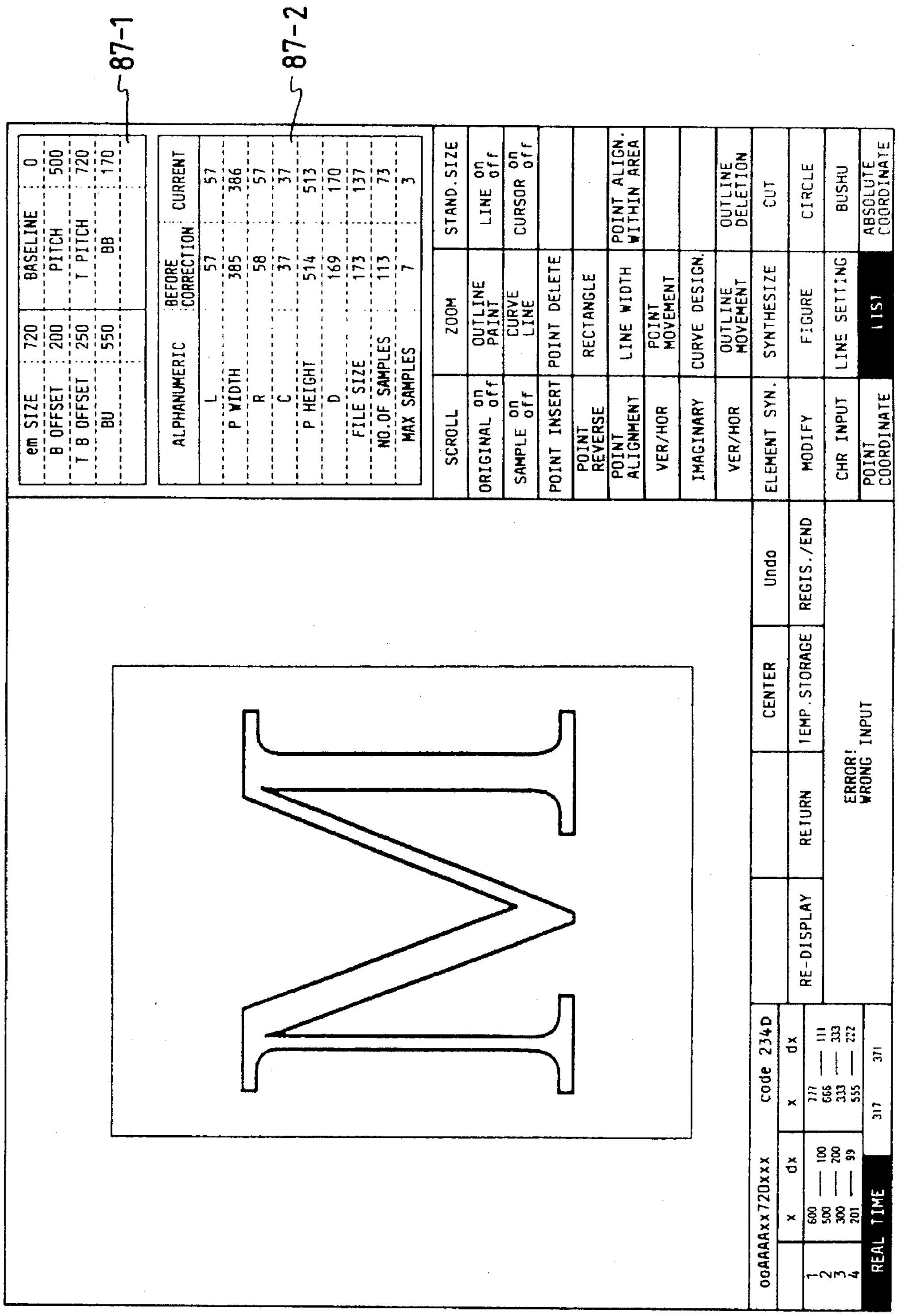
FIG. 87 is a view for explaining a list display process of this embodiment.

The list display will be described with reference to FIG. 87.

The list function is to display style information of a character of currently modified font data and information except for sample point coordinate values of this character. An area 87-1 displays information associated with the style. An area 87-2 displays values of the respective pieces of character information representing the current values and values before modification in units of items. The current values correspond in horizontal positions to the values before modification.

Character Information Input

The character information is not font data such as sample point coordinates and point attributes constituting characters. That is, the character information is defined not as common style values such as a character height or its width, but as unique coordinate system information of each character. The character information can have a common value as a default value in all styles or can have a unique value in units of characters. In other words, the character information may include information having· a predetermined value common in all styles, which cannot be set in units of characters.

The character information input function is to input character information set in units of characters. A value set in this function is stored in the font data file and is stored together with the font data in the disk 3.

Figure 88:
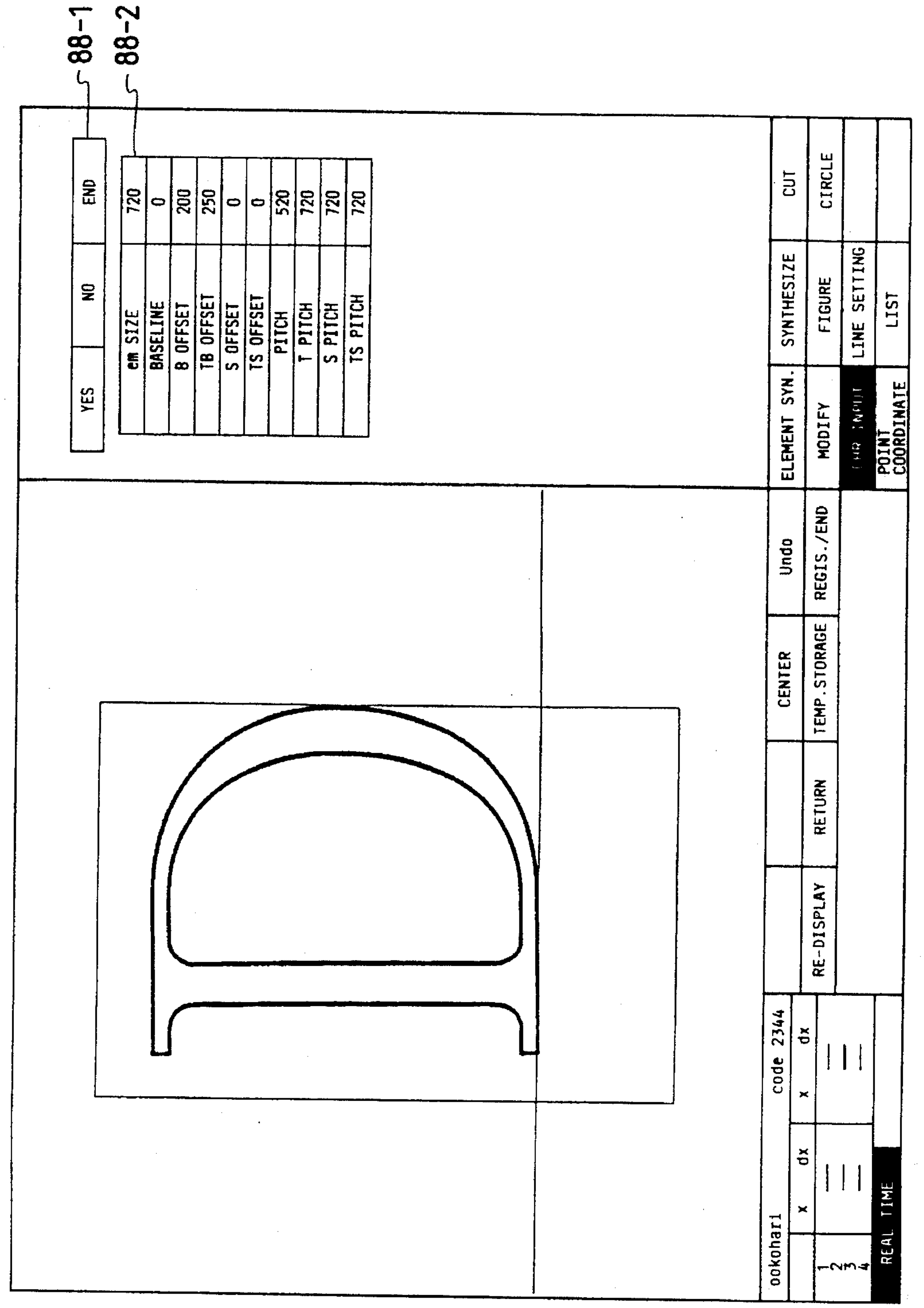
FIG. 88 is a view for explaining a character data input process of this embodiment.
Figures 89, 89A:
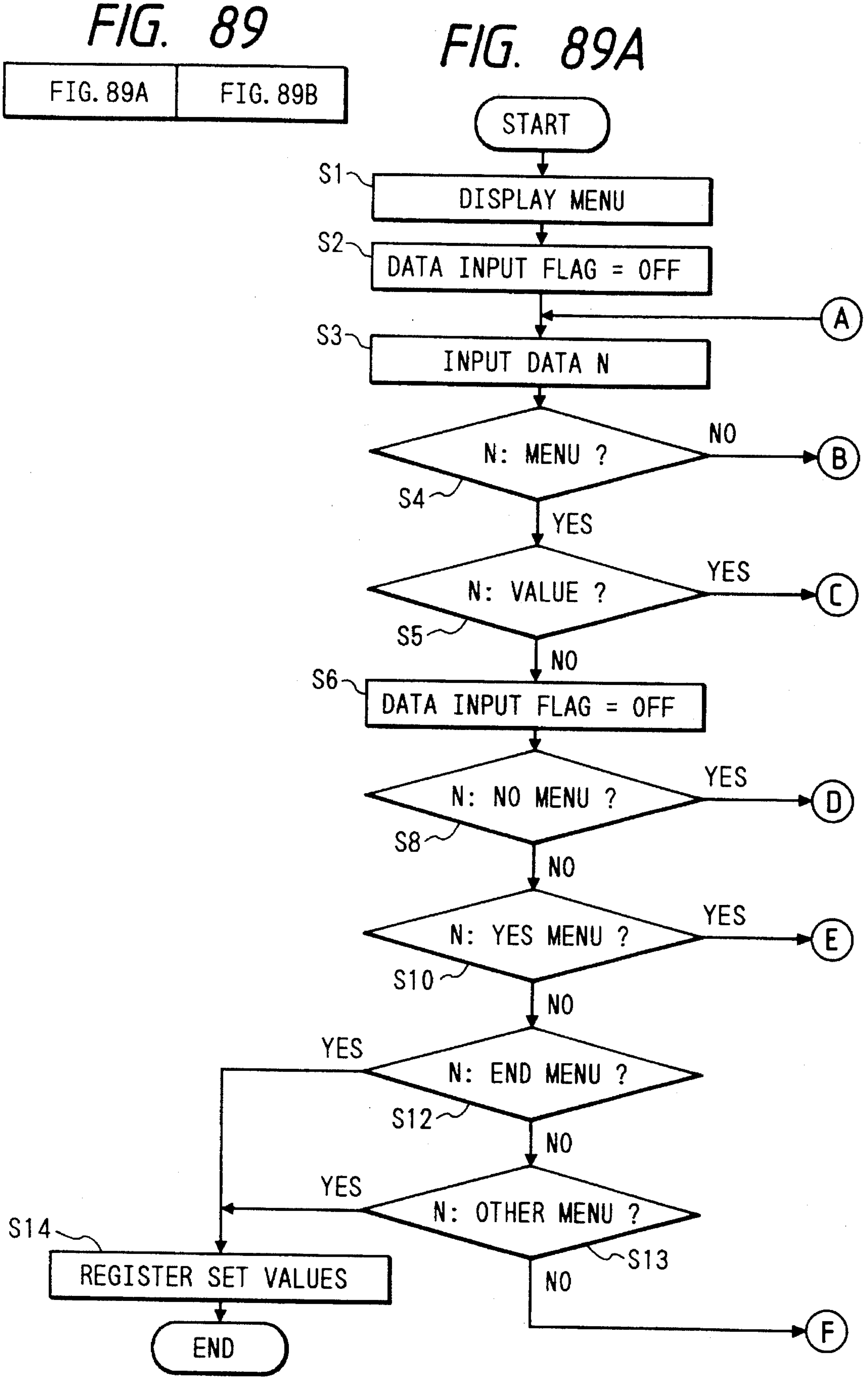
FIG. 89, consisting of FIGS. 89A and 89B, is a flow chart for explaining the character data input process of this embodiment.
Figure 89B:
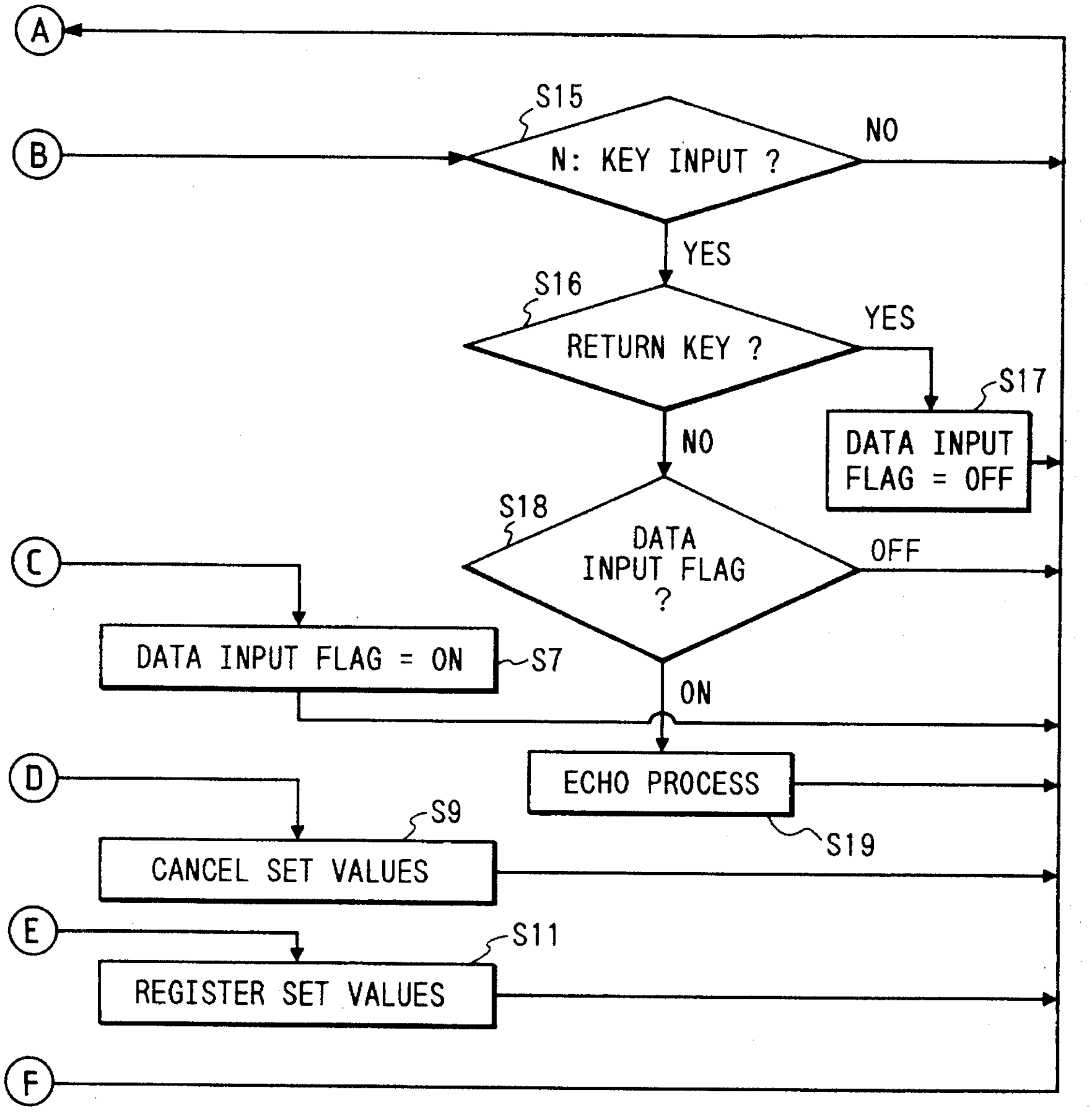

The character information input procedures will be described with reference to the editing screen of FIG. 88 and the flow chart of FIG. 89.

When the character information input menu is picked, the character information input menu (FIG. 88) is displayed in step 1. A column 88-1 displays three menus, i.e., "YES", "NO", and "END". A table 88-2 shows character information names and their values. In step 2, a data input flag is set OFF. The apparatus waits for the next input data N in step 3. If the data input N represents a value input menu, a data flag is set ON, and the flow returns to step 3. If the input N does not represent the value input menu, the data input flag is set OFF (step 6), and N is determined in step 8. If the input represents a pick of the "NO" menu, a new set input value is returned to the value before the start, and the flow returns to step 3. If the input N represents a pick of the "YES" menu, the currently input value is checked, and the set value is registered (step 11). The flow then returns to step 3. If the input N represents the "END" menu or another menu in step 12 or 13, the input value is checked in step 14 as in step 11. The set value is registered, and the flow is ended.

If the input N represents designation except for the menu pick in step 4, and if the input N is a key input from the KBD 11 in step 15, then the flow advances to step 16. If the key input is determined to be performed by the return key, the data input flag is set OFF, and the flow returns to step 3. If the input N represents a key input except for a return key input, and if the data flag is set OFF, no operation or work is performed, and the flow returns to step 3. However, if the data input flag is set ON, the input value is echoed to the value input menu in step 19, and the data input process is performed. The apparatus waits for the next data input in step 3. That is, the input value from the KBD 11 can be set in the value input menu only when the data input flag is ON.

This input value can be set while the value input menu is picked and the return key picks another menu. During this period, the data N input in step 3 can be echoed one by one to the value input menu.

Line Setting

The line setting S11-6 in FIG. 4 will be described below.

The line setting function is to allow an operator to set and display a plurality of auxiliary lines in an editing area independently of character outline data. These auxiliary lines are called lines. The lines include a line set parallel to the x-axis direction and a line parallel to the y-axis direction.

The lines set in the line setting function can be displayed/nondisplayed at an arbitrary timing during character forming in the line ON-OFF menu of the display control menu.

The set line information is registered in the disk 3 by each operator and can be loaded and referred to in the PMEM 6 unless setting is changed or deleted.

These lines are mainly used as auxiliary lines as references for judging the size, height, and width of characters during character forming. This auxiliary line is commonly determined in all the styles to balance the characters.

The line setting procedures will be described with reference to editing screens in FIGS. 90 and 91 and a flow chart in FIG. 92.

When the line setting menu is picked, a line setting result is displayed, as shown in FIG. 90. A column 90-1 displays "YES", "NO" and "END" menus. A table 90-2 shows line names, positions, and display state switching inputs.

In the table 90-2, letters A to L and a to e in the symbol column correspond to the lines A to L and a to e of the editing area, respectively. Letters A to L correspond to the horizontal lines, while letters a to e correspond to the vertical lines. That is, as values input in the position input menu column, y-coordinates are input for letters A to L, and x-coordinates are input for letters a to e. Display/nondisplay of a line is set in the display start switching menu column. This is a menu for switching the display flag in units of lines. In the display mode, the corresponding line is displayed in the editing area.

In step 1, only a line whose display flag is ON in accordance with the current setting state is displayed in the editing area.

In step 2, the data input flag is set OFF. The next data N is input in step 3. If the input N represents a menu pick in step 4, and if the menus picked in steps 5 and 6 are the name input menu or the position input menu, the data input flag is set ON in step 8. The flow then returns to step 3, and the apparatus waits for the next input. Otherwise, the flow advances to step 9. If the input N represents a display switching menu in step 9, the ON/OFF state of the display flag of the picked line is switched, and the flow returns to step 3. If the input N represents the "NO" menu, the line name, the position, and the display flag, all of which are newly set in step 12, are returned to the conditions before the start, and the flow returns to step 3. If the input N represents the "YES" menu, each line and the body frame are displayed in the editing area in accordance with the display area in step 14, and the apparatus waits for the next input in step 3. If the input N represents the ending menu or another menu pick in step 15 or 16, the currently input set menu is checked and registered. Steps 18 to 21 are executed when the input N does not represent a menu pick. When the input is determined to be a return key input, the data input flag is set OFF in step 19, and an input process by mainly the KBD 11 is performed, and the input operations are completed. If the input N represents an input except for the return key input in step 18, and if the data input flag is ON, i.e., if the data input enable state is set, the input value is actually echoed to the menu area, and the input process is performed. The apparatus then waits for the next data input in step 3.

Figure 91:
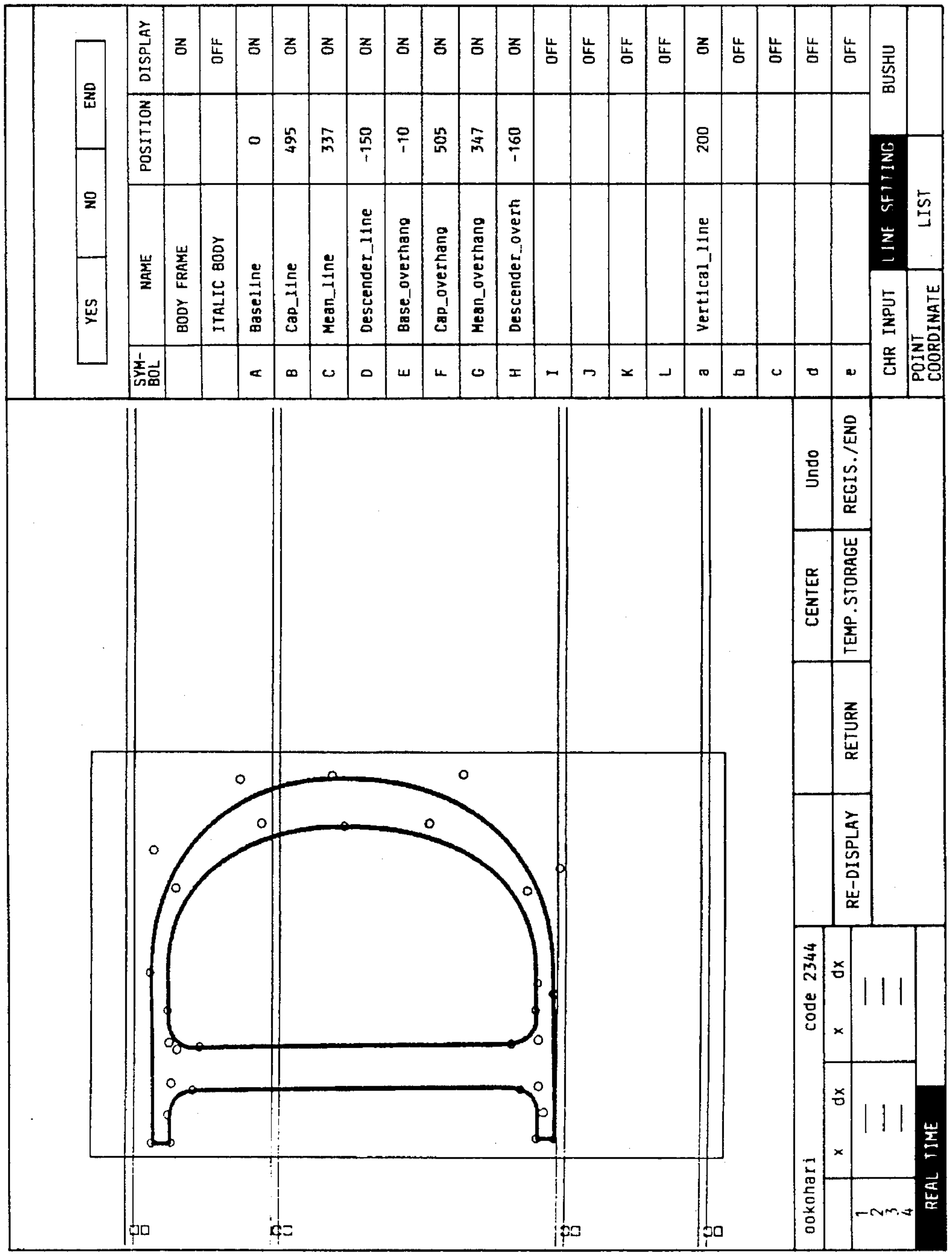
FIG. 91 is a view for explaining the line setting process of this embodiment.
Figures 92, 92A:
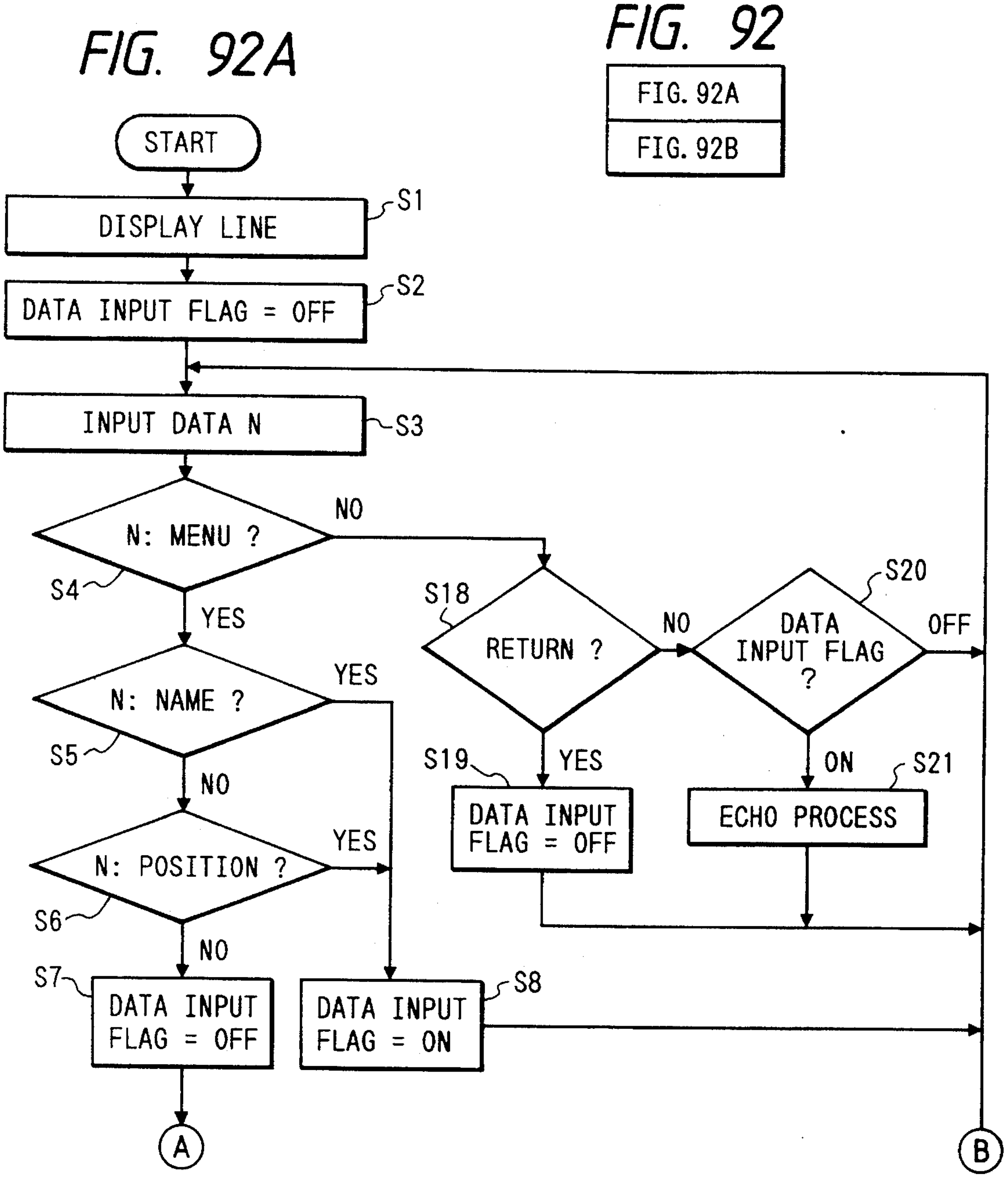
FIG. 92, consisting of FIGS. 92A and 92B, is a flow chart for explaining the line setting process of this embodiment.
Figure 92B:
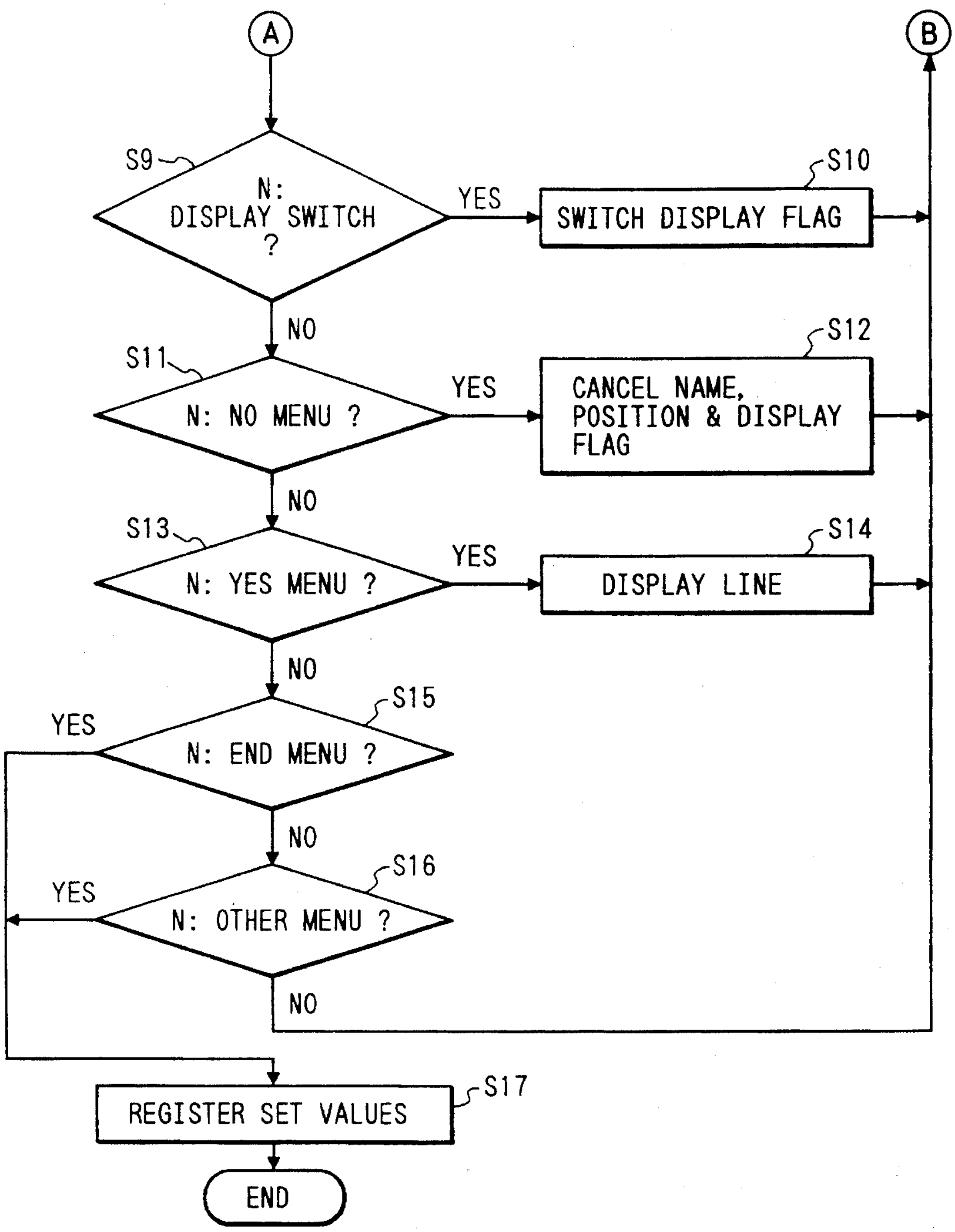

FIG. 91 shows a state wherein a vertical line is set in the symbol column a. This line can be referred to in the line ON/OFF menu.

Character Data Registration/End

Figure 93:
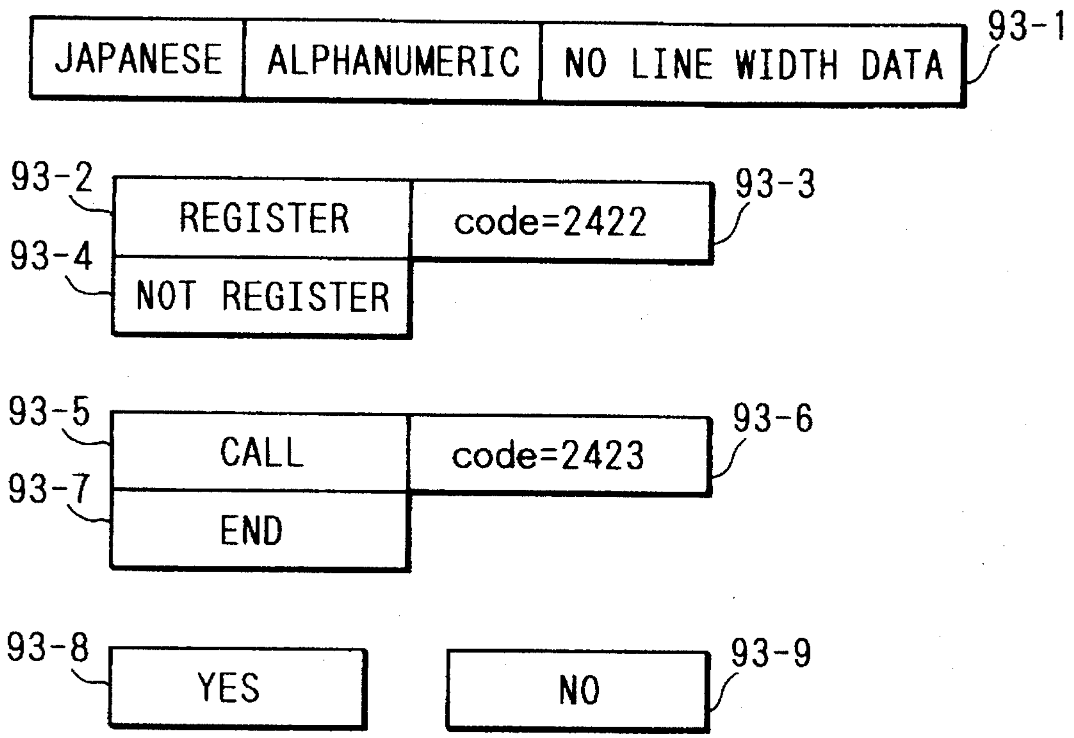
FIG. 93 is a view for explaining character data registration/completion-process of this embodiment.
Figure 94:
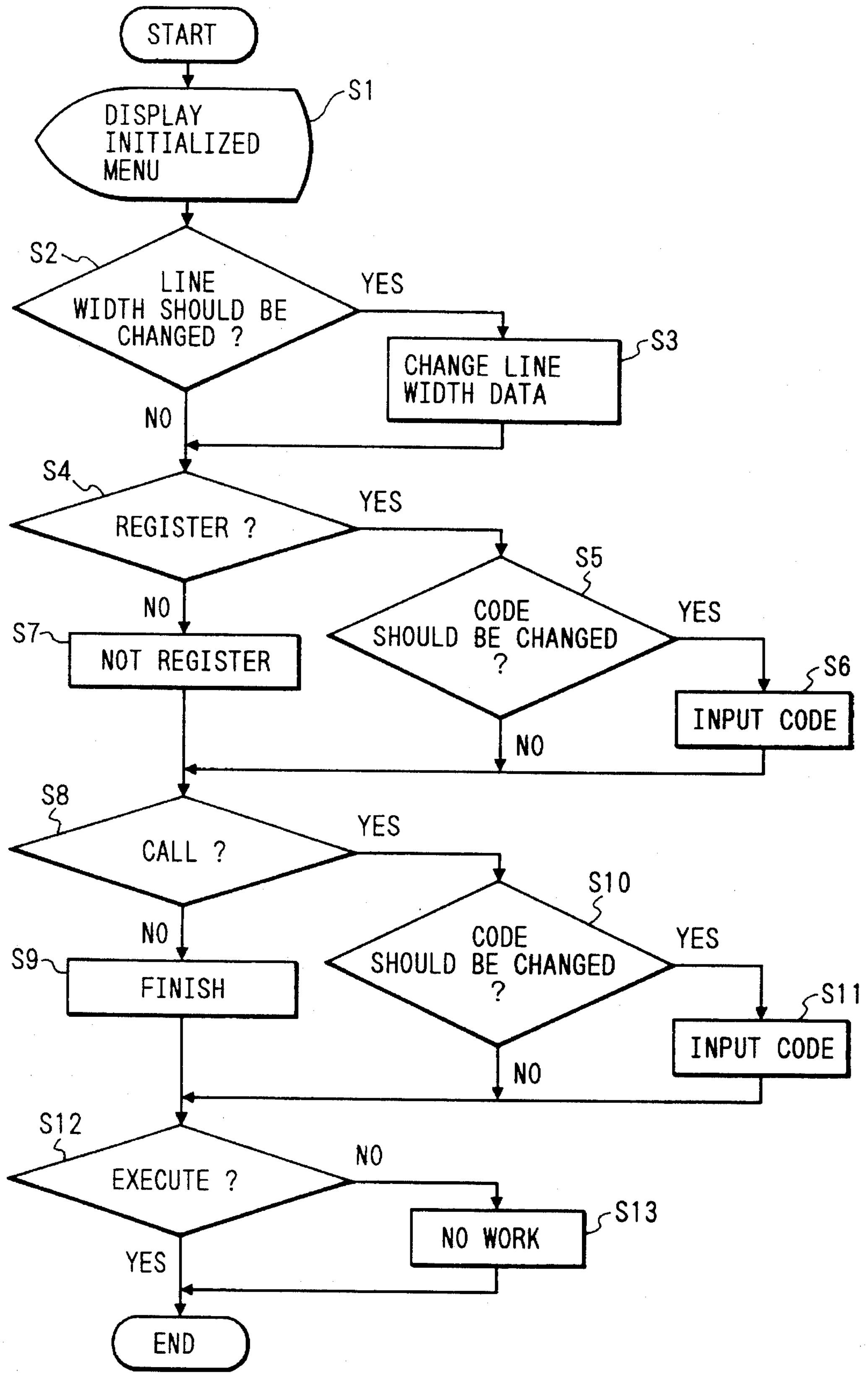
FIG. 94 is a flow chart for explaining the character data registration/completion process of this embodiment.

This menu is picked to display a registration/end screen in FIG. 93. Step numbers No.(Sn) are numbers in FIG. 94.

A menu in the default state is displayed (S1). If necessary, an appropriate menu in 93-1 is picked with the PD 12 to change line width data (S2 to S3).

Data registration can be performed by picking "Code=2422" (93-3) with the PD 12 and inputting a value from the KBD 11, thereby changing the code (S6). When "NOT REGISTER" (93-4) is selected with the PD 12 to invalidate modification of the character (S7).

After the registration, "Code=2423" (93-6) as the default value for a character to be called is picked with the PD 12, and an arbitrary value can be input from the KBD 11 (S11). When "END" (93-7) is picked with the PD 12 not to call the next code, the registration/end menu can be completed (S9).

Finally, "YES" (93-8) is picked with the PD 12 to execute this menu. It is possible to pick "NO" (93-9) with the PD 12 to cancel the registration operation (S13).

[Display Checking]

The display checking function is started by picking the display checking menu. Various operations are performed on the basic screen shown in FIG. 95 and will be described with reference to FIG. 95. A menu 95-1 is a list of font data file names to designate a font data file to be checked. An area 95-2 displays the font data file name selected by the menu 95-1. An area 95-3 designates a display character code area designated with the PD 12 and the KBD 11. An area 95-4 is an area for designating a resolution of an output device with the PD 12 and the KBD 11. An area 95-5 is an area for designating a display point size. An area 95-6 is a menu area for designating a kind (to be described later) of painting display. A menu 95-7 is a menu for designating an end of display checking. By selecting this menu, the flow returns to the control section. A message area 95-8 displays error messages for various operations. A menu 95-9 designates scrolling (page return) of the list of font data file names.

This menu is designated with the PD 12 or the KBD 11.

The list of font data file names in the menu 95-1 can be formed by searching the list in the disk 3 at the start of display checking.

Quality Check

Figure 95:
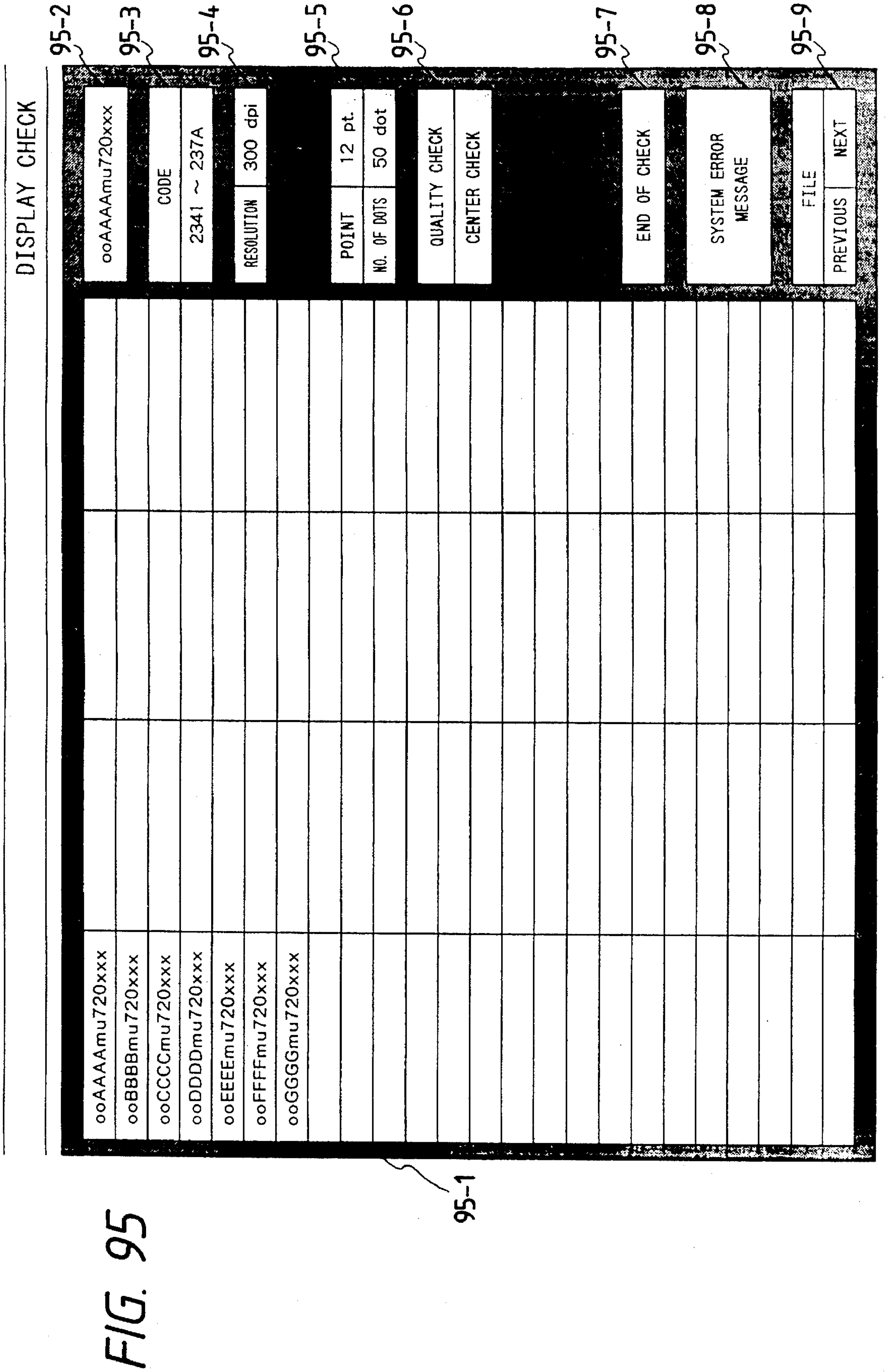
FIG. 95 is a view for explaining a display check process of this embodiment.
Figure 96:
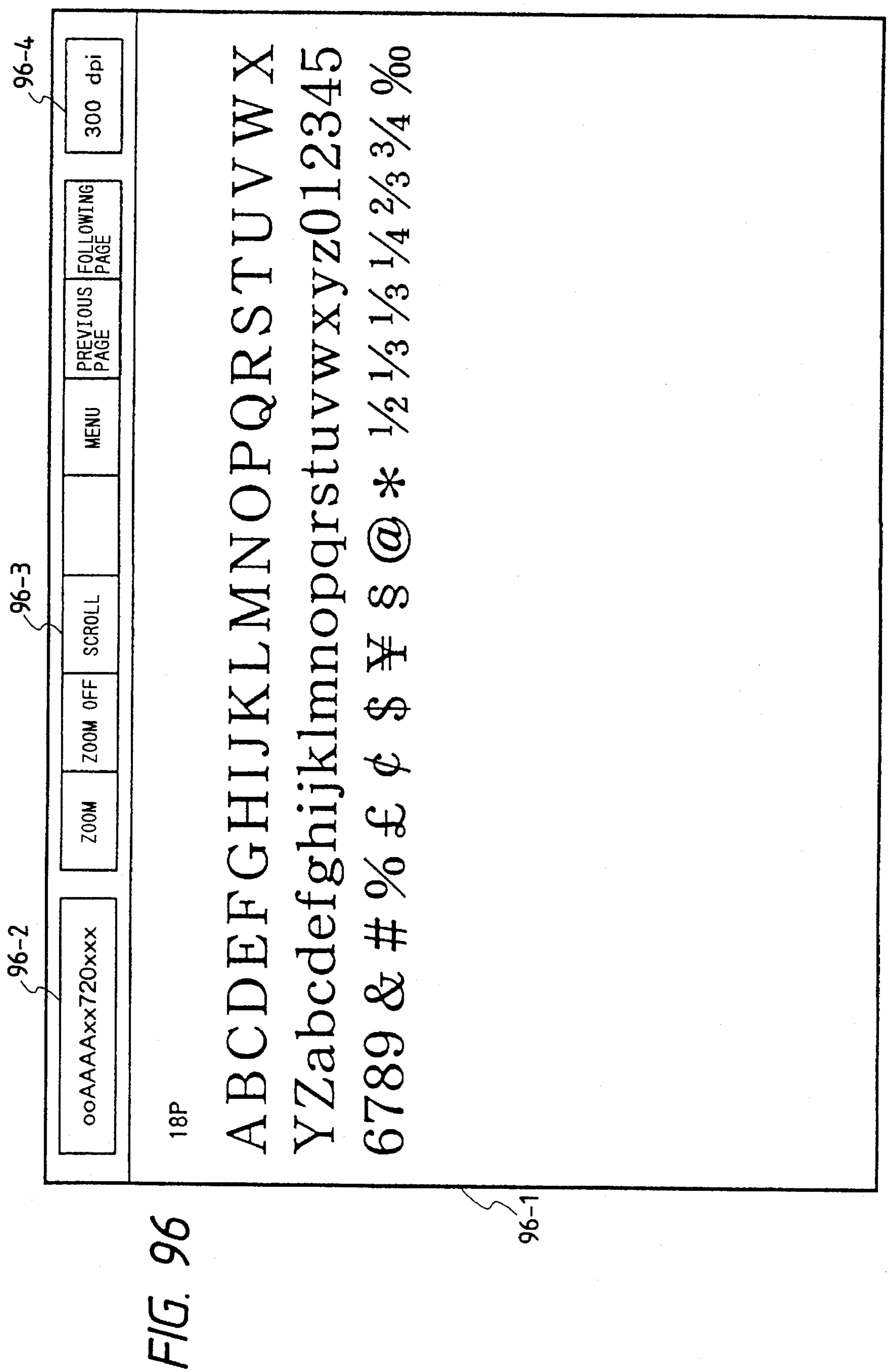
FIG. 96 is a view for explaining the display check process of this embodiment.

FIG. 96 shows a screen displayed upon selection of a quality check 95-6 of FIG. 95. This screen has a data display area 96-1. An area 96-2 displays a font data file name currently displayed and selected in the menu 95-1 of FIG. 95. A menu group 96-3 is used to control a display state of the data display area 96-1. An area 96-4 displays a resolution of an output device designated in the area 95-4 in FIG. 95.

Center Check

The contents displayed in a menu 96-1 in FIG. 96 are used for center check and are substantially the same as those in 96-2 to 96-4. When the menu 96-3 is picked, the display state is returned to that in FIG. 95.

Figure 102:
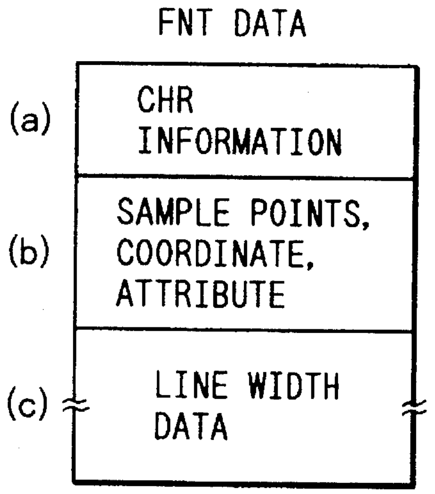
FIG. 102 is a view for explaining the printer output process of this embodiment.
Figure 103:
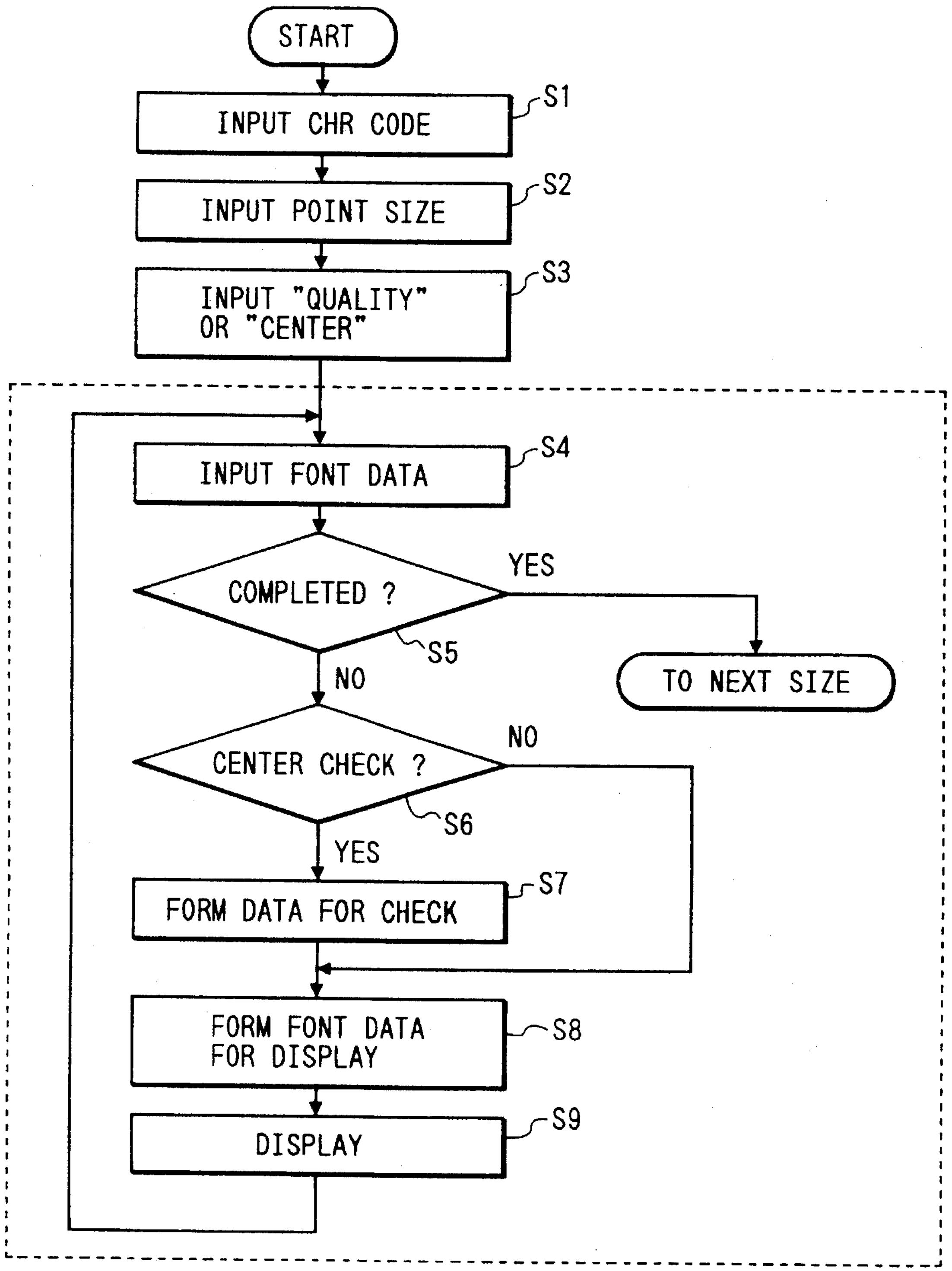
FIG. 103 is a flow chart for explaining the printer output process of this embodiment.

The details of the quality check and the center check are the same as the printer outputting S5 (to be described later). FIGS. 102 and 103 and the details of the printer outputting are referred to for the details of the quality check and the center check. However, in these checks, output devices are different. That is, in display checking, a display in step 9 of FIG. 103 is performed on the CRT 13 through the VRAM 14.

[Printer Outputting]

The printer outputting function is started by picking the printer output menu a-12 in FIG. 8. Various operations are performed on the basic screen shown in FIG. 97 and will be described in detail with reference to FIG. 97.

A menu 97-1 is a list of font data file names and designates a font data file to be output. An area 97-2 displays the font data file selected by the menu 97-1. An area 97-3 designates an output character code area with the PD 12 and KBD 11. An area 97-4 is an area representing a resolution of an output device (a printer in this case). An area 97-5 designates a kind (to be described later) at the time of an outline output. A menu 97-6 designates a painting output size and its kind (to be described later). A menu 97-7 designates character information as a numeric value. A menu 97-8 is a menu for designating an end of printer output. By selecting this menu, the flow returns to the control section. A message area 97-9 displays error messages for various operations. A menu 97-10 designates scrolling (page up/down) of the list of the font data file names in the menu 97-1.

This menu is designated with the PD 12 or KBD 11.

The list of font data files in the menu 97-1 is formed by searching the files in the disk 3 at the start of printer outputting function.

The outline display will be described below.

Figure 97:
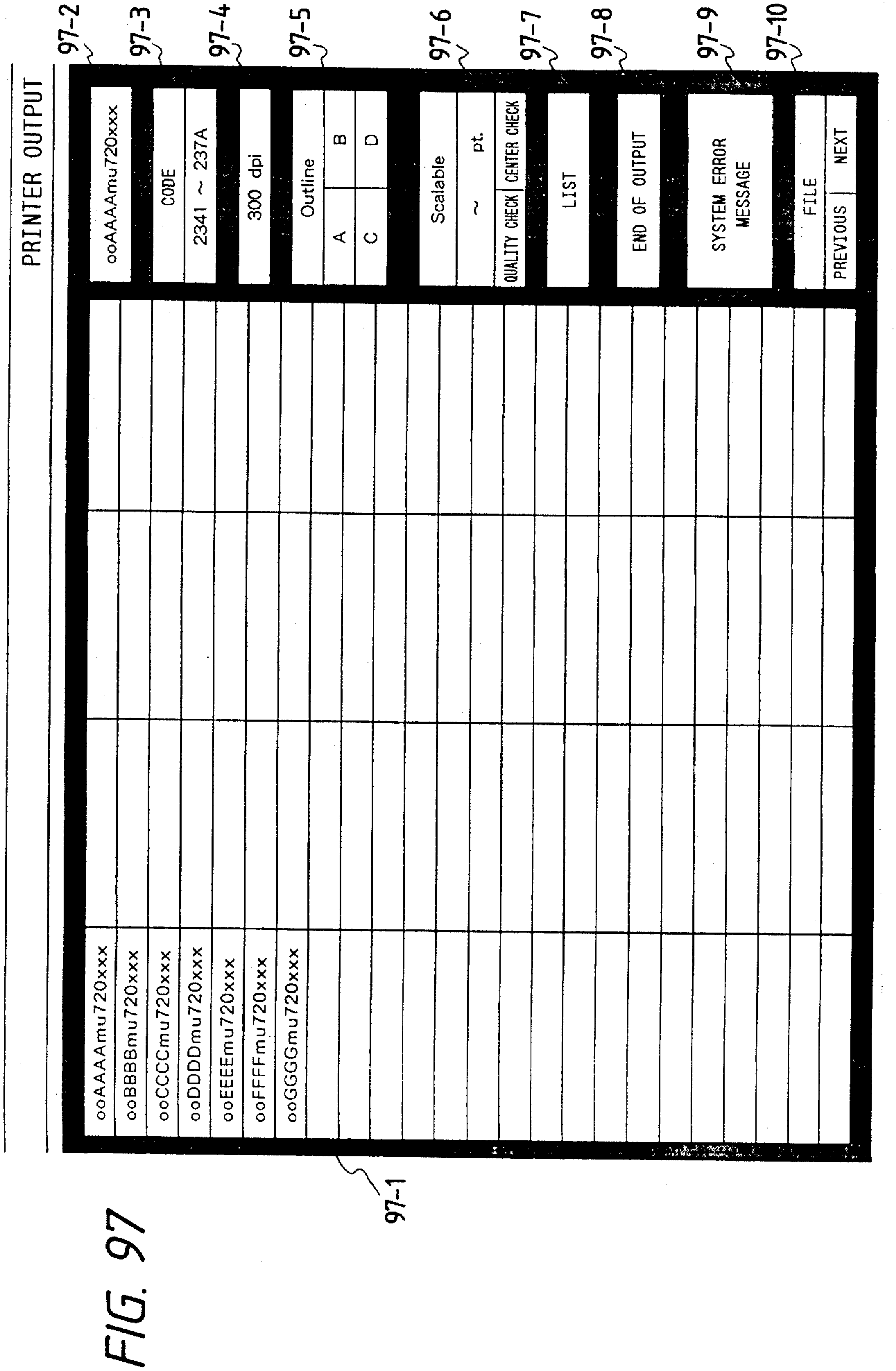
FIG. 97 is a view for explaining a printer output process of this embodiment.

The outline display is performed by designating a character code area in the area 97-3 in FIG. 97 and picking A, B, C, or D in the area 97-5 of FIG. 97 with the PD 12.

The contents of the display objects A, B, C, and D are described below. Letter A is displayed such that outlines are defined by coordinate values (i.e., 400×400 dots) which are ½ the data of the font data file if data in each font data file is defined by 800×800 dots. Letter A is used for a rough quality check. Letter B is similar to letter A but its inner outline is displayed by a dotted line. Letter C is displayed such that one dot of data of the font data file is caused to correspond to one dot of a printer. At this time, a section between sample points is displayed by a solid line, and an outline is displayed by a dotted line. In addition, line width information known to prevent quality degradation at a specific character size is displayed together with a parent-child relationship. Letter C is used to error detection of one dot of a sample point and to check validity of the line width information. Letter D has the same display size as that of letter C, but a section between sample points is displayed by a dotted line and outlines are displayed by solid lines.

Figure 98:
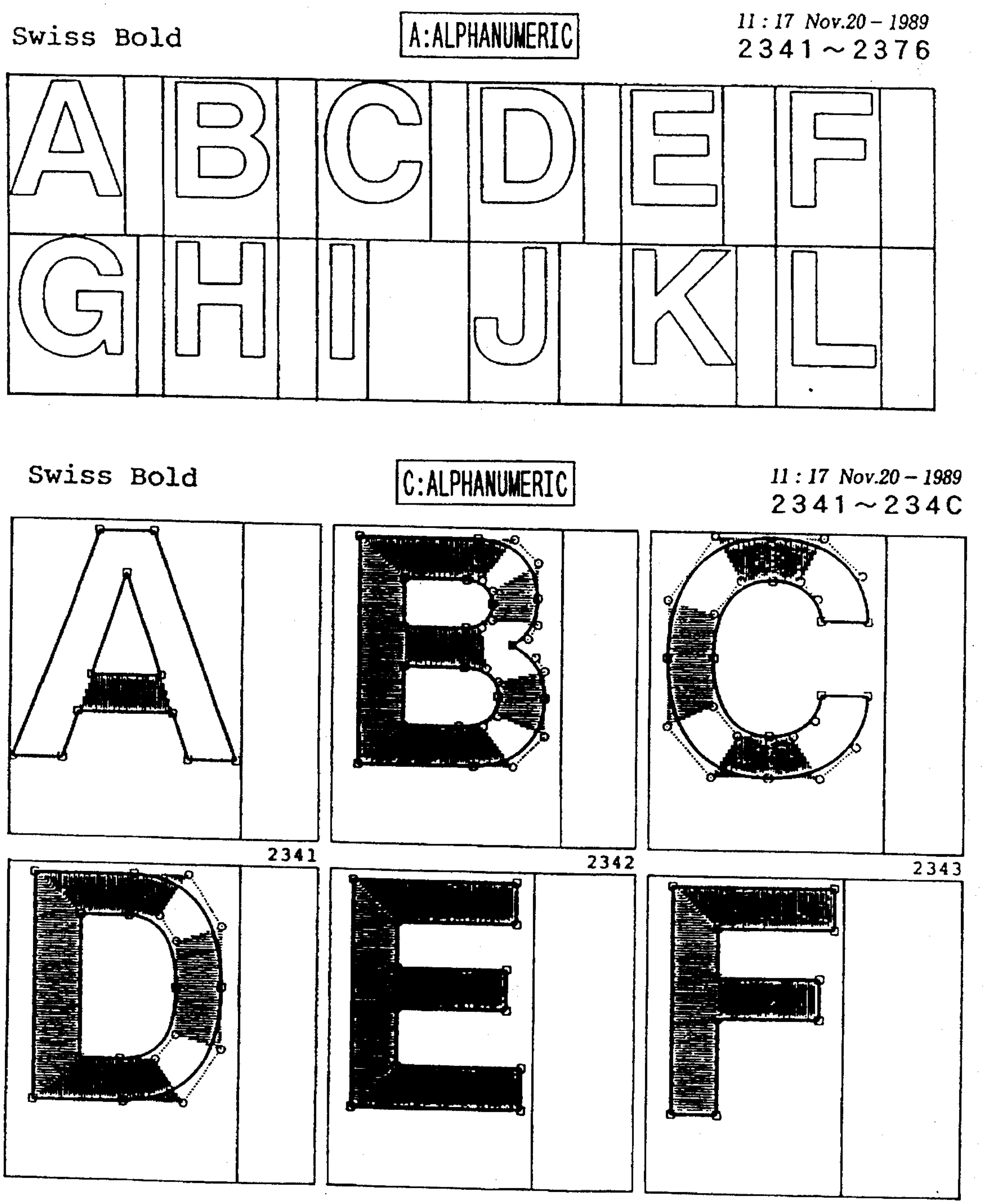
FIG. 98 is a view for explaining the printer output process of this embodiment.
Figure 101:
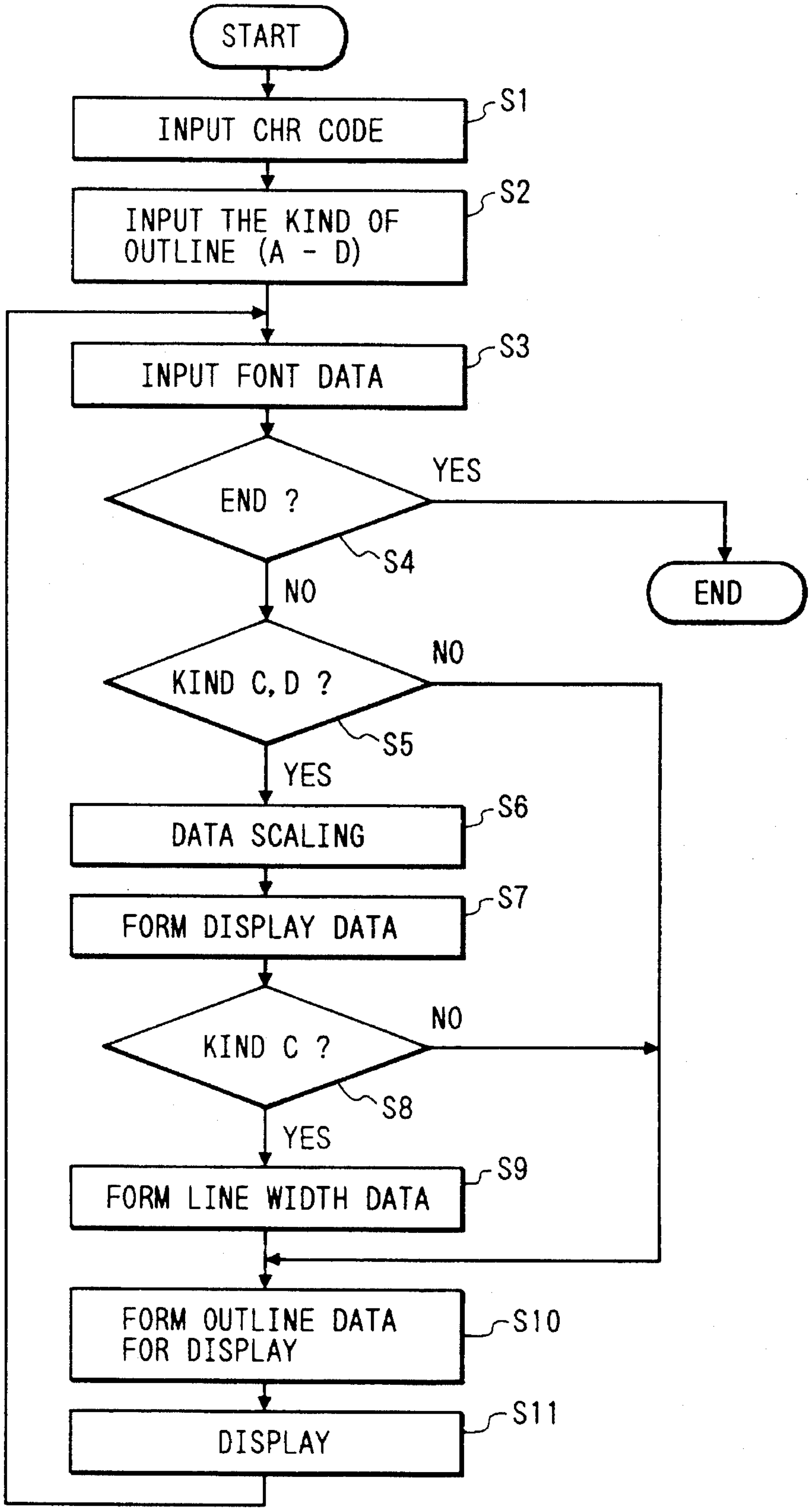
FIG. 101 is a view for explaining the printer output process of this embodiment.

Outline display process procedures will be described with reference to a flow chart in FIG. 101 and an output shown in FIG. 98.

In step 1, start and end codes designated in the area 97-3 in FIG. 97 are stored in the PMEM 6. In step 2, the kind of outline selected in the area 97-5 is stored in the PMEM 6. Operations from step 3 are repeated. In step 3, the font data from the start code to the end code stored in the PMEM 6 is read from the font data file from the disk 3 and is stored in a form (FIG. 102) in the PMEM 6. It is determined in step 4 whether the font data is output up to the end code or data is left in the font data file. The outline display process is then ended. In step 5, the kind of outline stored in the PMEM 6 in step 2 is determined. If the kind of outline is C or D, the data is scaled to (a) character information and (b) sample points, coordinates, and an attribute in FIG. 102 in the PMEM 6. In step 7, display data is formed with reference to (b) the sample points, coordinates, and attribute and is stored in the PMEM 6. The kind of outline is determined again in step 8. If the kind of outline is determined to be C, a line segment representing the parent-child relationship of the line width information is generated on the basis of (b) the sample points, coordinates, and attribute, and (c) line width data in FIG. 102 and is stored in the PMEM 6. The line segment is converted into outline display data (line segment string data) from (b) the sample points, coordinates, and attribute in FIG. 102. The outline display data is stored in the PMEM 6. In step 11, data formed in steps 7, 9, and 10 and stored in the PMEM 6 are sent to the image data output unit 10, and are output from the PRT 9, as shown in FIG. 98.

Painting display will be described below.

The painting display is performed such that a character code area is designated in the area 97-3 of FIG. 97, a point size area is input by the menu 97-6 of FIG. 97. The "quality check" or "center check" menu is picked with the PD 12.

The display contents of the "quality check" and "center check" menus are described below.

In the "quality check", a so-called "composition" of the font having the same condition as that of a product is formed at a designated point size. The composition is used for the quality check. In the "center check", a font having the same condition as that of a product is sandwiched between center check characters at a designated point size and is displayed.

The painting display process procedures will be described with reference to a flow chart in FIG. 103 and an output shown in FIG. 99.

In step 1, an output character code area is input and stored in the PMEM 6. In step 2, an output point size is input and stored in the PMEM 6. In step 3, data representing that the menu selected by the menu 97-6 is the "quality check" or the "center check" is stored in the PMEM 6. The processes in steps 4 to 9 are repeated by the number of times corresponding to the designated point size. In steps 4 and 5, as in steps 3 and 4 of FIG. 101, font data is loaded from the disk 3 and determines the end of the data and the like. In step 6, the kind of output designated in step 3 and stored in the PMEM 6 is determined. In the case of the "center check", a check pattern is generated in step 7. As shown in the center check of FIG. 99, a pattern is a normal letter such as O or N, or a pattern such as a square, as shown in the center check of FIG. 99. In step 8, image data is generated from data FNTDATA (FIG. 102) stored in the PMEM 6 (step 4) in consideration of the line width information. In step 9, the data formed in steps 7 and 8 and held in the PMEM are sent to the image data output unit 10 and are output from the PRT 9, as shown in FIG. 99.

Finally, the character information output will be described below.

The character information output is performed such that the character code area is designated in the area 97-3 of FIG. 97, and the menu 97-7 in FIG. 97 is picked with the PD 12. The character information to be displayed is shown in FIG. 100.

Figure 104:
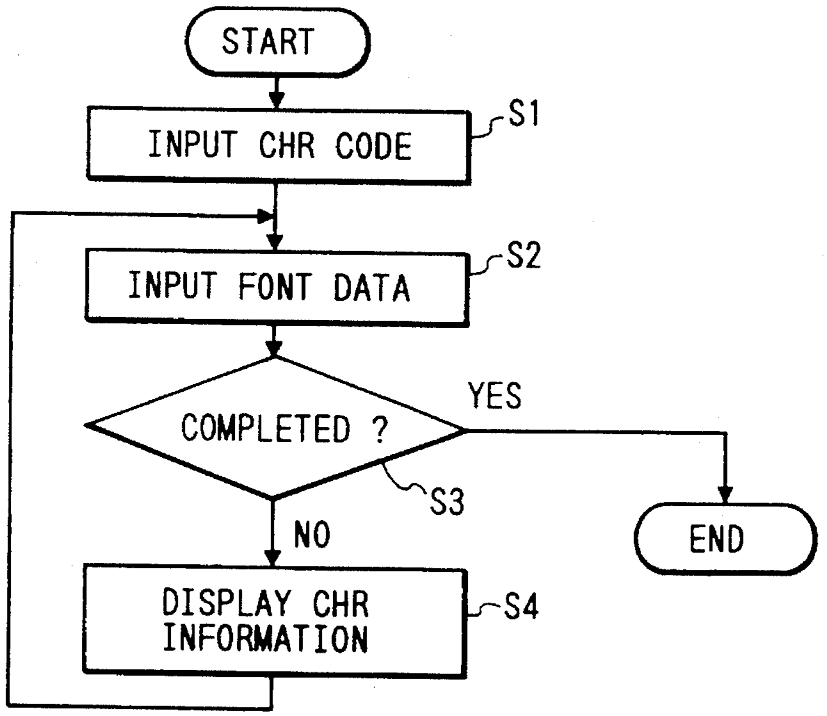
FIG. 104 is a flow chart for explaining the printer output process of this embodiment.

The character information output will be described with reference to a flow chart in FIG. 104. In step 1, start and end codes designated in the area 97-3 in FIG. 97 are stored in the PMEM 6. In step 2, the font data from the start code to the end code stored in the PMEM 6 in step 1 is loaded from the font data file in the disk 3 and is stored in a form (FIG. 102) in the PMEM 6. It is determined in step 3 whether the font data is output up to the end code or data is left in the font data file. The character information output process is then completed. In step 4, the data is formatted with reference to (a) the character information and is output to the PRT 9.

[Utility]

Figure 105:
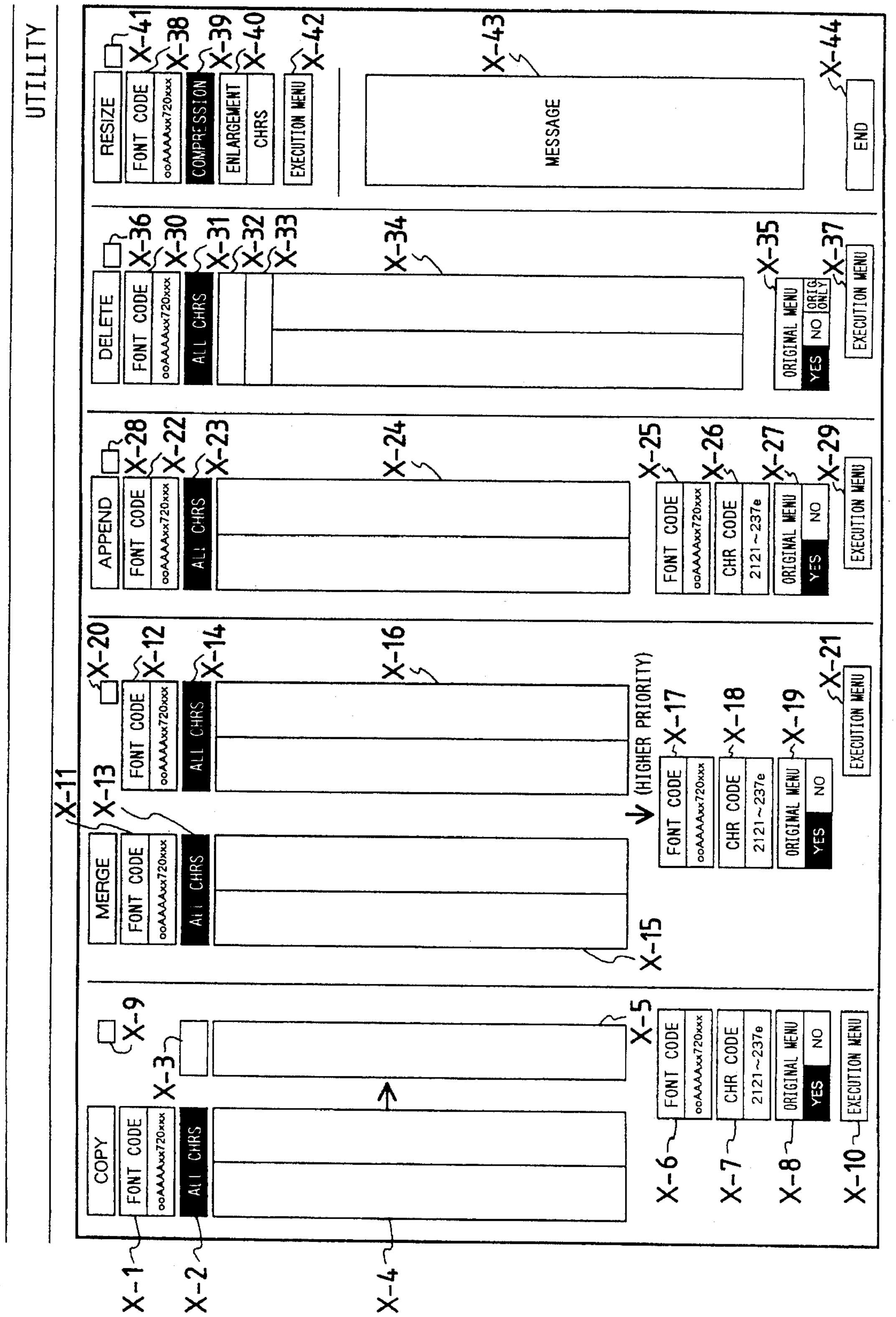
FIG. 105 is a view showing an initial screen state of a utility process of this embodiment.

By picking this menu, the screen is shifted to the utility menu in FIG. 105. The utility will be described with reference to FIG. 105.

FIG. 105 is a utility screen. The utility is divided into six areas, i.e., COPY, MERGE, APPEND, DELETE, RESIZE, and MESSAGE areas. The COPY function has menus X-1 to X-10. The menu X-1 is a font code menu for inputting a font code representing a COPY source file. The menu X-2 is an "ALL CHRS (all characters)" menu for designating that a COPY pattern is a pattern of all characters. The menu X-3 represents "ALL CHRS" start code for designating a COPY destination start code for all the characters. A code designation or target menu X-4 is a menu for designating the COPY source start and end codes when code designation is to be performed. The menu X-5 is a target code menu for inputting a code designation COPY destination start code for inputting the COPY destination start code. The menu X-6 is a font code menu for inputting a font code of the COPY destination target file. The menu X-7 is a character code menu for designating a change in character code of the target file. The menu X-8 is an original menu for designating a process for an original. The menu X-9 is a display menu for determining whether these processes are displayed. The menu X-10 is an execution menu for executing the menus X-1 to X-9.

The MERGE function has menus X-11 to X-21. The menus X-11 and X-12 are font code menus for inputting font codes of files subjected to a merge operation. The menus X-13 and X-14 are "ALL CHRS" menus for designating merging of all the characters of these files. The menus X-15 and X-16 are code designation menus which are picked when codes are designated. The menu X-17 is a font code menu for designating a font code for a merged file. The menus X-18, X-19, X-20, and X-21 are the same as those of the menus X-7, X-8, X-9, and X-10 of the COPY function, respectively. The APPEND function has menus X-22 to X-29. The menu X-22 is a font code menu for inputting a font code of an APPEND source file. The menu X-23 is an "ALL CHRS" menu for designating all characters. The menu X-24 is a code designation menu-for designating a code. The menu X-25 is a font code menu for a font code input area of an APPEND destination file.

The menus X-26, X-27, X-28, and X-29 are the same as the menus X-7, X-8, X-9, and X-10 of the COPY function, respectively.

The DELETE function has menus X-30 to X-37. The menu X-30 is a font code menu for inputting a font code of a file subjected to deletion. The menu X-31 is an "ALL CHRS" menu for designating deletion of all characters. The menu X-34 is a code designation menu for designating a code. The menu X-32 is a deletion menu for designating a code such that only the code designated by the code designation menu X-34 is deleted. The menu X-33 is a menu for designating deletion of a code except for the code designated in the code designation menu X-34. The menu X-35 is an original menu which represents a process for an original. This menu selects no deletion of the original, deletion of the original and its outlines, or deletion of only the original. The menus X-36 and X-37 are the same processes as those of the menus X-9 and X-10 of the COPY function.

The RESIZE function has menus X-38 to X-41. The menu X-38 is a font code menu for inputting a font code of a file subjected to resizing. The menu X-39 is a menu for designating a compression designation area. The menu X-40 is a menu-for designating the number of characters in an enlarged area, and the menu X-41 is an execution menu.

A menu X-43 is a message menu for an area for displaying a process code when designation is made in the display menus X-9, X-20, X-28, X-36, and X-41.

A menu X-44 is an END menu for returning the current state to the state in FIG. 8.

The utility will be described with reference to symbols in FIG. 105.

Copy

Figure 106A:
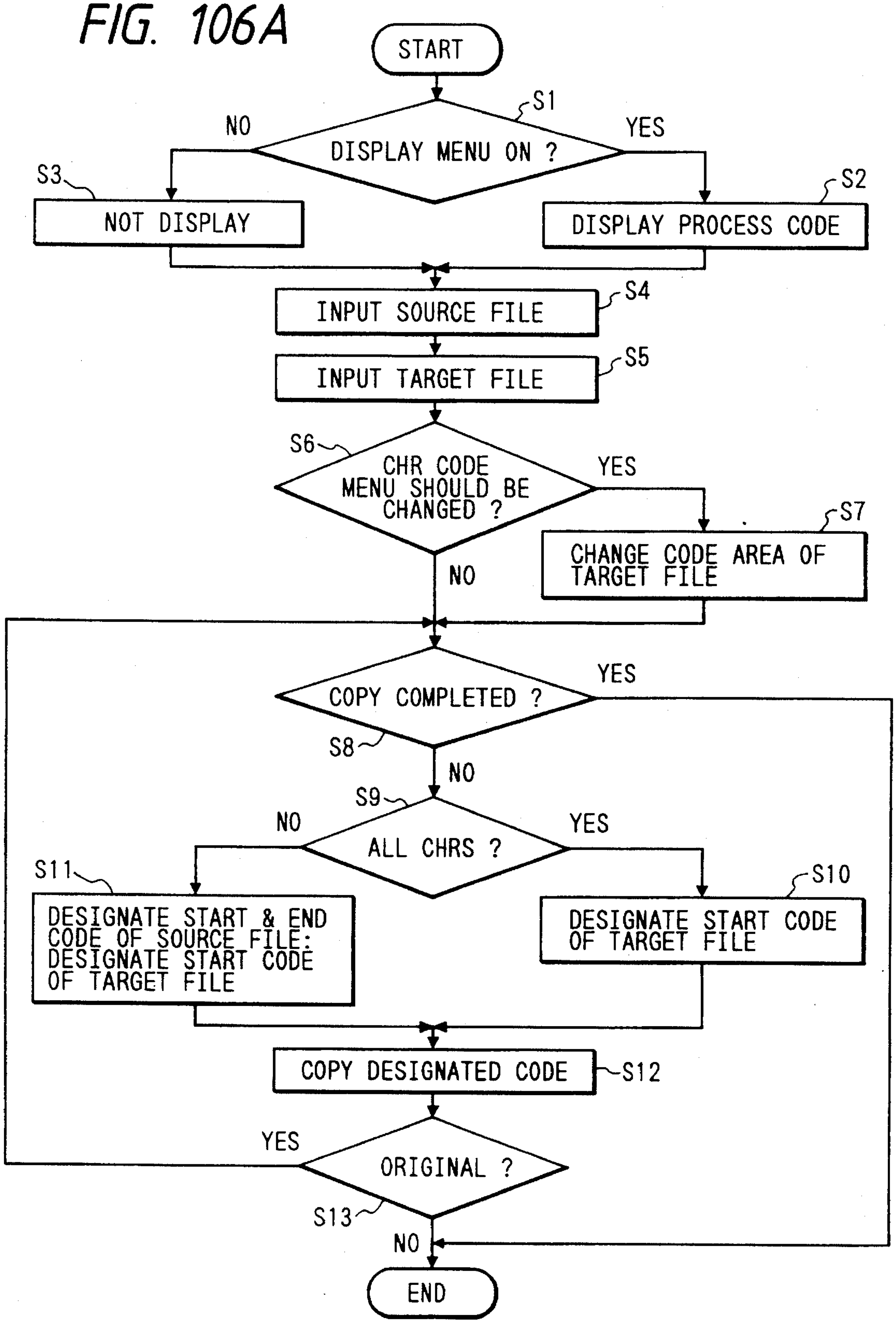
FIGS. 106A to 106C are a flow chart and data formats for explaining a copy process of this embodiment.
Figure 106B:
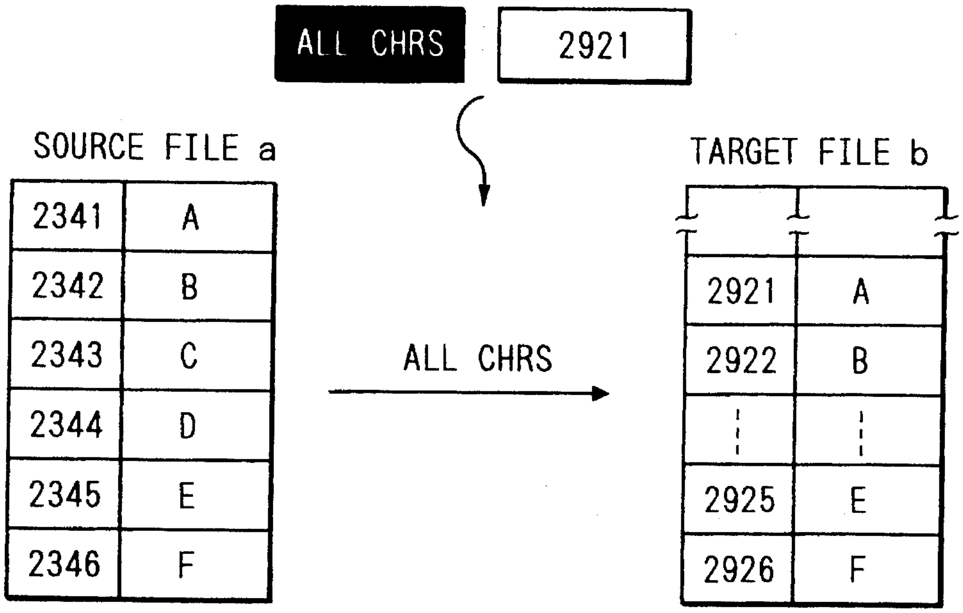
Figure 106C:
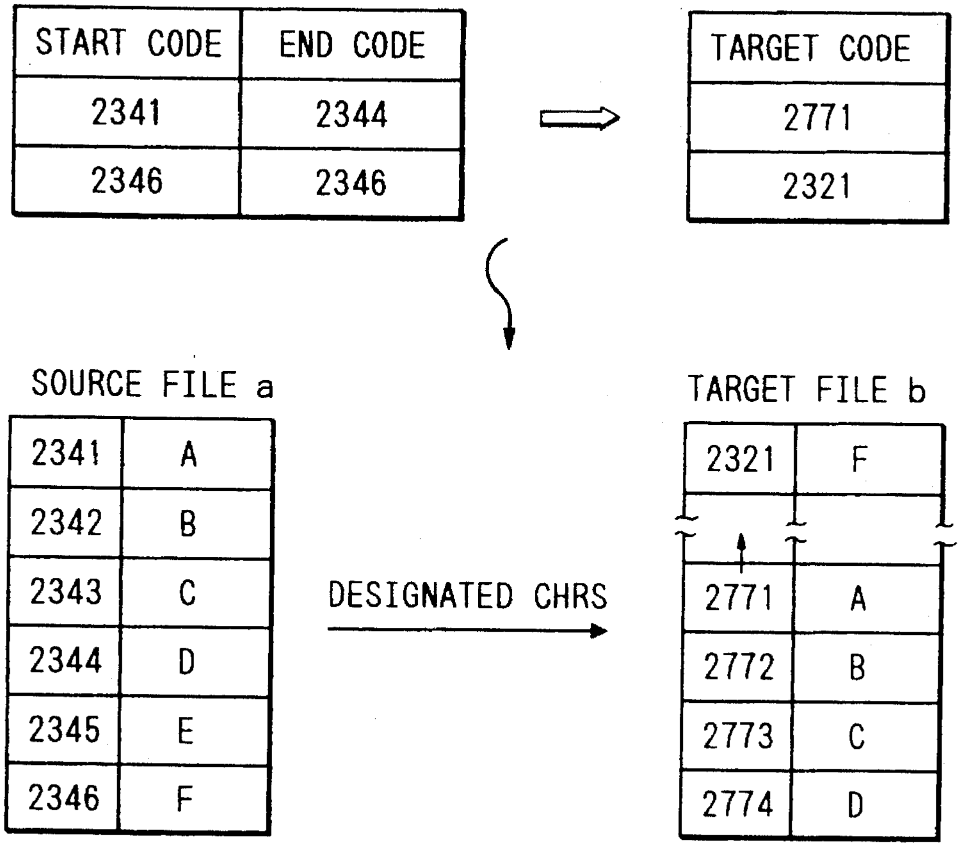

The COPY function will be described with reference to FIGS. 106A to 106C. A description will be made with reference to step numbers in FIG. 106A. A font code (X-1) of a font code (FIG. 106B) of a COPY source file is picked with the PD 12 and is input from the KBD 11 (S4). The PD 12 picks and inputs a target font code (X-6) for the target file (FIG. 106B) (S5). It is determined in step S8 whether the COPY function is ended. If YES in step S8, the COPY function is ended. However, if NO in step S8, it is determined in step 9 whether the copy code designates all characters. If YES in step 9, the "ALL CHRS" menu (X-2) is picked to designate all the characters, as shown in FIG. 106B. A character code "2921" of a target file D is input to the target code menu (X-3). The execution menu (X-10) is picked in step S10, and all the characters are copied after the character code "2921" in step S12. When code designation is to be performed, copy start and end codes are respectively input to the left and right of the code designation menu (X-4), as shown in FIG. 106C. The target start code is input in the code designation target code menu (X-5) in step S11. The execution menu (X-10) is picked to execute copying in step S12. When target code is to be designated outside the area of the character code designated at the time of file formation (S6), it can be designated in the character code menu (X-7) in step S7. It is determined by the original menu (X-8) in step S13 whether similar copying is performed for an original. When the display menu (X-9) is picked to display a process code in the message menu (X-42).

Merge

Figure 107A:
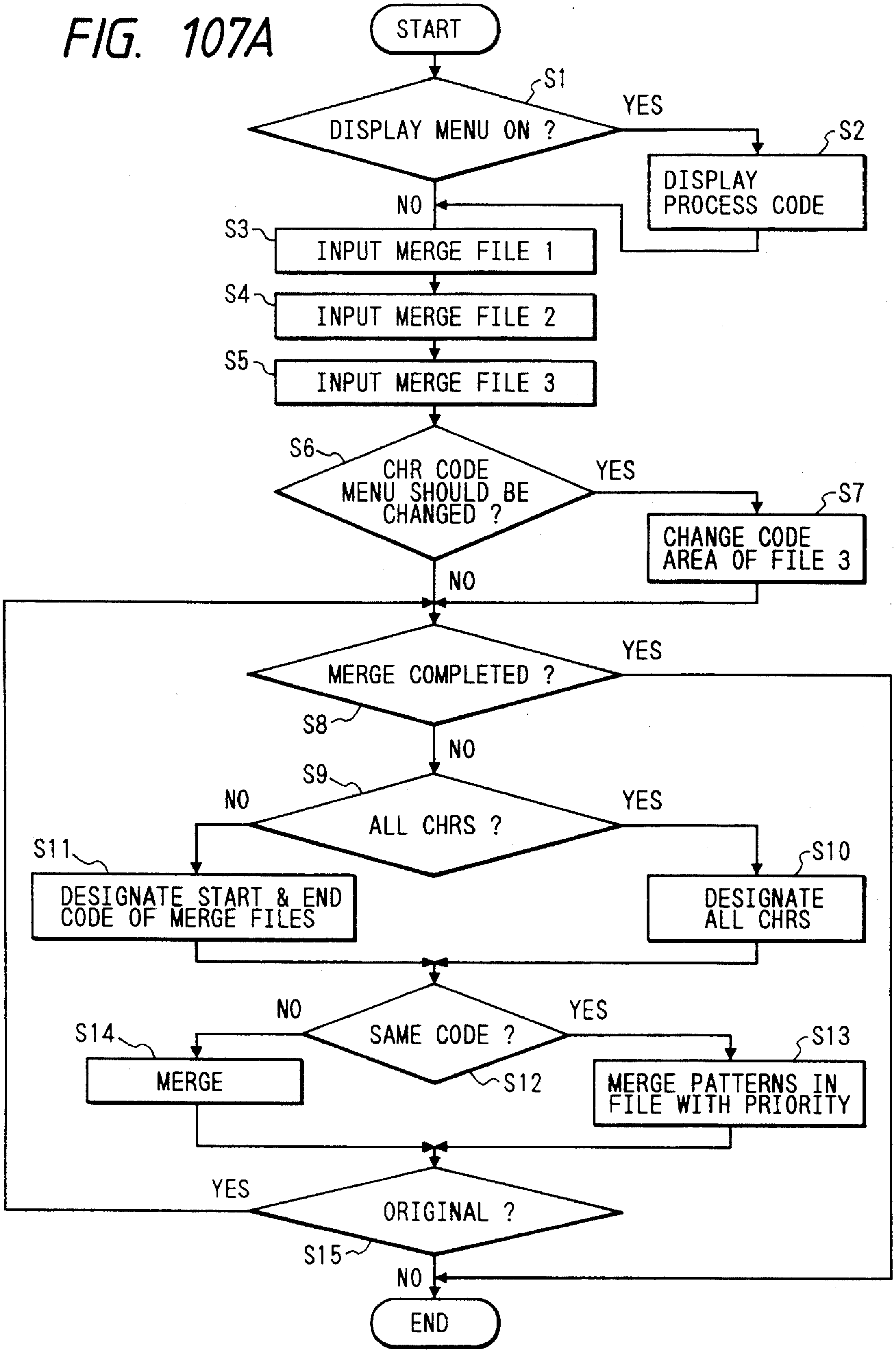
FIGS. 107A to 107C are a flow chart and data formats for explaining a merge process of this embodiment.
Figure 107B:
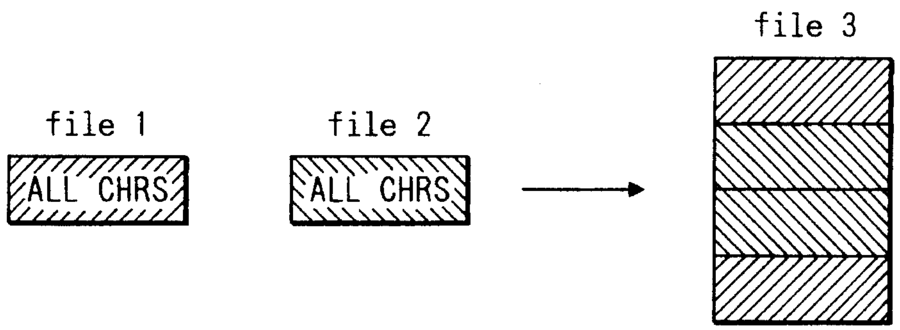
Figure 107C:
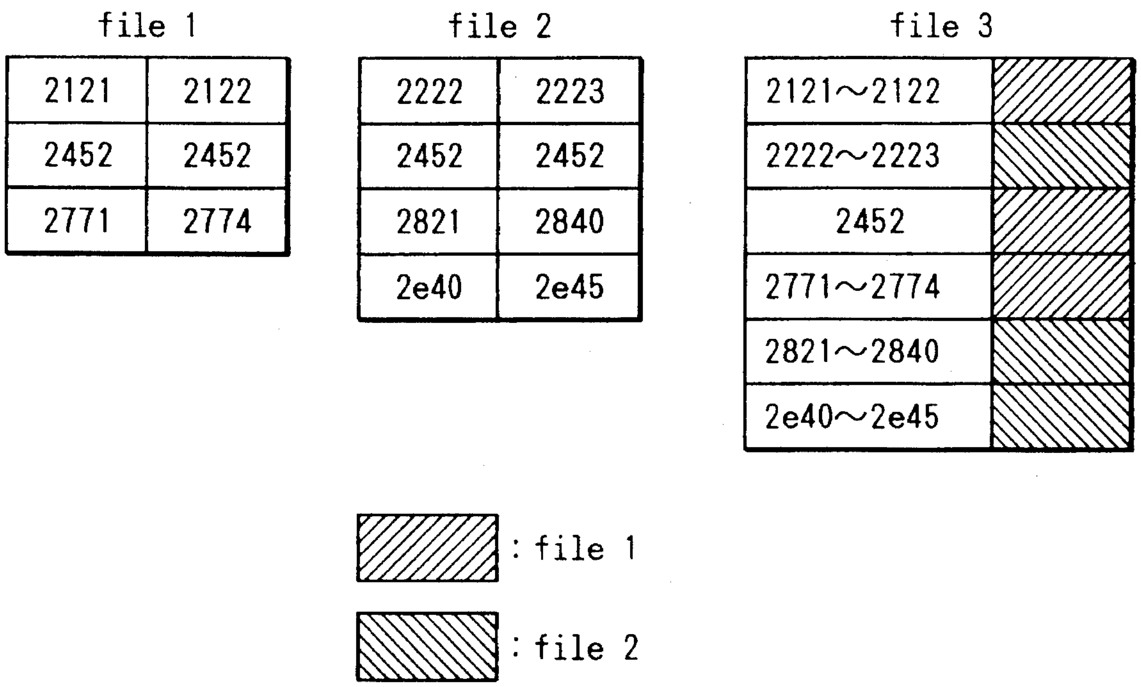

The MERGE function will be described with reference to FIGS. 107A to 107C. A description will be made with reference to step numbers in FIG. 107A. File1, file2, and file3 are described in FIGS. 107B and 107C.

In order to display the MERGE process code, the display menu (X-20) is picked to determine in step S1 whether it is ON. If YES in step S1, the process code is displayed by the message menu (X-43). The font menu codes (X-11 and X-12) of file1 and file2 subjected to merging are picked and are input in steps S3 and S4. The font code of the merged file, i.e., file3 is picked from the font code menu (X-17) and is input in step S5. When file3 is subjected to merging in an area except for the character code area designated during "file forming", the process code can be designated by the character code menu (X-18) in steps S6 and S7. It is determined in step S8 whether merging is ended. If YES in step S8, merging is ended. However, if NO in step S8, it is determined in step S9 whether merging of all characters is determined. If YES in step S9, the "ALL CHRS" menus (X-13 and X-14) of file1 and file2 are picked and designated in step S10. If NO in step S9, the code designation menus (X-15 and X-16) of file1 and file2 are picked to designate the start and end codes in step S11. The execution menu (X-21) is picked and merging is performed. In this case, "SAME CODE? " is determined in step S12. The files are merged with priority in steps S13 and S14. Merging as in the character code "2452" in FIG. 107B is performed. It is determined in step S15 whether merging is performed for the original. If YES in step S15, similar merging is performed. However, if NO in step S15, the MERGE function is ended.

Append

Figure 108A:
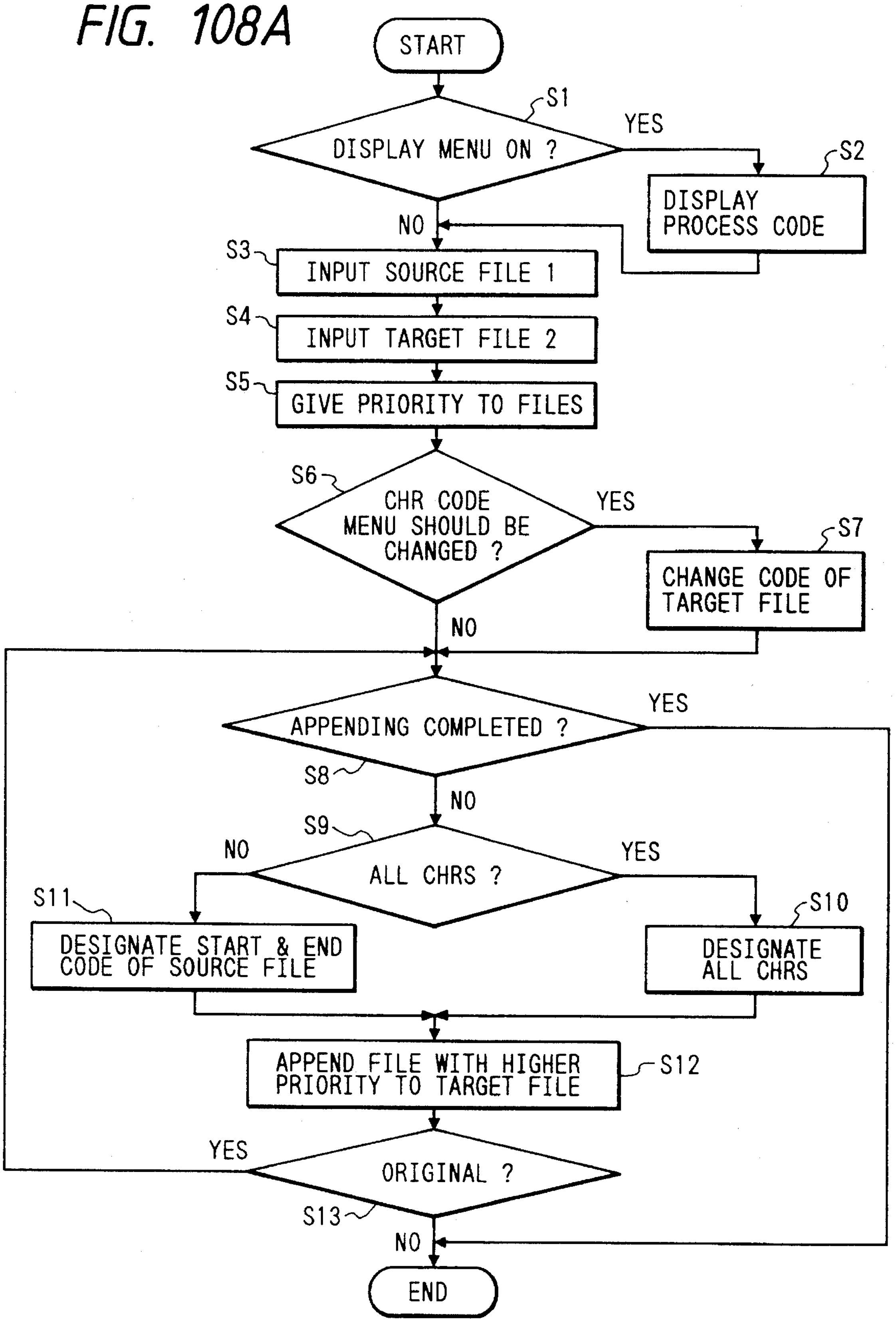
FIG. 108A to 108C are a flow chart and data formats for explaining an append process of this embodiment.
Figure 108B:
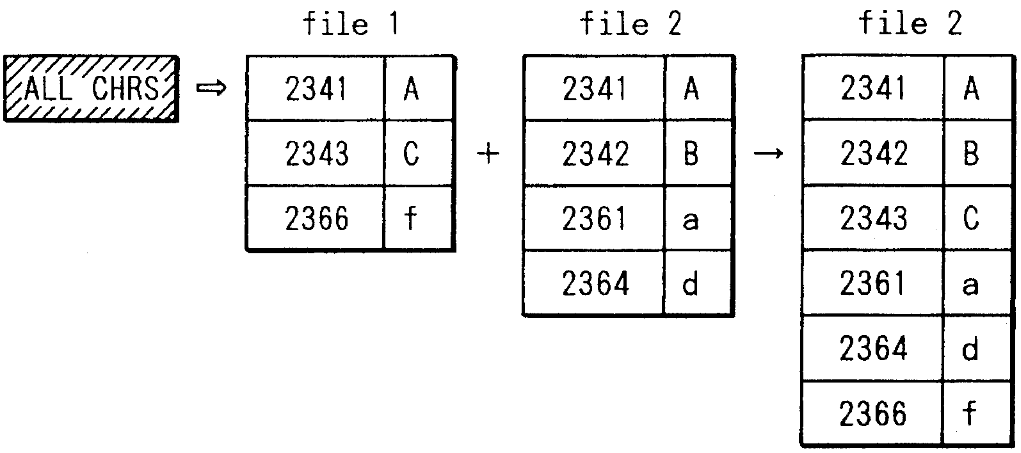
Figure 108C:
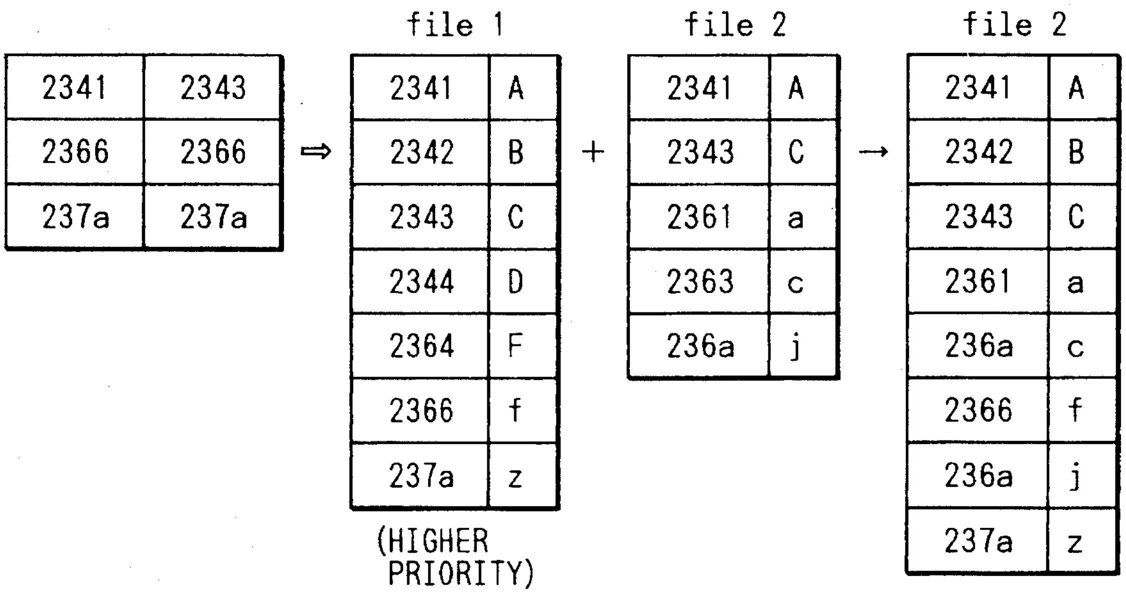

The APPEND function will be described with reference to FIGS. 108A, 108B, and 108C. A description will be made with reference to step numbers in FIG. 108A.

In order to display a process code by the APPEND function, the display menu (X-28) is picked to determine in step S1 whether the code is ON. If YES in step S1, the process code or the like is displayed in the message menu (X-43) in step S2. The font code menu (X-22) is picked to input a font ode for the APPEND source file, i.e., file1 in step S3. The font for the APPEND destination file, i.e., file2 is picked from the font code menu (X-25) and is input in step S4. At this time, a priority order is assigned to these files in step S5. When appending is to be performed in an area except for the character code area designated during file formation, it can be designated in the character code menu (X-26) in steps S6 and S7. It is determined in step S8 whether appending is completed. If YES in step S8, the APPEND function is ended. However, if NO in step S8, it is determined in step S9 whether the APPEND code represents designation of all characters. If YES in step S9, the "ALL CHRS" menu (X-23) is picked and designated in step S10. However, if NO in step S9, the start and end codes of the code to be appended in file1 are picked and designated in the code designation menu (X-24) in step S11. When this designation is ended, the execution menu (X-29) is picked and appending is performed in step S12. It is determined in step S13 by the original menu (X-27) whether similar processing is performed-for the original. If YES in step S13, a similar process is performed. However, if NO in step S13, the flow is ended.

Delete

Figure 109A:
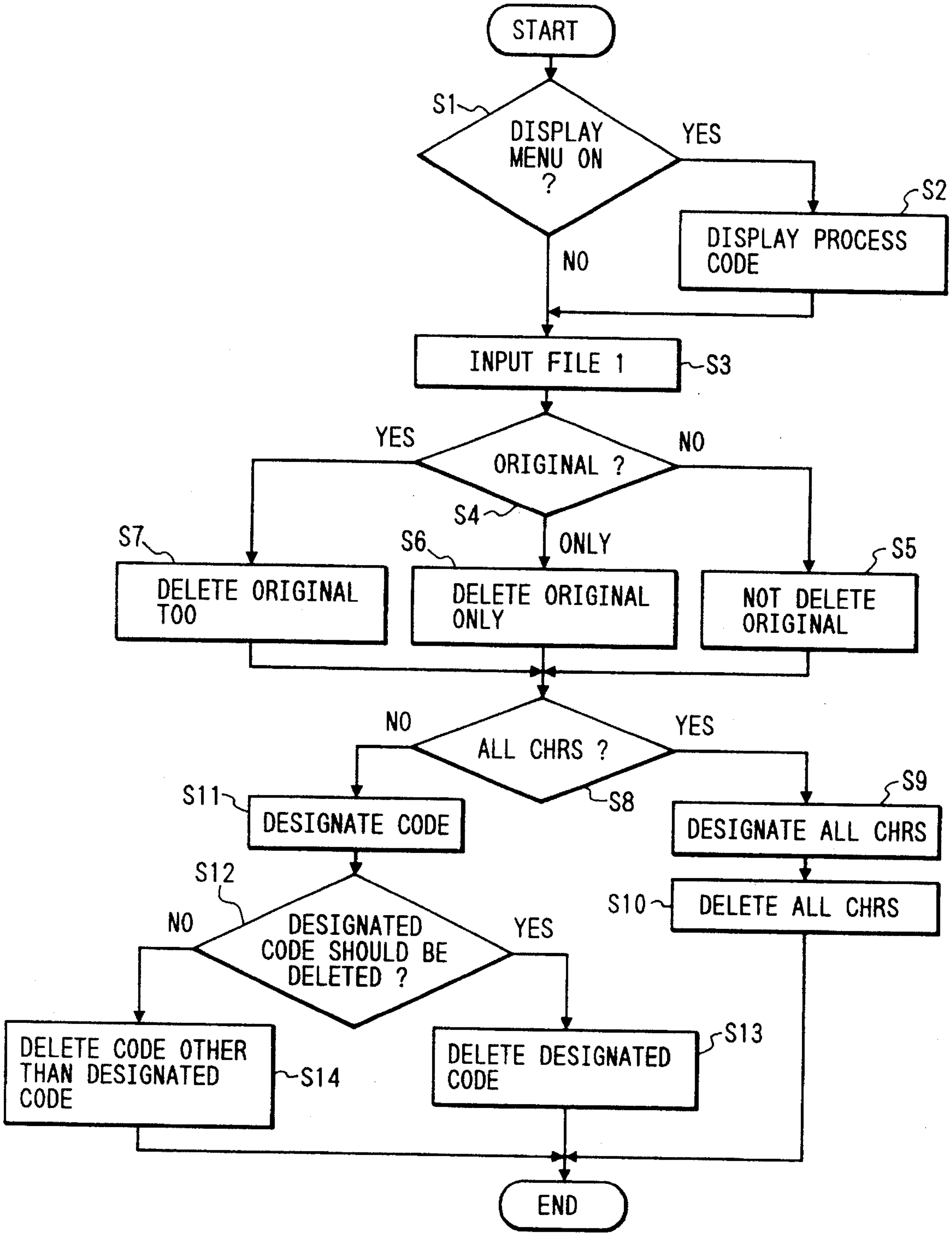
FIGS. 109A to 109C are a flow chart and data formats for explaining a delete process of this embodiment.
Figure 109B:
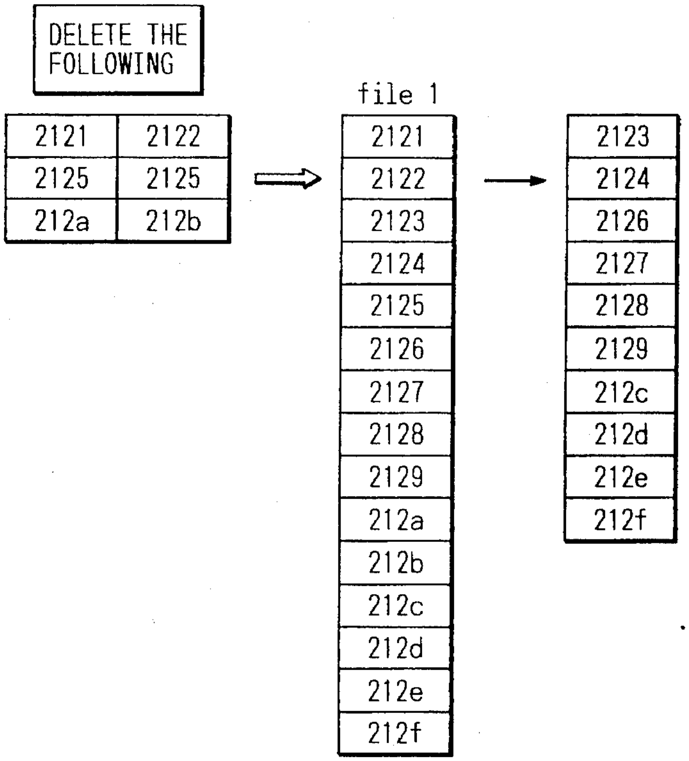
Figure 109C:
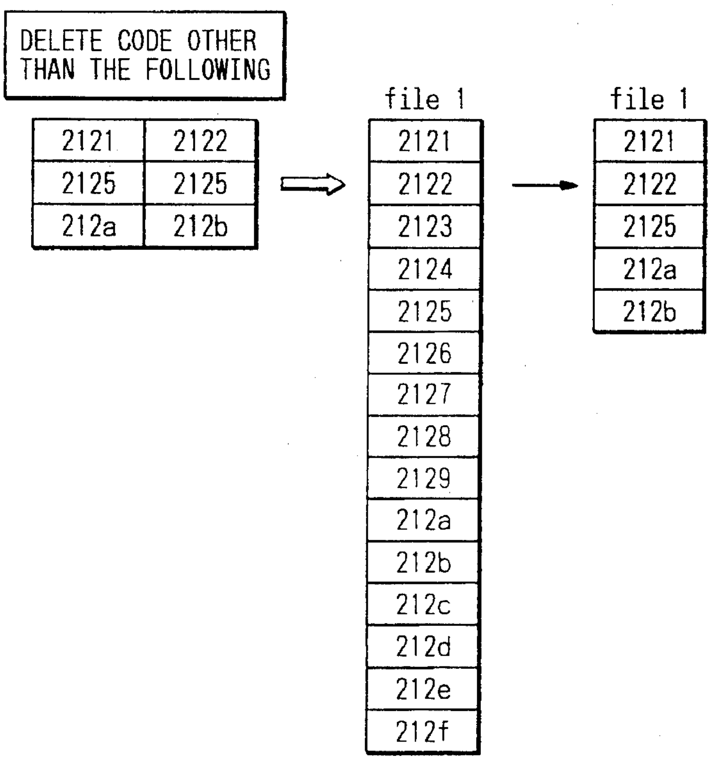

The DELETE function will be described with reference to FIGS. 109A, 109B, and 109C.

It is determined in step S1 whether a process code or the like by the DELETE function is displayed in the message menu (X-36). If YES in step 1, the process code and the like are displayed.

The font code of file1 subjected to deletion is picked and input from the font code menu (X-30) in step S3. It is determined in step S4 whether the original is to be deleted. If NO in step S4, the original is not deleted in step S5. If deletion of only the original is designated, only the original is deleted in step S6. If YES in step S4, the original is also deleted in step S7. It is determined in step S8 whether the DELATE code represents deletion of all characters. If YES in step S8, the "ALL CHRS" menu (X-31) is picked to designate deletion of all characters in step S9. The execution menu is picked to perform deletion in step S10. If NO in step S8, the start and end codes of the DELETE code are picked and designated from the code designation menu (X-34) in step S11. The menu (X-32) for deleting only the designated code and the menu (X-33) for deleting data except for the designated code are determined to be ON or OFF in step S12. If the menu (X-32) is ON, only the designated code is deleted. If the menu (X-33) is ON, deletion except for the designated code is performed in step S14.

Resize

Figure 110:
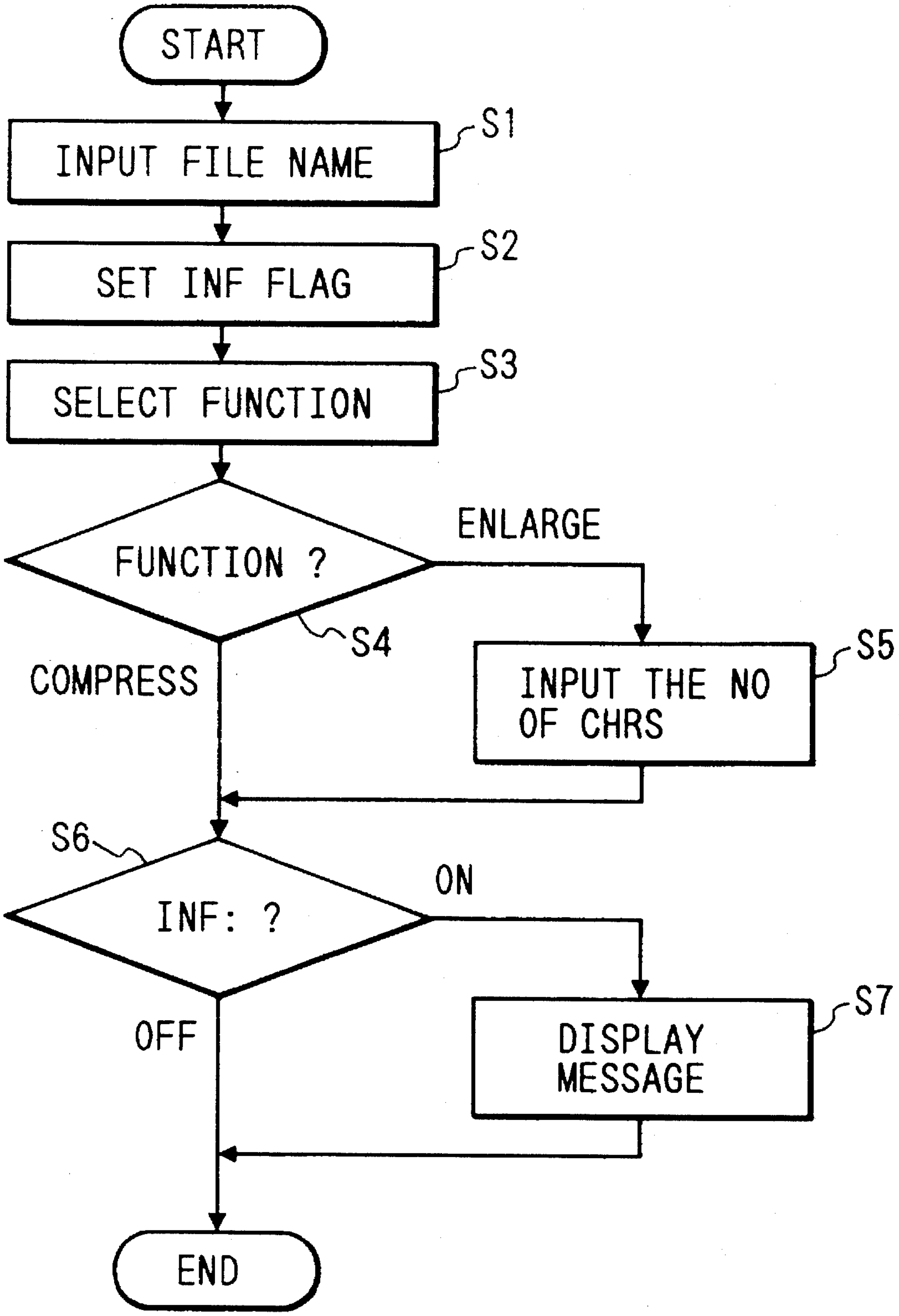
FIG. 110 is a flow chart for explaining a resize process of this embodiment.
Figure 111:
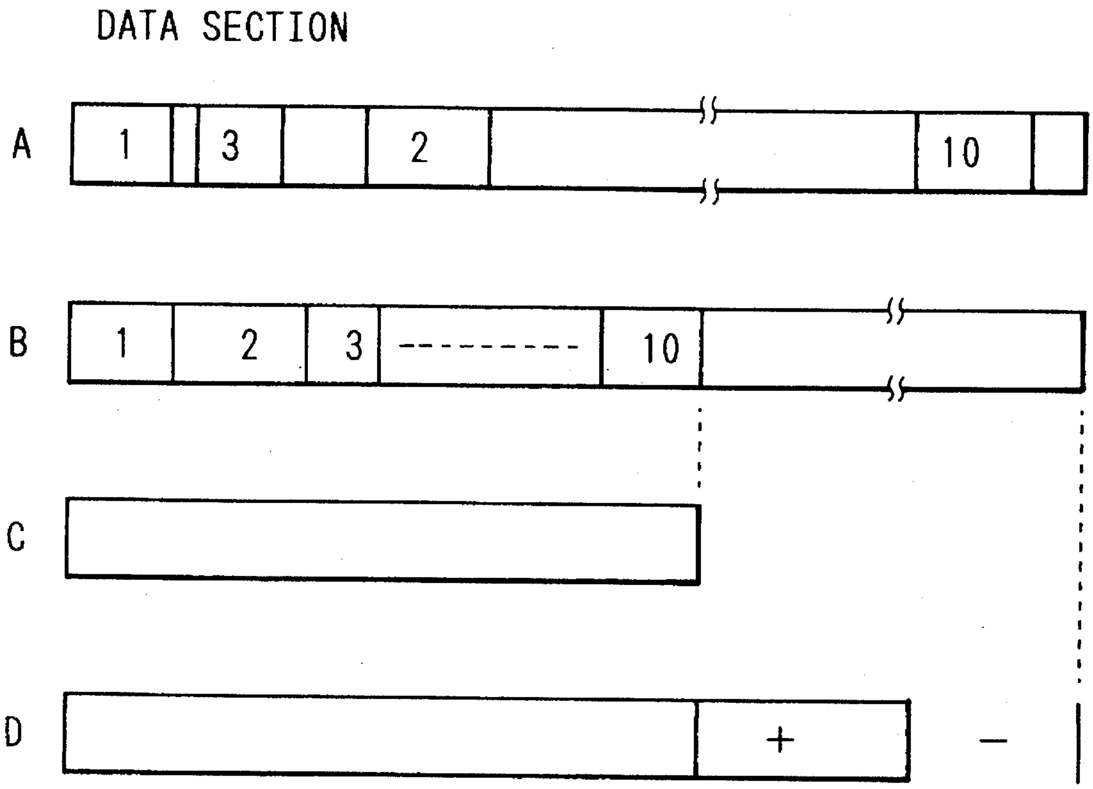
FIG. 111 is a view for explaining the resize process of this embodiment.

The RESIZE function will be described below. A description will be made with reference to step numbers in FIG. 110.

A target file name is input in step S1. The process code display, i.e., an INF flag is set in step S2. Finally, the function is selected in step S3 and is executed.

The functions include compression and enlargement functions. By the compression function, data set in a state A is rearranged without forming any space between codes in an order of code numbers, thereby obtaining a state B. Finally, an unused area is released to obtain a state C to compress the file. Enlargement is to change the size of the data. As in the compression function, data is set in the state B, and an enlargement size is input as the plus (+) or minus (−) number of characters. If the plus number of characters is input, the area is enlarged by (average number of blocks constituting one character)×(number of characters). In the case of the minus number of characters, the area is reduced from the state B by (average number of blocks)×(number of characters). Note that the area cannot be smaller than that in the state C.

Point movement described with reference to FIG. 60 will be additionally described below. The end point E2' picked in FIG. 56 and the intermediate points M2' and M3' are set on a straight line. This operation is performed to smooth connections of a curve represented by the end points E1 and E2 and a curve represented by the end points E2 and E3. That is, the points M2, E2, and M3 are aligned on a straight line so as to obtain equal connection gradients at the end point E2. This condition is also set for the points E3 and M4 and the points E1 and M1. In particular, all points are aligned on the x- or y-axis, the above operation can prevent generation of an extended portion caused by quantization errors at the maximum point, i.e., E2. In the above two cases, the positional relationships are maintained even after point movement is performed. When the associated points are located on a given straight line in point movement, these points are moved as a group, or the points can be moved with reference to the designation point along only the x- or y-axis. Referring to FIG. 56, the width between the straight line including the end point E2 and the end point on the inner curve can be stored as the width between the straight lines, i.e., as one hint information of the pieces of information shown in FIGS. 10A, 10B, 10D, and 10E and FIGS. 35A to 35D. In addition, it is advantageous that the width can be easily controlled because these lines are straight lines.

As has been described above, there can be provided a figure processing method capable of easily enlarging a figure pattern by plural types of operations.

As has been described above, there is provided a figure processing method capable of determining whether the designated menu is an interruption menu, and performing the designated menu if the designated menu is determined as the interruption menu, and performing the previously executed menu upon completion of the designated menu process.

What is claimed is:

1. A figure processing method comprising the steps of:

displaying on a screen a figure pattern represented by coordinate information;

designating on the screen a desired rectangular frame by pointing to two points on the screen;

deriving an enlargement factor of the displayed figure pattern based on the designated rectangular frame and a predetermined area; and operating on the coordinate information based on the derived enlargement factor to convert the operated coordinate information into a dot pattern, thereby displaying information of the designated rectangular frame in the predetermined area.

2. A method according to claim 1, wherein, in said deriving step, the enlargement factor is derived based on the length of one side of each of the rectangular frame and the predetermined area.

3. A figure processing method comprising the steps of:

displaying on a screen a figure pattern represented by coordinate information;

designating on the screen a desired one point;

deriving an enlargement factor of the displayed figure pattern based on the one point designated in said designating step and a distance from the one point to a predetermined point within a predetermined area; and operating on the coordinate information based on the derived enlargement factor to convert the operated coordinate information into a dot pattern, thereby displaying the dot pattern on the screen, wherein, in said deriving step, the enlargement factor is derived to be larger than 1 if in said designating step the desired one point has been designated in a first area within the predetermined area, and wherein the enlargement factor is derived to be smaller than 1 if in said designating step the desired one point has been designated in a second area within the predetermined area.

4. A method according to claim 3, wherein the first area comprises an area which lies above the predetermined point and the second area comprises an area which lies below the predetermined point.

5. A figure processing apparatus comprising:

means for displaying on a screen a figure pattern represented by coordinate information;

means for designating on the screen a desired rectangular frame by pointing to two points on the screen;

means for deriving an enlargement factor of the displayed figure pattern based on the designated rectangular frame and a predetermined area; and means for operating on the coordinate information based on the derived enlargement factor to convert the operated coordinate information into a dot pattern, thereby displaying information of the designated rectangular frame in the predetermined area.

6. An apparatus according to claim 5, wherein said deriving means derives the enlargement factor based on the length of one side of each of the rectangular frame and the predetermined area.

7. A figure processing apparatus comprising:

means for displaying on a screen a figure pattern represented by coordinate information;

means for designating on the screen a desired one point;

means for deriving an enlargement factor of the displayed figure pattern based on the one point designated by said designating means and a distance from the one point to a predetermined point within a predetermined area; and means for operating on the coordinate information based on the derived enlargement factor to convert the operated coordinate information into a dot pattern, thereby displaying the dot pattern on the screen, wherein said deriving means derives the enlargement factor to be larger than 1 if said designating means has designated the desired one point in a first area within the predetermined area, and derives the enlargement factor to be smaller than 1 if said designating means has designated the desired one point in a second area within the predetermined area.

8. An apparatus according to claim 7, wherein the first area comprises an area which lies above the predetermined point and the second area comprises an area which lies below the predetermined point.

9. A figure processing method comprising the steps of:

displaying on a screen a figure pattern represented by coordinate information;

designating on the screen a desired rectangular frame, by pointing to two points on the screen;

designating a display area in which image information included in the desired rectangular frame is enlarged and displayed;

deriving an enlargement factor of the displayed figure pattern based on the designated rectangular frame and the designated display area; and operating on the coordinate information based on the derived enlargement factor to convert the operated coordinate information into a dot pattern, thereby displaying information of the designated rectangular frame in the designated display area.

10. A figure processing apparatus comprising:

means for displaying on a screen a figure pattern represented by coordinate information;

means for designating on the screen a desired rectangular frame by pointing to two points on the screen;

means for designating a display area in which image information included in the desired rectangular frame is enlarged and displayed;

deriving an enlargement factor of the displayed figure pattern based on the designated rectangular frame and the designated display area; and means for operating on the coordinate information based on the derived enlargement factor to convert the operated coordinate information into a dot pattern, thereby displaying information of the designated rectangular frame in the designated display area.

* * * * *

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

On the title page: Item

[56] REFERENCES CITED

Other Publications
"Fundametnals" should read --Fundamentals--.

[57] ABSTRACT

Line 3, "screen," should read --screen.--.
Line 5, "interruption," should read --interruption.--

SHEET 11

FIG. 14, "DEGITIZING" should read --DIGITIZING--.

SHEET 28

FIG. 30C, "SYN THE SIZE" should read --SYNTHESIZE--.

SHEET 92

Figure 85:
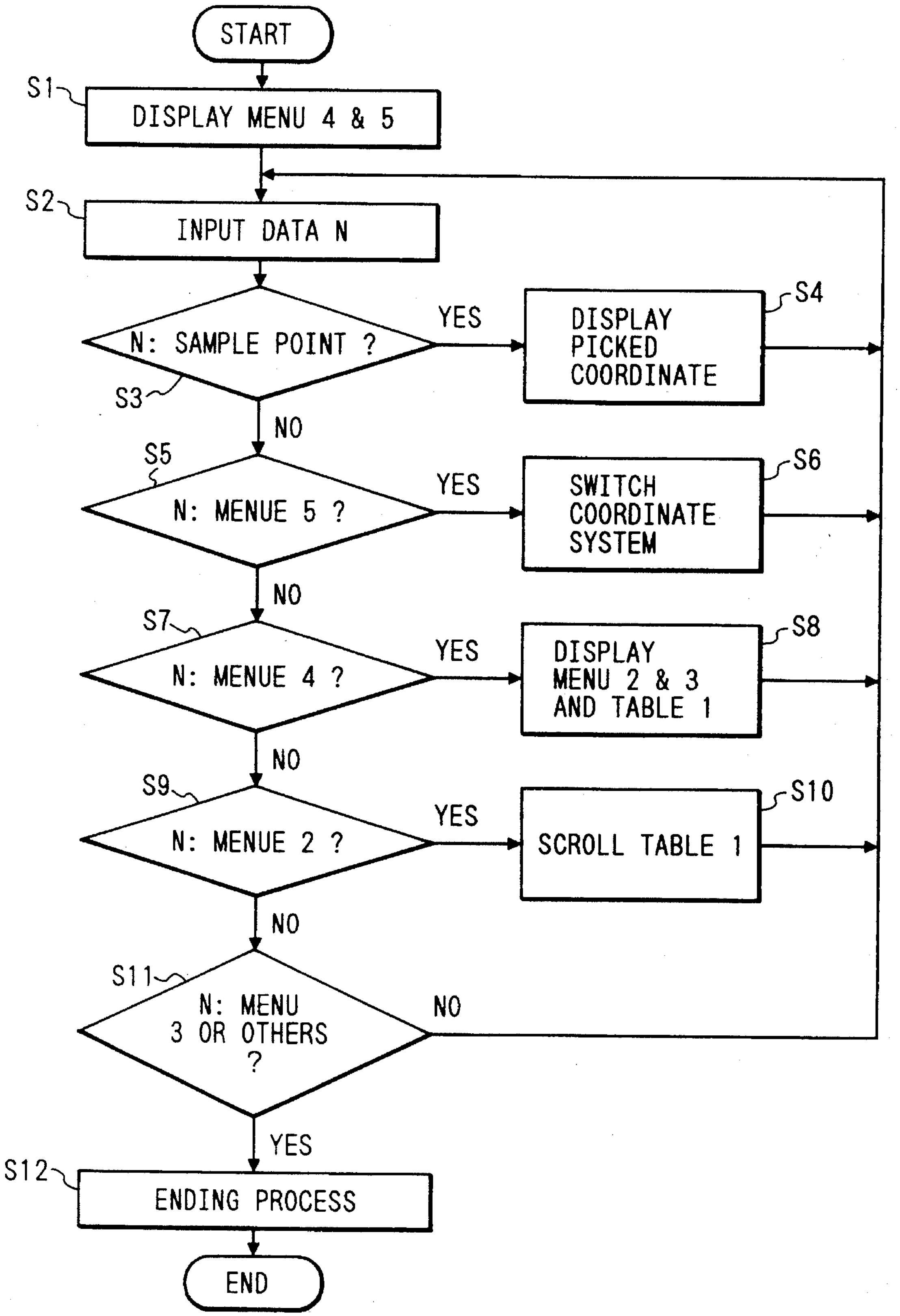
FIG. 85 is a flow chart for explaining the point coordinate display process of this embodiment.

FIG. 85, "MENU 4 & 5" should read --MENUS 4 & 5,--; "MENU 2 & 3" should read --MENUS 2 & 3--; and "MENUE" (all occurrences) should read --MENU--.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

FIGURES

Insert Amended Figures 12, 17, 19, 21, 23, 24, 26, 27, 30A, 38, 39, 41, 42, 43, 44, 45, 46A, 46B, 48, 49, 52, 53, 56, 57, 58, 62, 63, 65, 67, 68, 69, 79-82, 84, 86-88, 90, 91, 95, 97, 98, 105 and 106B

COLUMN 1

Line 28, "of" should read --to--.
Line 37, "problem." should read --problems.--.
Line 40, "however" should be deleted.
Line 47, "system" should read --systems--.
Line 58, "a" should read --the--.

COLUMN 3

Line 25, "Of" should read --of--.
Line 52, "explaining" should read --explaining a--.
Line 54, "outline-paining" should read --outline-painting--.

COLUMN 4

Line 5, "explaining" should read --explaining the--.
Line 31, "64-2" should be deleted.
Line 63, "explaining" should read --explaining the--.

UNITED STATES PATENT AND TRADEMARK OFFICE
CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 5

Line 30, "explaining" should read --explaining a--.

COLUMN 6

Line 5, "sate" should read --state--.
Line 66, "system," should read --system, and--.

COLUMN 7

Line 4, "figures" should read --the figures--.
Line 39, ".the" should read --the--.

COLUMN 8

Line 8, "of" should be deleted.
Line 16, "S8-3" should read --S8-c--.
Line 27, "paining" should read --painting--.

COLUMN 9

Line 45, "for" should read --for a--.
Line 55, "include" should read --includes--.
Line 58, "quality" should read --the quality--.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 10

Line 58, "causing" should read --used by--.
Line 65, "button from the left" should read --button--.

COLUMN 12

Line 14, "$a_o$, $b_o$, $c_o$ and $d_o$" should read --$a_0$, $b_0$, $c_0$ and $d_0$--
Line 44, "data" should read --data of--.

COLUMN 13

Line 35, "requires to" should read --requires the operator to--.
Line 47, "FIG. 13," should read --FIG. 17,--.

COLUMN 16

Line 34, "order-from" should read --order from--.
Line 41, "each menu" should read --each of these menus--.

COLUMN 17

Line 30, "accurately" should read --accurate--.

UNITED STATES PATENT AND TRADEMARK OFFICE
CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 18

Line 27, "below. The" should read --below. ¶ The--.
Line 38, "and" should read --along with--.
Line 54, "32B. Input" should read --32B. ¶ Input--.

COLUMN 19

Line 50, "When" should read --when--.
Line 55, "desired" should read --a desired--.

COLUMN 20

Line 32, "specific-type" should read --specific type--.

COLUMN 21

Line 9, "S8-J)" should read --S8-j)--.
Line 53, "38 In" should read --38 is scrolled. In--.
Line 54, "No" should read --No.-- and "corresponded by" should read --corresponding to--.
Line 55, "the display the" should read --the displayed-- and "of" should be deleted.
Line 64, "An" should read --A--.

COLUMN 22

Line 40, "However, a" should read --However, if a--.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 23

Line 20, "data. In this case" should read --data,--.
Line 56, "10" should be deleted.
Line 59, "into" should read --in--.

COLUMN 24

Line 14, "segments," should read --segments, and--.
Line 32, "in-step" should read --in step--.
Line 38, "19" should read --13--.
Line 45, "a. direction" should read --a direction--.

COLUMN 25

Line 37, "steep" should read --step--.
Line 43, "OFF - IF OFF 10 in" should read --OFF. IF OFF in--.

COLUMN 26

Line 63, "to basically" should read --basically to more--.
Line 64, "an-arbitrary" should read --an arbitrary--.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 27

Line 9, "Of" should read --of--.
Line 31, "E2." should read --E2,--.
Line 32, "Therefore," should be deleted.

COLUMN 28

Line 14, "the PMEM. The" should read --the PMEM, the--.

COLUMN 30

Line 42, "PMEM 6. The" should read --PMEM 6, the--.
Line 45, "FLAG. The" should read --FLAG, the--.

COLUMN 31

Line 55, "VRAM. 14" should read --VRAM 14--.
Line 62, "either X" should read --either the X--.

COLUMN 32

Line 41, "M1x=I1x+(12x=I1x)*K" should read --M1x=I1x+(12x-I1x)*K--.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 33

Line 46, "received-in" should read --received in--.
Line 52, "15," (first occurrence) should read --14,--.
Line 53," the" should be deleted.
Line 57, "for receiving" should read --to receive--.

COLUMN 34

Line 3, "a-circle" should read --a circle--.
Line 43, "a PMEM." should read --the PMEM.--.

COLUMN 35

Line 8, "executes" should read --executing--.
Line 9, "of other" should read --of the other--.
Line 53, "indicate" should read --indicates--.

COLUMN 38

Line 14, "When" should be deleted.

UNITED STATES PATENT AND TRADEMARK OFFICE

CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 39

Line 11, "a kind" should read --a kind of outline--.
Line 42, "to error" should read --for error--.

COLUMN 41

Line 5, ""ALL CHRS (all characters)"" should read --"ALL CHRS" (all characters)--.
Line 36, "menu for" should read --menu for--.
Line 61, "menu for" should read --menu for--.

COLUMN 42

Line 29, "When" should be deleted.

COLUMN 43

Line 4, "ode" should read --code--.
Line 23, "performed-for" should read --performed for--.
Line 64, "Enlargement is" should read --Enlargement is selected--.

UNITED STATES PATENT AND TRADEMARK OFFICE
CERTIFICATE OF CORRECTION

PATENT NO. : 5,596,689

DATED : January 21, 1997

INVENTOR(S) : MASAAKI TAMURA ET AL.

It is certified that error appears in the above-identified patent and that said Letters Patent is hereby corrected as shown below:

COLUMN 44

Line 15, "particular, all" should read --particular when all--.
Line 26, "hint" should read --unit of--.

Signed and Sealed this

Thirty-first Day of March, 1998

Attest:

BRUCE LEHMAN

*Attesting Officer*

*Commissioner of Patents and Trademarks*